US012020194B2

(12) United States Patent
Gupta

(10) Patent No.: US 12,020,194 B2
(45) Date of Patent: Jun. 25, 2024

(54) SYSTEM AND METHOD FOR ASSISTING ENTITIES IN MAKING DECISIONS

(71) Applicant: Mayank Gupta, Calgary (CA)

(72) Inventor: Mayank Gupta, Calgary (CA)

( * ) Notice: Subject to any disclaimer, the term of this patent is extended or adjusted under 35 U.S.C. 154(b) by 171 days.

(21) Appl. No.: 17/514,524

(22) Filed: Oct. 29, 2021

(65) Prior Publication Data

US 2022/0138657 A1 May 5, 2022

Related U.S. Application Data

(60) Provisional application No. 63/108,297, filed on Oct. 31, 2020.

(51) Int. Cl.

*G06N 5/04* (2023.01)
*G06N 5/045* (2023.01)
*G06Q 10/0637* (2023.01)
*G06Q 10/0639* (2023.01)

(52) U.S. Cl.

CPC ....... *G06Q 10/06375* (2013.01); *G06N 5/041* (2013.01); *G06N 5/045* (2013.01); *G06Q 10/06393* (2013.01)

(58) Field of Classification Search

CPC ....... G06Q 10/06375; G06Q 10/06393; G06N 5/041; G06N 5/045

See application file for complete search history.

(56) References Cited

U.S. PATENT DOCUMENTS

| | | | | |
|---|---|---|---|---|
| 2003/0069870 A1* | 4/2003 | Ras | G06Q 10/10 706/54 |
| 2010/0036699 A1* | 2/2010 | Merrifield, Jr. | G06Q 10/06 705/7.38 |

(Continued)

FOREIGN PATENT DOCUMENTS

KR 101425951 B1 * 8/2014

OTHER PUBLICATIONS

"The Decision Matrix: Make Better Decisions With This Spreadsheet Template" by Pinola (2019) (https://zapier.com/blog/decision-matrix-template/) (Year: 2019).*

*Primary Examiner* — Sujay Koneru
(74) *Attorney, Agent, or Firm* — Mayank Gupta

(57) ABSTRACT

A system and method for assisting entities or users to make decisions is disclosed. The user access the decision-making engine (MG Case composite) for end-to-end decision-making process. The system comprises a computing device (physical or on the cloud) having a processor and a memory, and a database. The engine comprises multiple modules such as case open, structure, MG Case matrix, brainstorming, problem solving, data analysis, speed math, and case end along with drive and alignment, integration and transition, and insights and impacts. The system is an integrated system and the modules are executed by the processor to perform an operation that draws on modules as needed. The decision-making engine interacts with internal and external facets of an organization, including users, various communication systems, ERPs, databases, etc. to execute various tasks related to decision making such as gathering data and driving the decision-making process through the organization or with the user.

20 Claims, 108 Drawing Sheets

(56) References Cited

U.S. PATENT DOCUMENTS

| | | | | |
|---|---|---|---|---|
| 2010/0145715 | A1* | 6/2010 | Cohen | G06T 11/206 705/1.1 |
| 2010/0153127 | A1* | 6/2010 | Rosenthal | G06Q 99/00 715/780 |
| 2011/0239044 | A1* | 9/2011 | Kumar | G06Q 20/4016 714/15 |
| 2014/0287398 | A1* | 9/2014 | Singh | G09B 7/02 434/350 |
| 2015/0302436 | A1* | 10/2015 | Reynolds | G06Q 10/06 705/7.32 |
| 2018/0101598 | A1* | 4/2018 | Allen | G06F 40/268 |
| 2018/0314949 | A1* | 11/2018 | Bender | G06Q 50/02 |
| 2019/0087756 | A1* | 3/2019 | Hull | G06Q 10/06316 |
| 2020/0327818 | A1* | 10/2020 | Byron | G09B 7/02 |

* cited by examiner

1600

| Company | Competition/ Industry | Product | Customer |
|---|---|---|---|
| Competency | Major Players | What Is The Product (Description, Ad, Disad) | Who Is Customer |
| Loyalty | Benchmarks | Why Do People Buy It | Decision Making Criteria |
| Revenue | Barriers To Entry | Product Life Cycle Details | Willingness To Play |
| Value Chain | Barriers To Exit | Process To Make, Deliver | Power Of Customer |
| Costs | Products | Commodity/ Differentiation Points | Channels |
| Organization Design And Structure | Industry Life Cycle | Channels | |
| Channels, Etc | Etc | Etc | Etc |

| | Type | Example Questions / Templates | Breakdown | |
|---|---|---|---|---|
| 1 | **Stakeholders / Elements** | Various Stakeholders Or Elements In The Frame (Who All Or What All Is Impacted)<br>- How To Increase Revenue<br>- Why Did It Go Down | - Int/Ext And 3CP<br>- All Elements<br>- All Stakeholders<br>- 4P | - Core/Non Core Functions |
| 2 | **Business** | How To Break Down Analysis | Financial/Non financial<br>Economic/Qualitative | |
| 3 | **Formula (2 Parts)** | First Step To Breaking Down Information And Then Repeat | Profit = Revenue, Cost | Fixed/Variable/ Investment |
| 4 | **Decision** | Why Did Someone Do Something<br>Why Did A Company Not Launch Digital<br>Why Did It Launch Digital | - Have Choice/ Have No Choice<br>-Yes/No/Maybe<br>- Advantage/Disadvantage | |
| 5 | **Ensure An Outcome /Avoid** | How To Avoid Or How To Sustain<br>- How To Avoid Drop In Revenue<br>- How To Ensure Stable Growth | - Preventive/Corrective<br>- Short term/Medium Term/Long Term | |
| 6 | **Commodity** | | - Supply Demand | Supply<br>- Rod<br>Demand<br>- CC |
| 7 | **Solve The Issue** | | Solve It/Don't Solve/Give Perception Of Solving It<br>Solve Ourselves/someone Else Solves | |
| 8 | **Growth** | | Organic/Inorganic/Hybrid | |
| 9 | **Functions/Tasks** | | - Core/Non Core Functions<br>- Important/Not Important | |
| 10 | **Time Dependent** | | - Urgent/Not Urgent<br>- Critical/Non Critical<br>- Short Term/Med/Long Term | |

FIG. 18

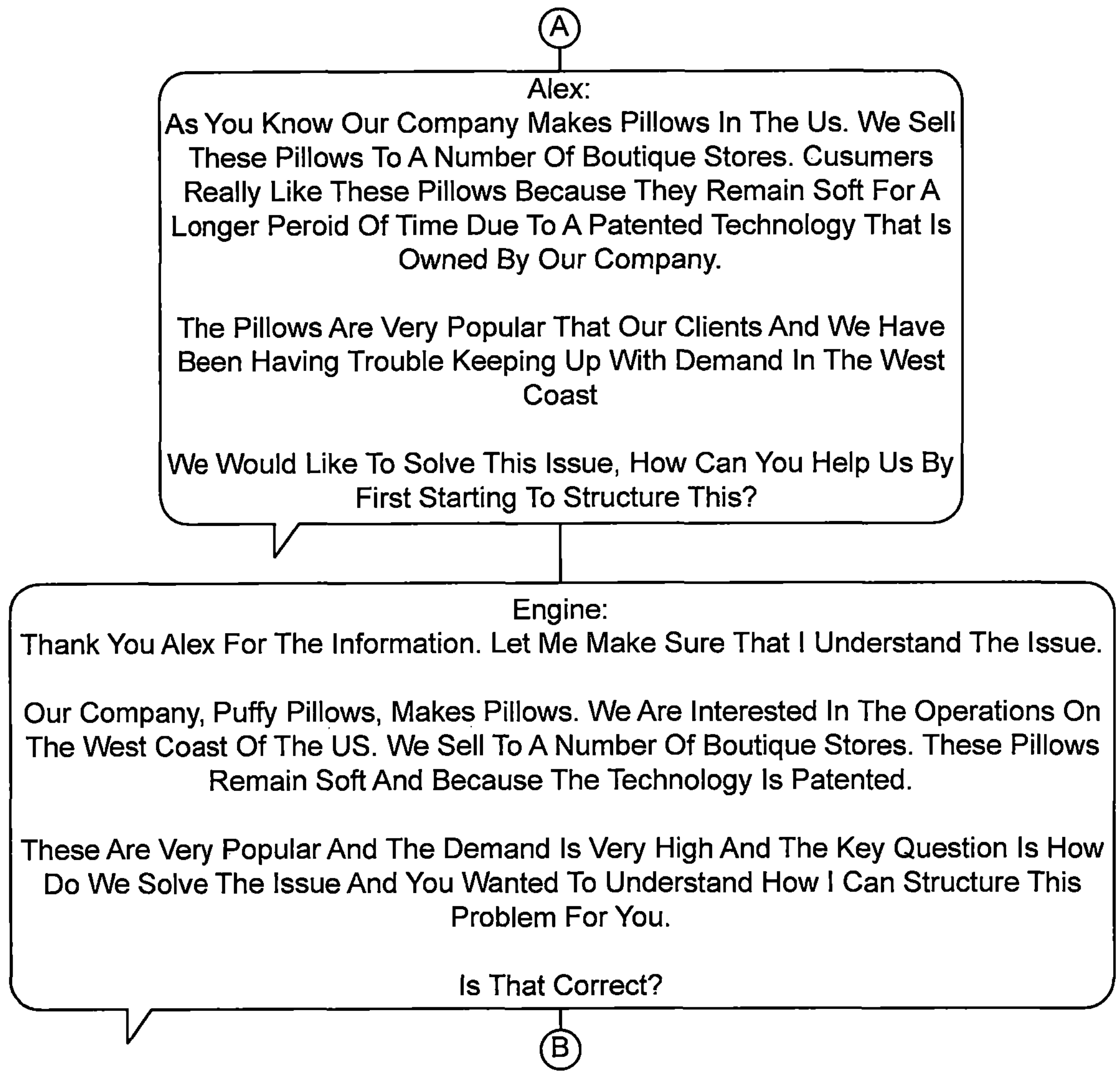
FIG. 23 (Cont. 1)

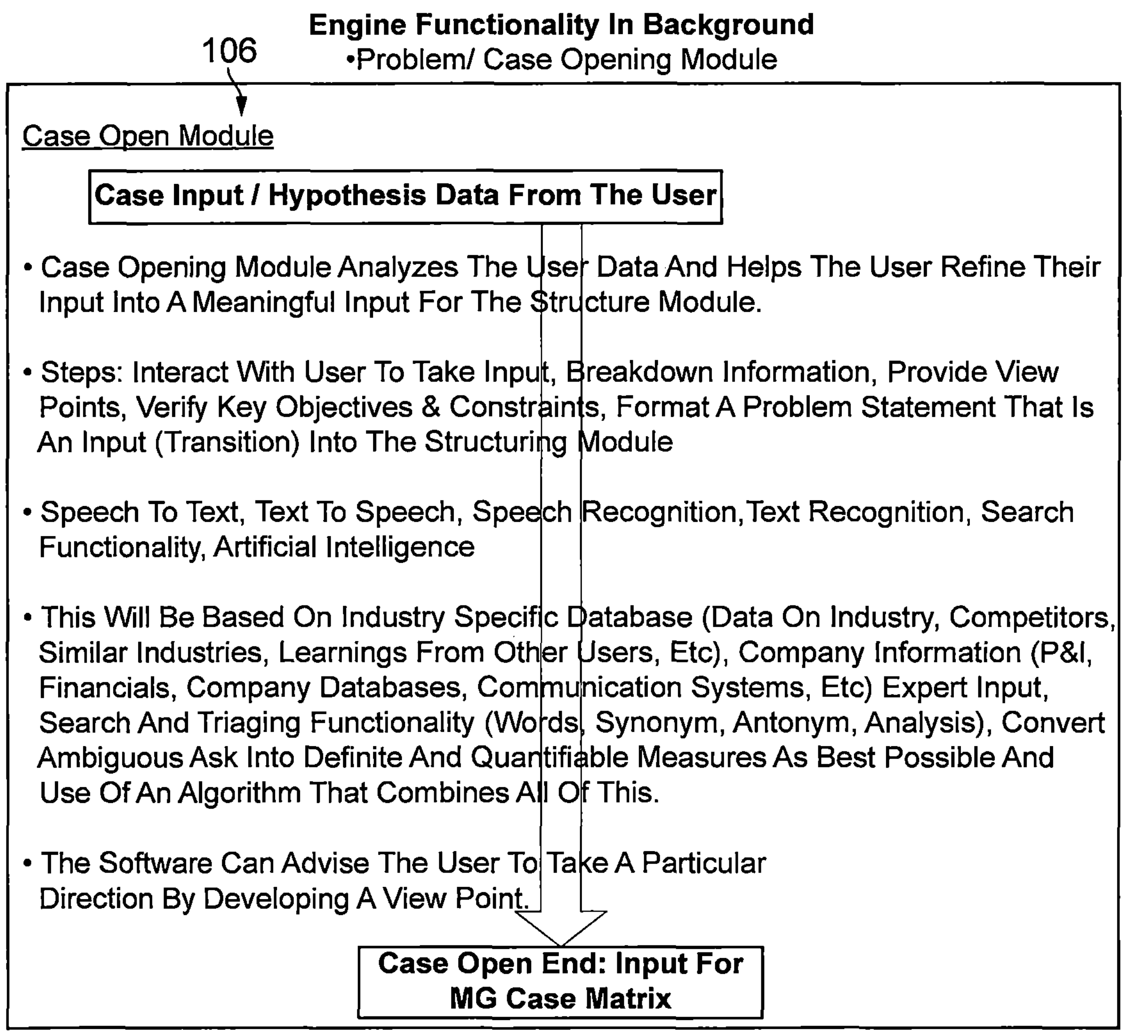
Engine Is Analyzing The Case Using Case Opening Module
FIG. 23 (Cont. 2)

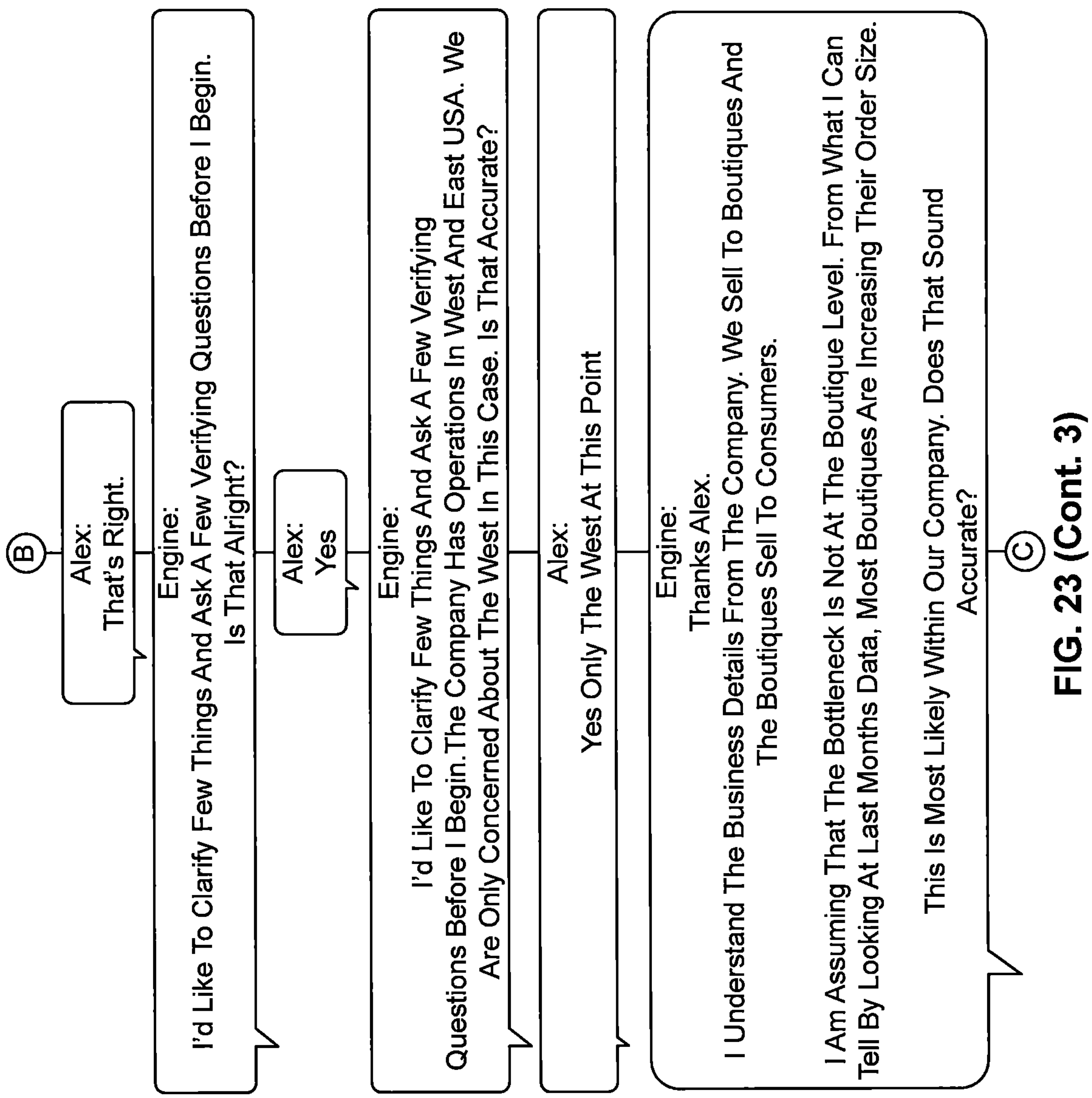
FIG. 23 (Cont. 3)

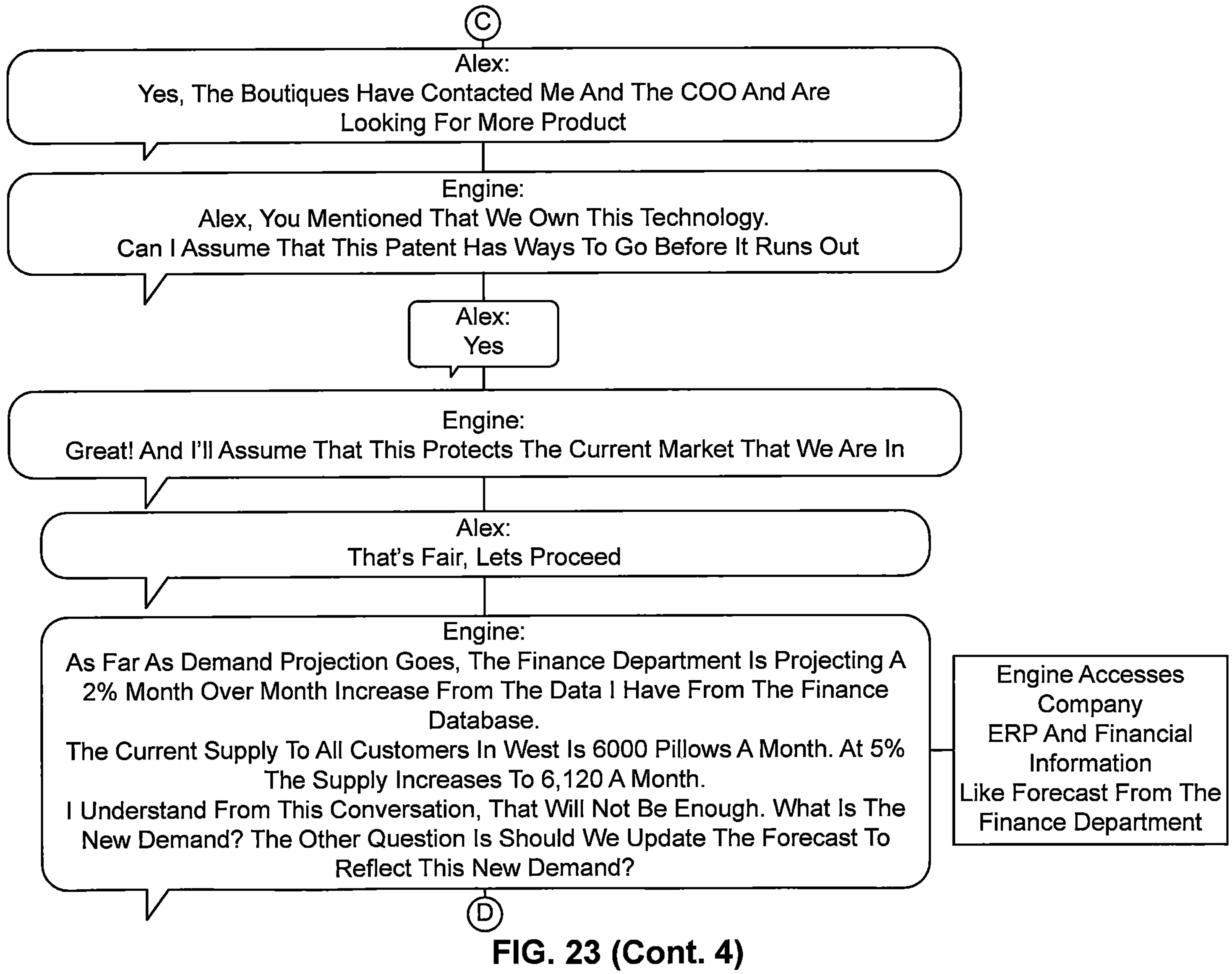
FIG. 23 (Cont. 4)

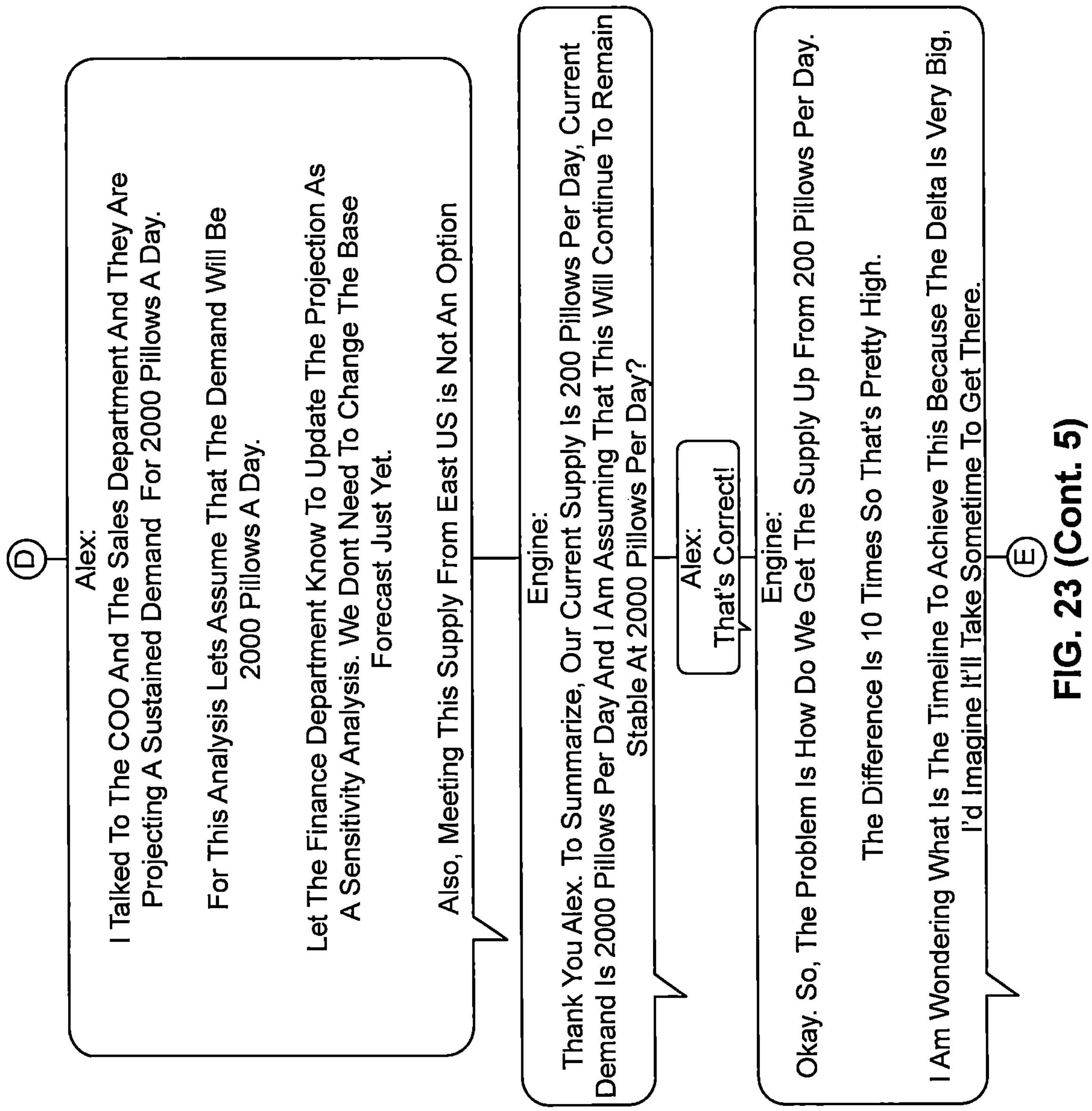
FIG. 23 (Cont. 5)

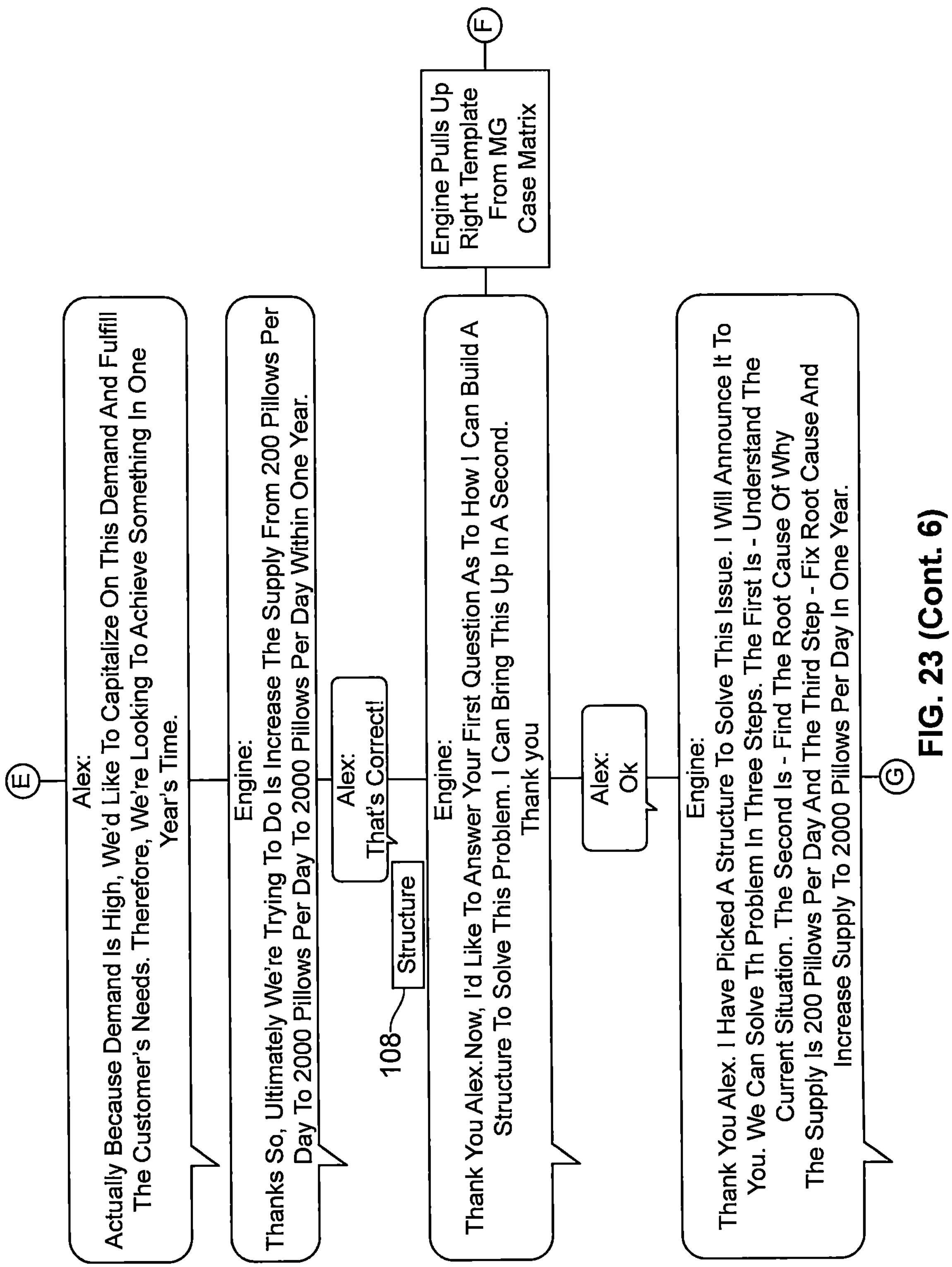
FIG. 23 (Cont. 6)

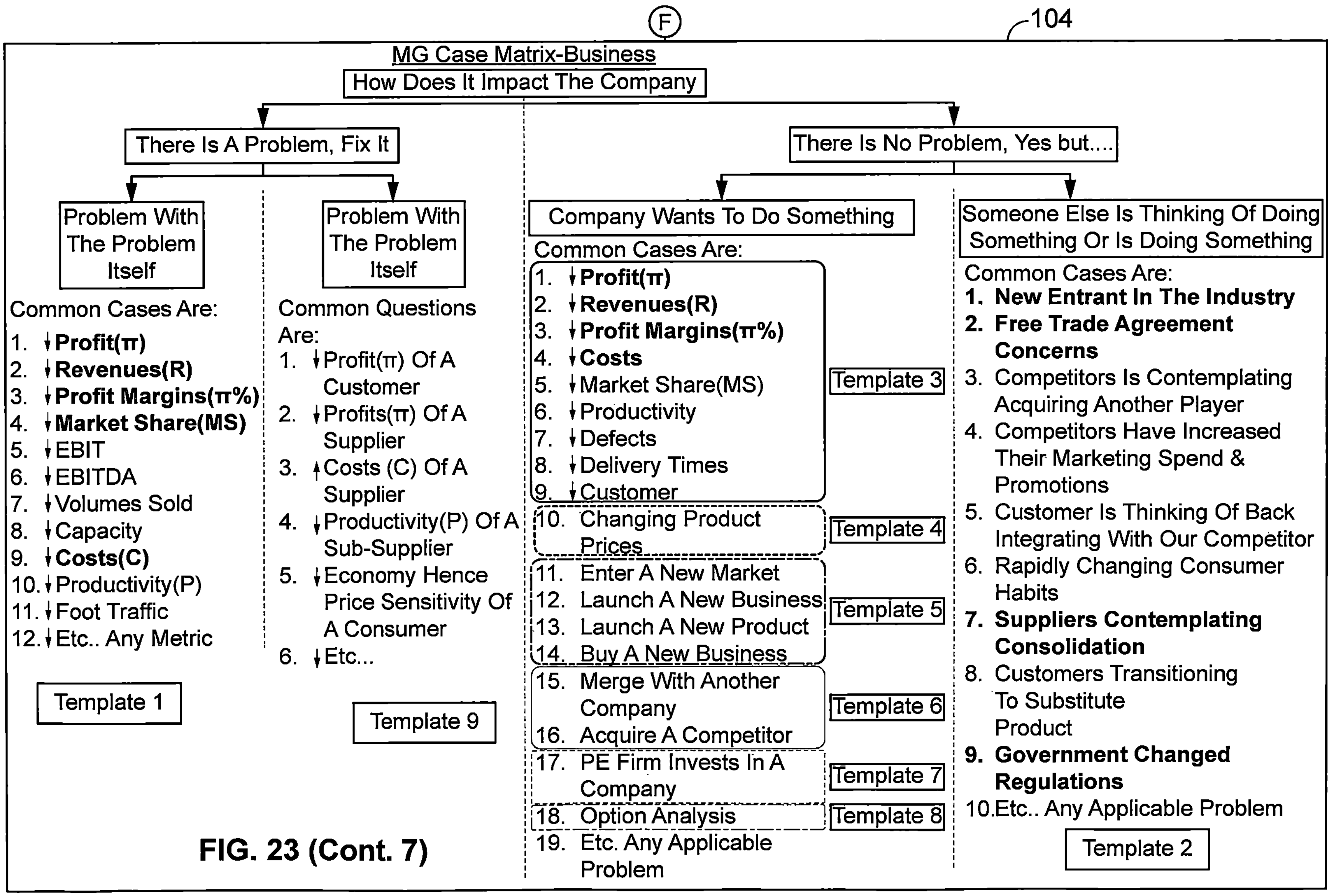
FIG. 23 (Cont. 7)

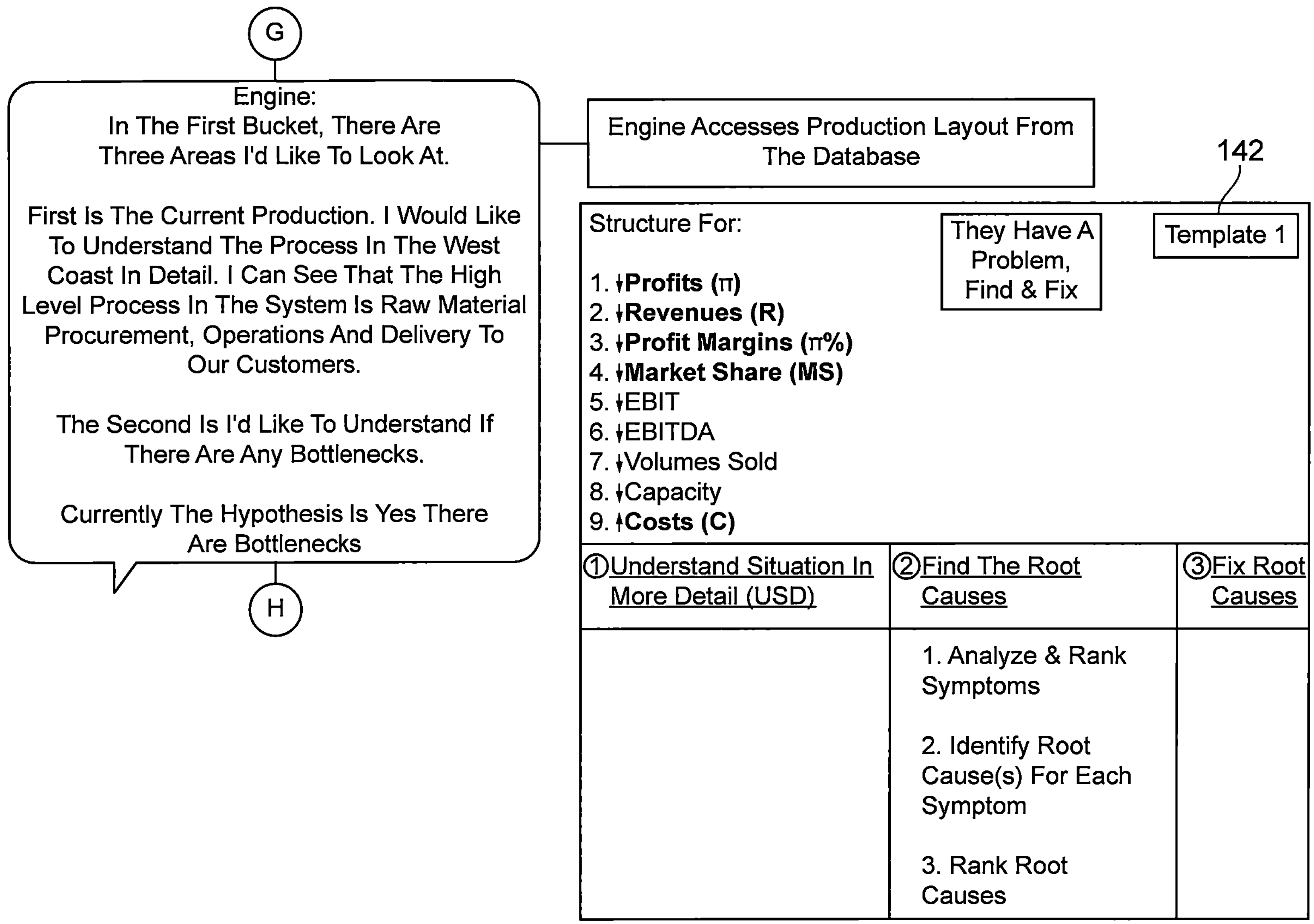
FIG. 23 (Cont. 8)

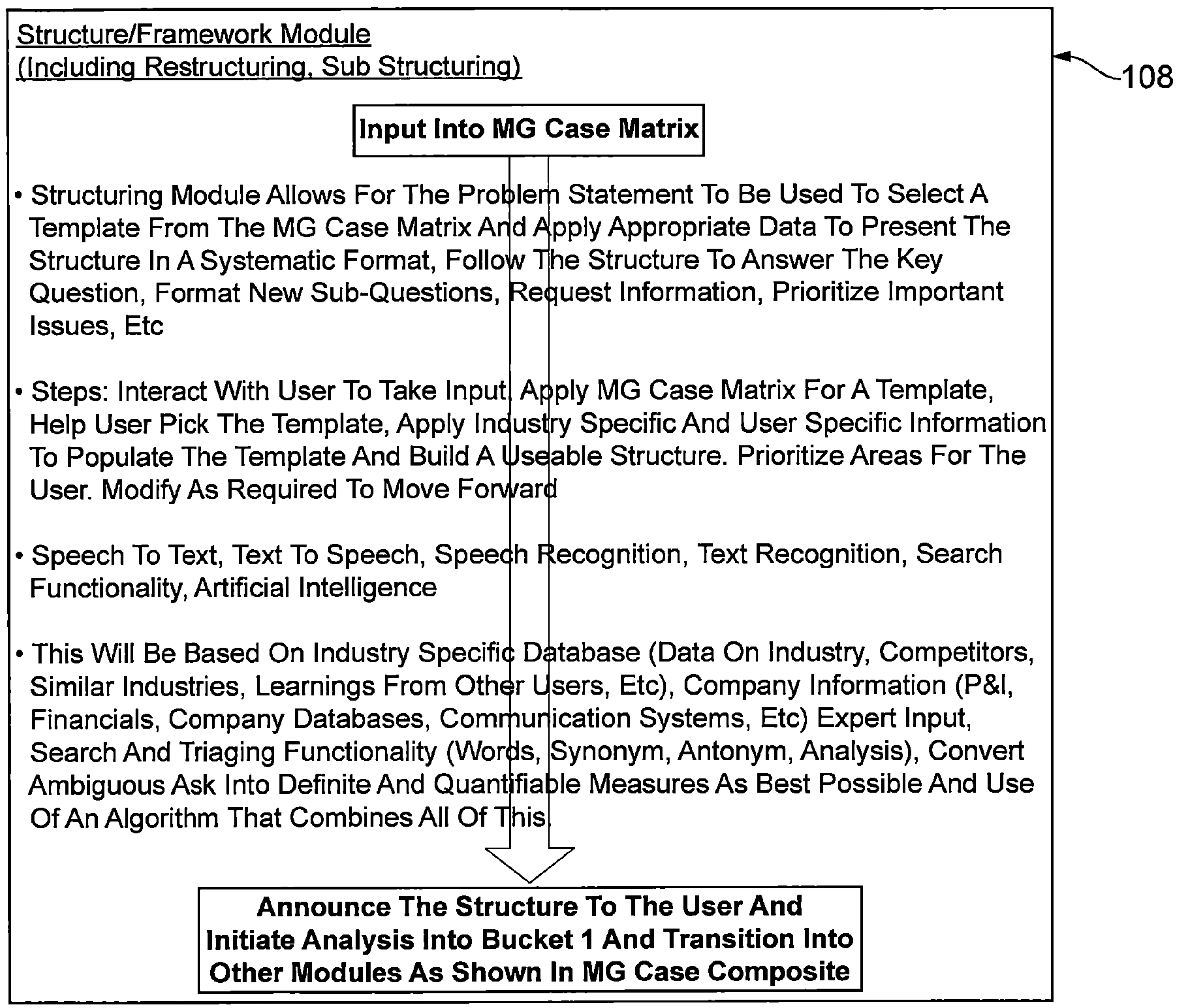
FIG. 23 (Cont. 9)

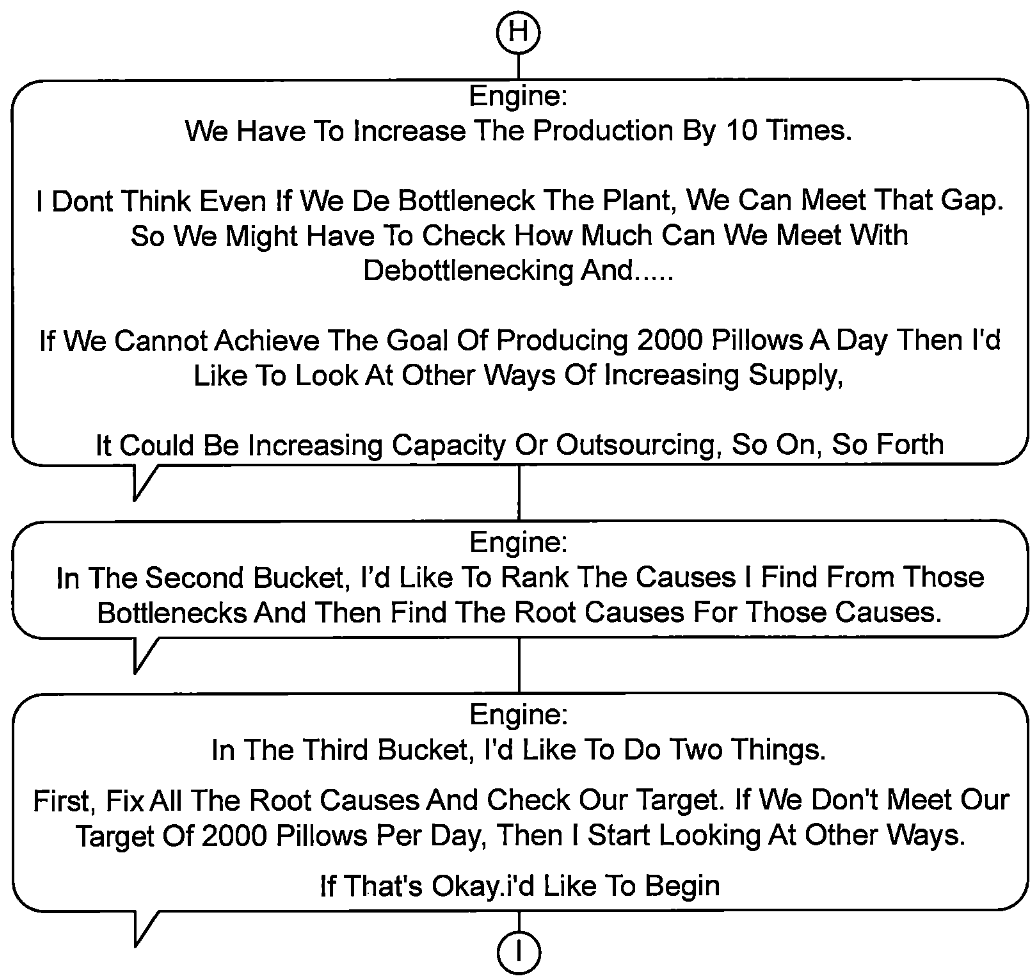
FIG. 23 (Cont. 10)

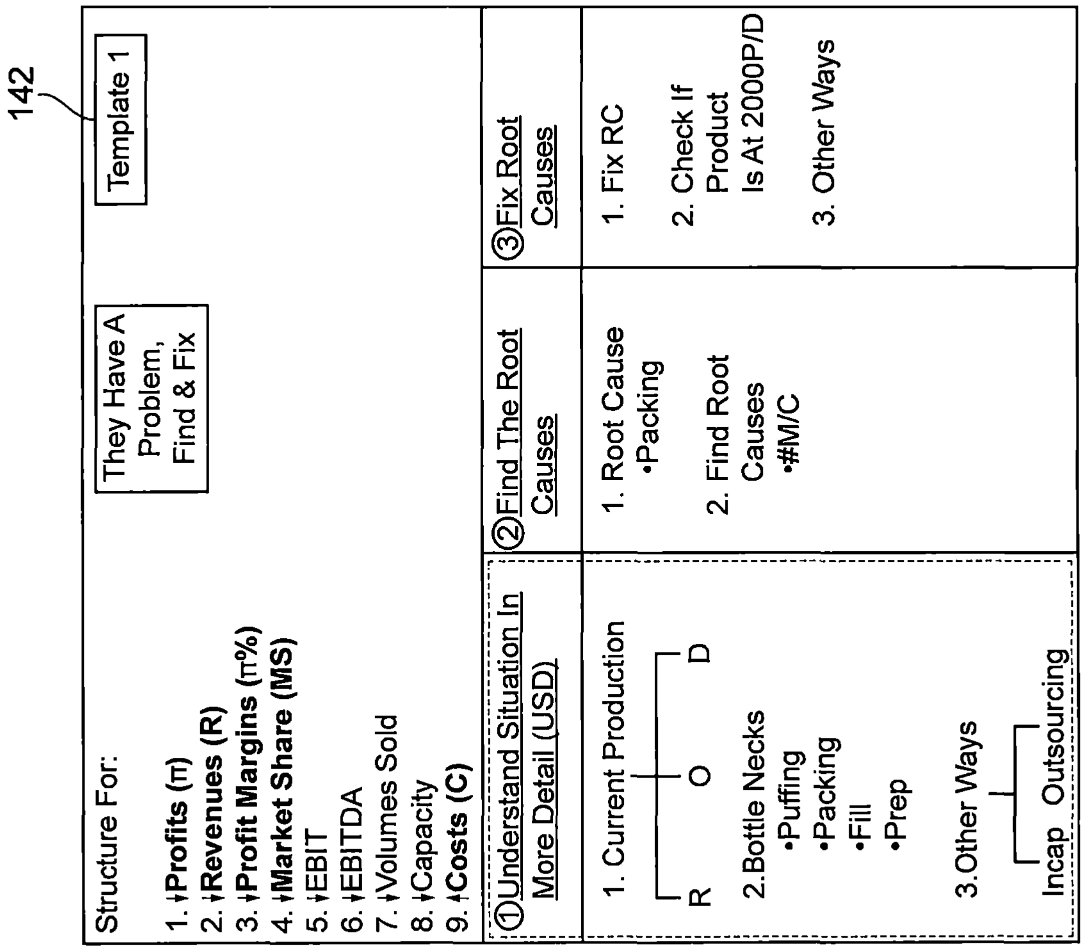
FIG. 23 (Cont. 11)

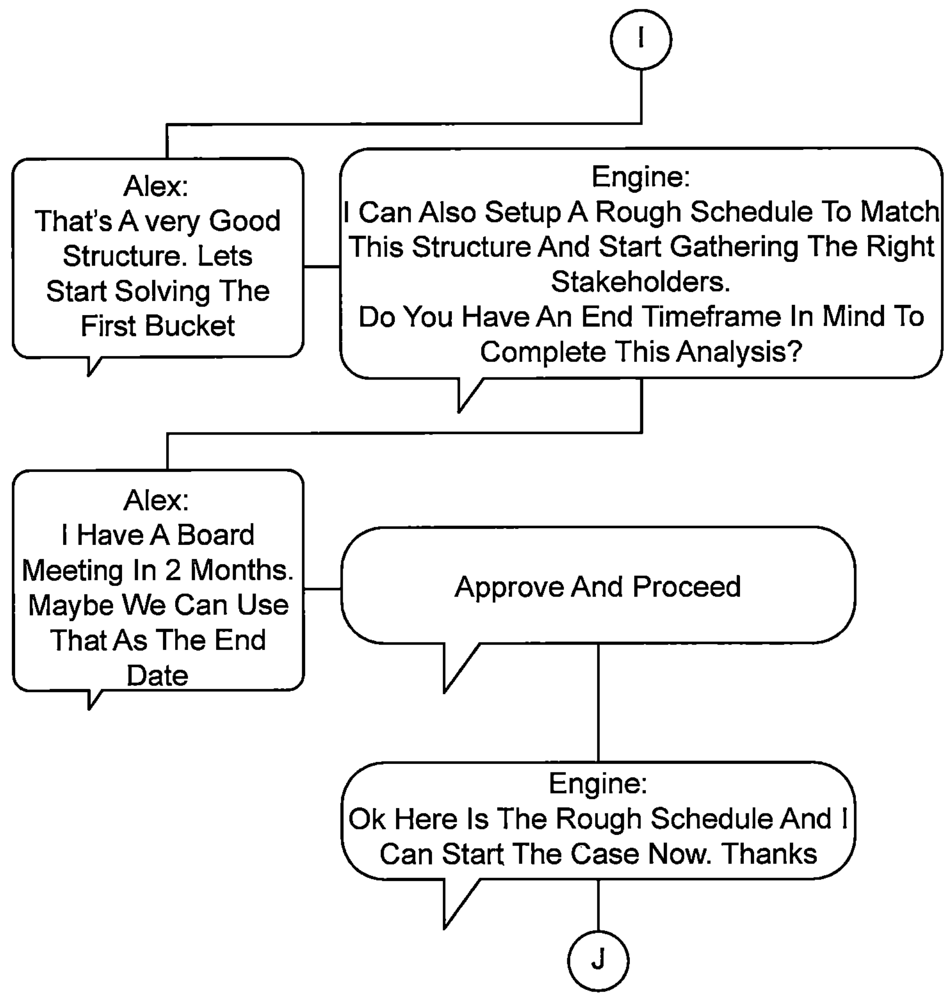
FIG. 23 (Cont. 12)

| | A | B | C | D | E |
|---|---|---|---|---|---|
| 1 | Case # 3246 | | | | |
| 2 | Schedule 3 | | | | |
| 3 | Task | Time | Updated Time | Reason | Action Owner |
| 4 | Meeting With C Suite -Main Structure Selection, Problem Definition | Week 1 | Week 1 | | CEO,COO,CFO |
| 5 | **Main Structure** | | | | |
| 6 | **Understand The Current Situation** | Week 2 | Week 2 | | VP Production |
| 7 | Current Production Profile | Week 2 | Week 3 | | VP Production |
| 8 | Bottle Necks | Week 2 | Week 6 | Find RC For Other Steps | VP Production |
| 9 | Other Ways To Improve Production | Week 3 | Week 7 | | VP Production |
| 10 | **Find Root Causes** | | | | |
| 11 | Rank Causes | Week 4 | Week 8 | | VP Production |
| 12 | Find Root Causes | Week 4 | Week 8 | | VP Production |
| 13 | **Execution** | Week 4 | Week 8 | | VP Production |
| 14 | **Risks** | Week 4 | Week 8 | | VP Production |
| 15 | **Opportunities** | Week 4 | Week 8 | | VP Production |

FIG. 23 (Cont. 13)

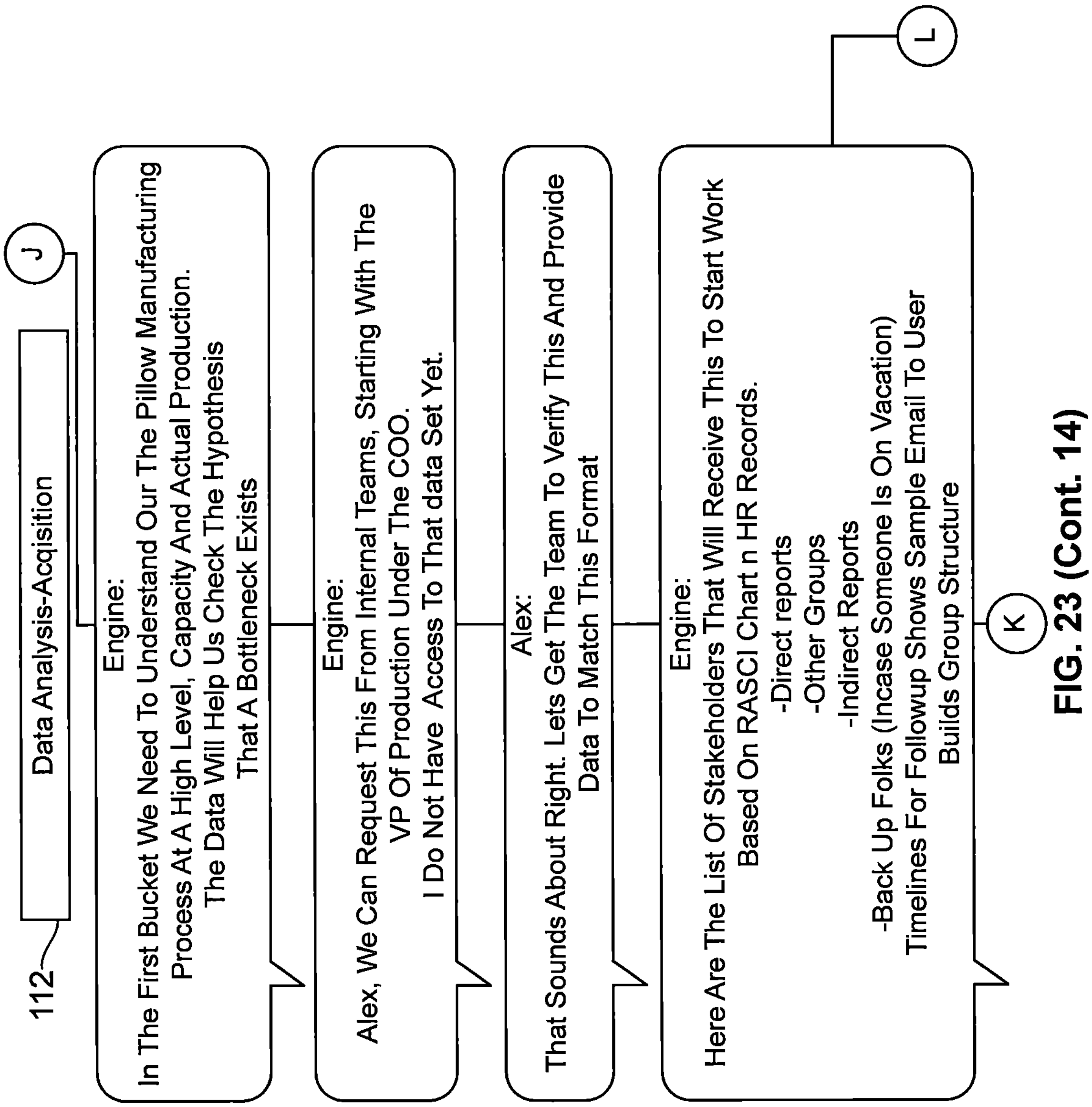
FIG. 23 (Cont. 14)

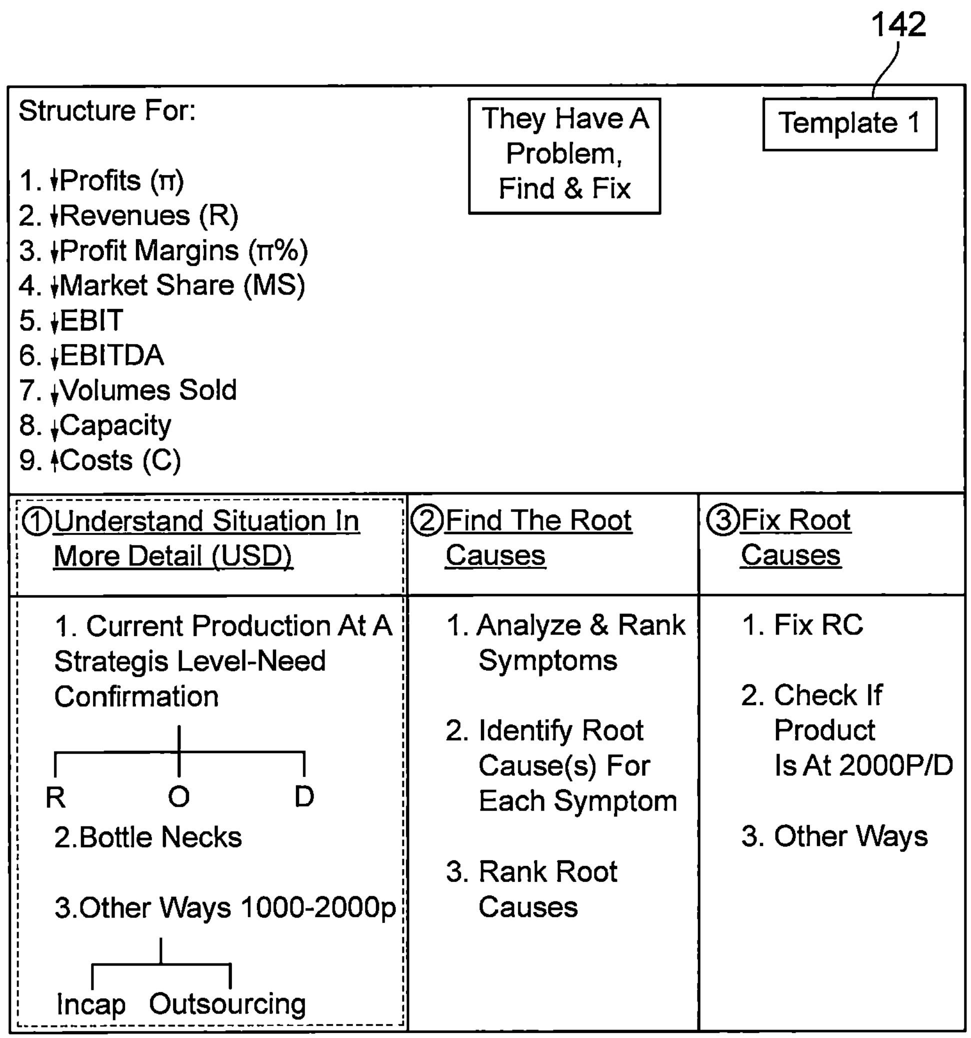
FIG. 23 (Cont. 15)

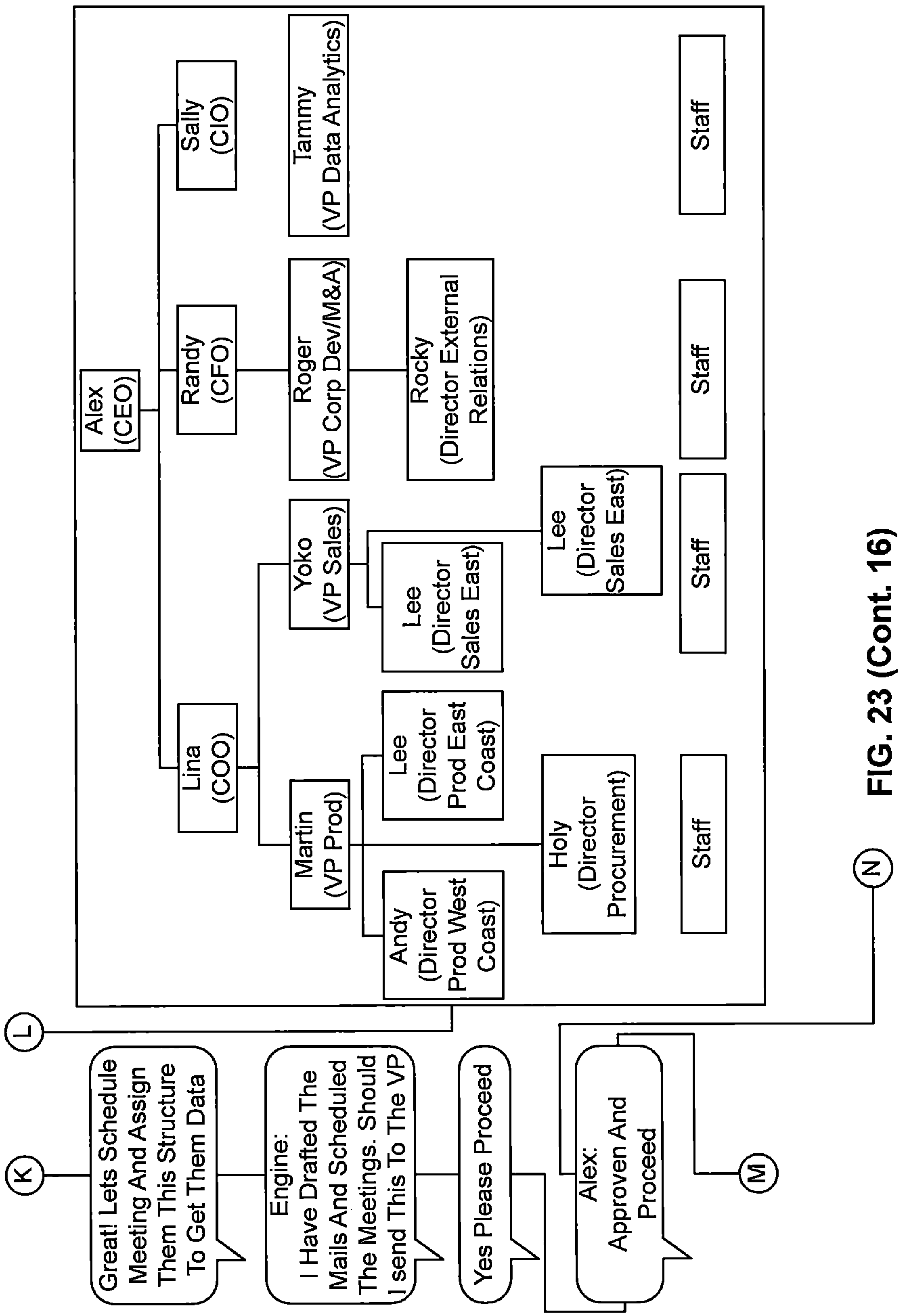
FIG. 23 (Cont. 16)

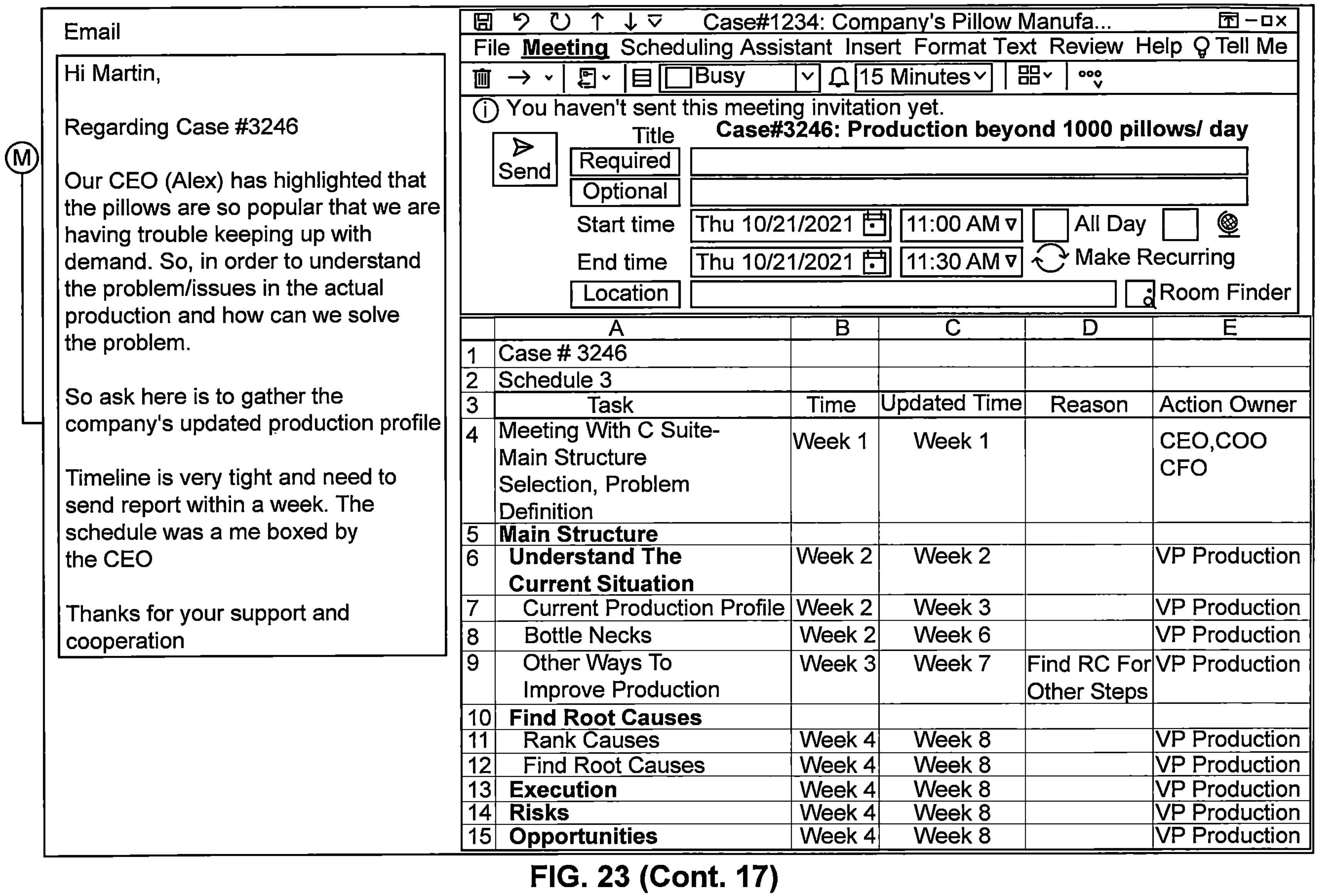

| | A | B | C | D | E |
|---|---|---|---|---|---|
| 1 | Case # 3246 | | | | |
| 2 | Schedule 3 | | | | |
| 3 | Task | Time | Updated Time | Reason | Action Owner |
| 4 | Meeting With C Suite- Main Structure Selection, Problem Definition | Week 1 | Week 1 | | CEO,COO CFO |
| 5 | **Main Structure** | | | | |
| 6 | **Understand The Current Situation** | Week 2 | Week 2 | | VP Production |
| 7 | Current Production Profile | Week 2 | Week 3 | | VP Production |
| 8 | Bottle Necks | Week 2 | Week 6 | | VP Production |
| 9 | Other Ways To Improve Production | Week 3 | Week 7 | Find RC For Other Steps | VP Production |
| 10 | **Find Root Causes** | | | | |
| 11 | Rank Causes | Week 4 | Week 8 | | VP Production |
| 12 | Find Root Causes | Week 4 | Week 8 | | VP Production |
| 13 | **Execution** | Week 4 | Week 8 | | VP Production |
| 14 | **Risks** | Week 4 | Week 8 | | VP Production |
| 15 | **Opportunities** | Week 4 | Week 8 | | VP Production |

FIG. 23 (Cont. 17)

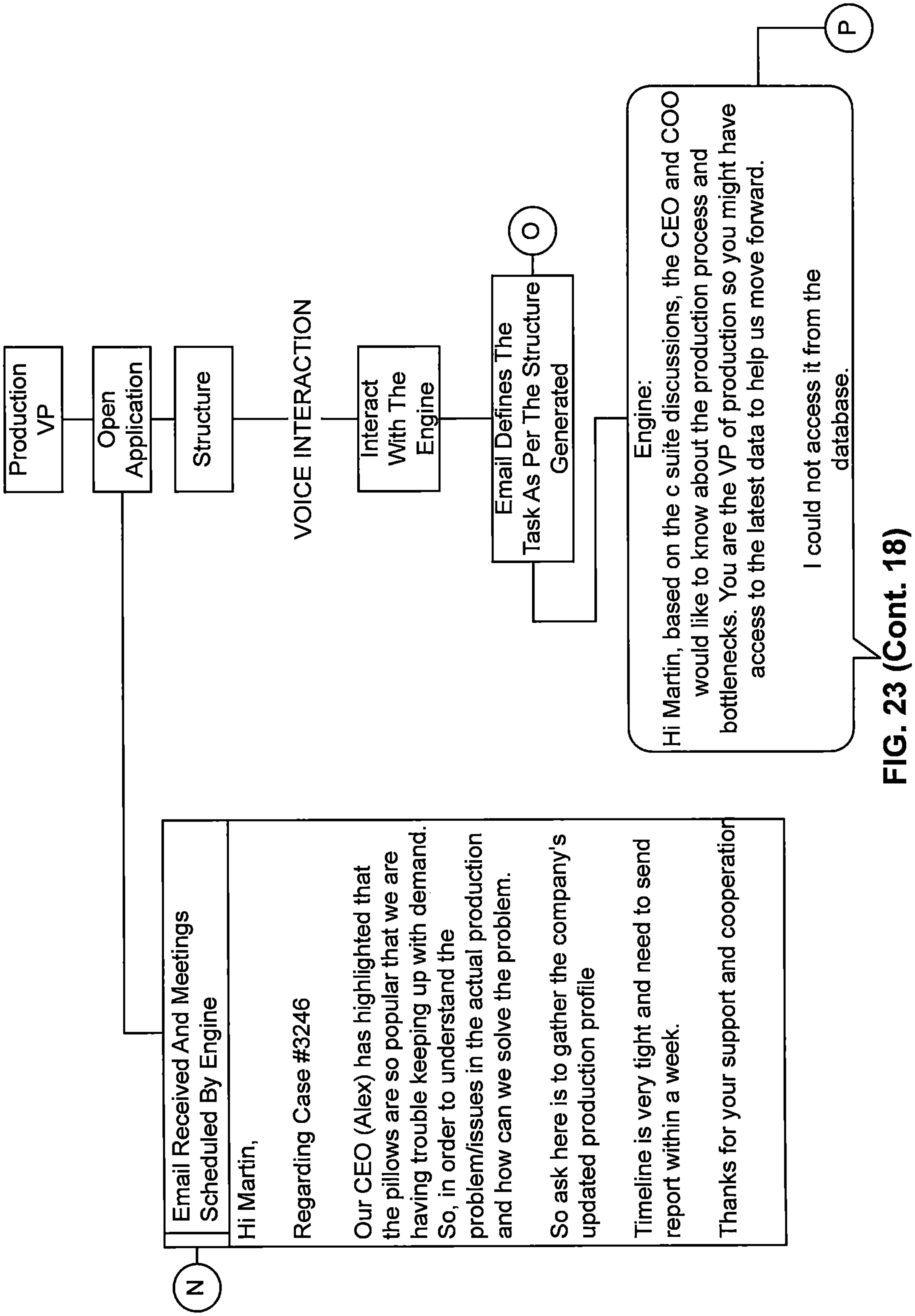
FIG. 23 (Cont. 18)

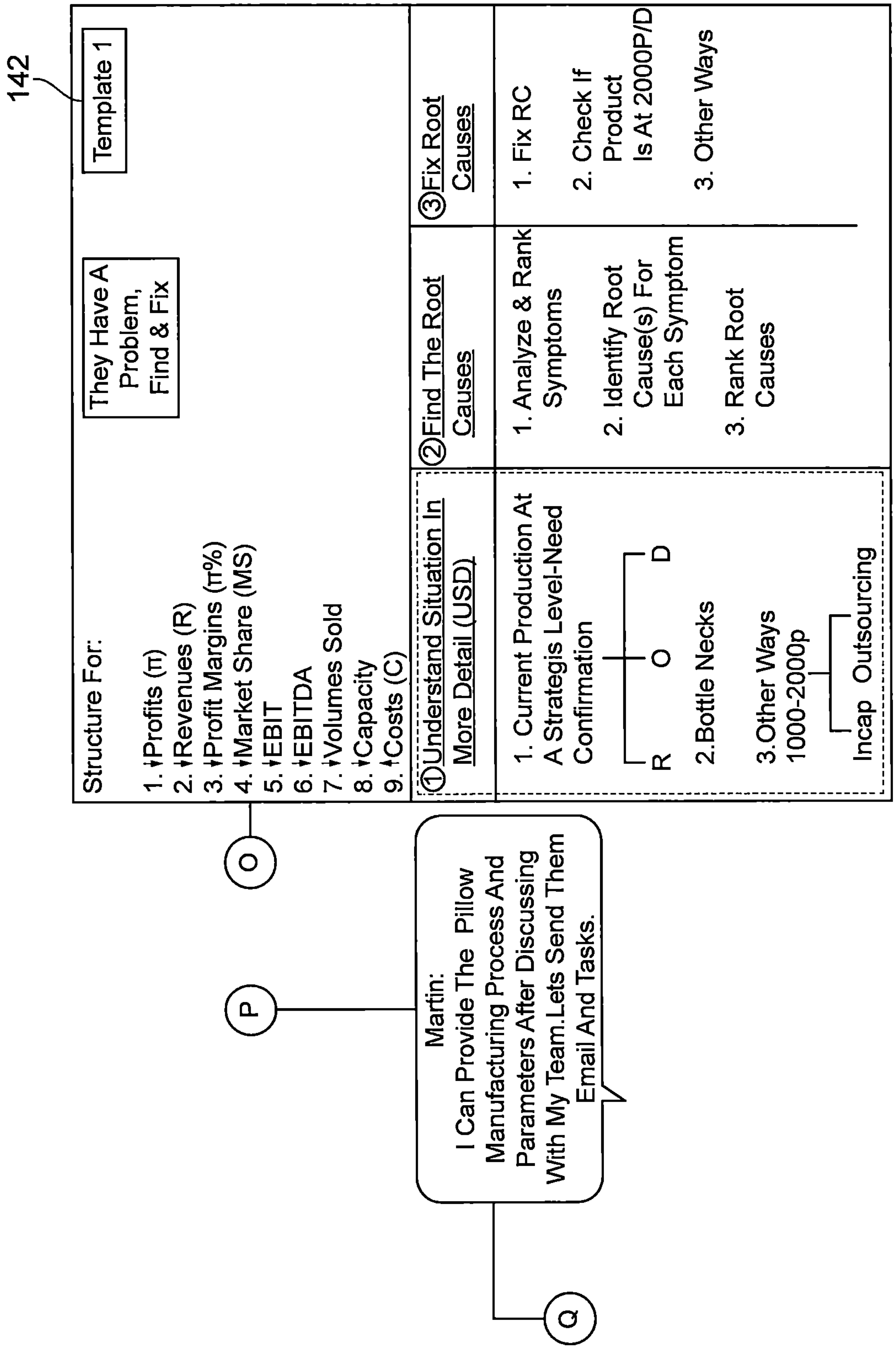
FIG. 23 (Cont. 19)

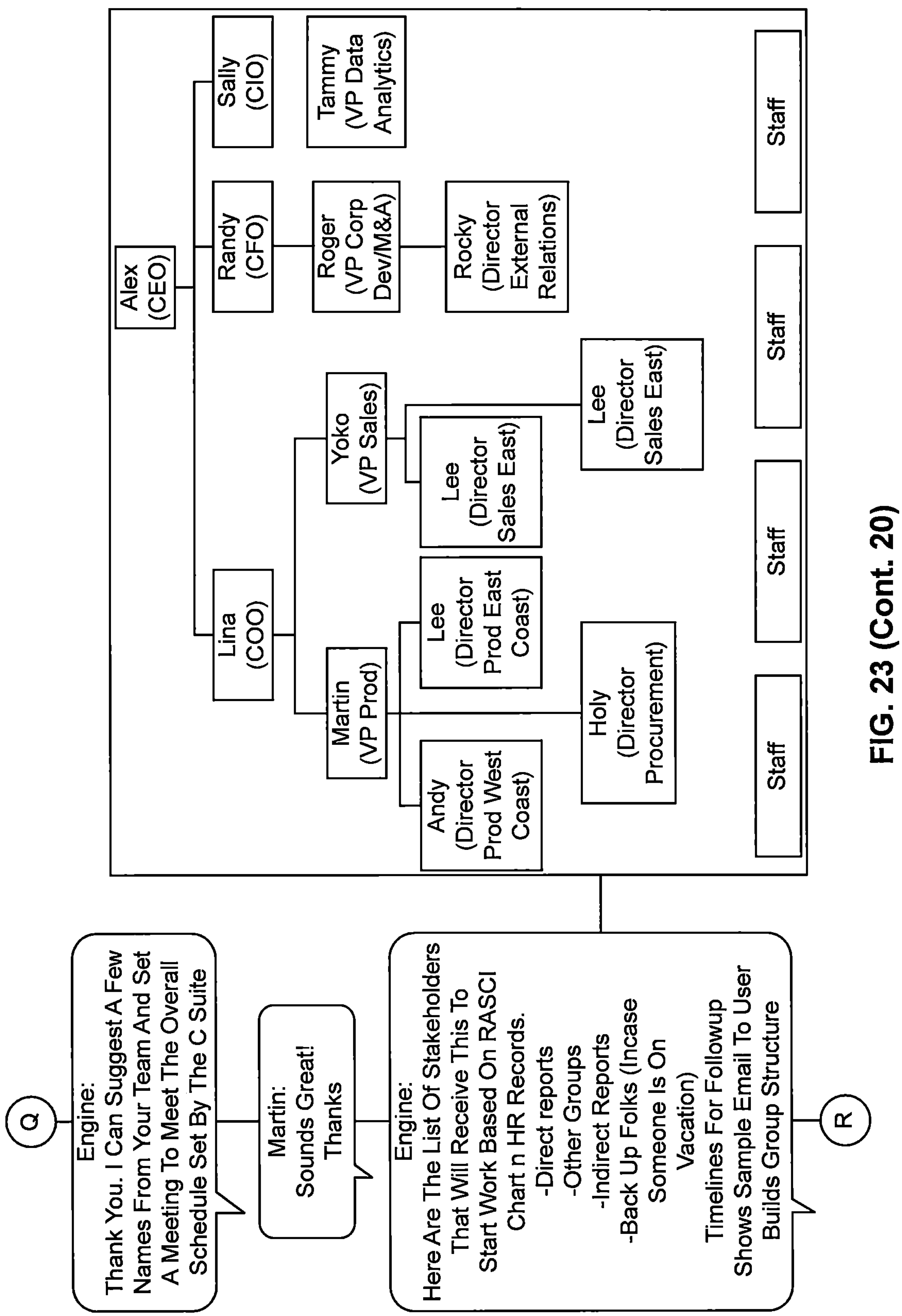
FIG. 23 (Cont. 20)

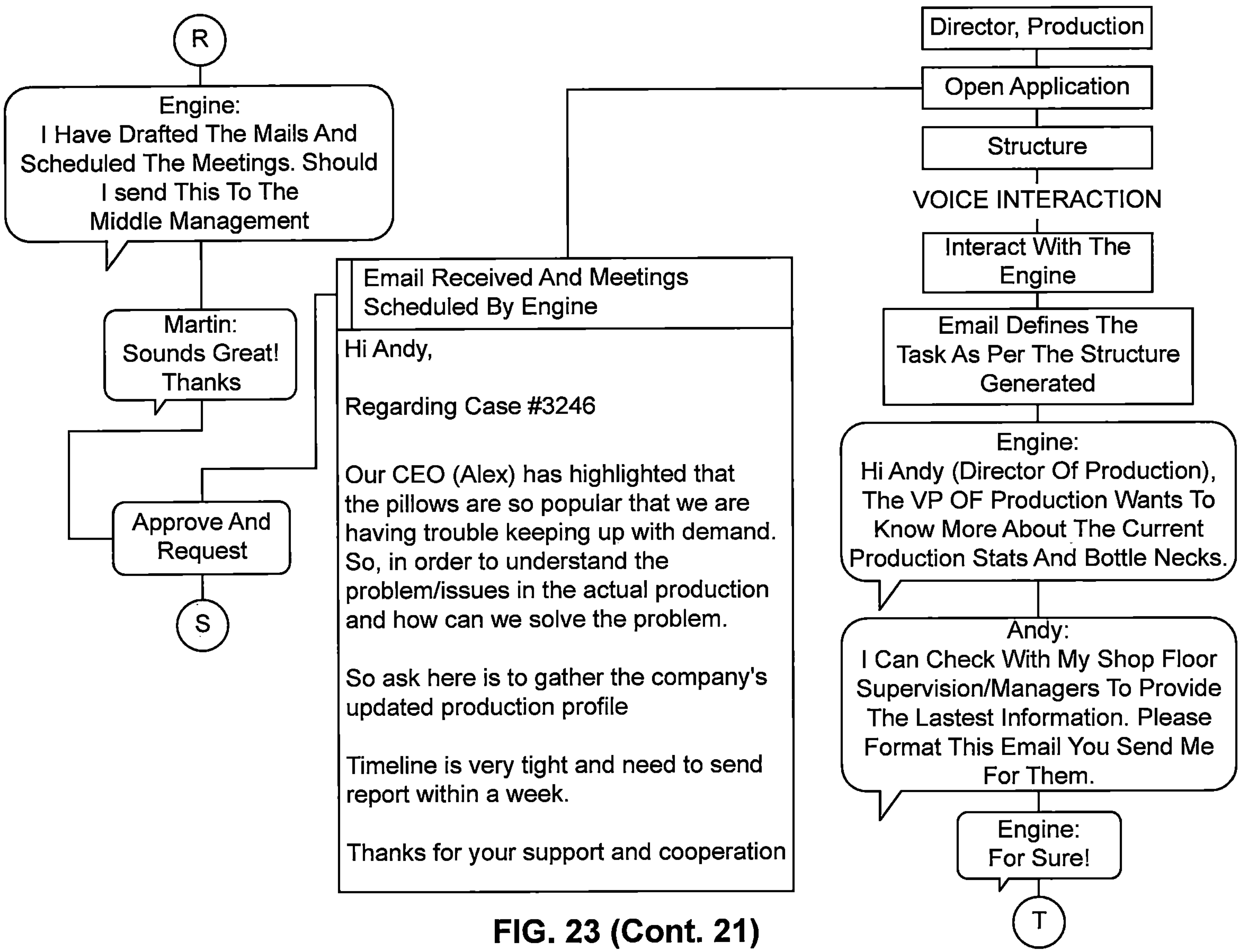
FIG. 23 (Cont. 21)

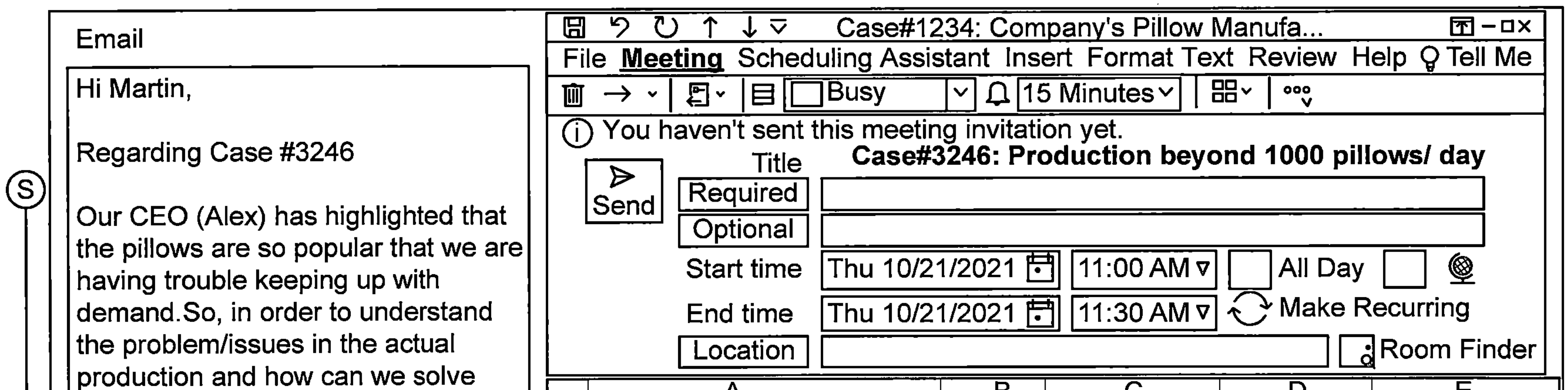

| | A | B | C | D | E |
|---|---|---|---|---|---|
| 1 | Case # 3246 | | | | |
| 2 | Schedule 3 | | | | |
| 3 | Task | Time | Updated Time | Reason | Action Owner |
| 4 | Meeting With C Suite-Main Structure Selection, Problem Definition | Week 1 | Week 1 | | CEO,COO CFO |
| 5 | **Main Structure** | | | | |
| 6 | **Understand The Current Situation** | Week 2 | Week 2 | | VP Production |
| 7 | Current Production Profile | Week 2 | Week 3 | | VP Production |
| 8 | Bottle Necks | Week 2 | Week 6 | | VP Production |
| 9 | Other Ways To Improve Production | Week 3 | Week 7 | Find RC For Other Steps | VP Production |
| 10 | **Find Root Causes** | | | | |
| 11 | Rank Causes | Week 4 | Week 8 | | VP Production |
| 12 | Find Root Causes | Week 4 | Week 8 | | VP Production |
| 13 | **Execution** | Week 4 | Week 8 | | VP Production |
| 14 | **Risks** | Week 4 | Week 8 | | VP Production |
| 15 | **Opportunities** | Week 4 | Week 8 | | VP Production |

Data Analysis / Data Charts / Graph Analysis Module

Hypothesis/Information Requirements And Request Data

- Data Analysis Module Allows For The User Group To Transition From A Hypothesis, Understand Data Needs, Gather Data Through The Systems Functions And Eventually Gain Insights And Impact.

- Steps: Interact With User To Take Input, Help User Identify Data Needs To Solve The Sub-Issue Or Key Issue, Help The User Procure This Data Through Internal Or External Sources, Utilize The Algorithm To Analyze The Data Including But Not Limited To Gain Observations And Deeper Insights, Help The User Move In A Direction To Further The Solution Set. The Software Can Also Restructure The Problem If Required, Modify The Approach As Required As Per The MG Case Composite.

- Speech To Text, Text To Speech, Speech Recognition, Text Recognition, Search Functionality, Artificial Intelligence

- This Will Be Based On Industry Specific Database (Data On Industry, Competitors, Similar Industries, Learnings From Other Users, Etc), Company Information (P&I, Financials, Company Databases, Communication Systems, Etc) Expert Input, Search And Triaging Functionality (Words, Synonym, Antonym, Analysis), Convert Ambiguous Ask Into Definite And Quantifiable Measures As Best Possible

Insights And Actions For The User Group To Move Forward

FIG. 23 (Cont. 23)

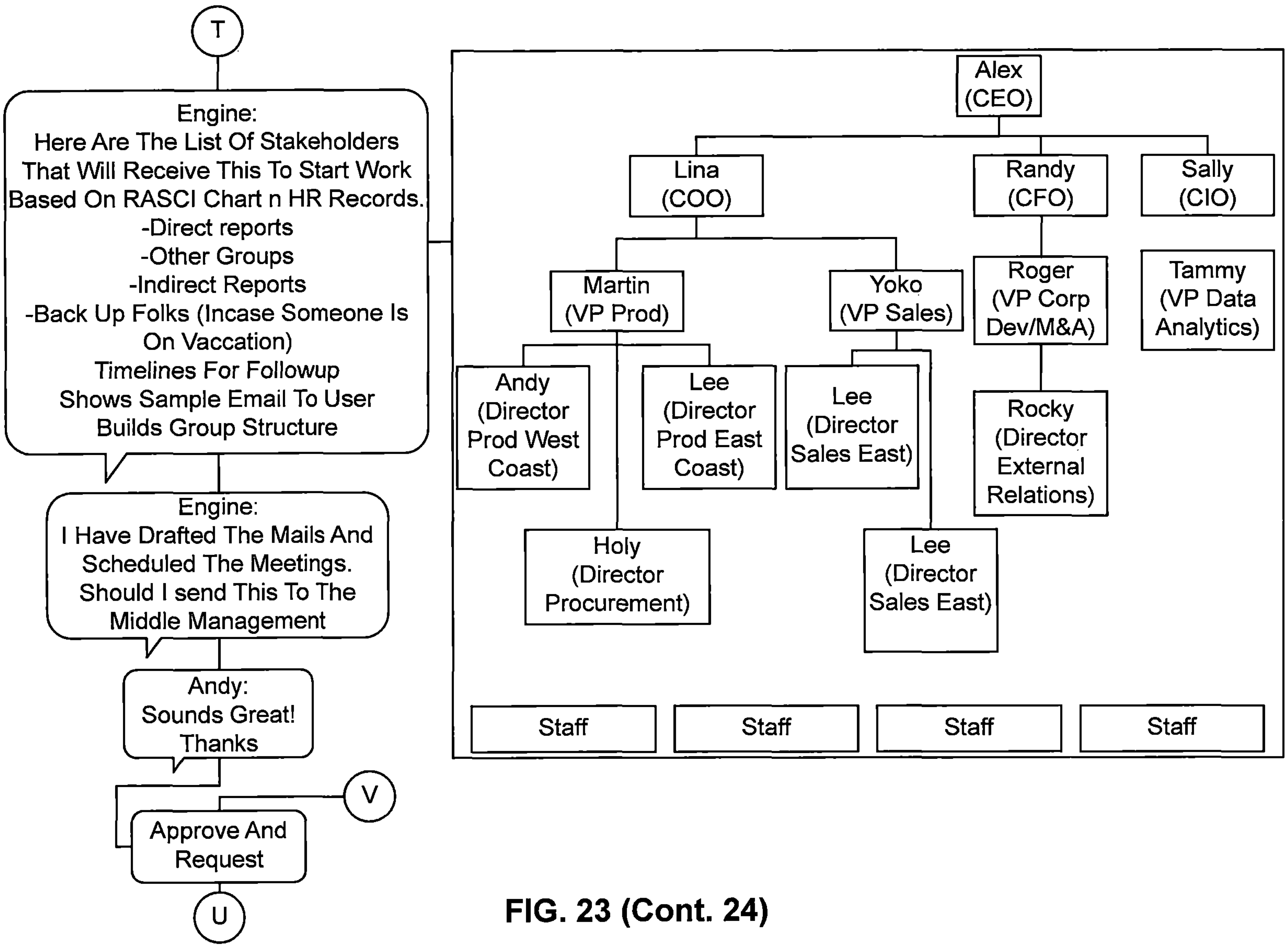
FIG. 23 (Cont. 24)

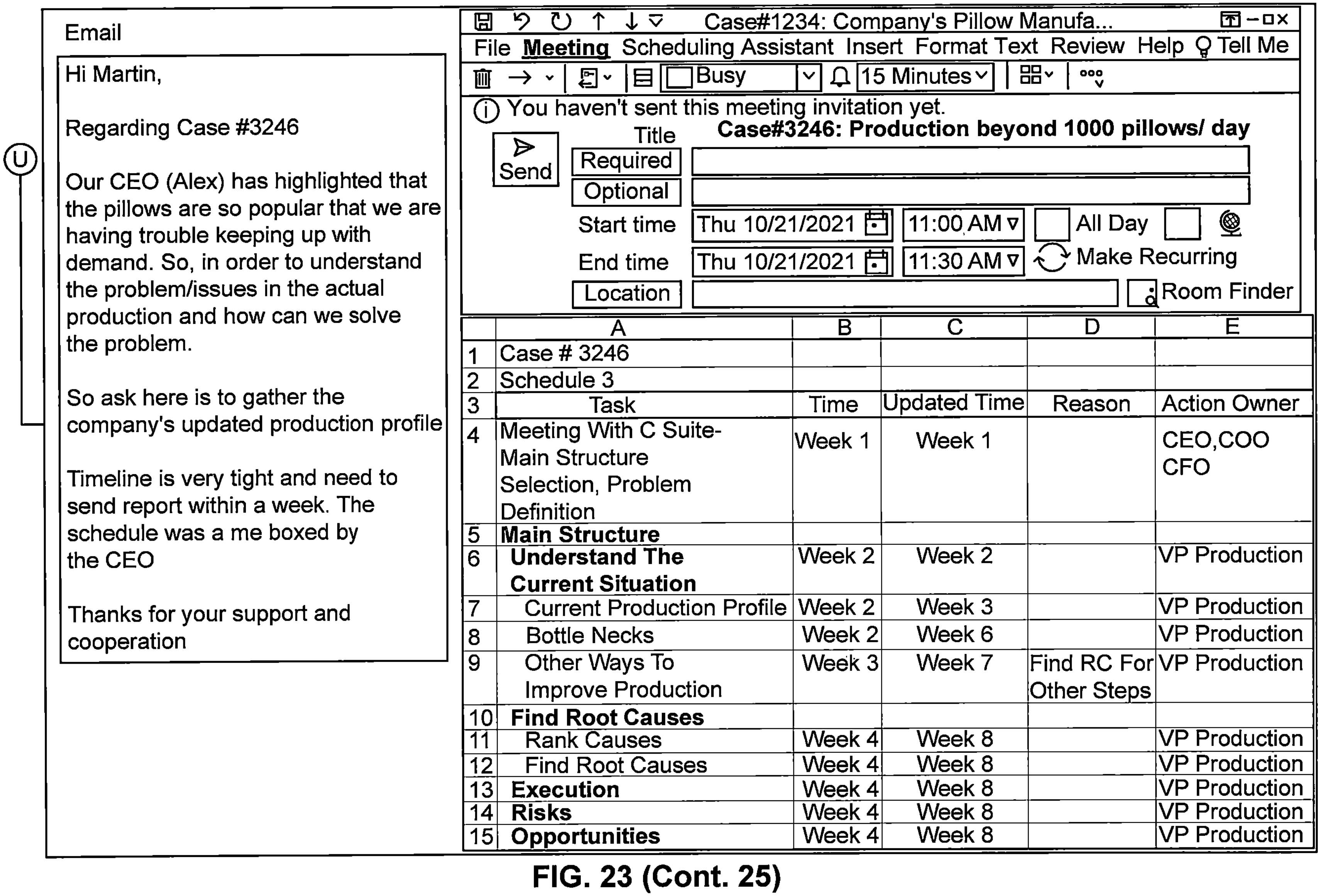
FIG. 23 (Cont. 25)

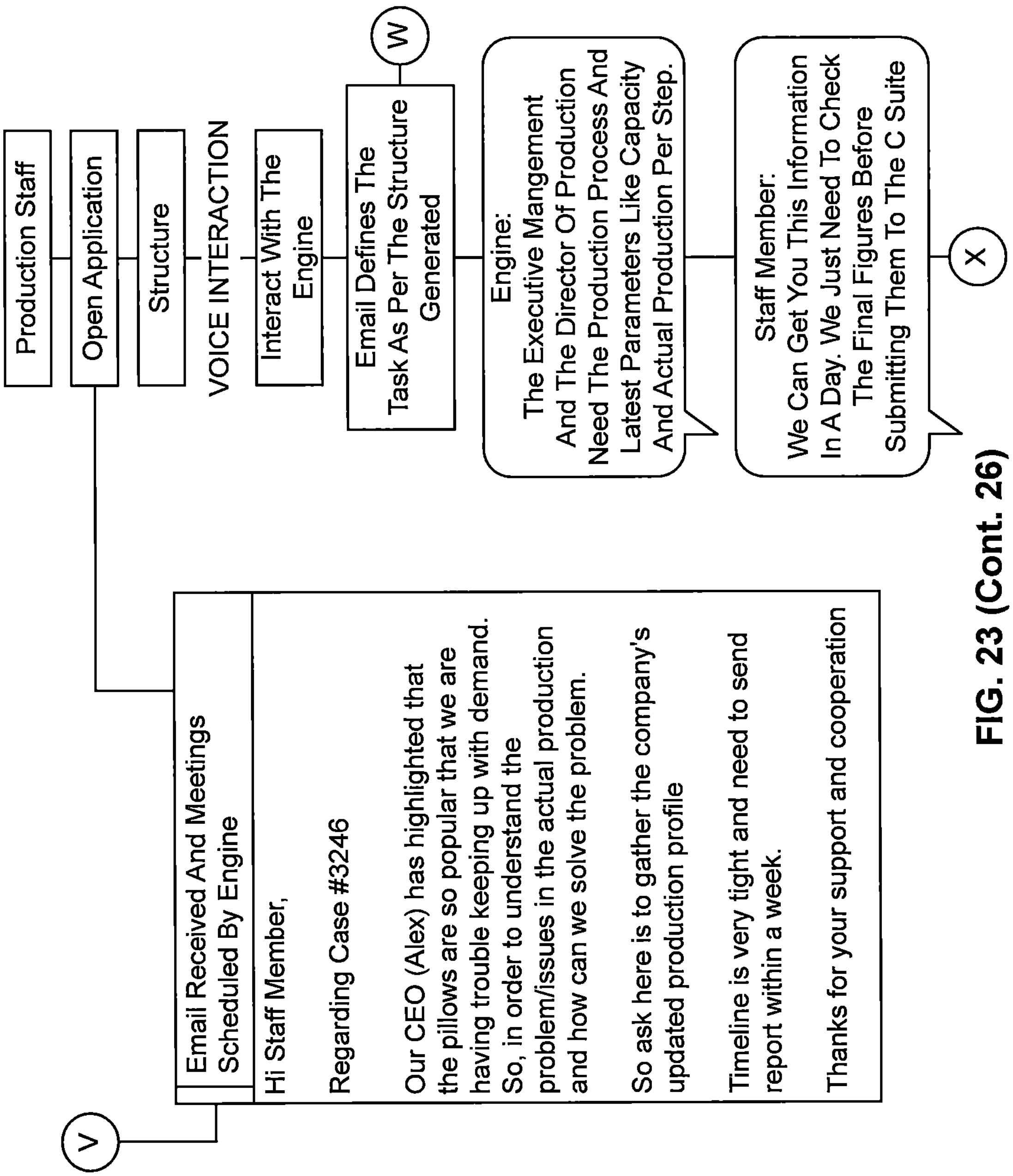
FIG. 23 (Cont. 26)

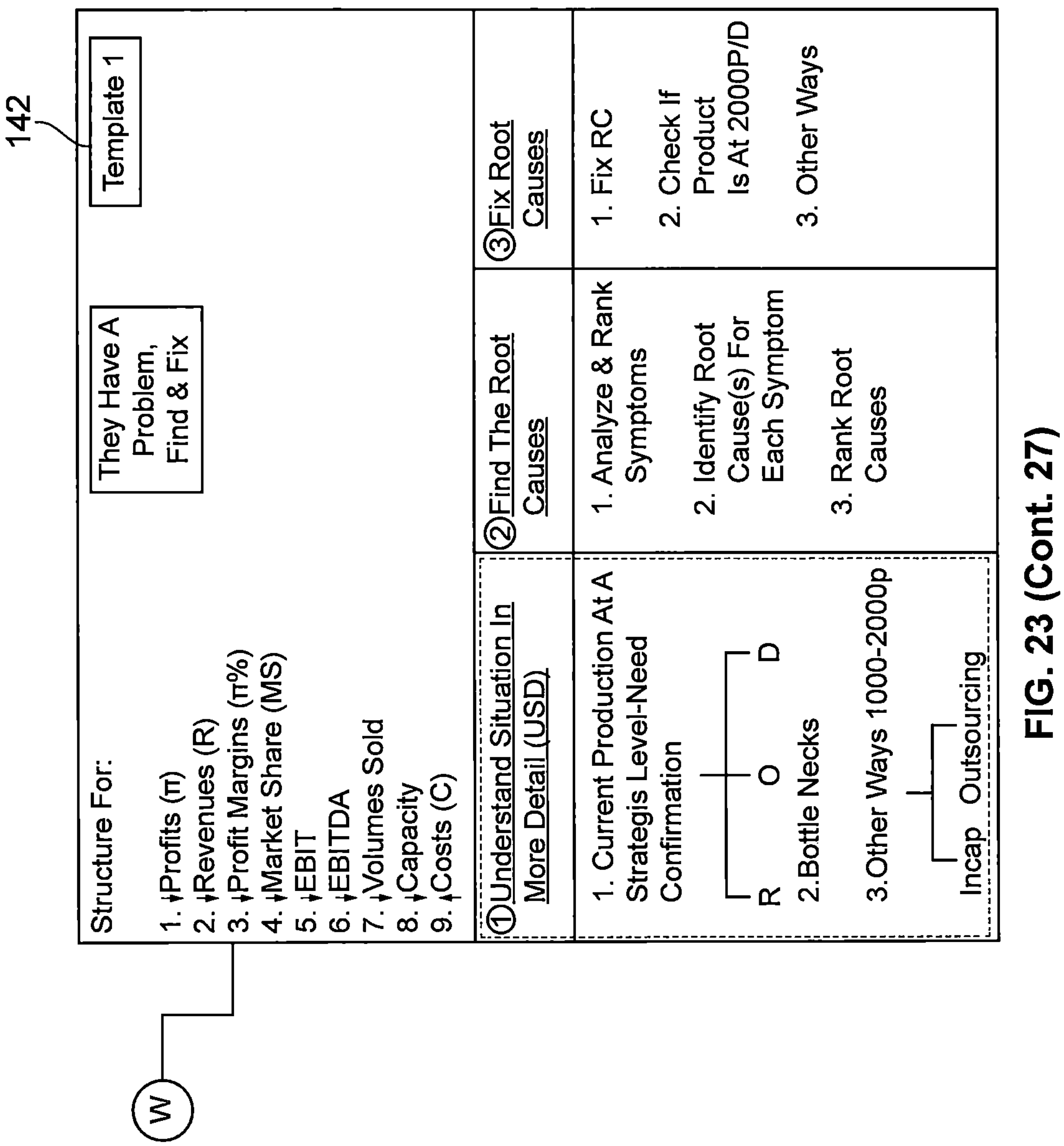
FIG. 23 (Cont. 27)

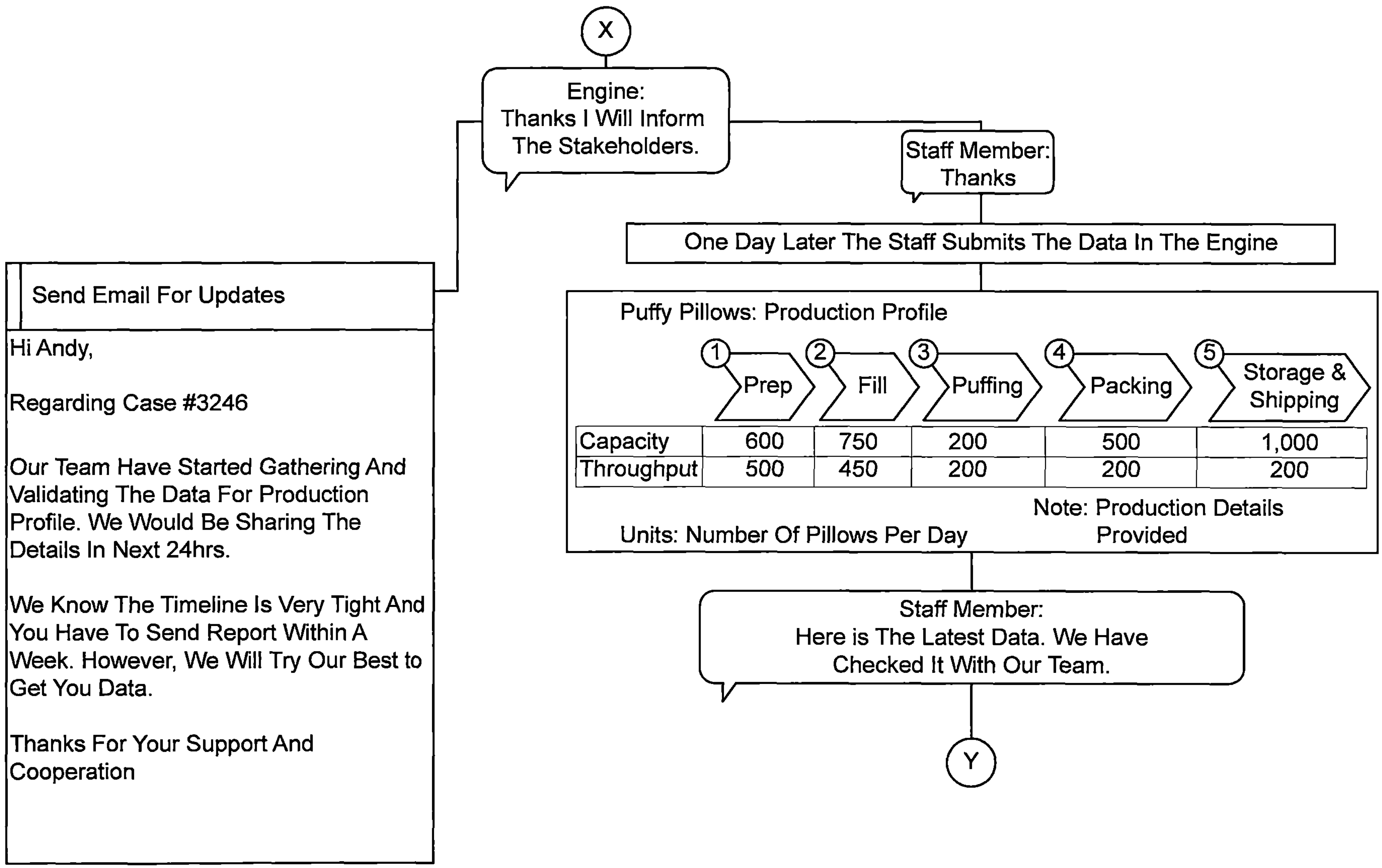
FIG. 23 (Cont. 28)

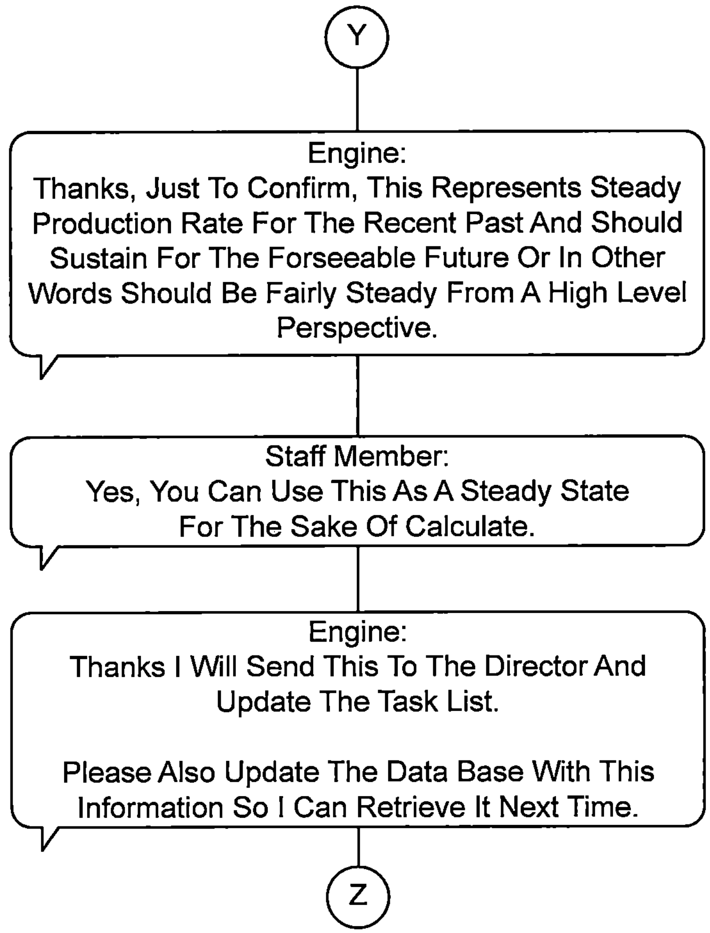
FIG. 23 (Cont. 29)

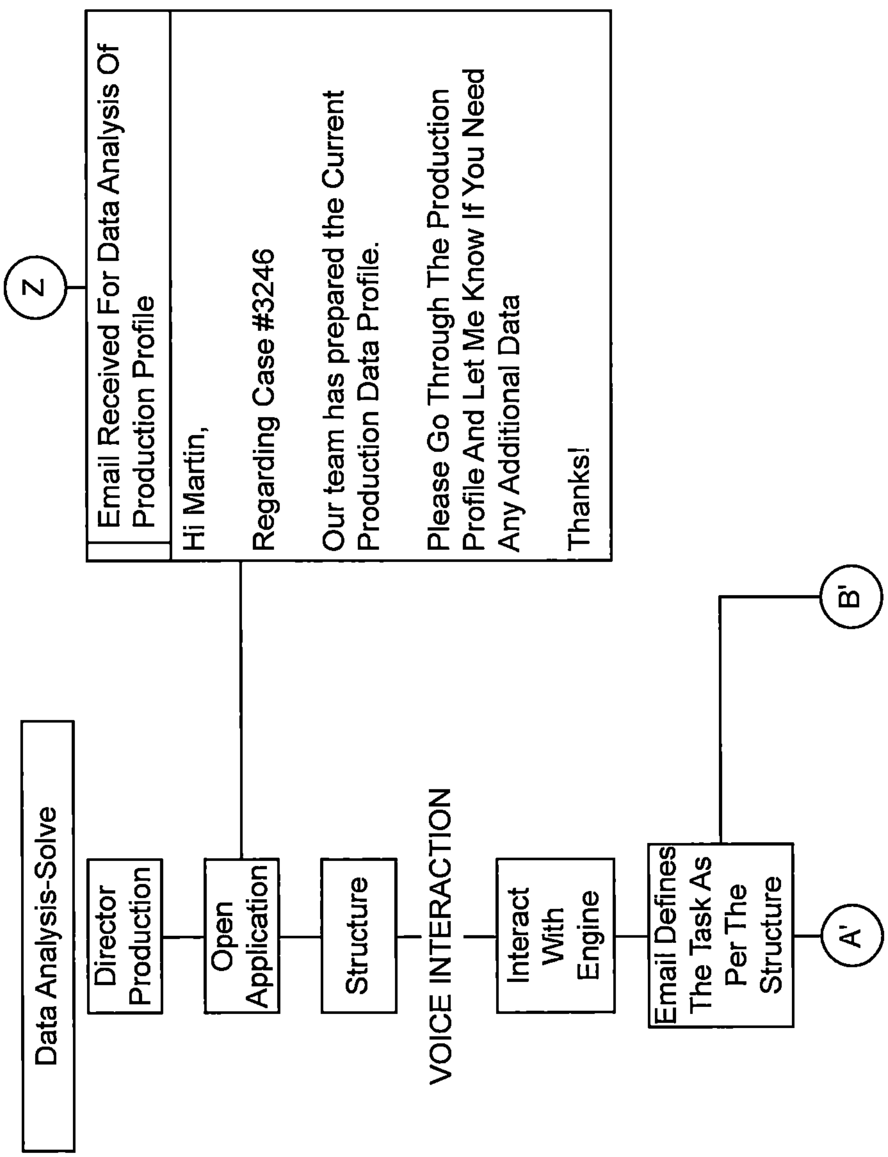
FIG. 23 (Cont. 30)

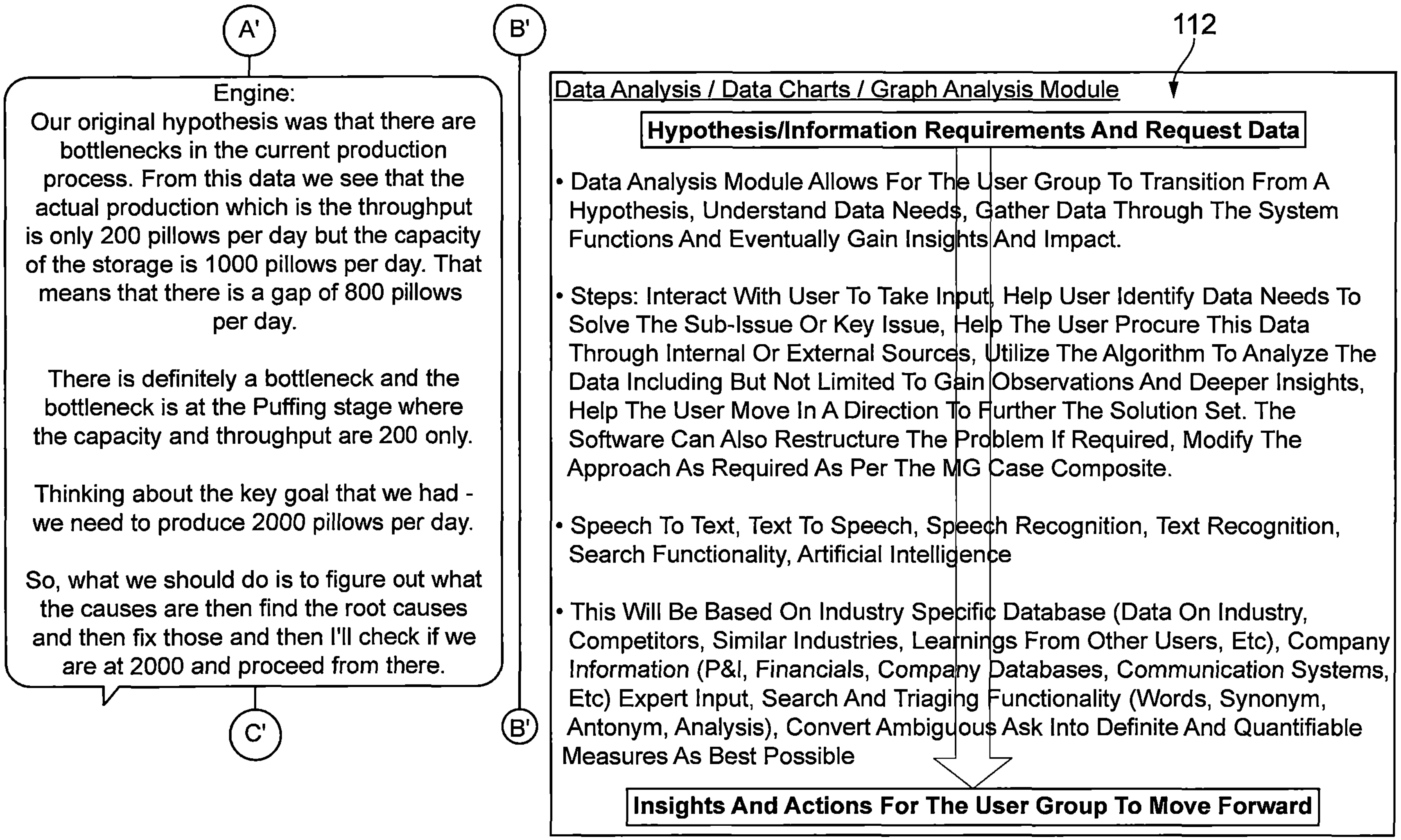
FIG. 23 (Cont. 31)

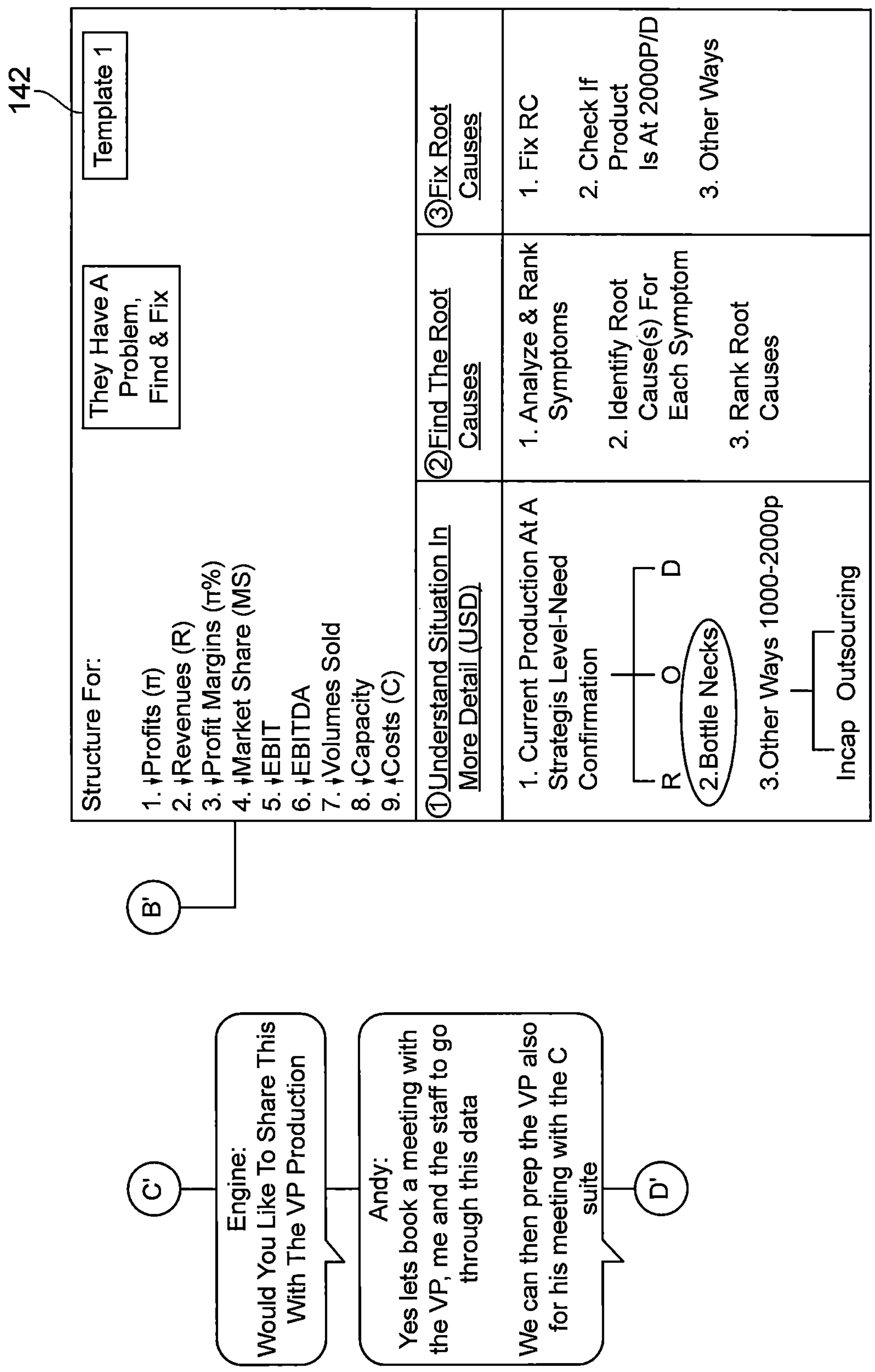
FIG. 23 (Cont. 32)

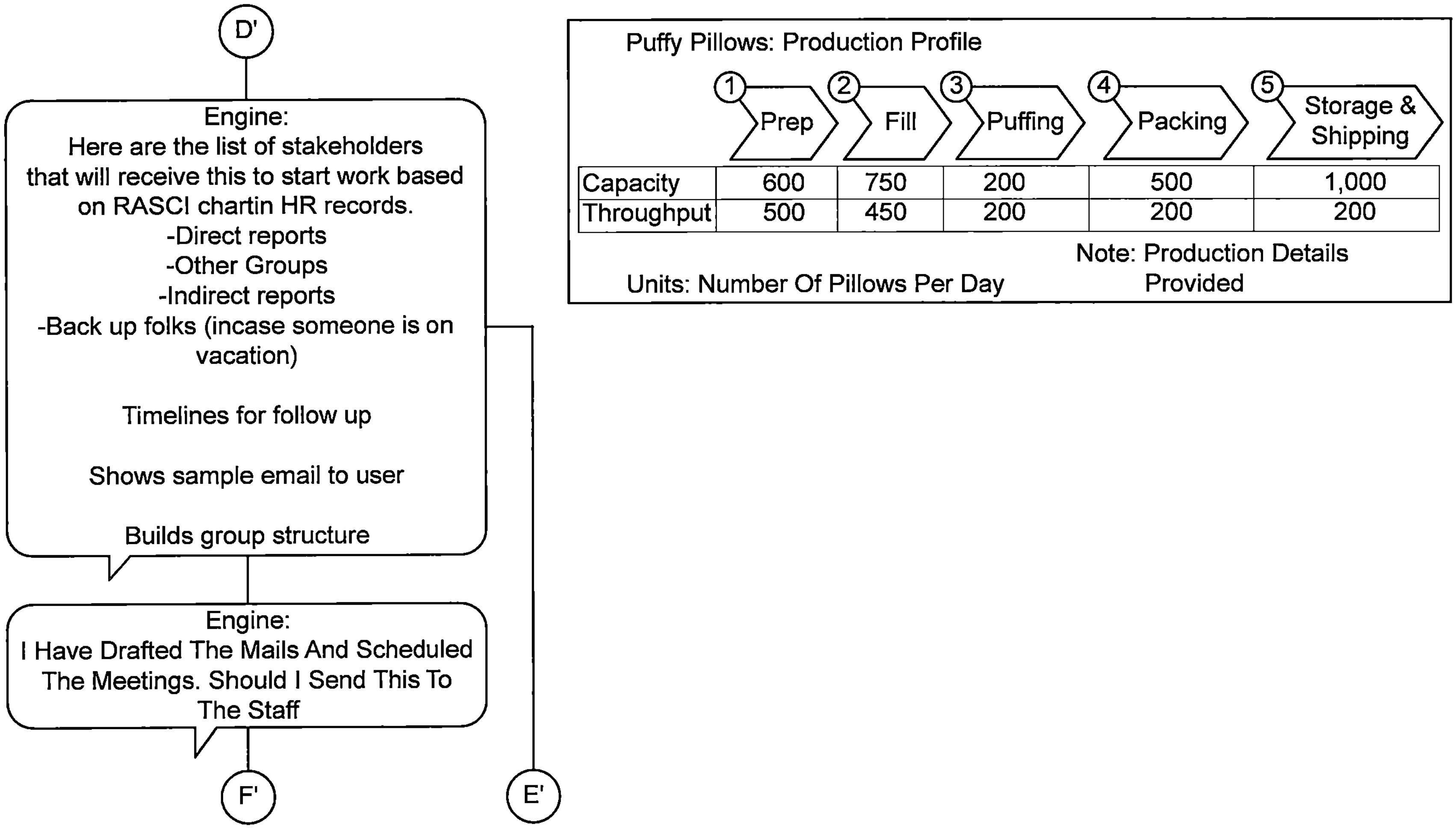
| | Prep | Fill | Puffing | Packing | Storage & Shipping |
|---|---|---|---|---|---|
| Capacity | 600 | 750 | 200 | 500 | 1,000 |
| Throughput | 500 | 450 | 200 | 200 | 200 |
FIG. 23 (Cont. 33)

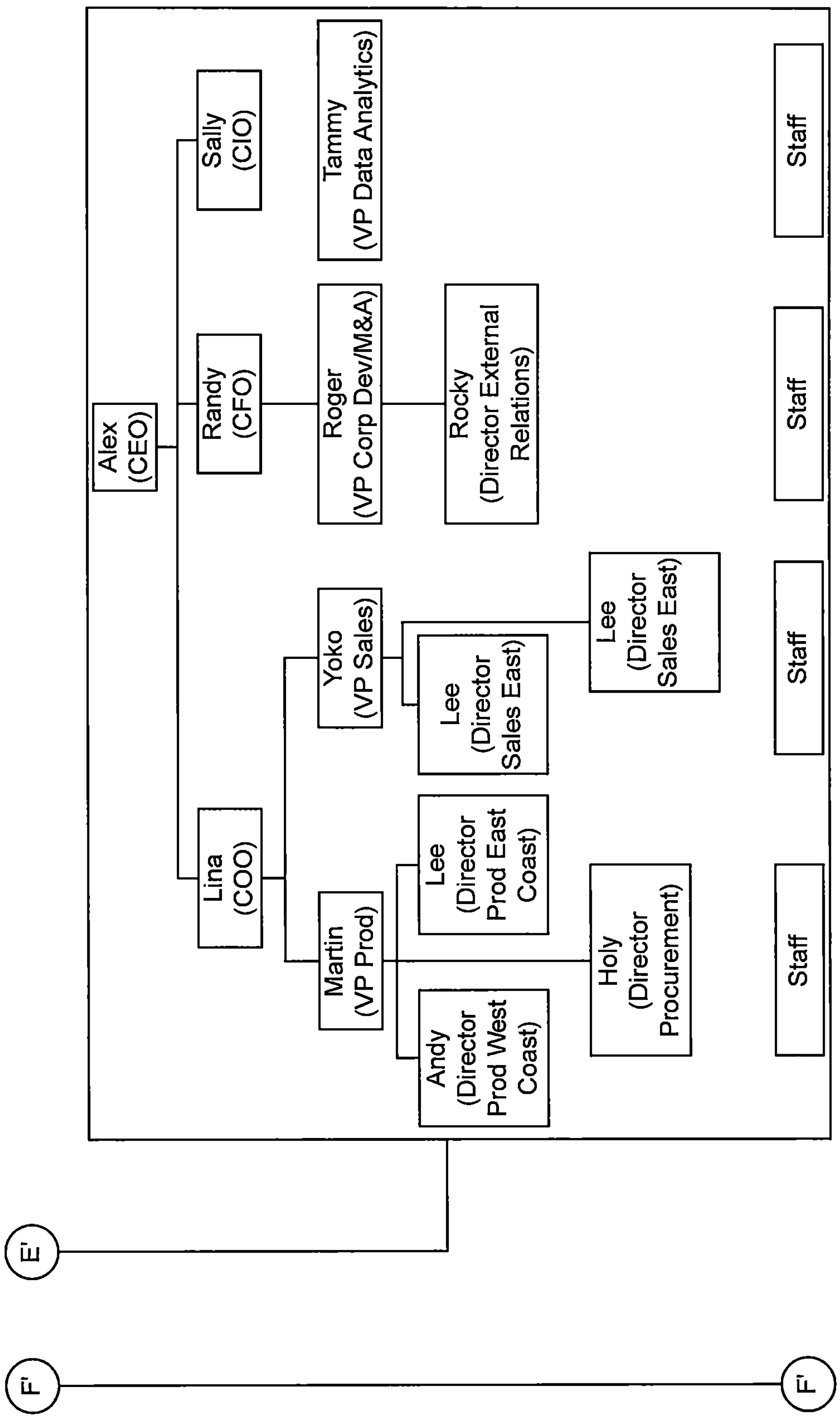
FIG. 23 (Cont. 34)

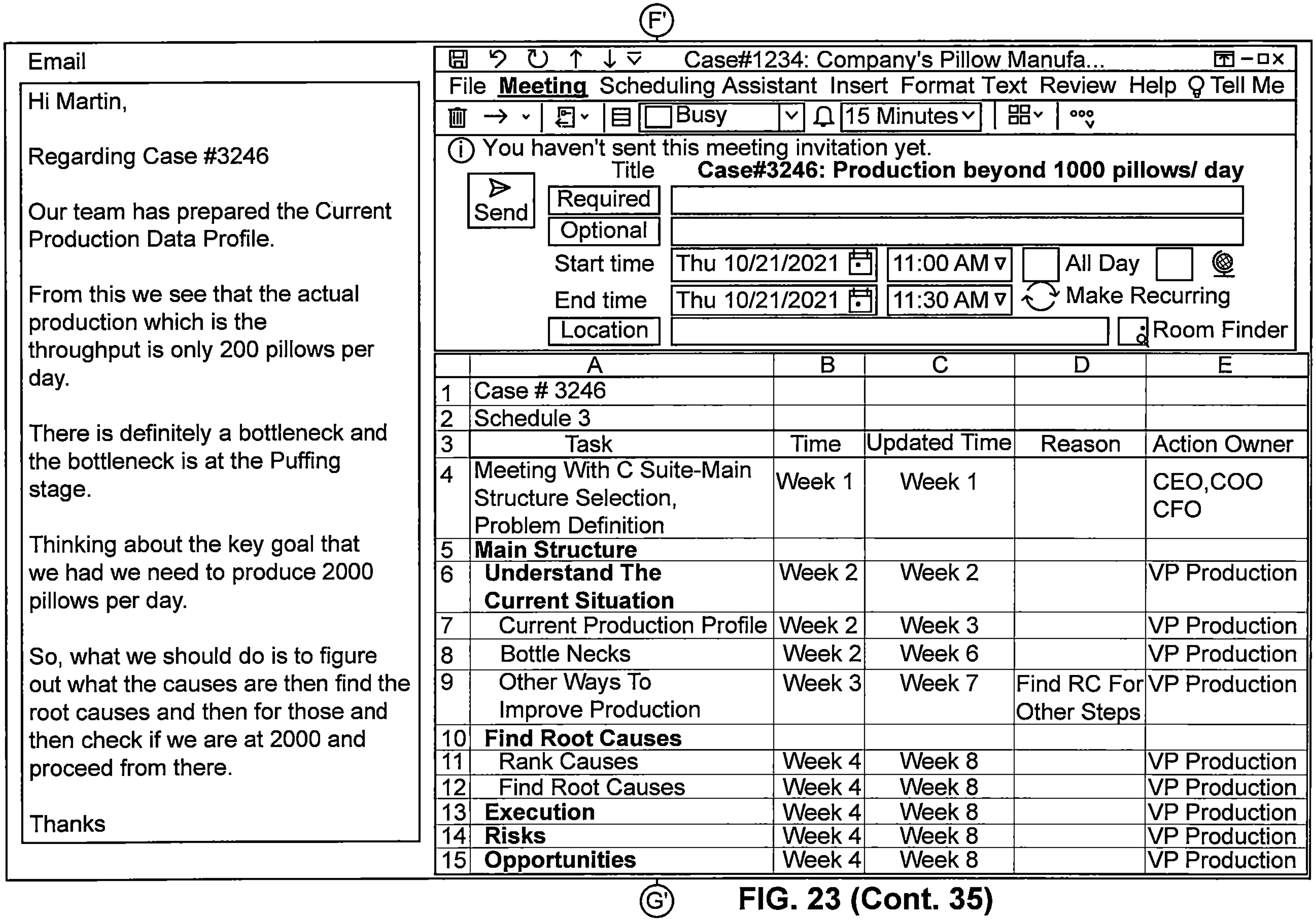

| | A | B | C | D | E |
|---|---|---|---|---|---|
| 1 | Case # 3246 | | | | |
| 2 | Schedule 3 | | | | |
| 3 | Task | Time | Updated Time | Reason | Action Owner |
| 4 | Meeting With C Suite-Main Structure Selection, Problem Definition | Week 1 | Week 1 | | CEO,COO CFO |
| 5 | **Main Structure** | | | | |
| 6 | **Understand The Current Situation** | Week 2 | Week 2 | | VP Production |
| 7 | Current Production Profile | Week 2 | Week 3 | | VP Production |
| 8 | Bottle Necks | Week 2 | Week 6 | | VP Production |
| 9 | Other Ways To Improve Production | Week 3 | Week 7 | Find RC For Other Steps | VP Production |
| 10 | **Find Root Causes** | | | | |
| 11 | Rank Causes | Week 4 | Week 8 | | VP Production |
| 12 | Find Root Causes | Week 4 | Week 8 | | VP Production |
| 13 | **Execution** | Week 4 | Week 8 | | VP Production |
| 14 | **Risks** | Week 4 | Week 8 | | VP Production |
| 15 | **Opportunities** | Week 4 | Week 8 | | VP Production |

FIG. 23 (Cont. 35)

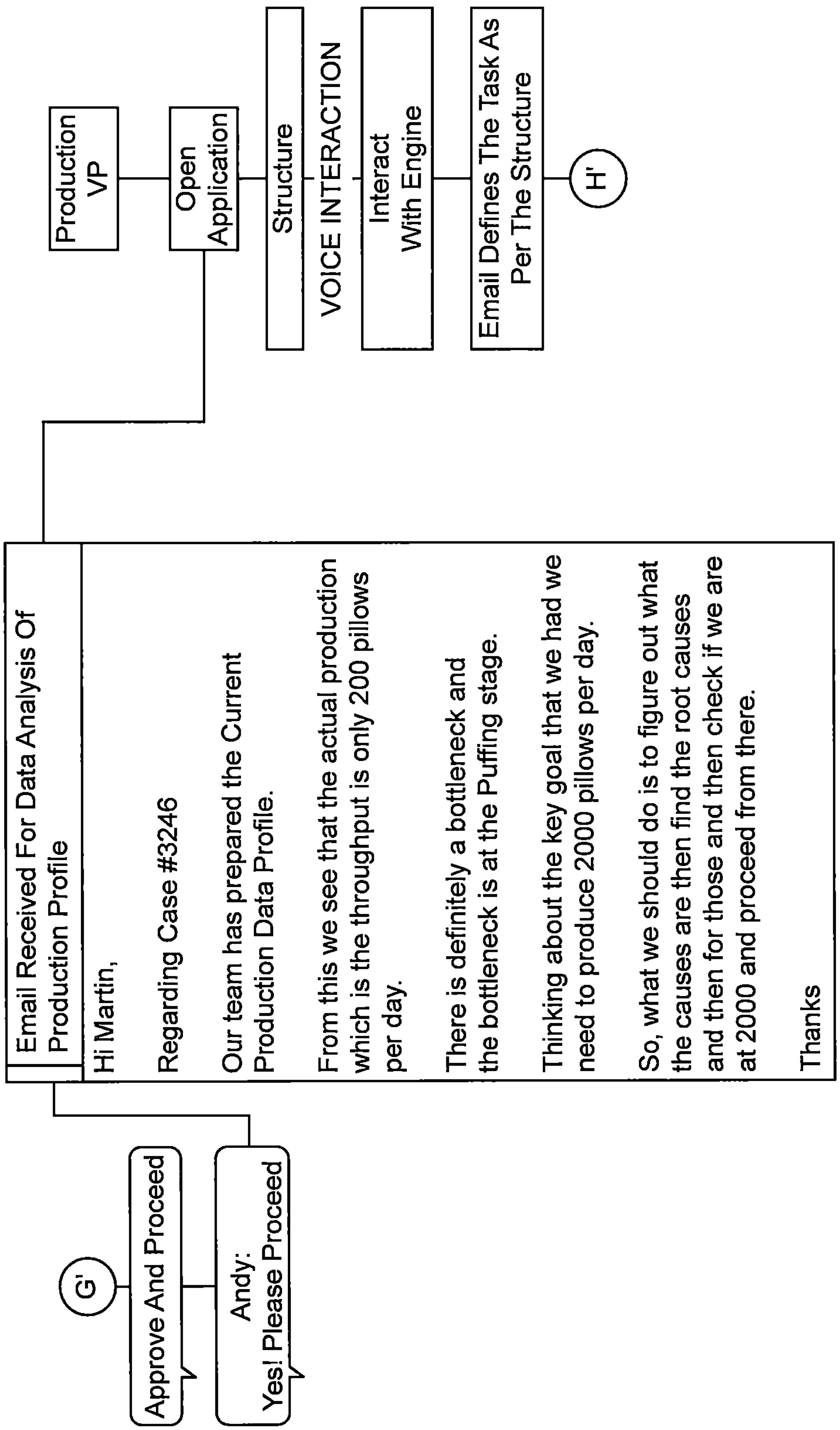
FIG. 23 (Cont. 36)

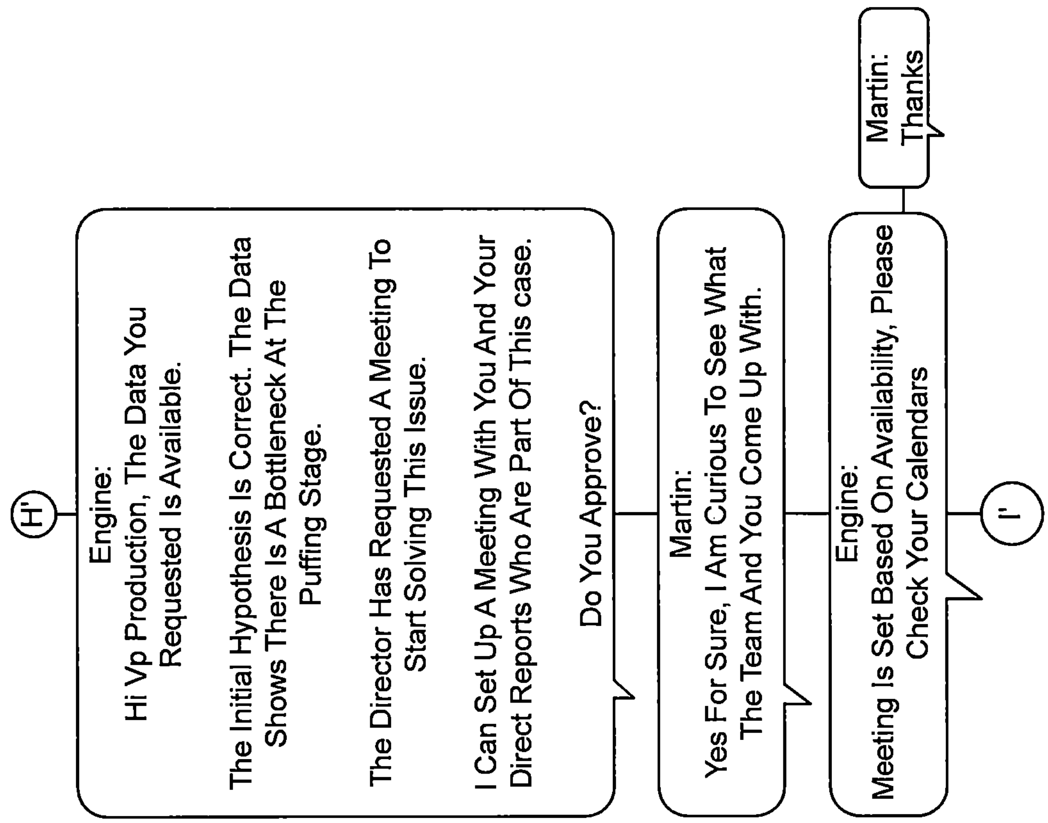
FIG. 23 (Cont. 37)

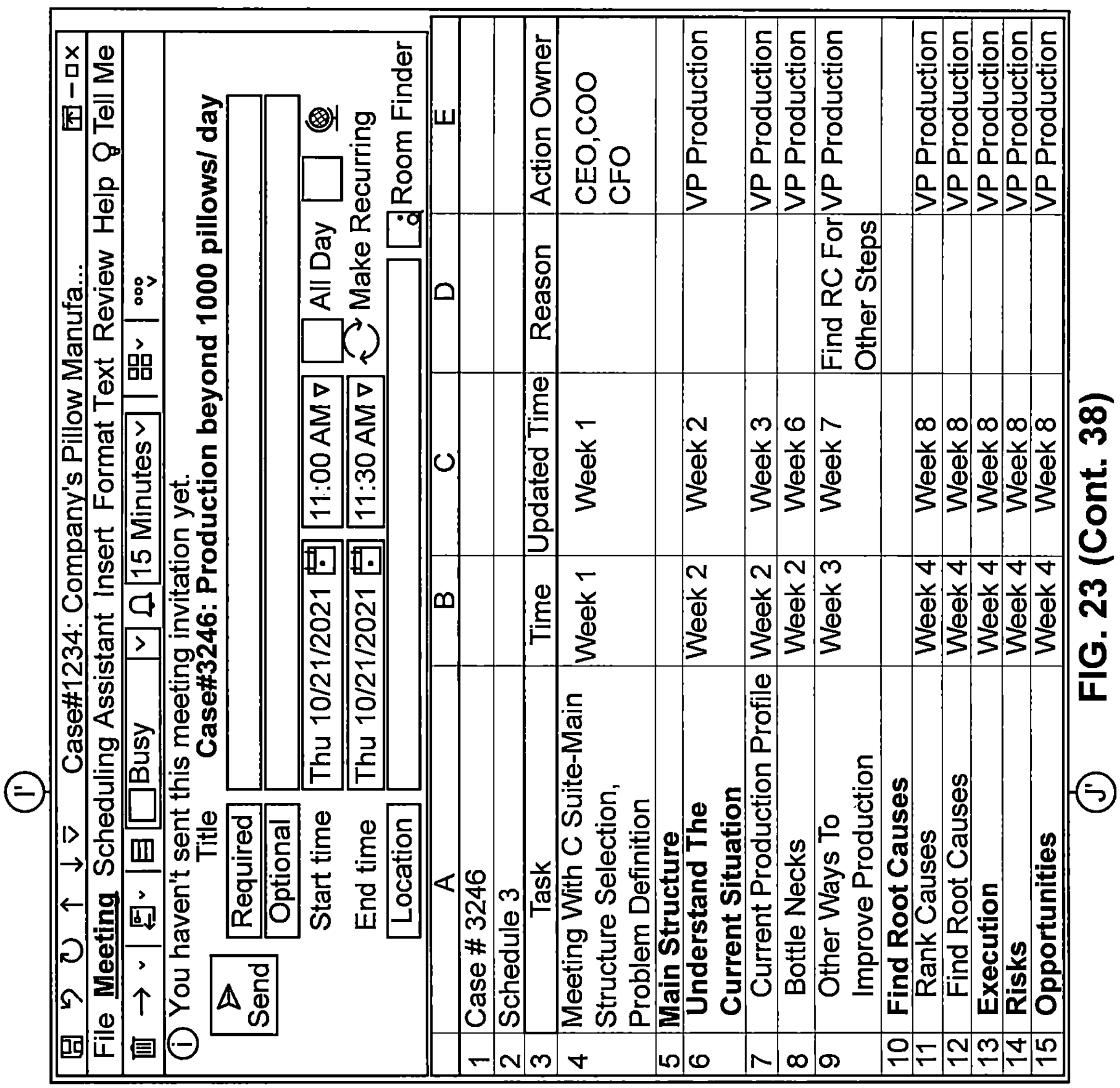
FIG. 23 (Cont. 38)

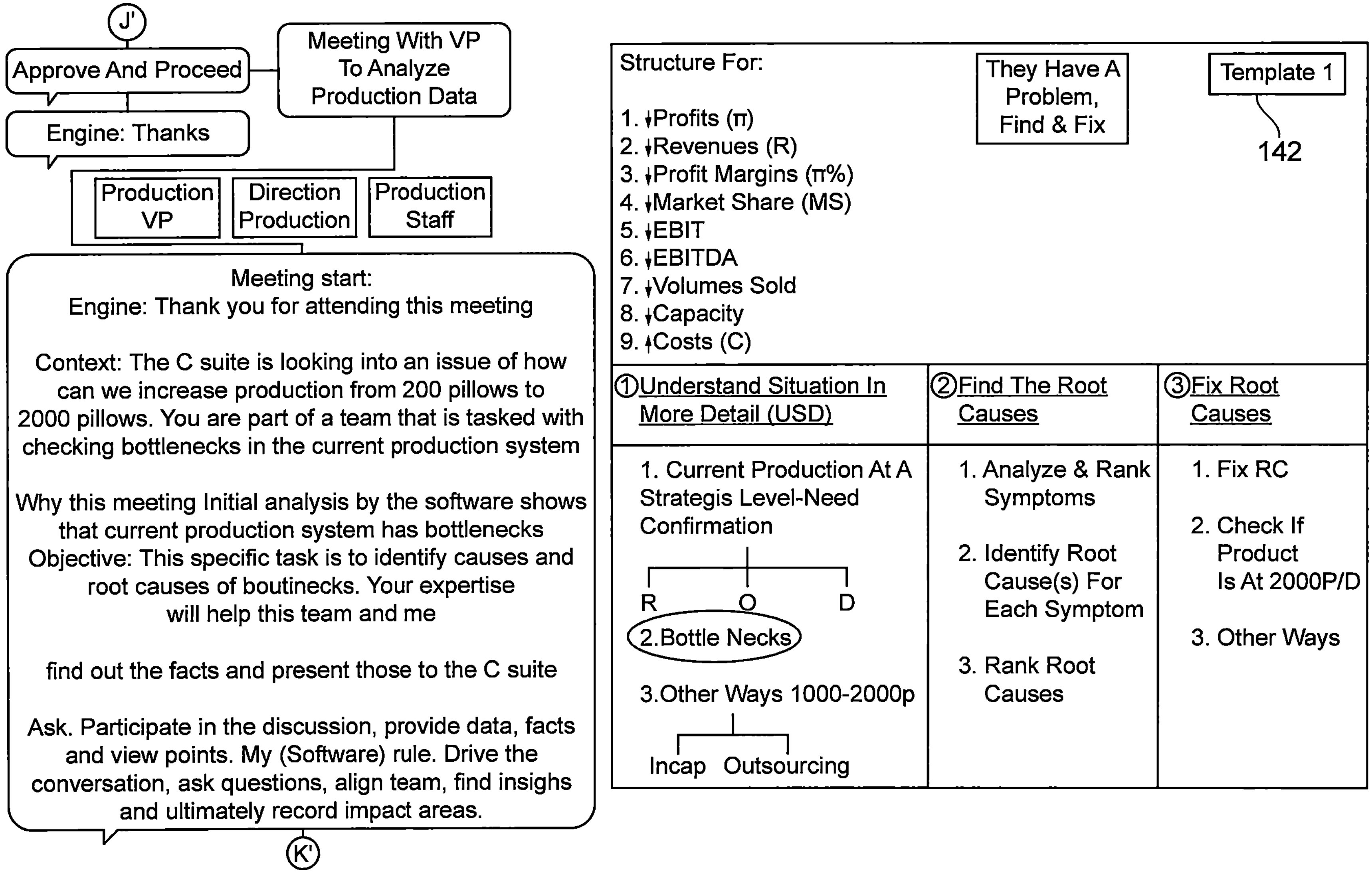
FIG. 23 (Cont. 39)

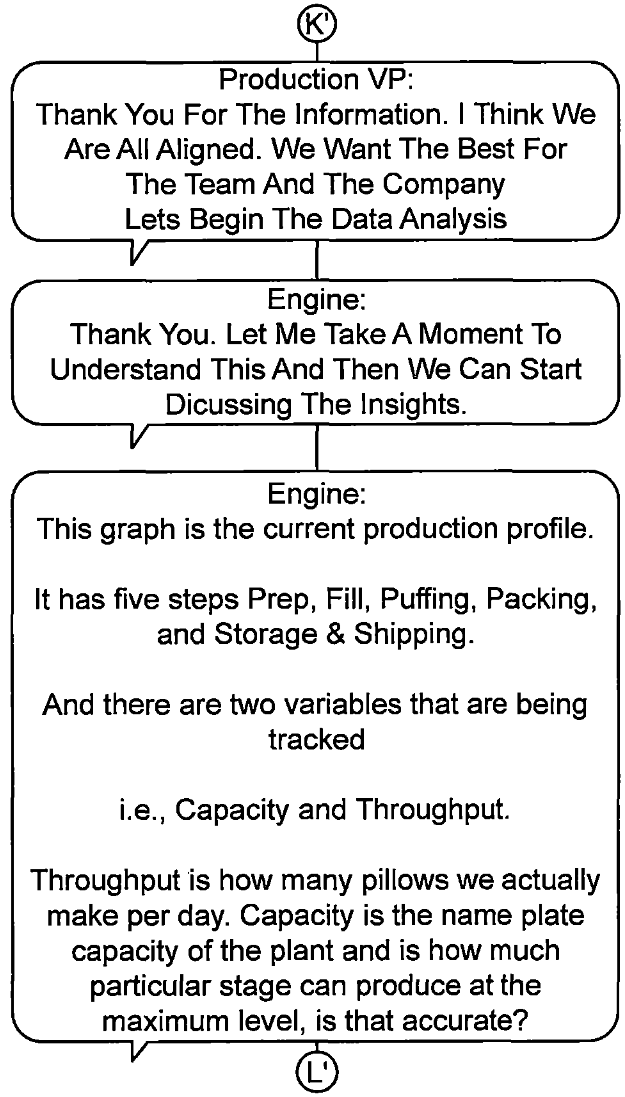
Puffy Pillows: Production Profile
| | 1 Prep | 2 Fill | 3 Puffing | 4 Packing | 5 Storage & Shipping |
|---|---|---|---|---|---|
| Capacity | 600 | 750 | 200 | 500 | 1,000 |
| Throughput | 500 | 450 | 200 | 200 | 200 |
Units: Number Of Pillows Per Day
Note: Production Details Provided
Puffy Pillows: Production Profile
| | 1 Prep | 2 Fill | 3 Puffing | 4 Packing | 5 Storage & Shipping |
|---|---|---|---|---|---|
| Capacity | 600 | 750 | 200 | 500 | 1,000 |
| Throughput | 500 | 450 | 200 | 200 | 200 |
Units: Number Of Pillows Per Day
Note: Production Details Provided
FIG. 23 (Cont. 40)

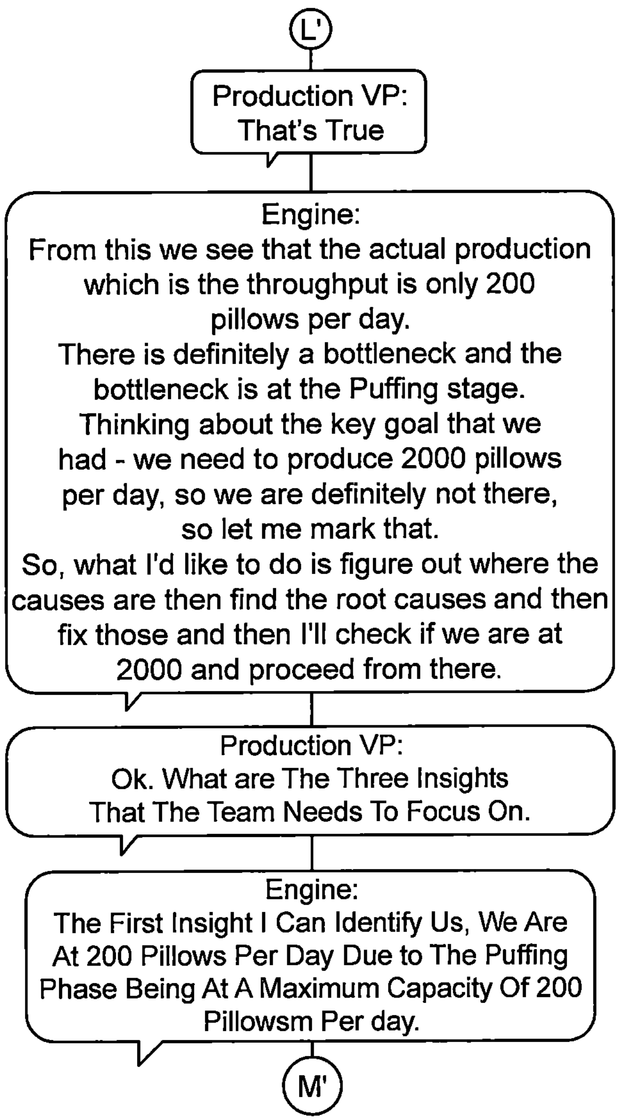
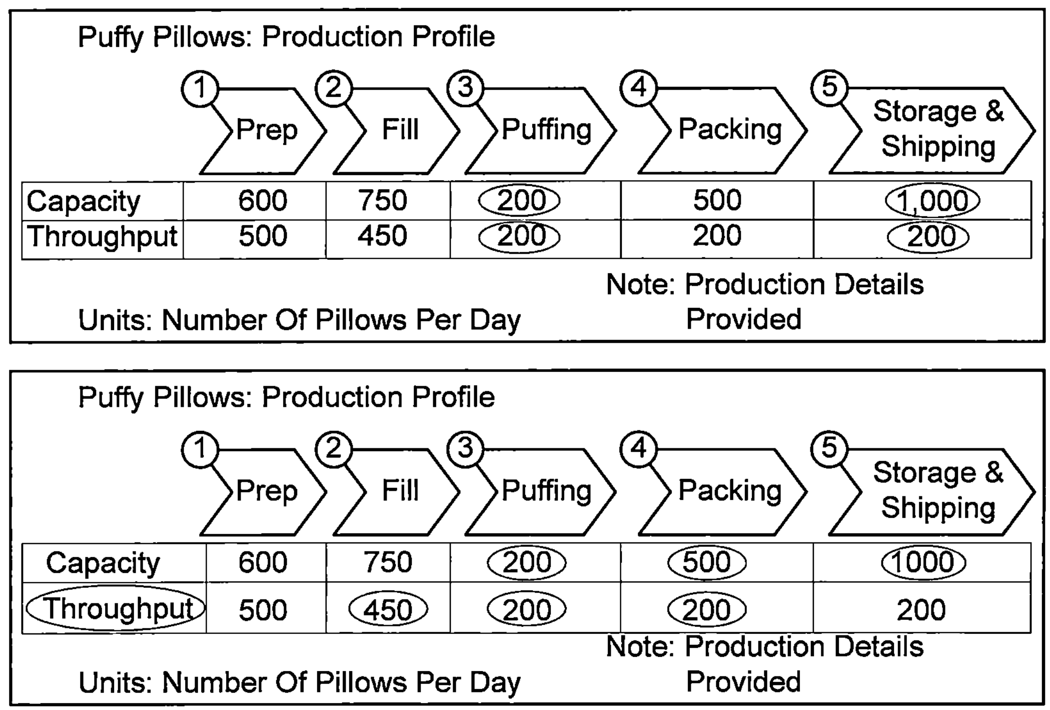
FIG. 23 (Cont. 41)

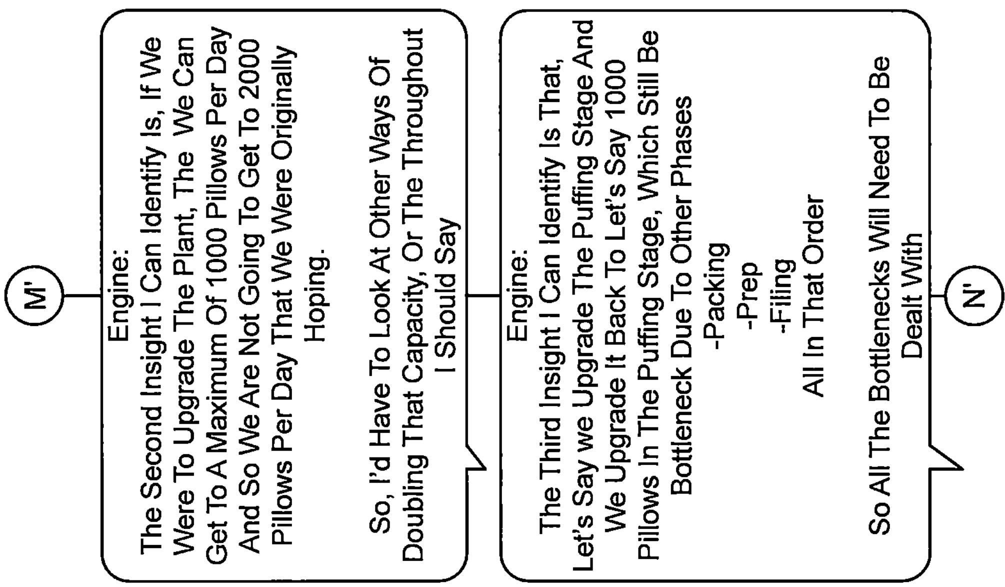
FIG. 23 (Cont. 42)

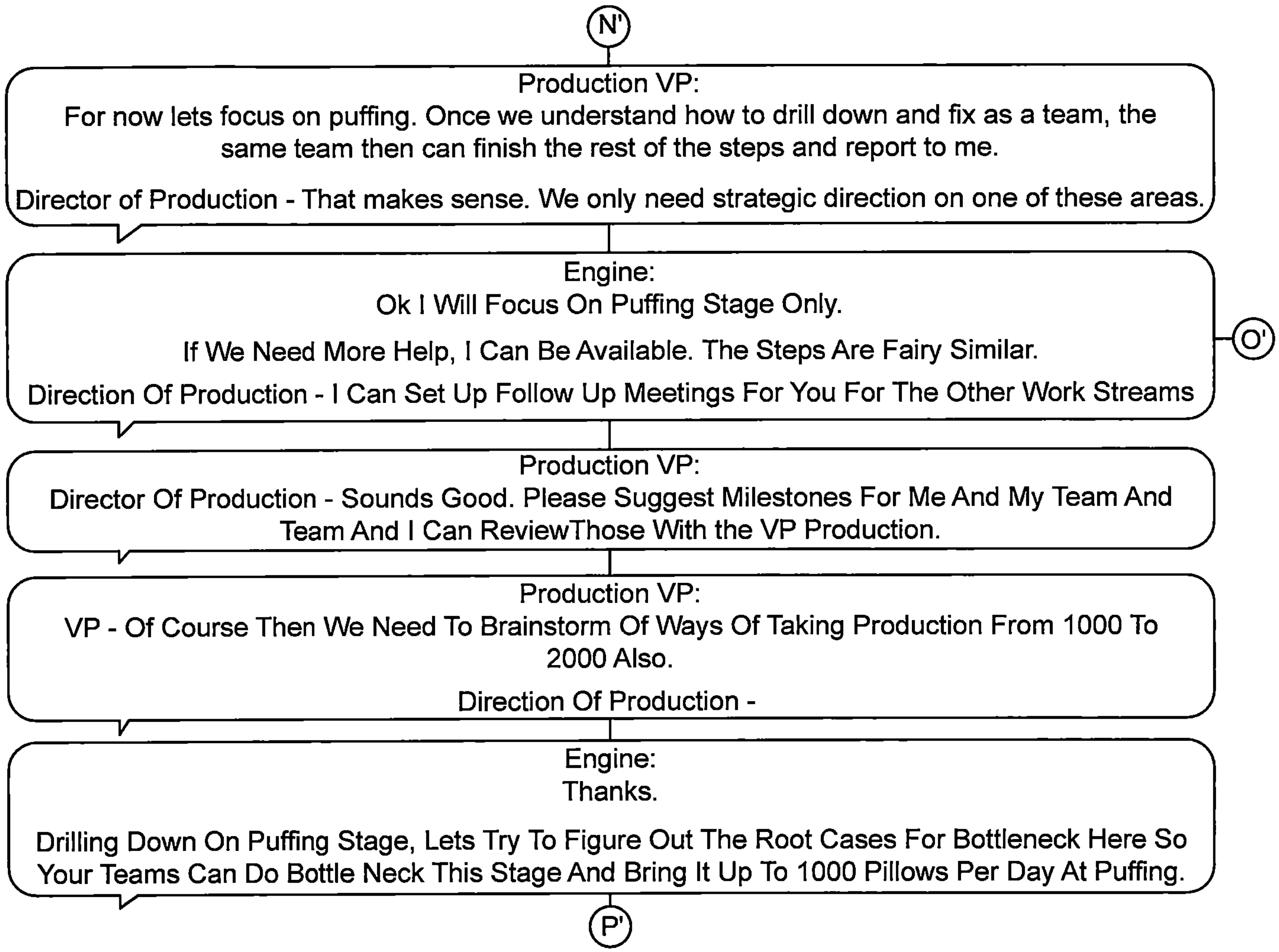
FIG. 23 (Cont. 43)

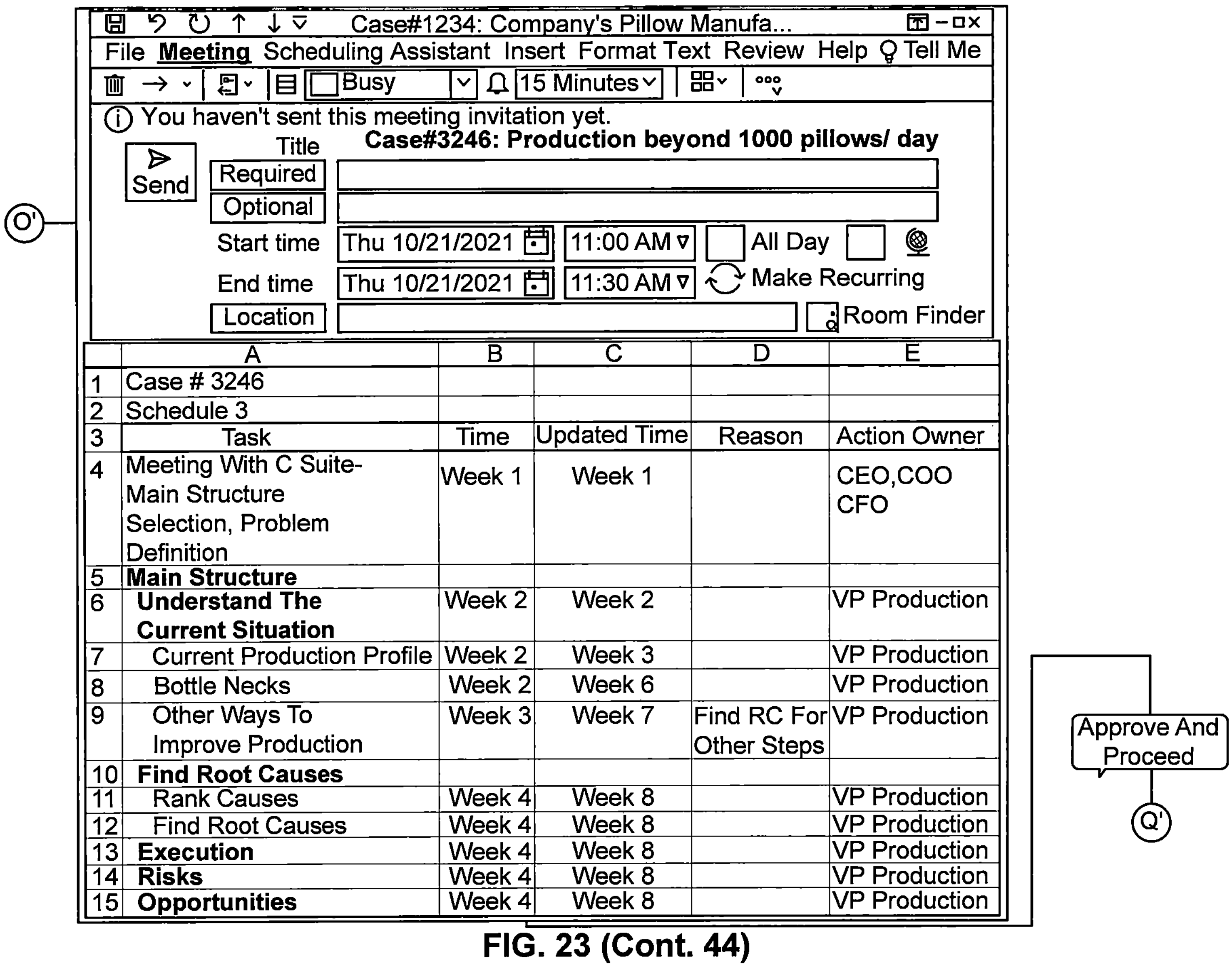
FIG. 23 (Cont. 44)

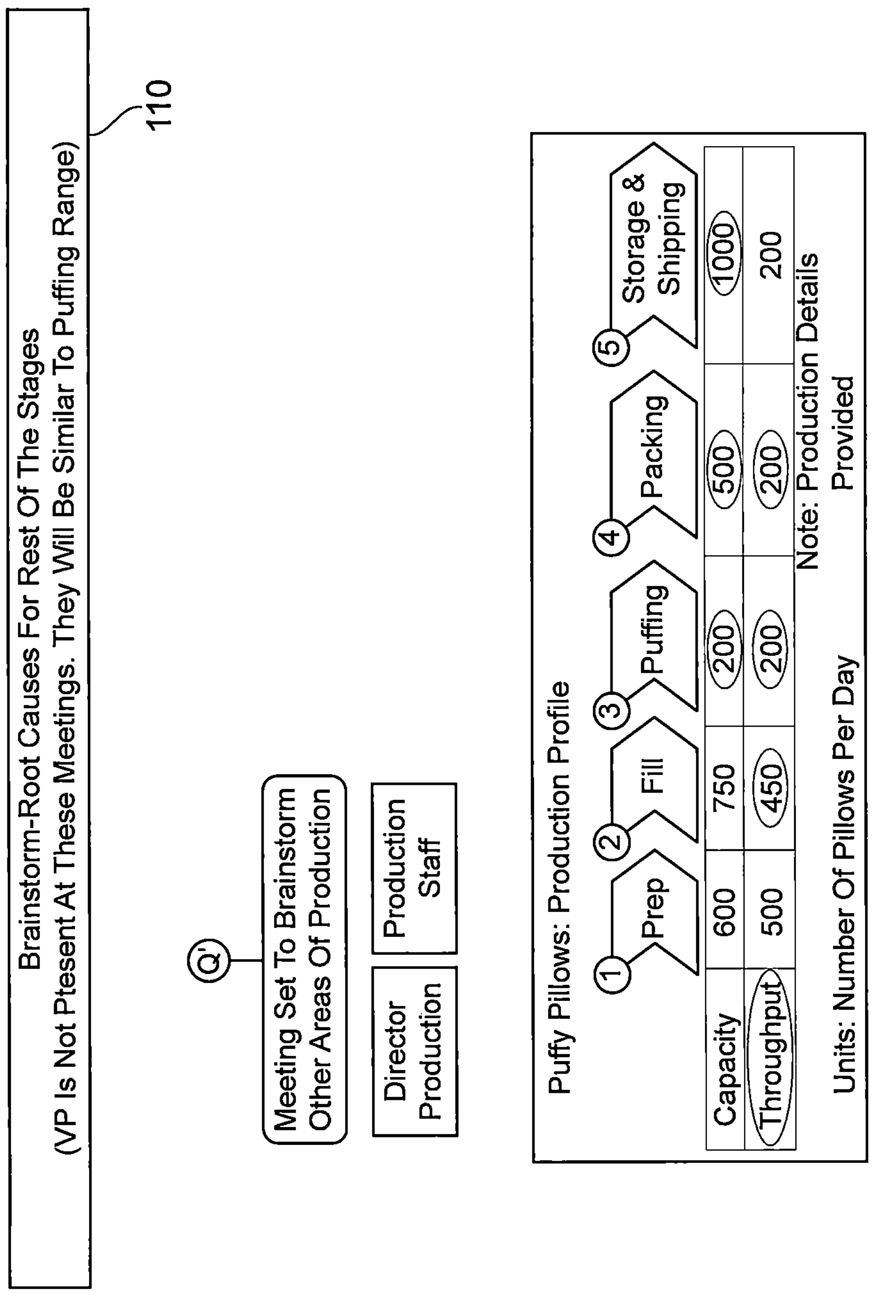
FIG. 23 (Cont. 45)

| | A | B | C | D | E |
|---|---|---|---|---|---|
| 1 | Case # 3246 | | | | |
| 2 | Schedule 3 | | | | |
| 3 | Task | Time | Updated Time | Reason | Action Owner |
| 4 | Meeting With C Suite -Main Structure Selection, Problem Definition | Week 1 | Week 1 | | CEO,COO,CFO |
| 5 | **Main Structure** | | | | |
| 6 | **Understand The Current Situation** | Week 2 | Week 2 | | VP Production |
| 7 | Current Production Profile | Week 2 | Week 3 | | VP Production |
| 8 | Bottle Necks | Week 2 | Week 6 | Find RC For Other Steps | VP Production |
| 9 | Other Ways To Improve Production | Week 3 | Week 7 | | VP Production |
| 10 | **Find Root Causes** | | | | |
| 11 | Rank Causes | Week 4 | Week 8 | | VP Production |
| 12 | Find Root Causes | Week 4 | Week 8 | | VP Production |
| 13 | **Execution** | Week 4 | Week 8 | | VP Production |
| 14 | **Risks** | Week 4 | Week 8 | | VP Production |
| 15 | **Opportunities** | Week 4 | Week 8 | | VP Production |

FIG. 23 (Cont. 46)

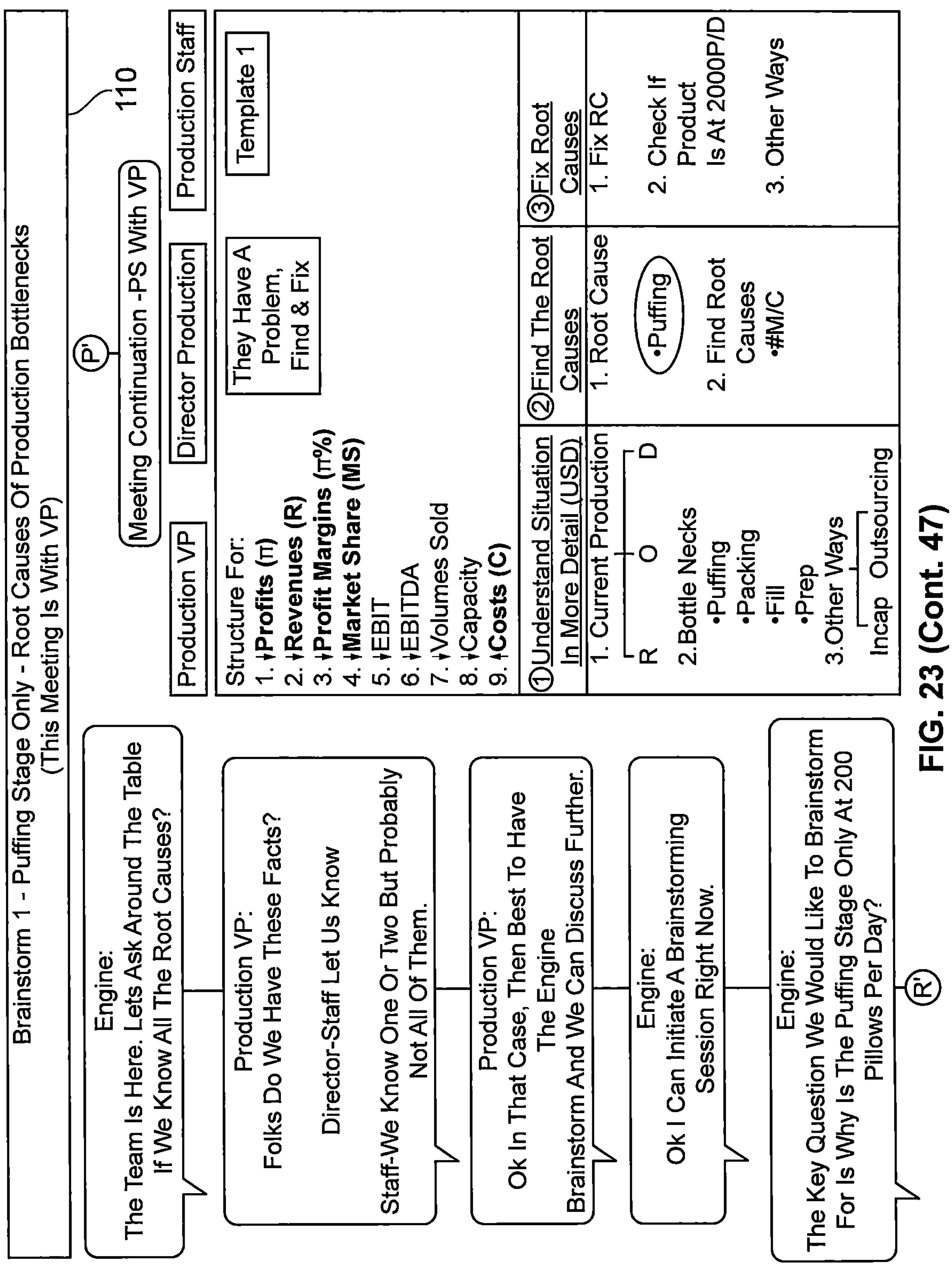
FIG. 23 (Cont. 47)

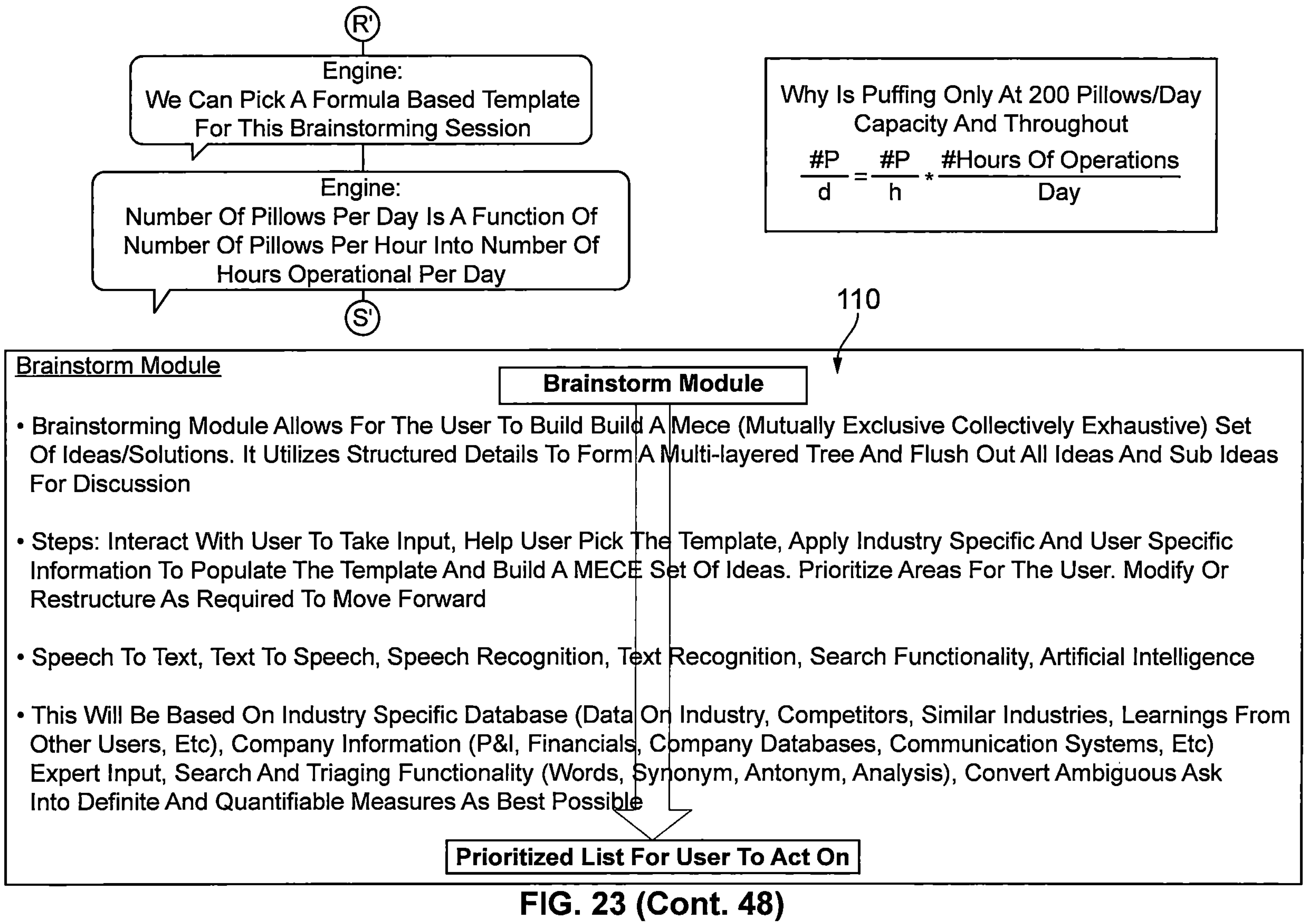
FIG. 23 (Cont. 48)

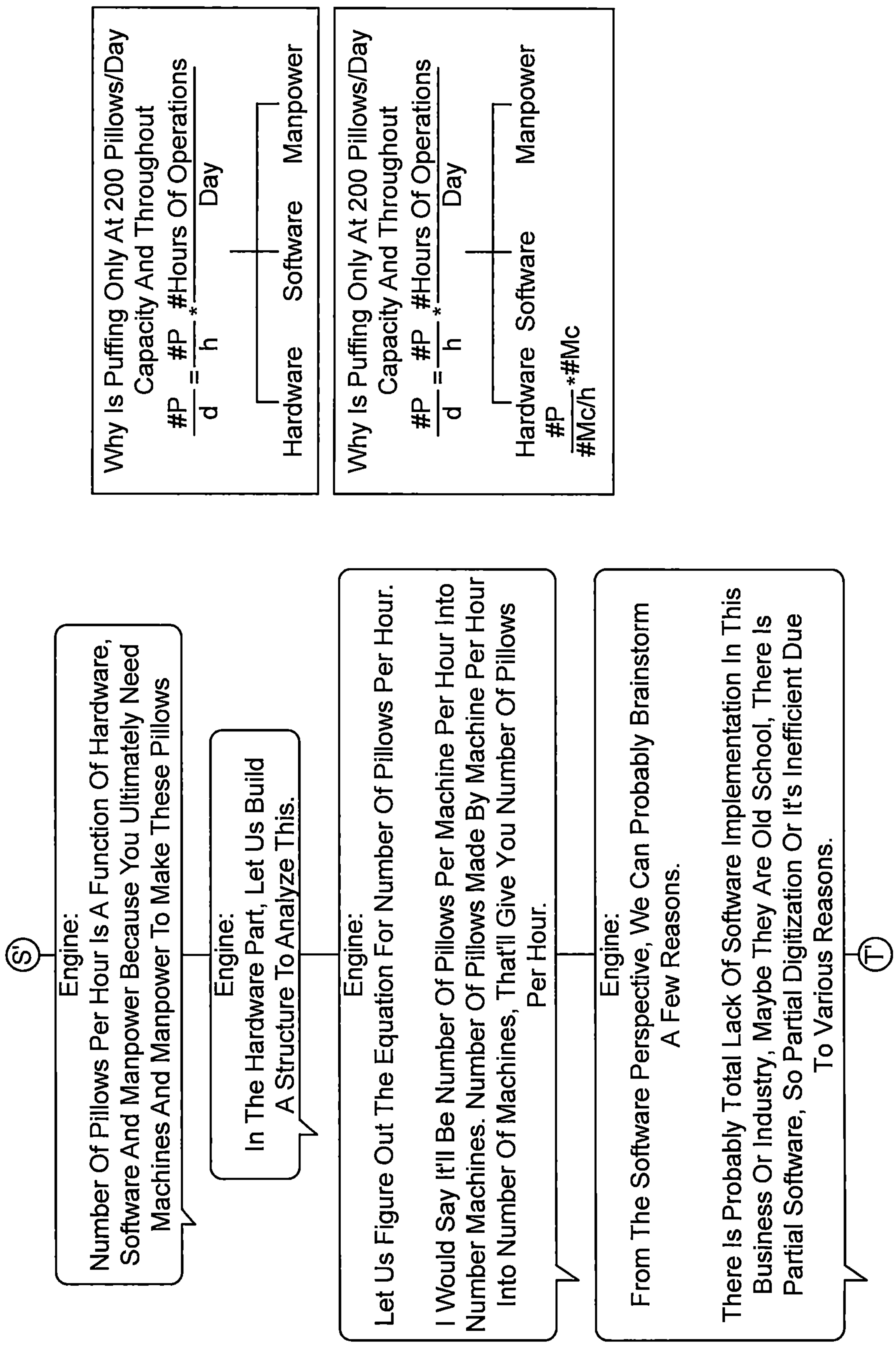
FIG. 23 (Cont. 49)

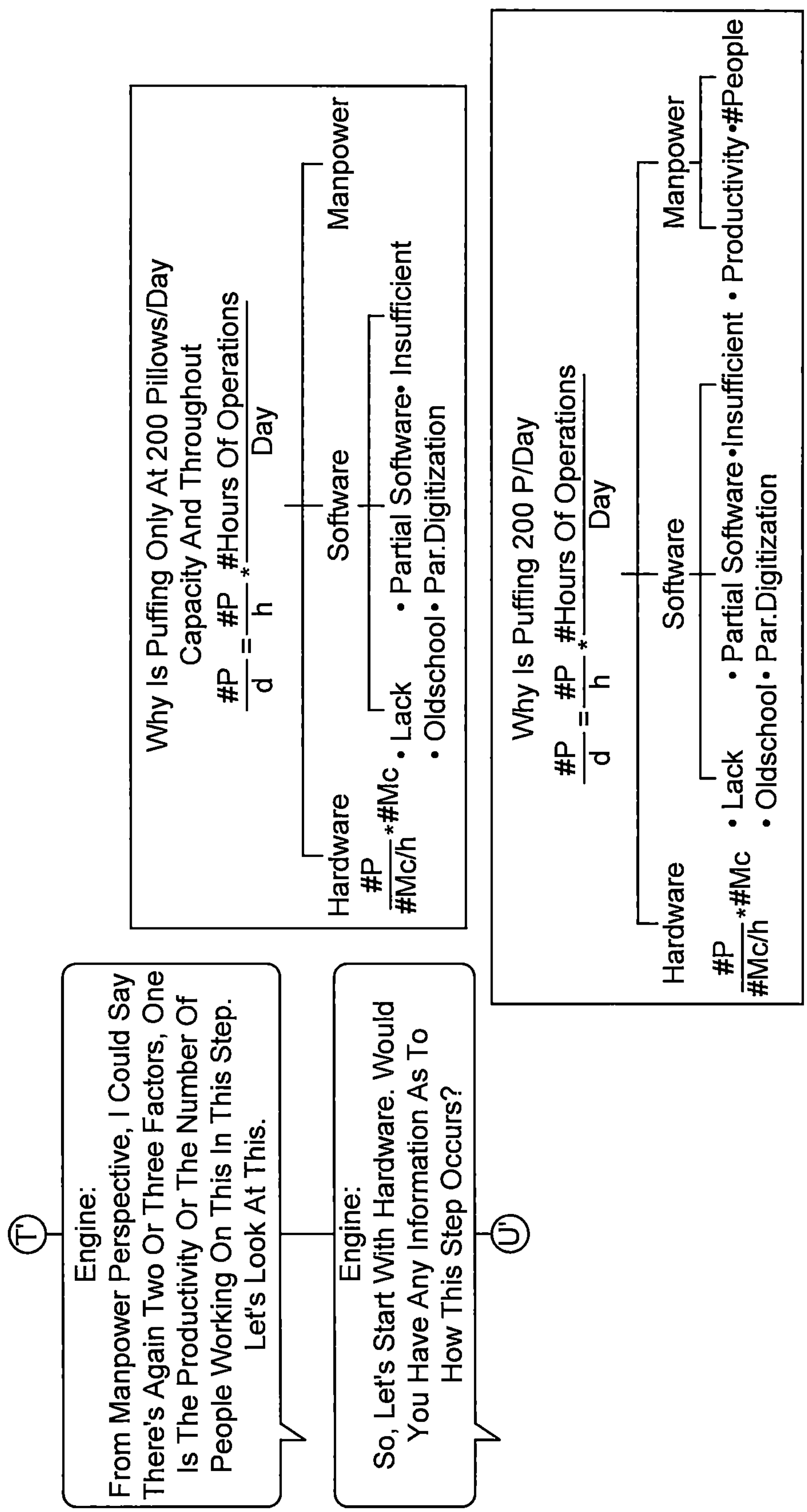
FIG. 23 (Cont. 50)

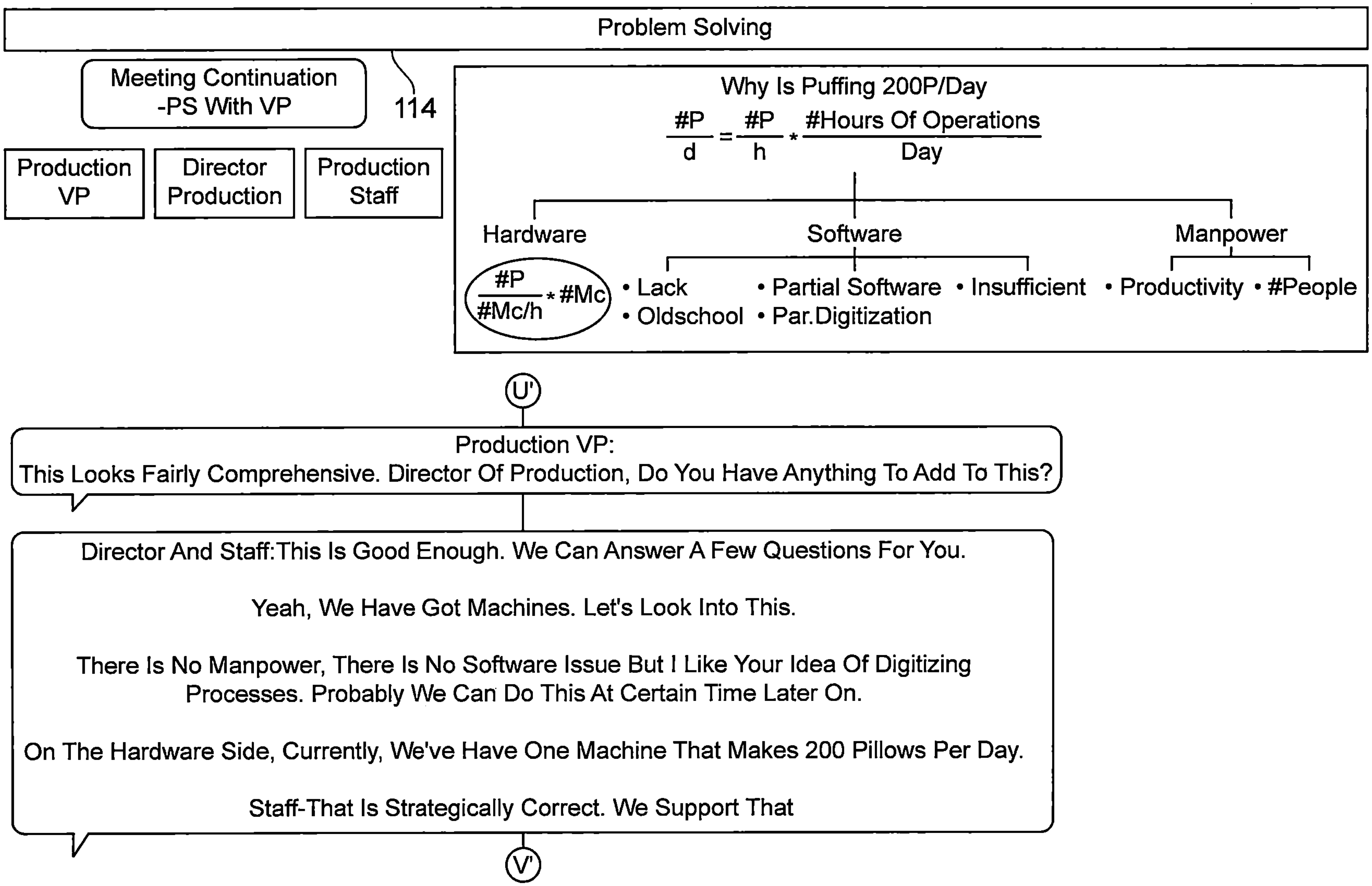
FIG. 23 (Cont. 51)

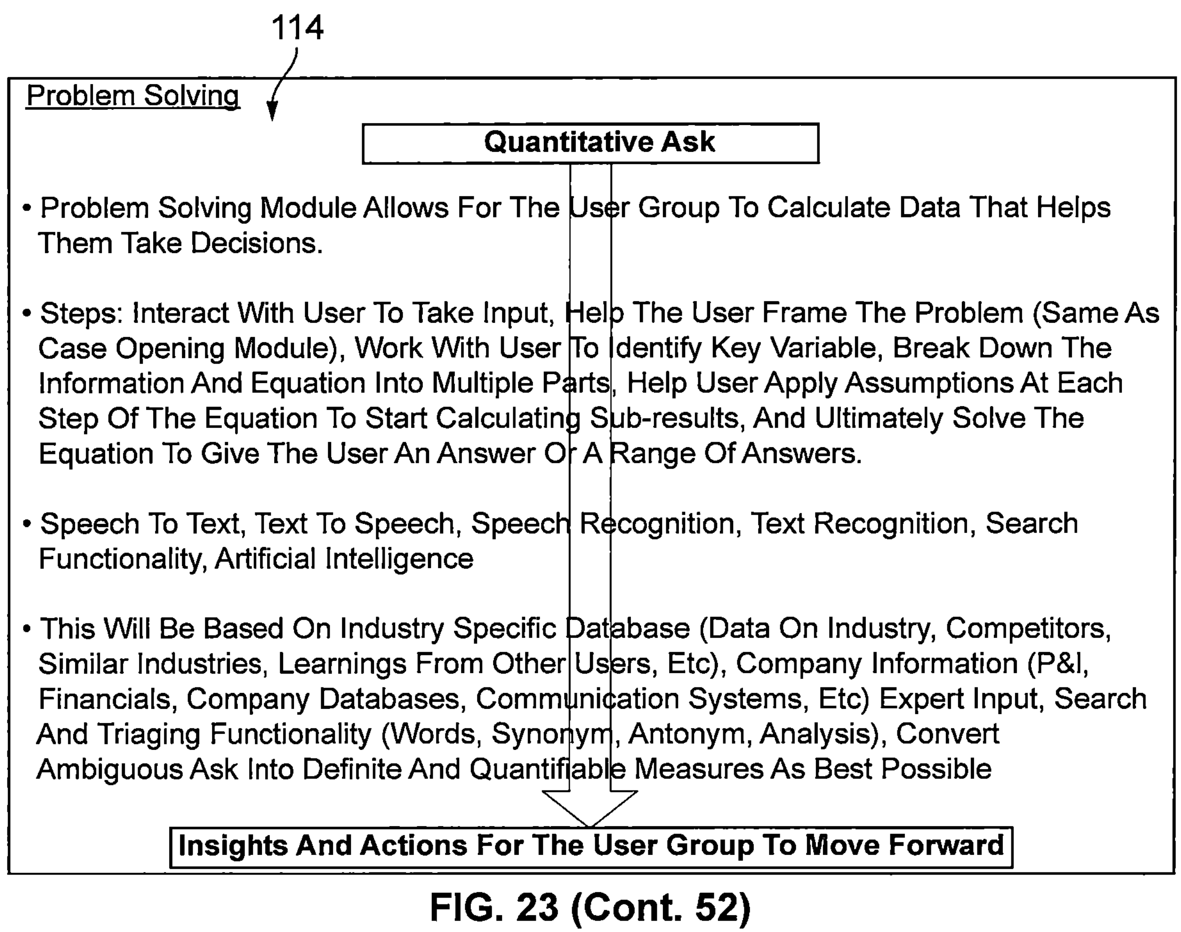
FIG. 23 (Cont. 52)

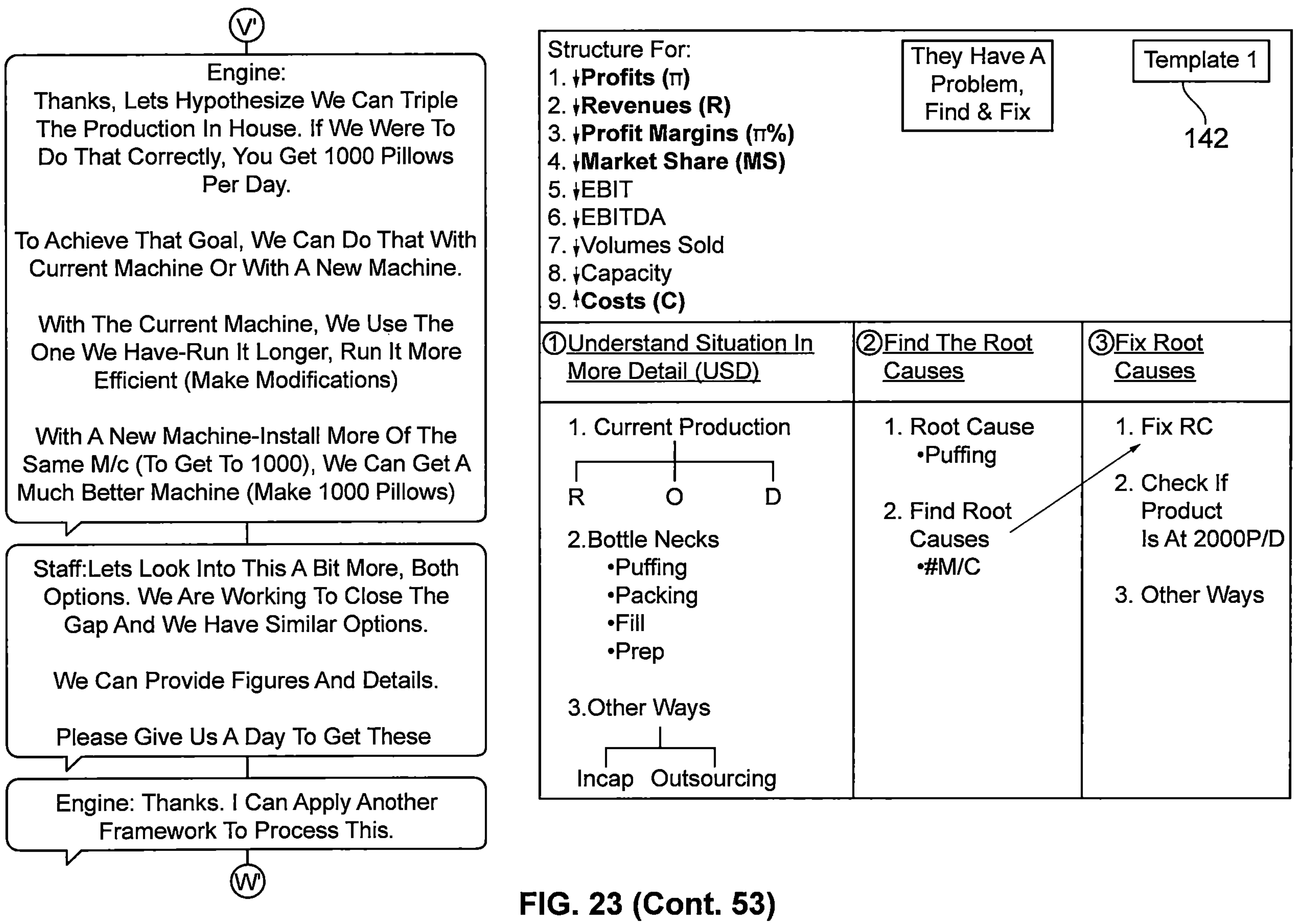
FIG. 23 (Cont. 53)

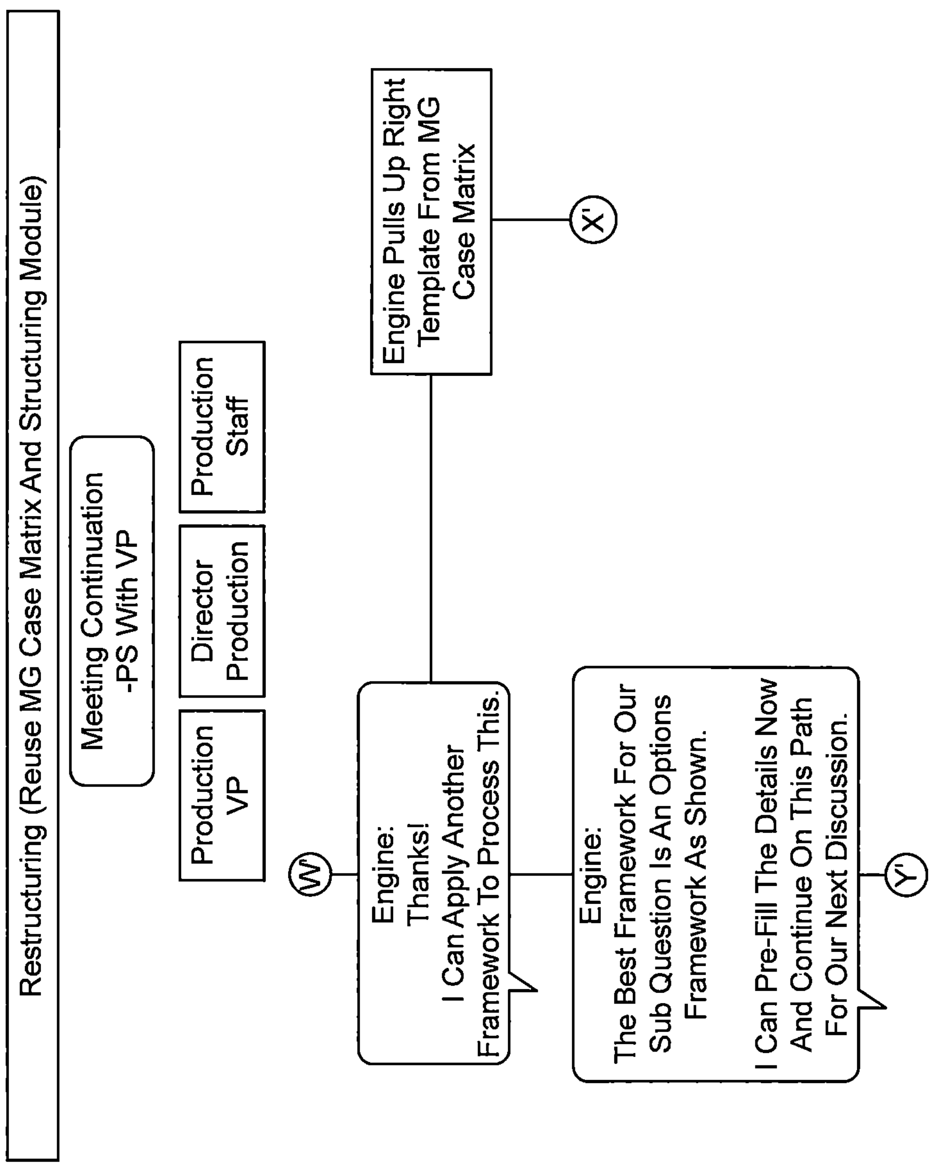
FIG. 23 (Cont. 54)

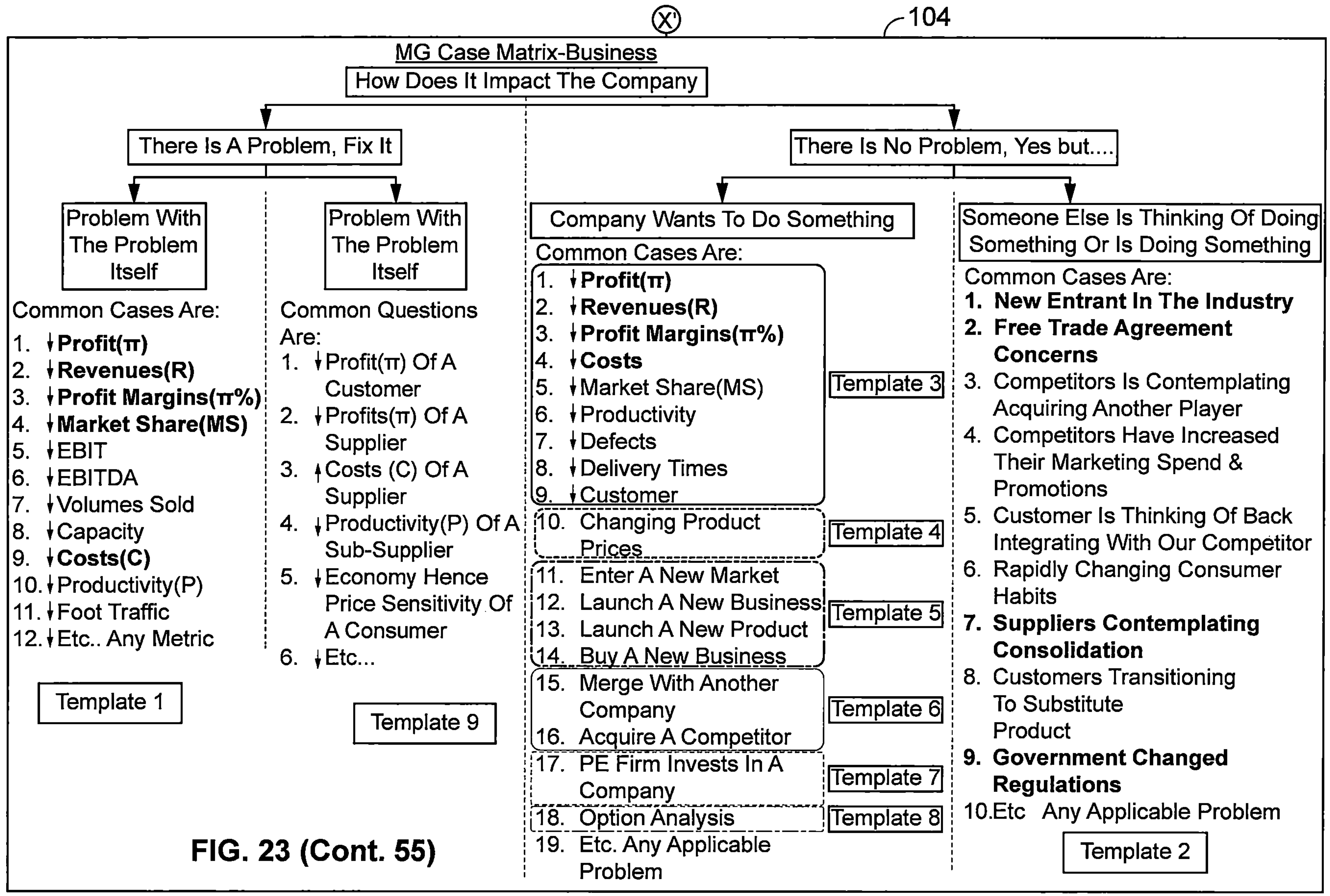
FIG. 23 (Cont. 55)

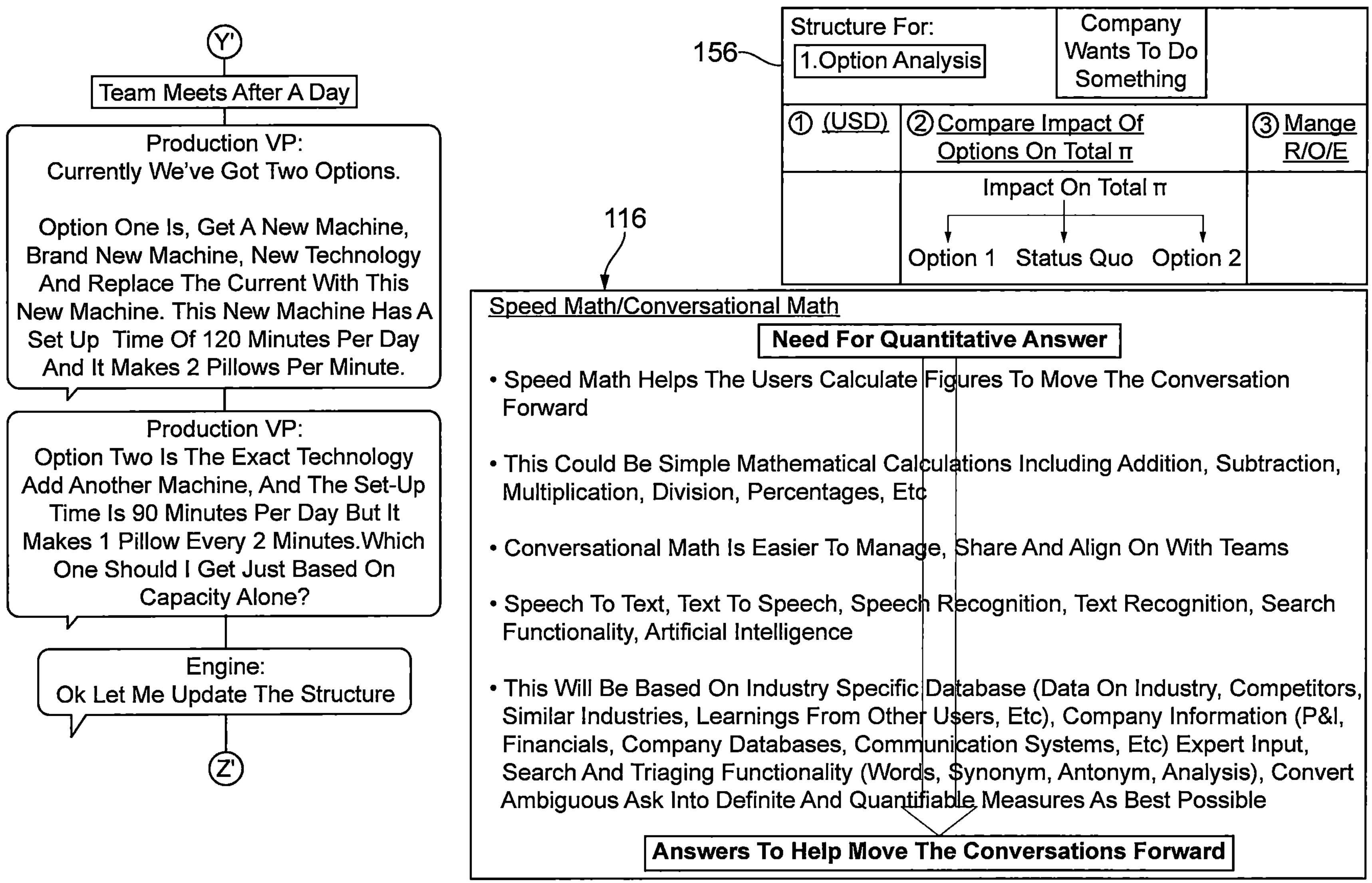
FIG. 23 (Cont. 56)

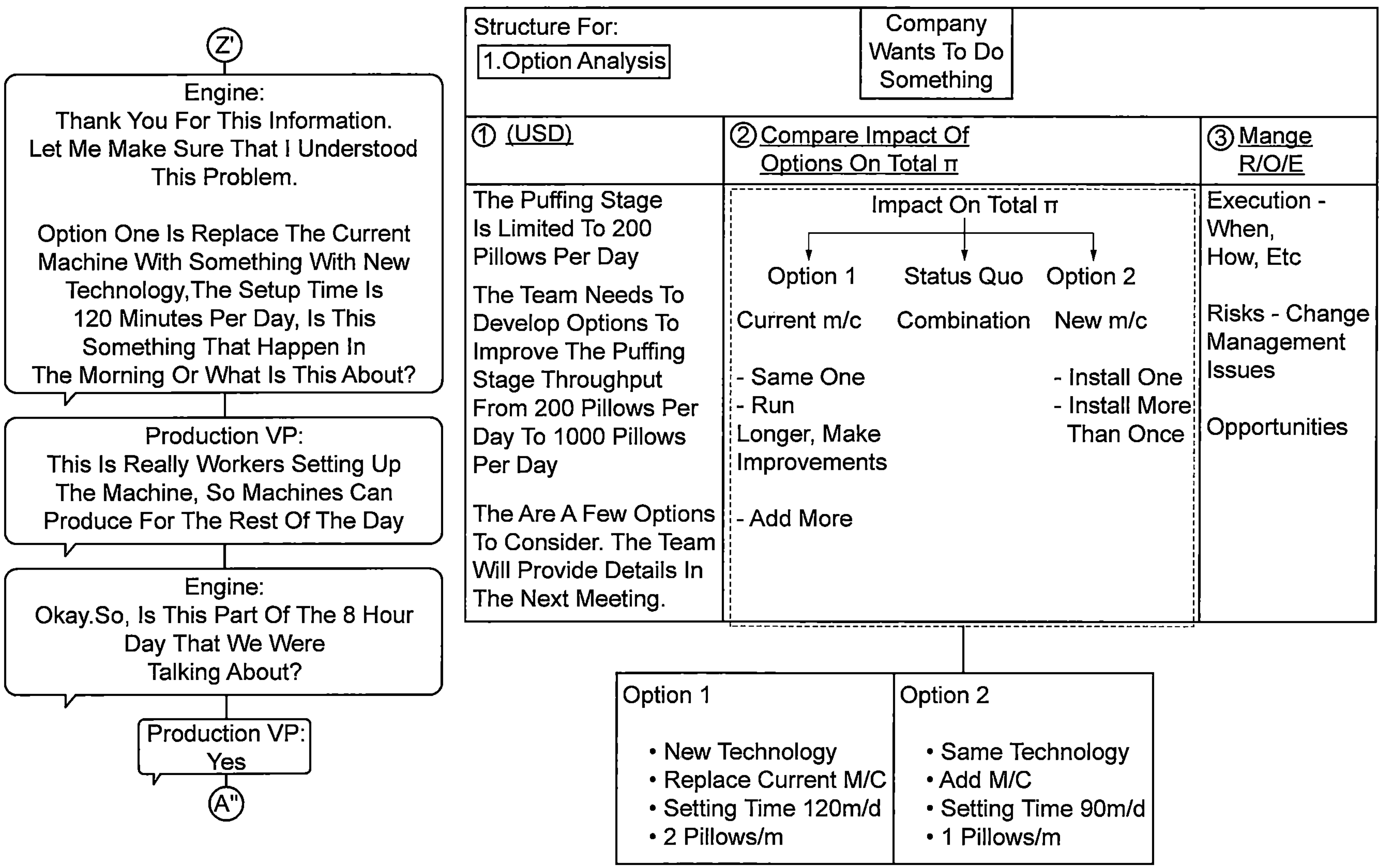
FIG. 23 (Cont. 57)

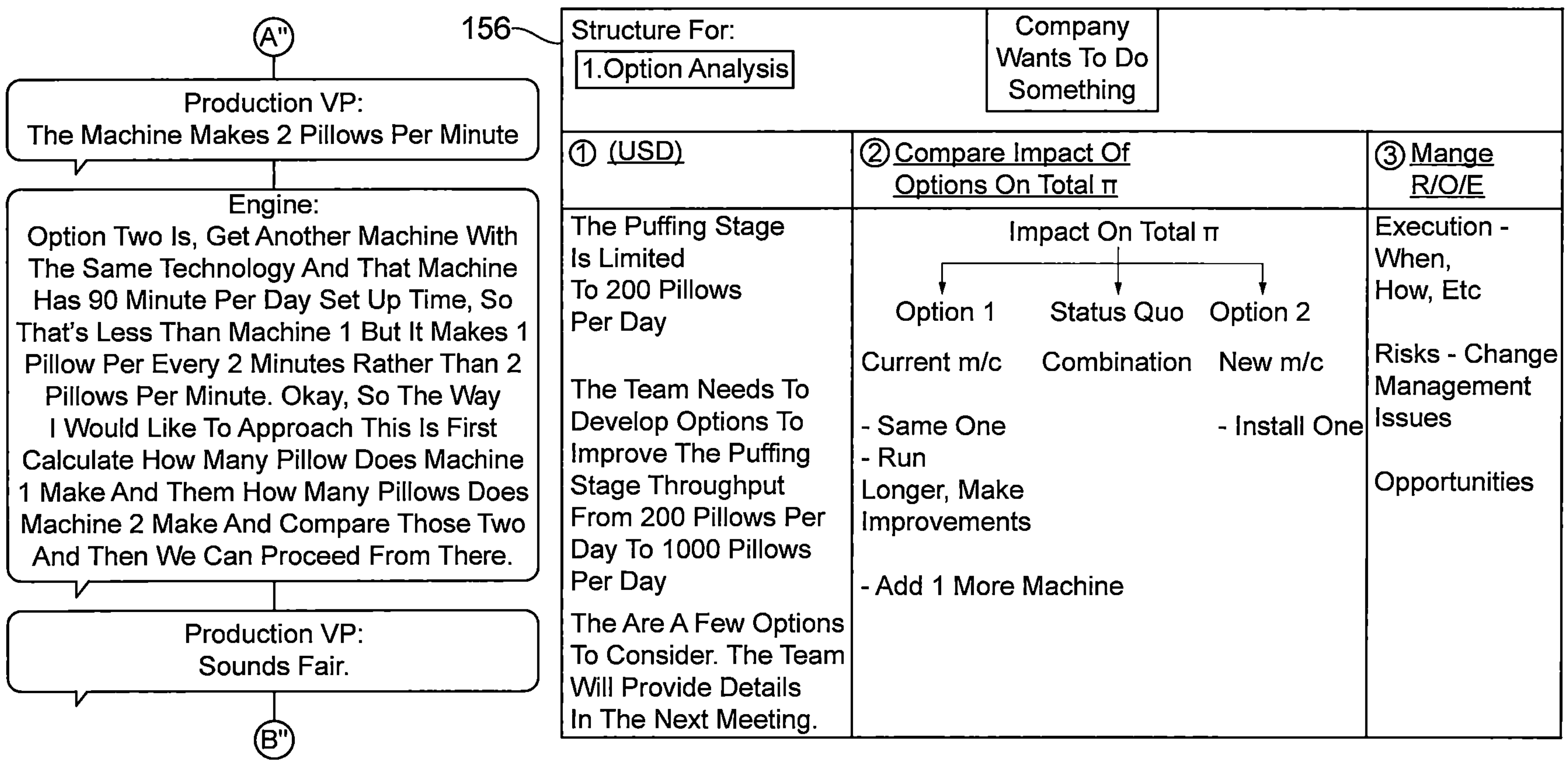
FIG. 23 (Cont. 58)

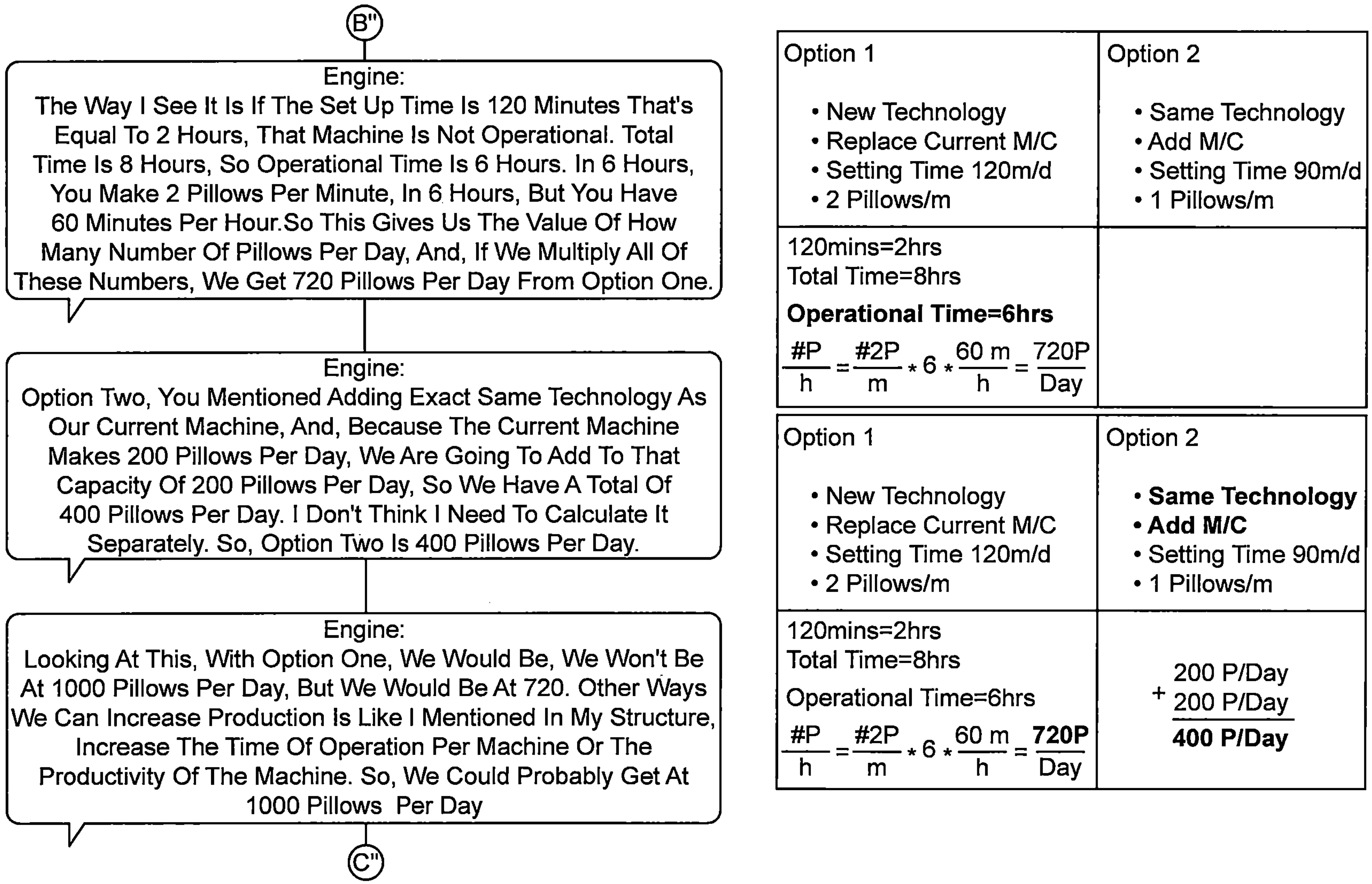
FIG. 23 (Cont. 59)

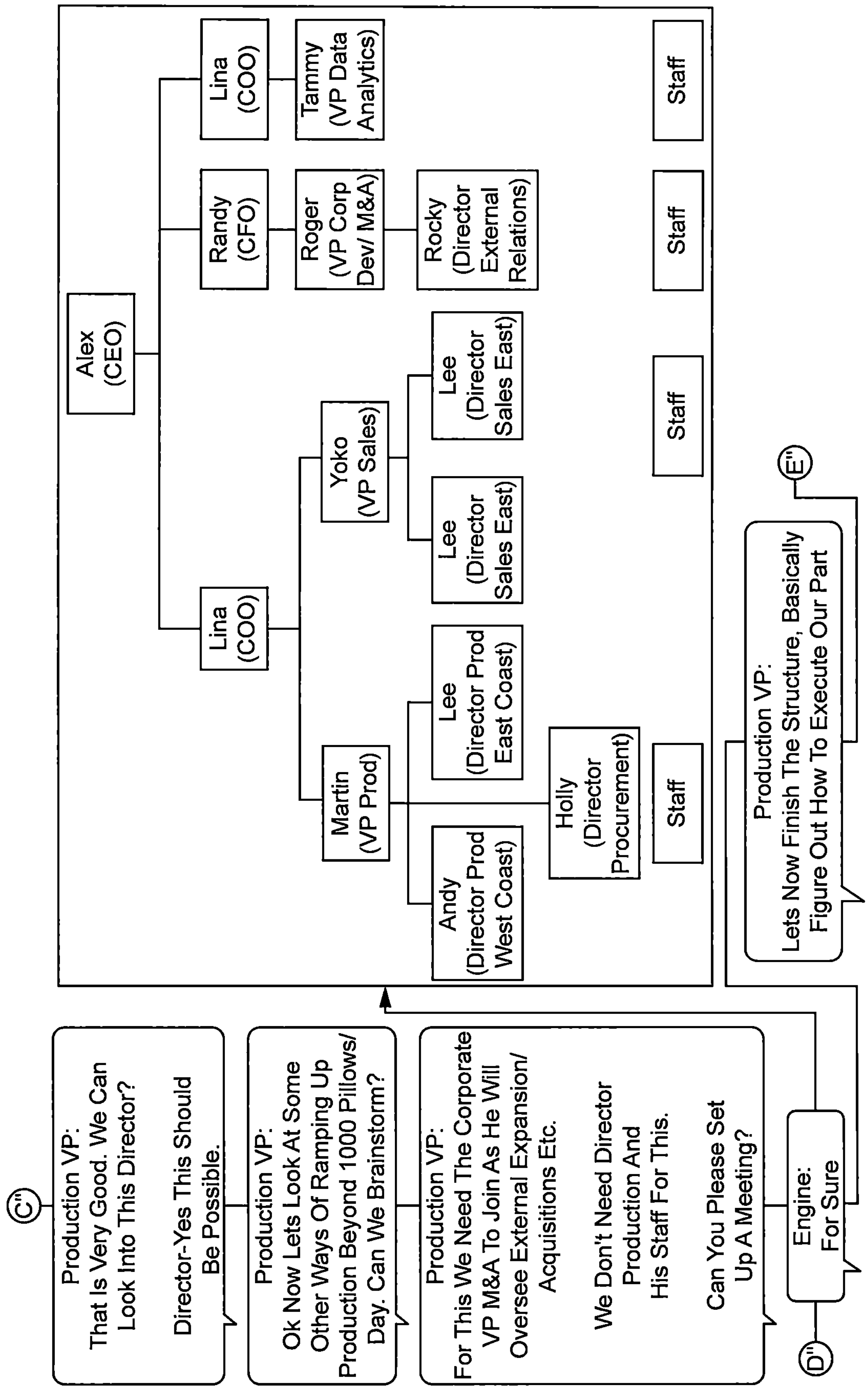
FIG. 23 (Cont. 60)

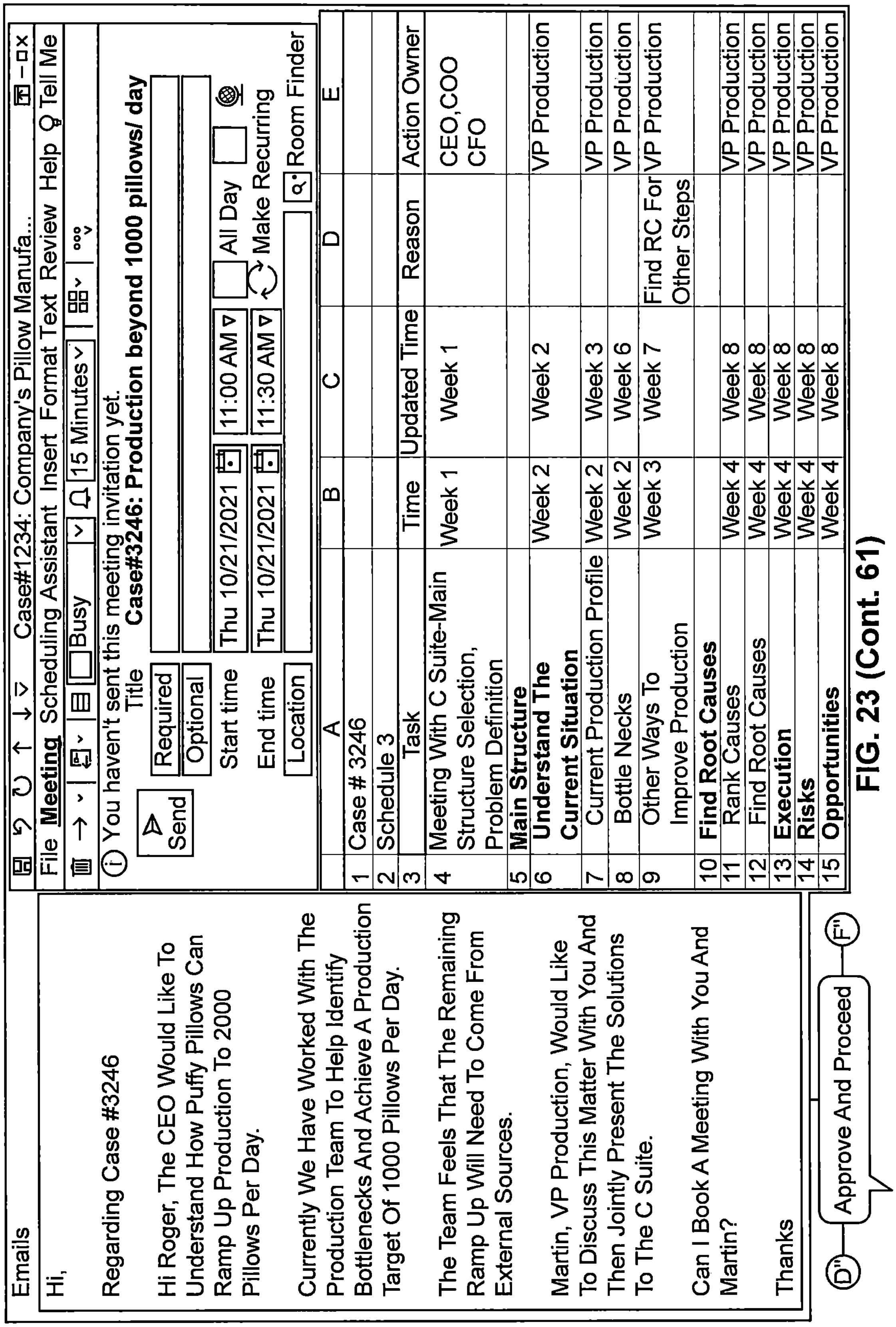
FIG. 23 (Cont. 61)

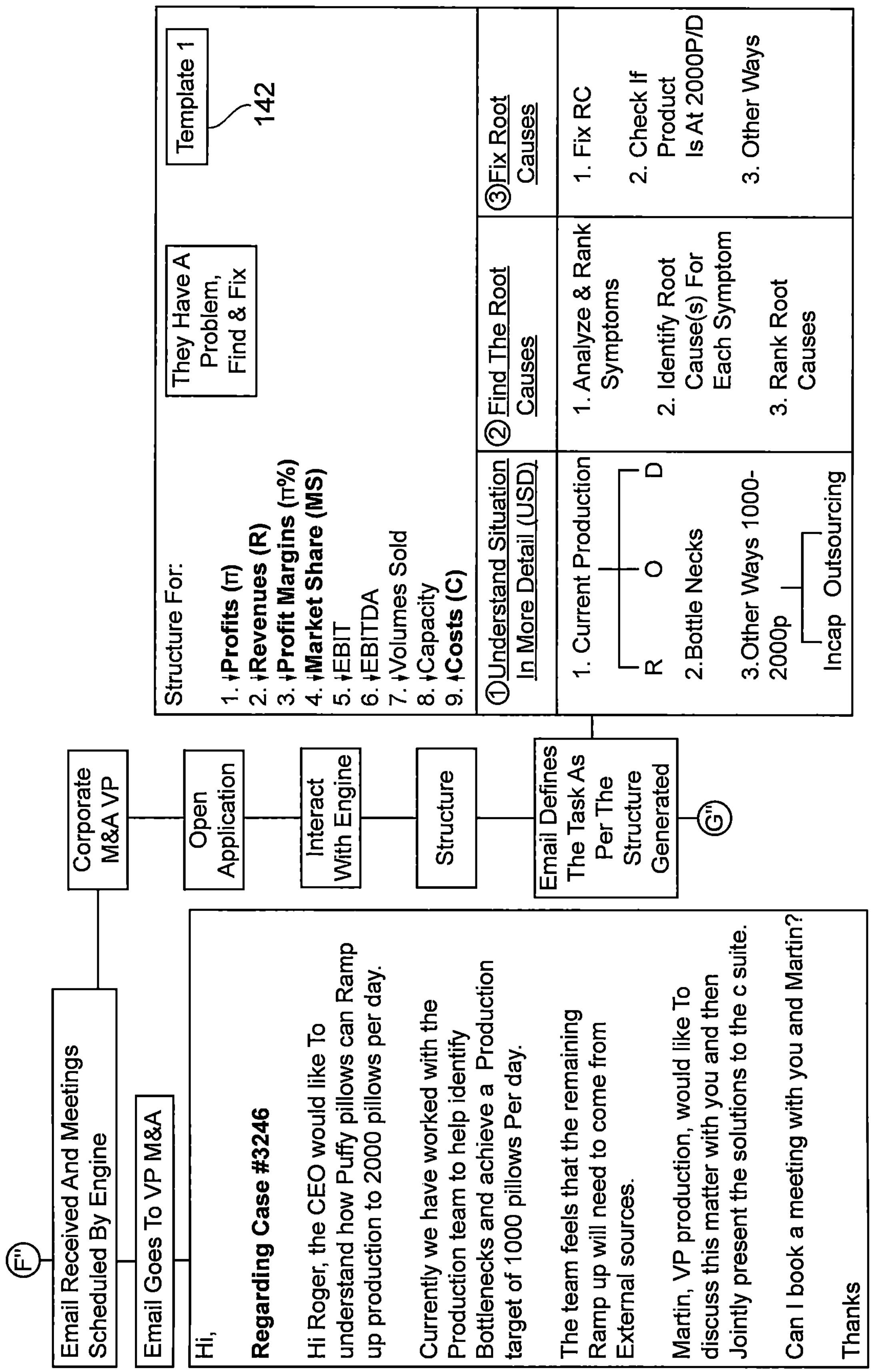
FIG. 23 (Cont. 62)

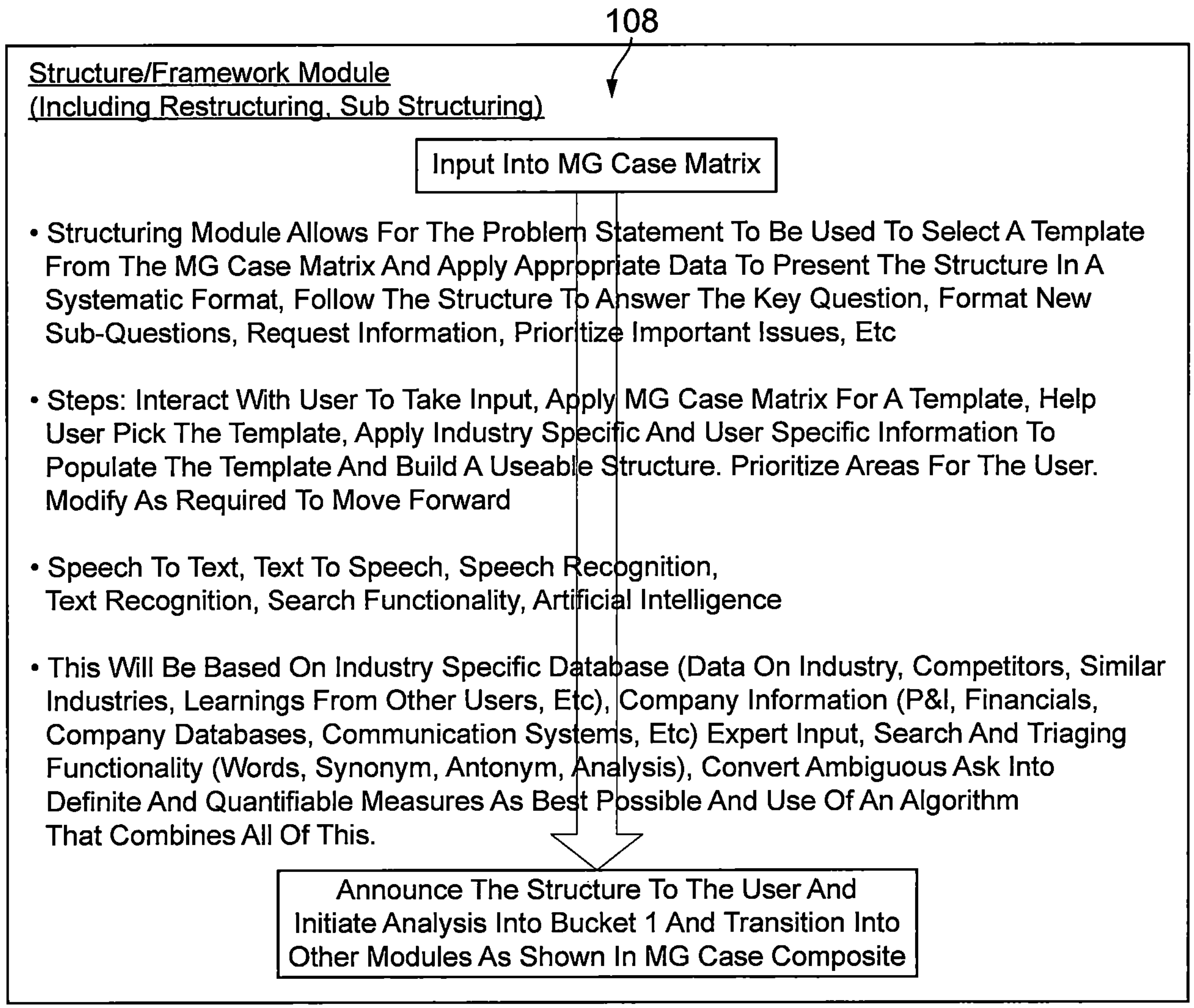
FIG. 23 (Cont. 63)

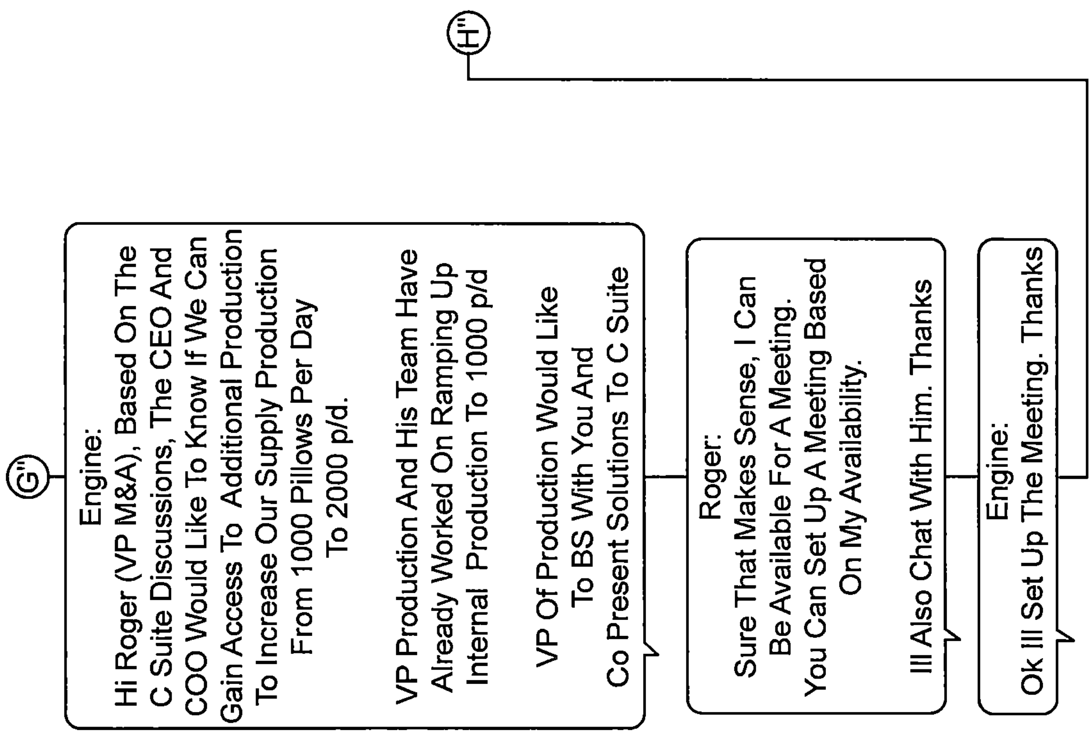
FIG. 23 (Cont. 64)

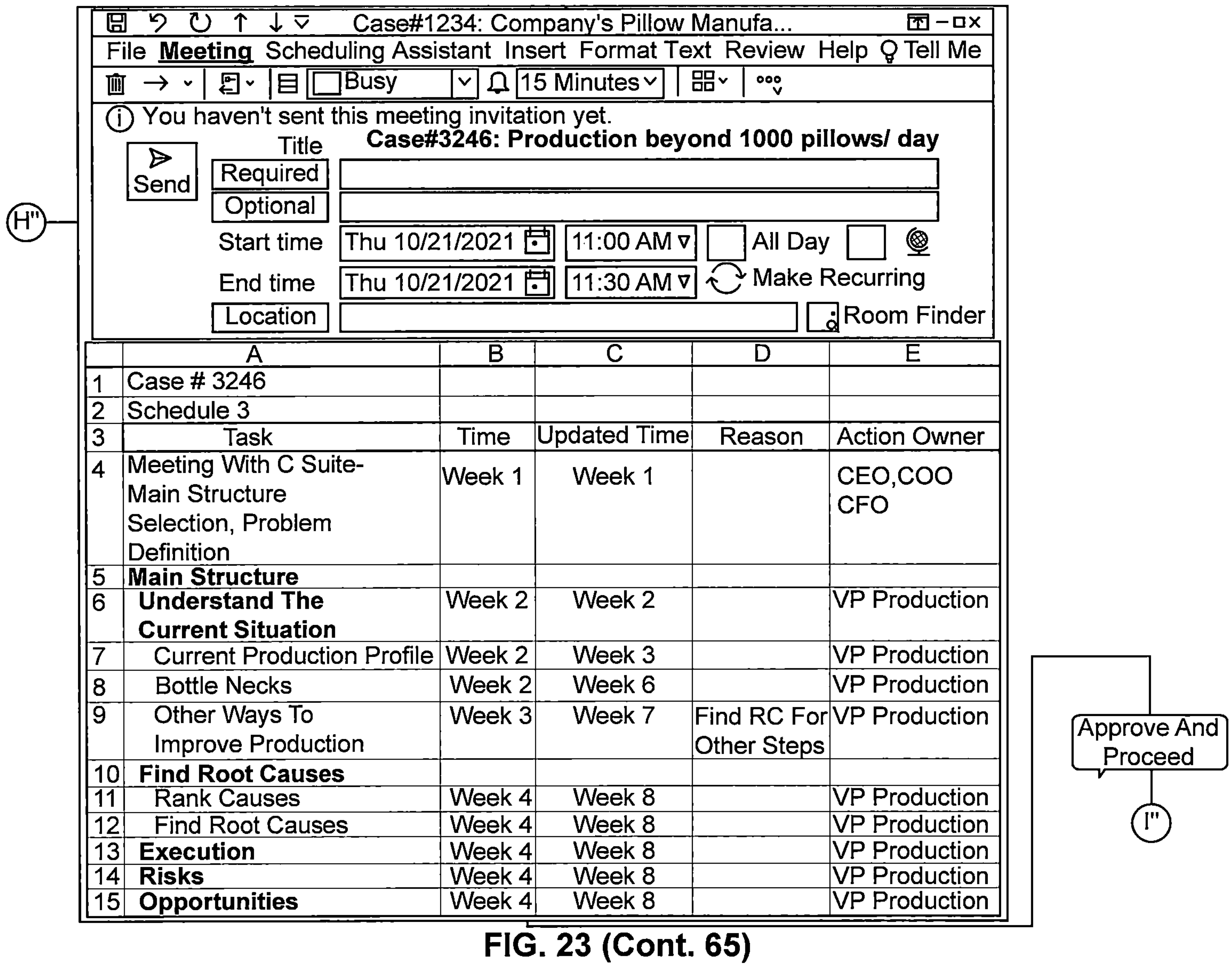
FIG. 23 (Cont. 65)

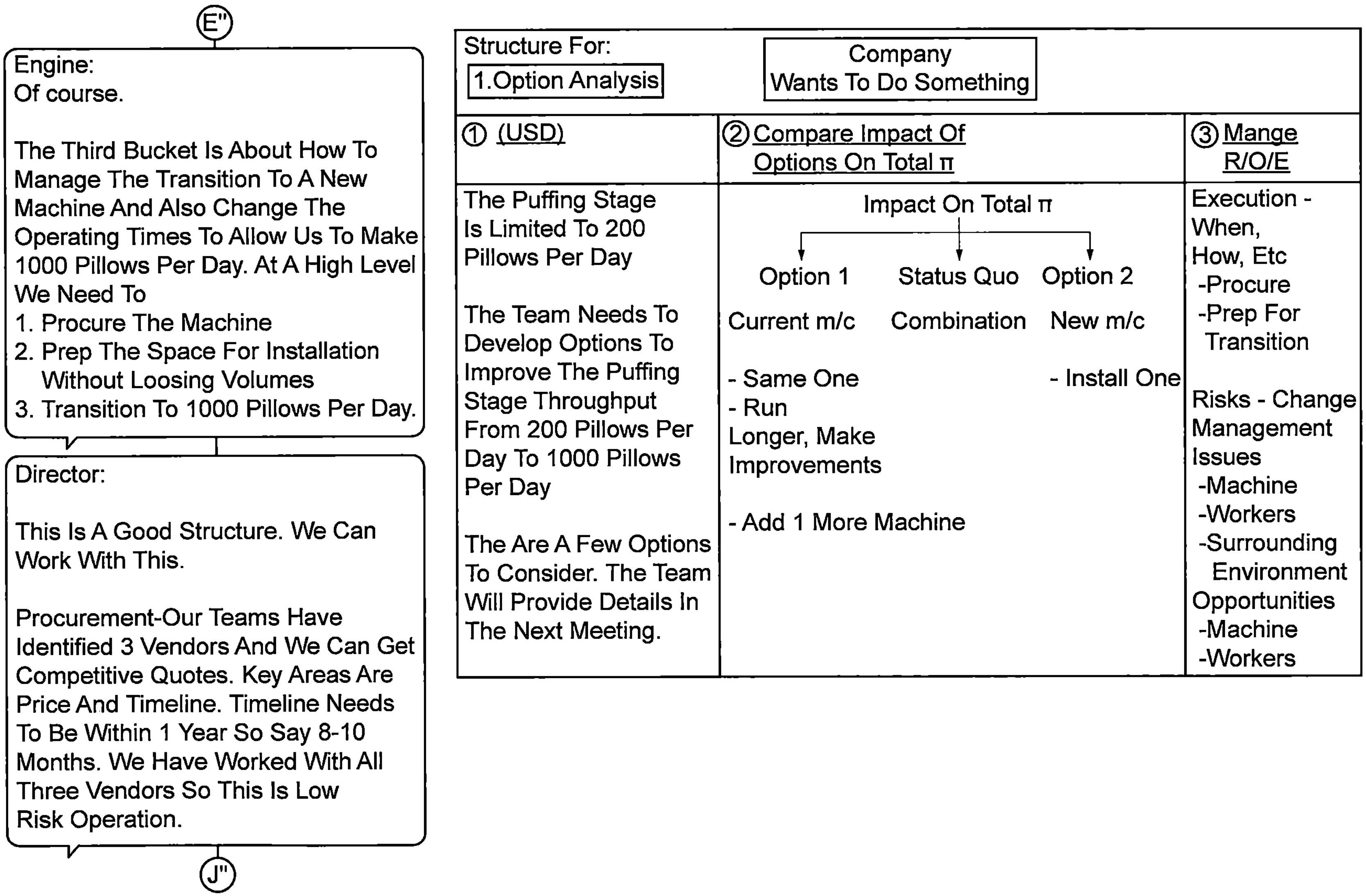
FIG. 23 (Cont. 66)

J"

Director:
We Have Procedures For Installation
Of Machines At This Facility
So That Is Low Risk Operation
Too. We Can Involve Our
Project Management And
Operations Teams To Start
Looking Into The Installation
And Change Management
Process And De Risk This They Probably Have
Opportunities To Upgrade The
Facility And Processes
Around This Project Also.

Can You Please Build A Risk
And Opportunities Register
For Us To Start This Project?

K"

| | A | B | C | D | E | F | G | H | I |
|---|---|---|---|---|---|---|---|---|---|
| 1 | Risk & Opportunity Register | | | | | | | | |
| 2 | Case #3246 | | | | | | | | |
| 3 | SNO | Risk/ Oppo | Date Created | Created By | Assigned To | Risk Description | Likelihood Of Risk Court | Impact If Occurs | Mitigation Action |
| 4 | 1 | Risk | Strategy Meeting | Director Of Production | Project Management Team | New Machine Not Fitting In The Space | Low | High | TBD |
| 5 | 2 | Risk | Strategy Meeting | Director Of Production | Operations Team | New Machine Not Integrated Into The Operations | Medium | Medium | TBD |
| 6 | 3 | Risk | Strategy Meeting | Director Of Production | Operations Team | New Machine Does Not Meet 1000 Pillows Per Day | Medium | Very High | TBD |

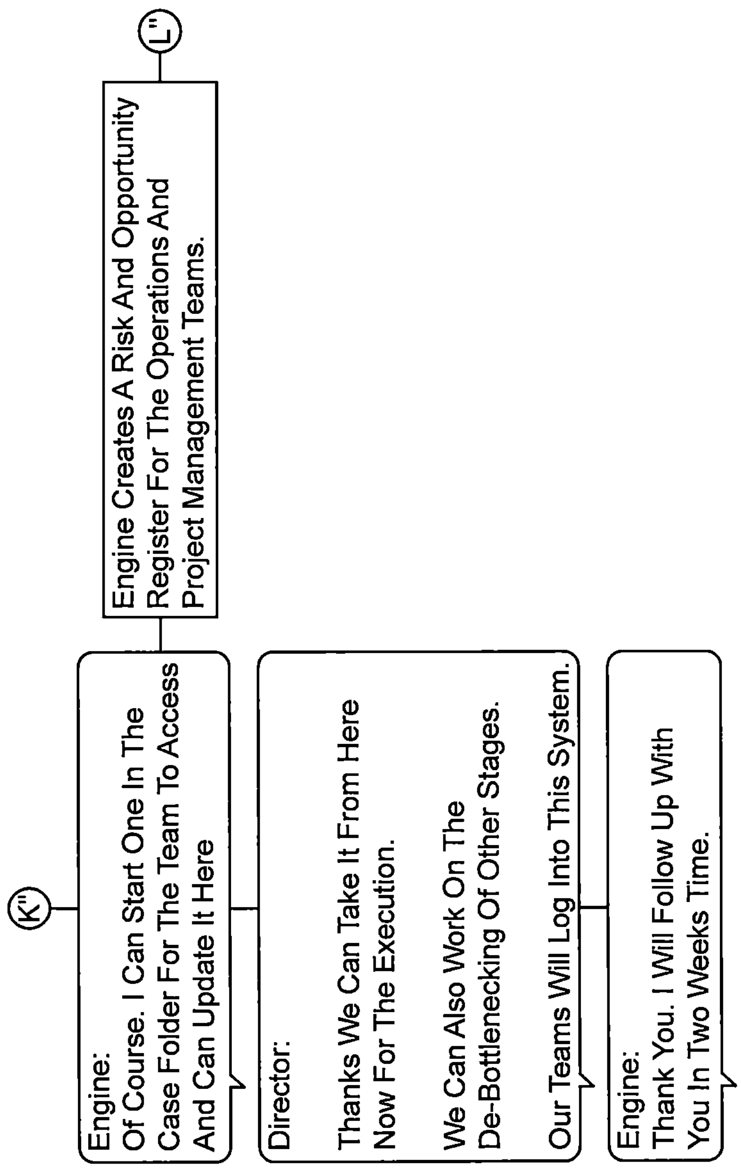
FIG. 23 (Cont. 68)

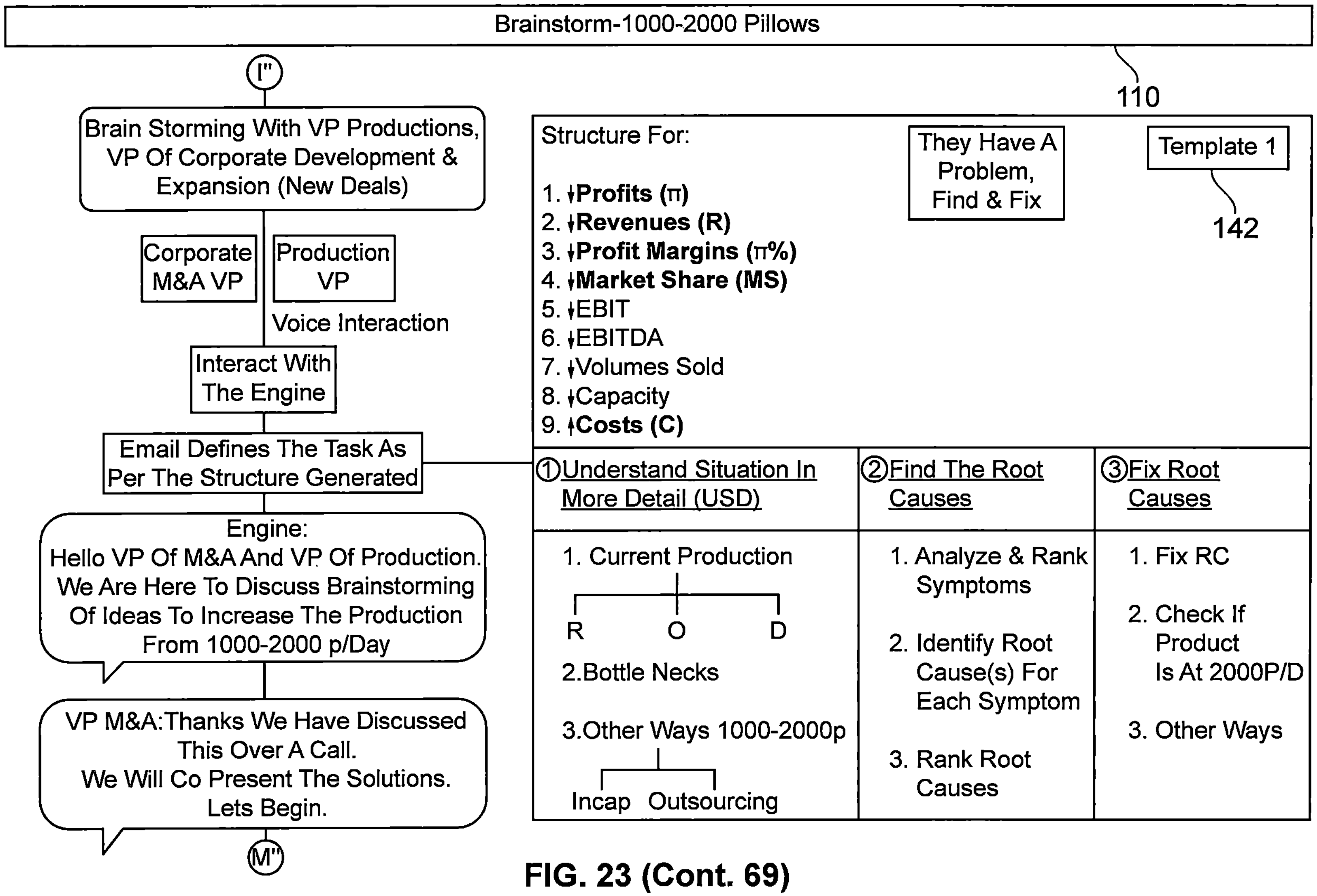
FIG. 23 (Cont. 69)

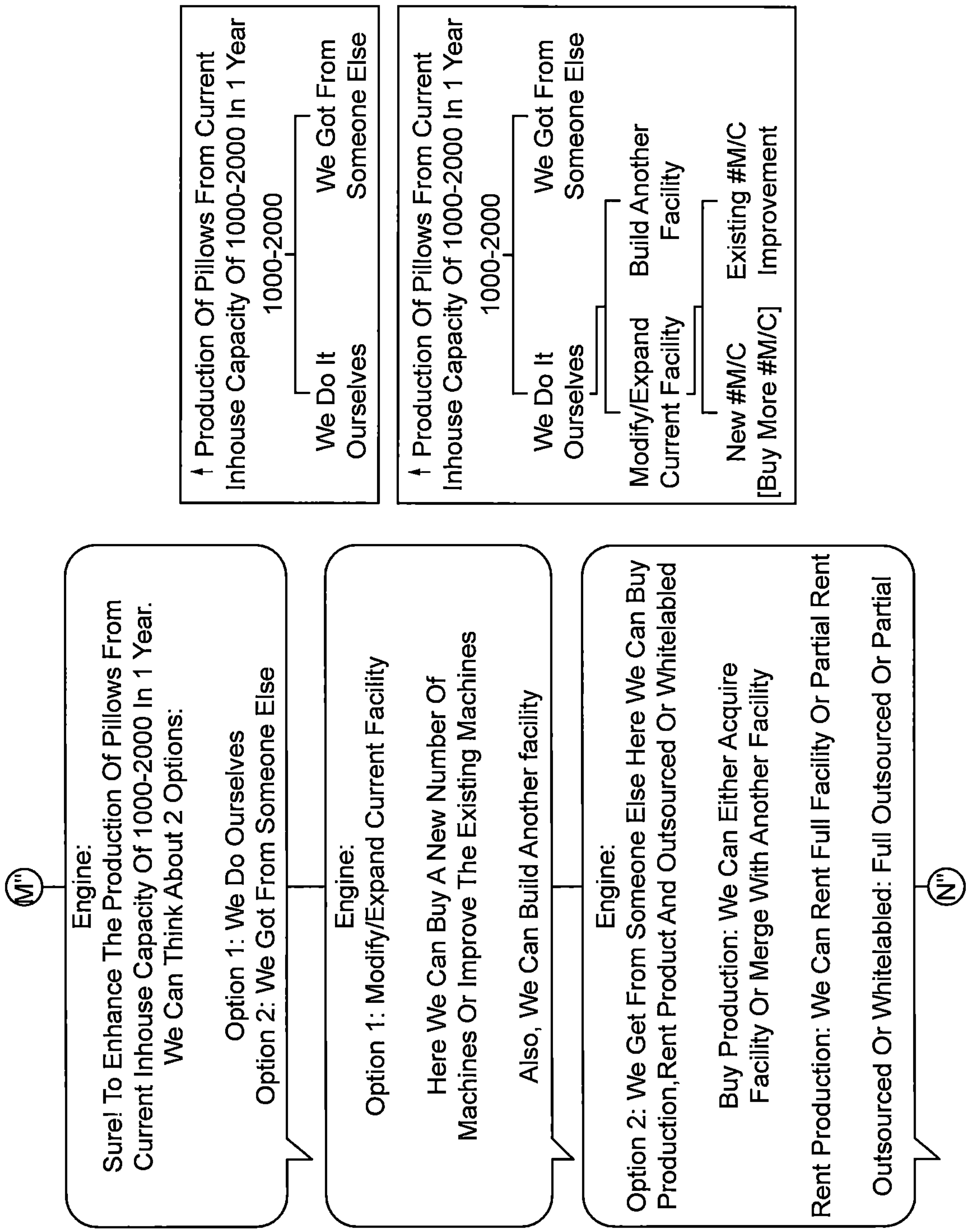
FIG. 23 (Cont. 70)

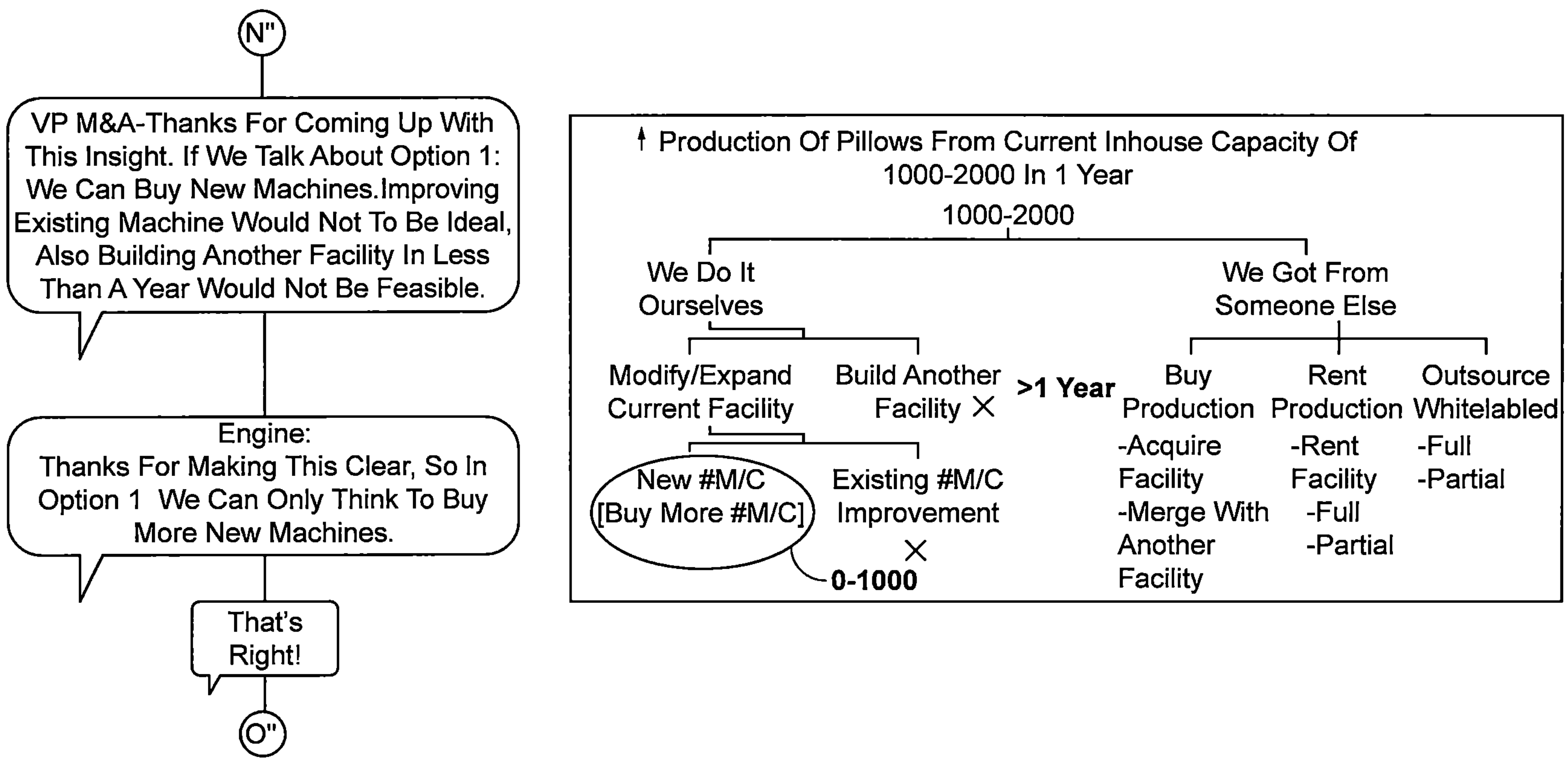
FIG. 23 (Cont. 71)

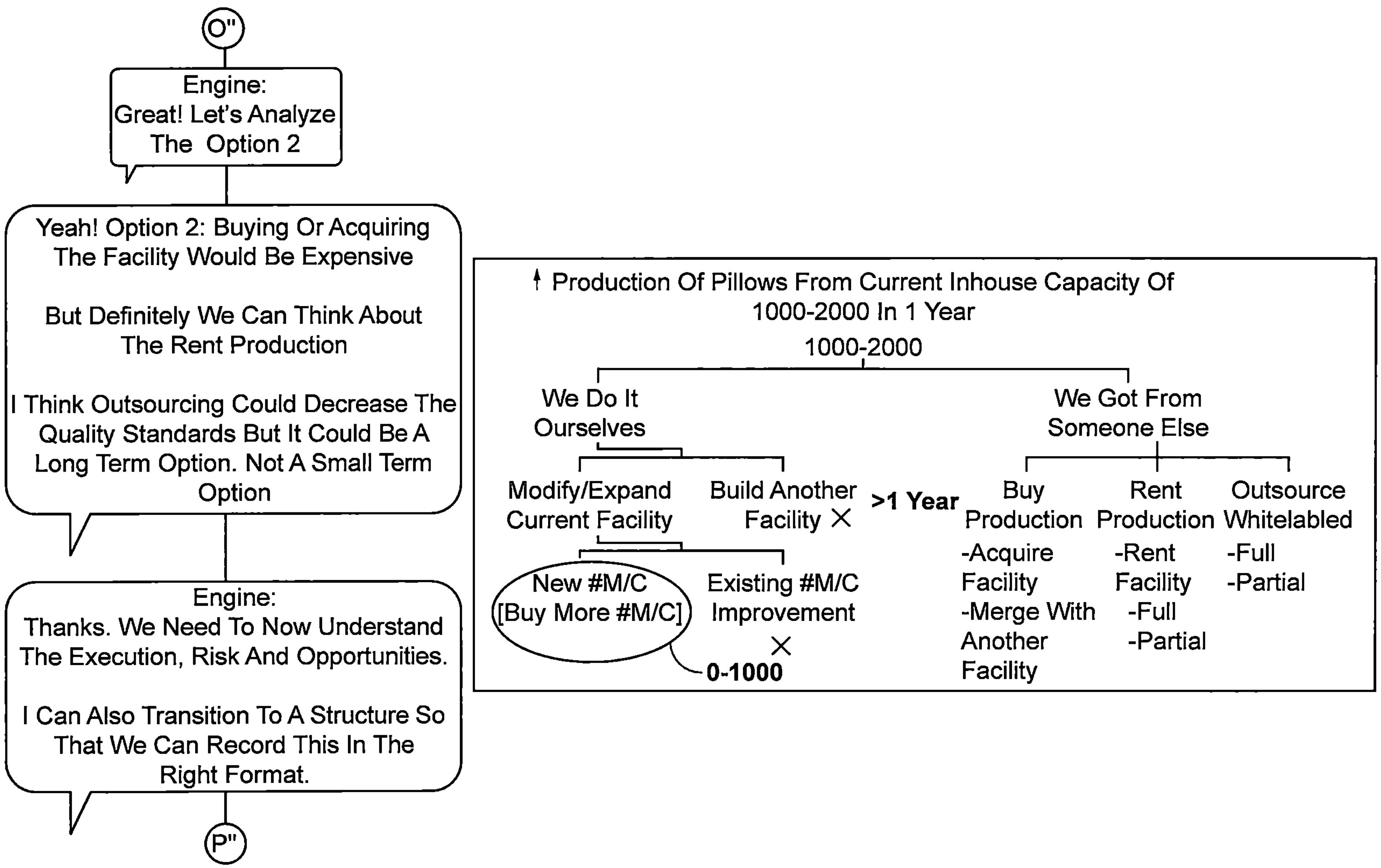
FIG. 23 (Cont. 72)

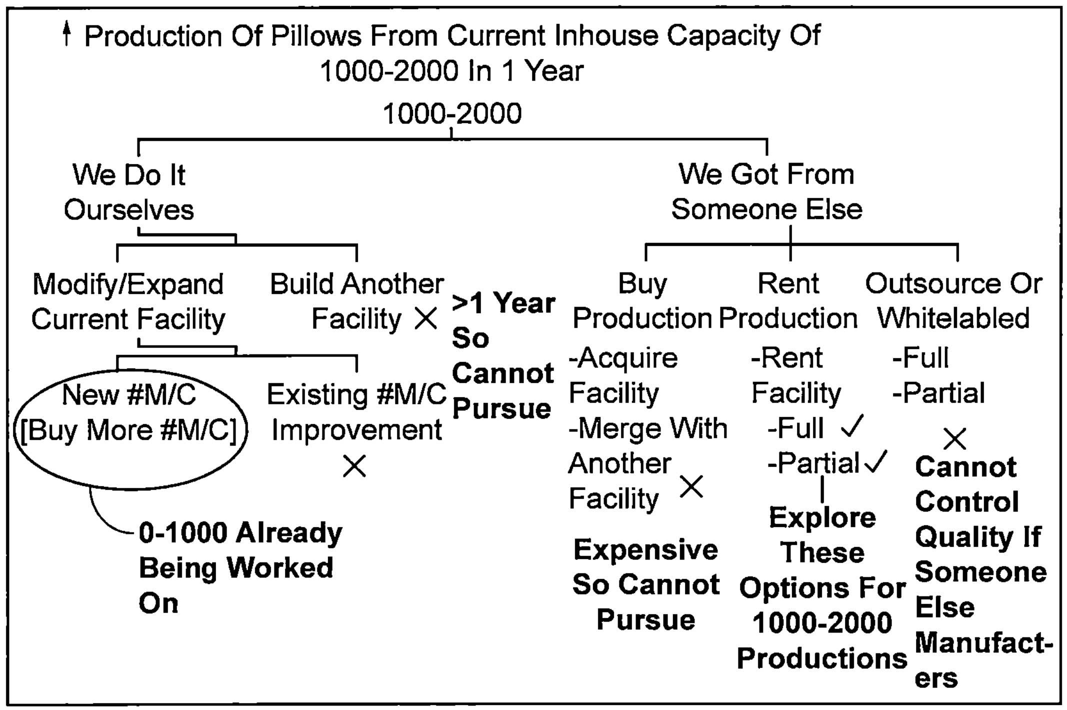
FIG. 23 (Cont. 73)

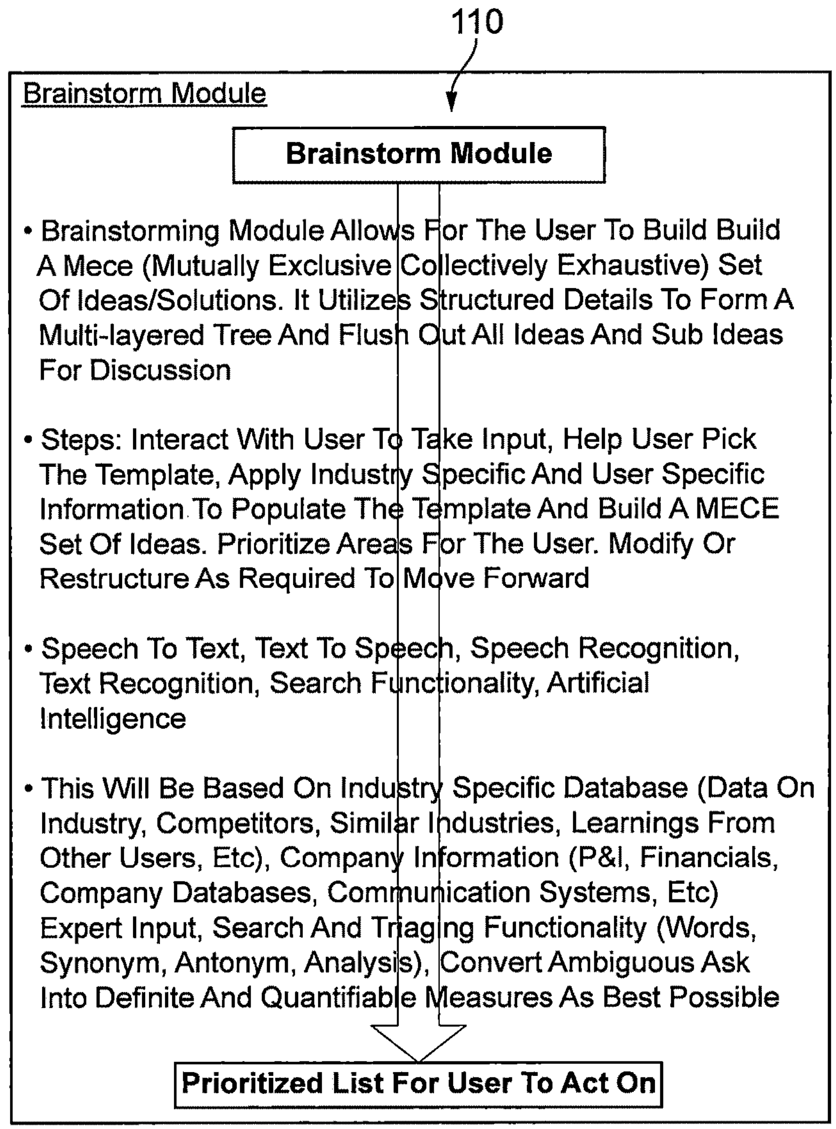
FIG. 23 (Cont. 74)

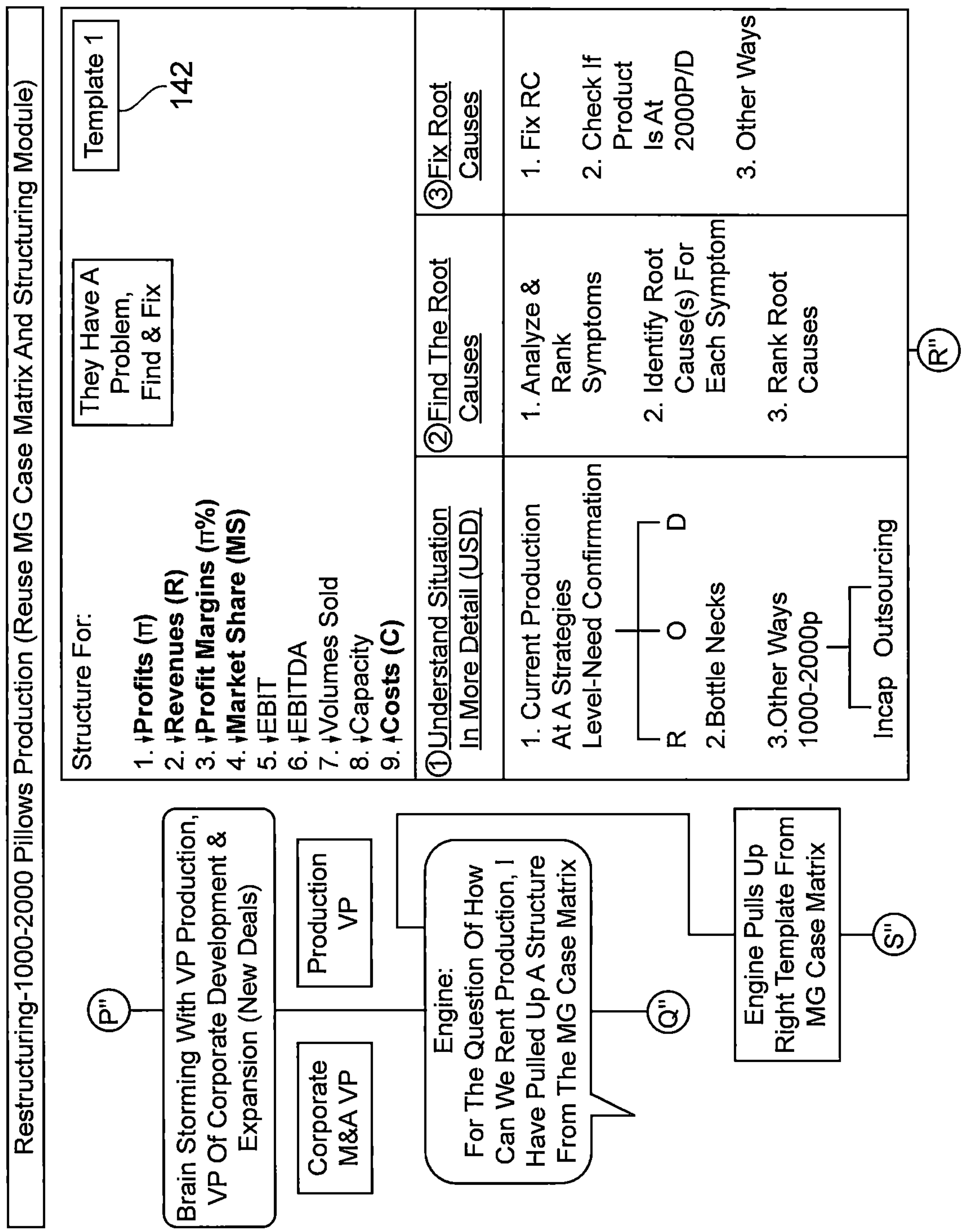
FIG. 23 (Cont. 75)

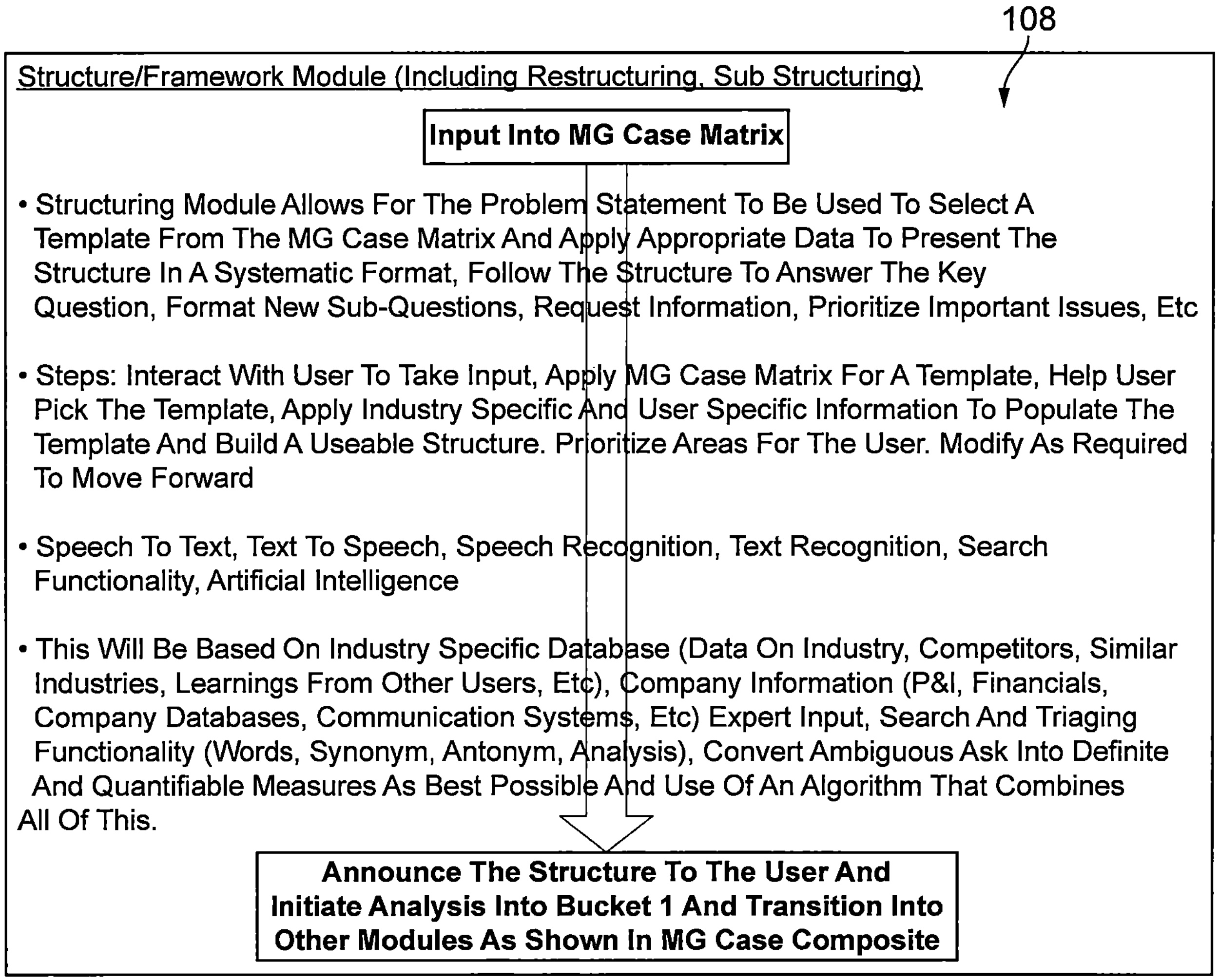
FIG. 23 (Cont. 76)

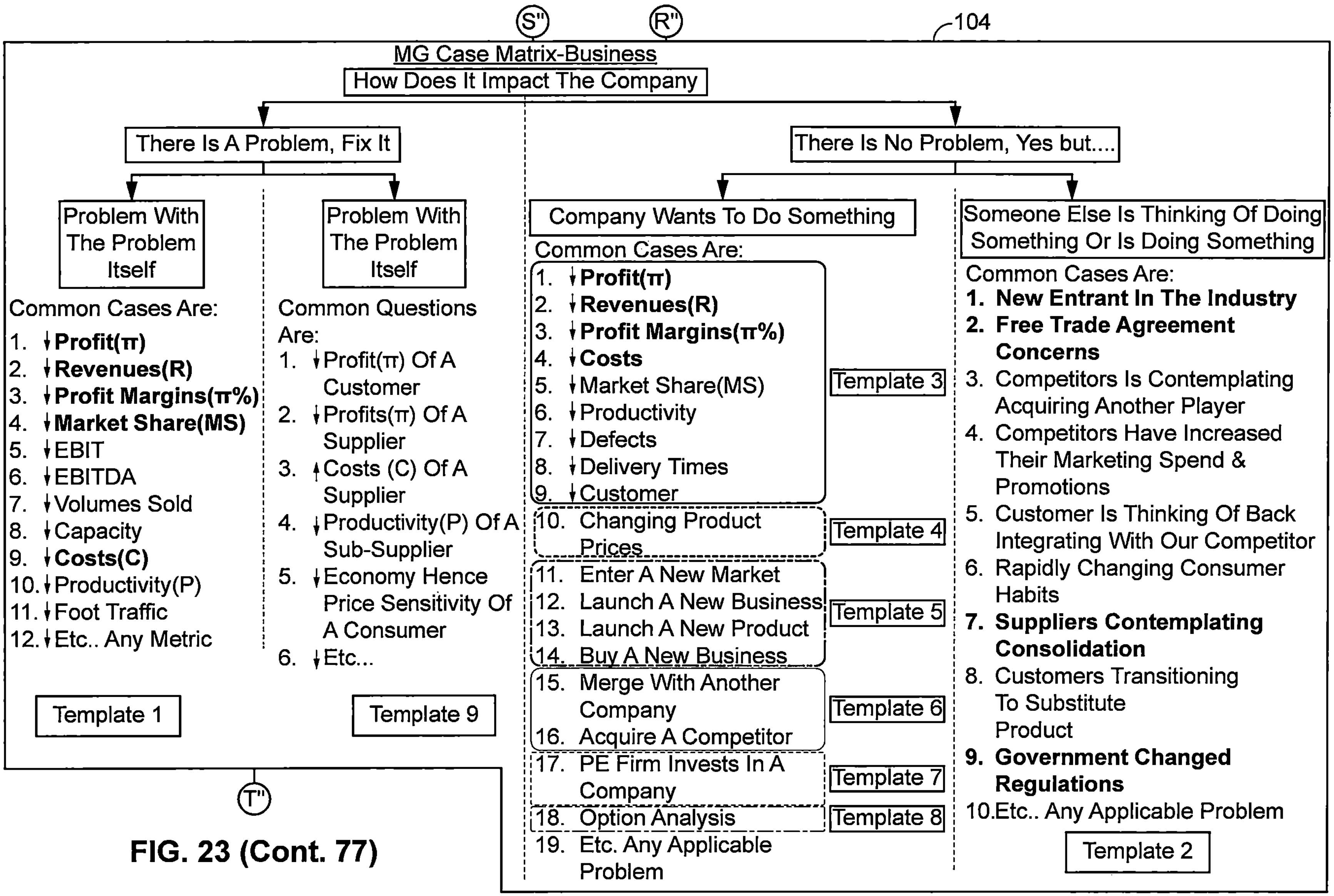
FIG. 23 (Cont. 77)

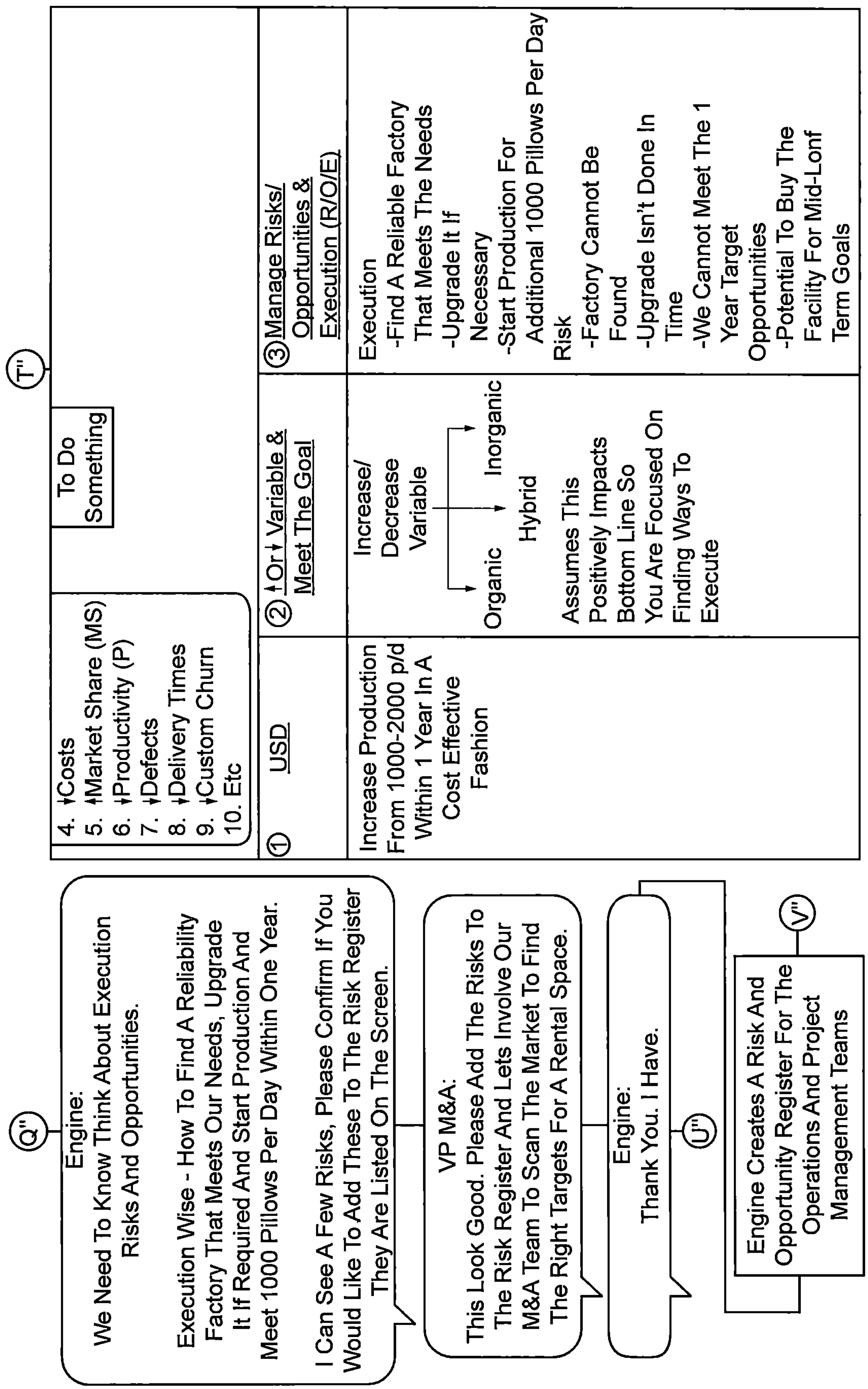
FIG. 23 (Cont. 78)

V''

| | A | B | C | D | E | F | G | H | I |
|---|---|---|---|---|---|---|---|---|---|
| 1 | Risk & Opportunity Register | | | | | | | | |
| 2 | Case #3246 | | | | | | | | |
| 3 | SNO | Risk/ Oppo | Date Created | Created By | Assigned To | Risk Description | Likelihood Of Risk Court | Impact If Occurs | Mitigation Action |
| 4 | 1 | Risk | Strategy Meeting | Director Of Production | Project Management Team | New Machine Not Fitting In The Space | Low | High | TBD |
| 5 | 2 | Risk | Strategy Meeting | Director Of Production | Operations Team | New Machine Not Integrated Into The Operations | Medium | Medium | TBD |
| 6 | 3 | Risk | Strategy Meeting | Director Of Production | Operations Team | New Machine Does Not Meet 1000 Pillows Per Day | Medium | Very High | TBD |
| 7 | 4 | Risk | VP M&A Meeting | VP M&A | M&A Team | Reliable Factory To Rent Space Cannot Be Found | High | High | TBD |
| 8 | 5 | Risk | VP M&A Meeting | VP M&A | M&A Team | The Upgrades To That Factory (If Needed) Are Not Done In Time | Medium | Medium | TBD |
| 9 | 6 | Risk | VP M&A Meeting | VP M&A | M&A Team | We Cannot Meet 1 Year Target For 1000 p/d External Production | High | High | TBD |
| 10 | | Oppo | VP M&A Meeting | VP M&A | M&A Team | We Can Buy The Rental Facility And Add To Our Long Term Production | Medium | Low | TBD |

FIG. 23 (Cont. 79)

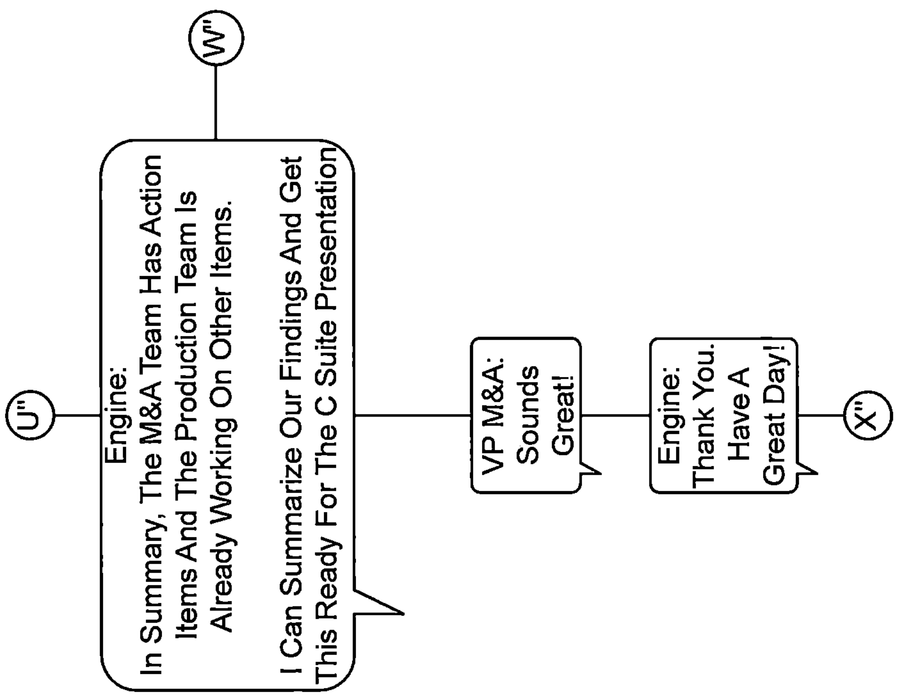
FIG. 23 (Cont. 80)

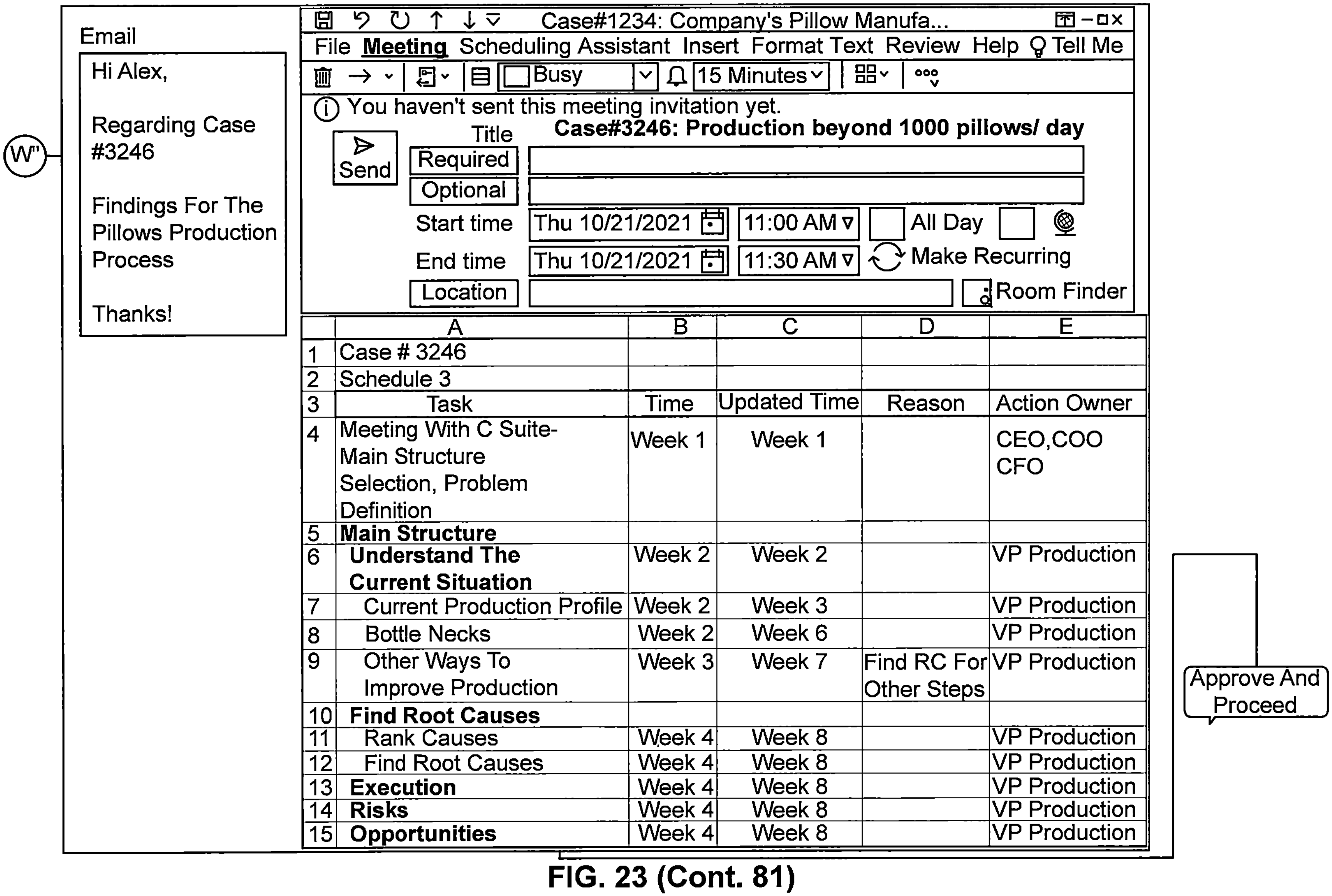
FIG. 23 (Cont. 81)

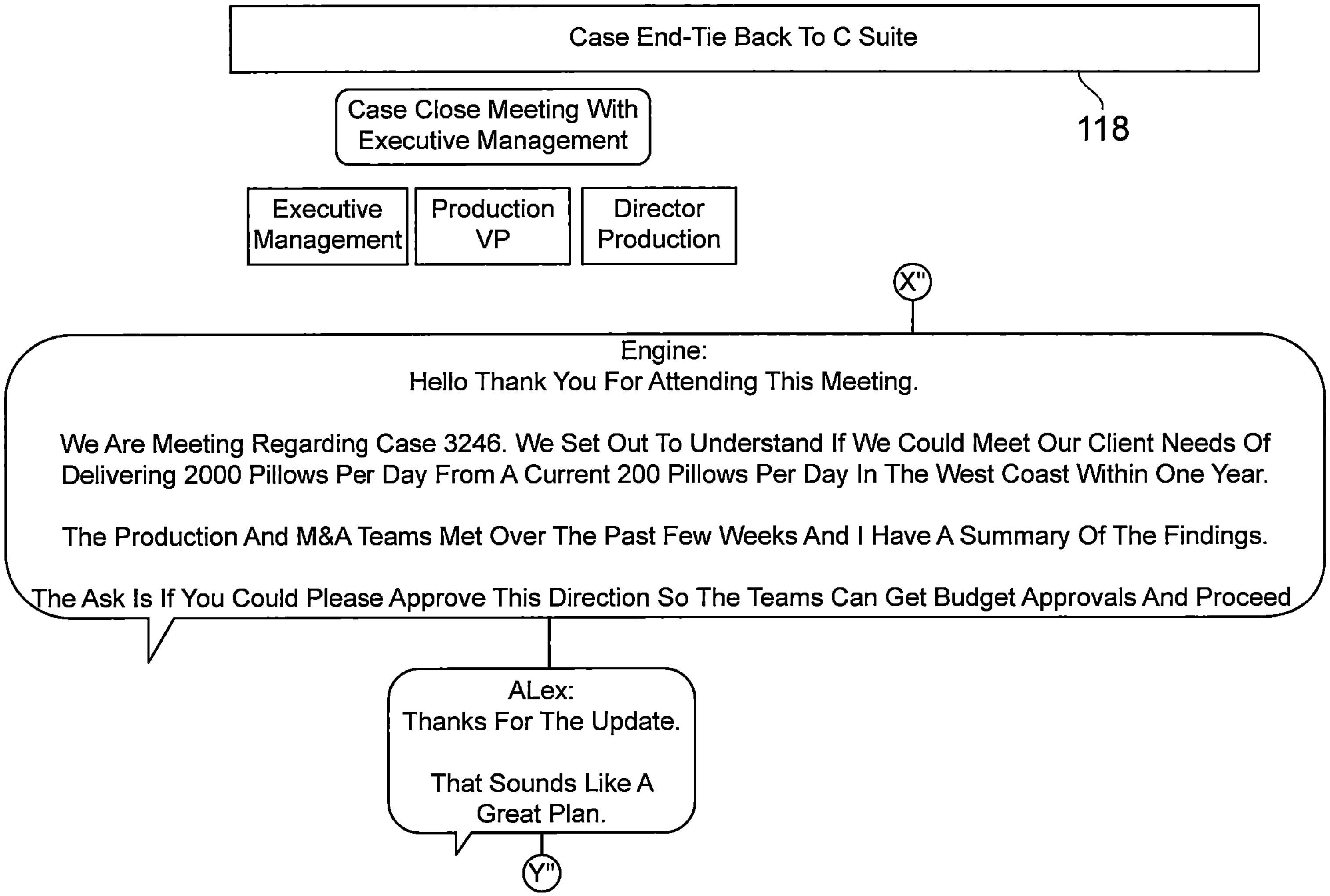
FIG. 23 (Cont. 82)

Y"

Engine:
Our Production Team Found Multiple Bottlenecks In The Current Production Process And Are In The Process Of De Bottlenecking To Get The Production Ramped Up Internally From 200 To 1000 Pillows Per Day. They Also Identified A Few Risks And Opportunities And Should Have Progress Meetings With The COO Next Week.

Our M&A Teams Are Working On Renting Additional Space To Get Additional 1000 Pillows Per Day Production By The End Of The Year.
They Are Also Working On Executing This And Should Have Report For The COO Next Week.

Due To The Delays In Data Collection, We Had To Update The Schedule But The Teams Are Working Hard To Achieve The Target Set By The C Suite.

I Have Attached The Updated Schedule Also For Your Review.

Z"

| | A | B | C | D | E |
|---|---|---|---|---|---|
| 1 | Case # 3246 | | | | |
| 2 | Schedule 3 | | | | |
| 3 | Task | Time | Updated Time | Reason | Action Owner |
| 4 | Meeting With C Suite -Main Structure Selection, Problem Definition | Week 1 | Week 1 | | CEO,COO,CFO |
| 5 | **Main Structure** | | | | |
| 6 | **Understand The Current Situation** | Week 2 | Week 2 | | VP Production |
| 7 | Current Production Profile | Week 2 | Week 3 | | VP Production |
| 8 | Bottle Necks | Week 2 | Week 6 | Find RC For Other Steps | VP Production |
| 9 | Other Ways To Improve Production | Week 3 | Week 7 | | VP Production |
| 10 | **Find Root Causes** | | | | |
| 11 | Rank Causes | Week 4 | Week 8 | | VP Production |
| 12 | Find Root Causes | Week 4 | Week 8 | | VP Production |
| 13 | **Execution** | Week 4 | Week 8 | | VP Production |
| 14 | **Risks** | Week 4 | Week 8 | | VP Production |
| 15 | **Opportunities** | Week 4 | Week 8 | | VP Production |

FIG. 23 (Cont. 83)

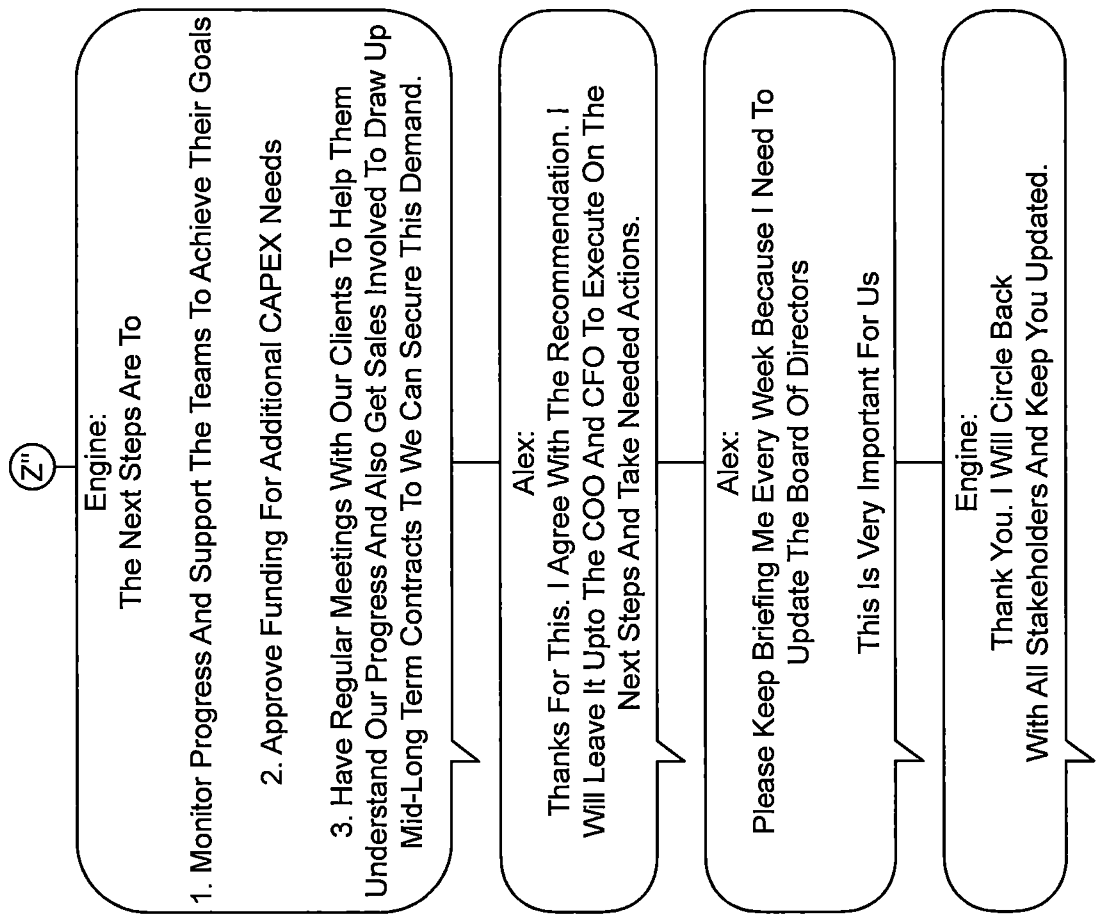
FIG. 23 (Cont. 84)

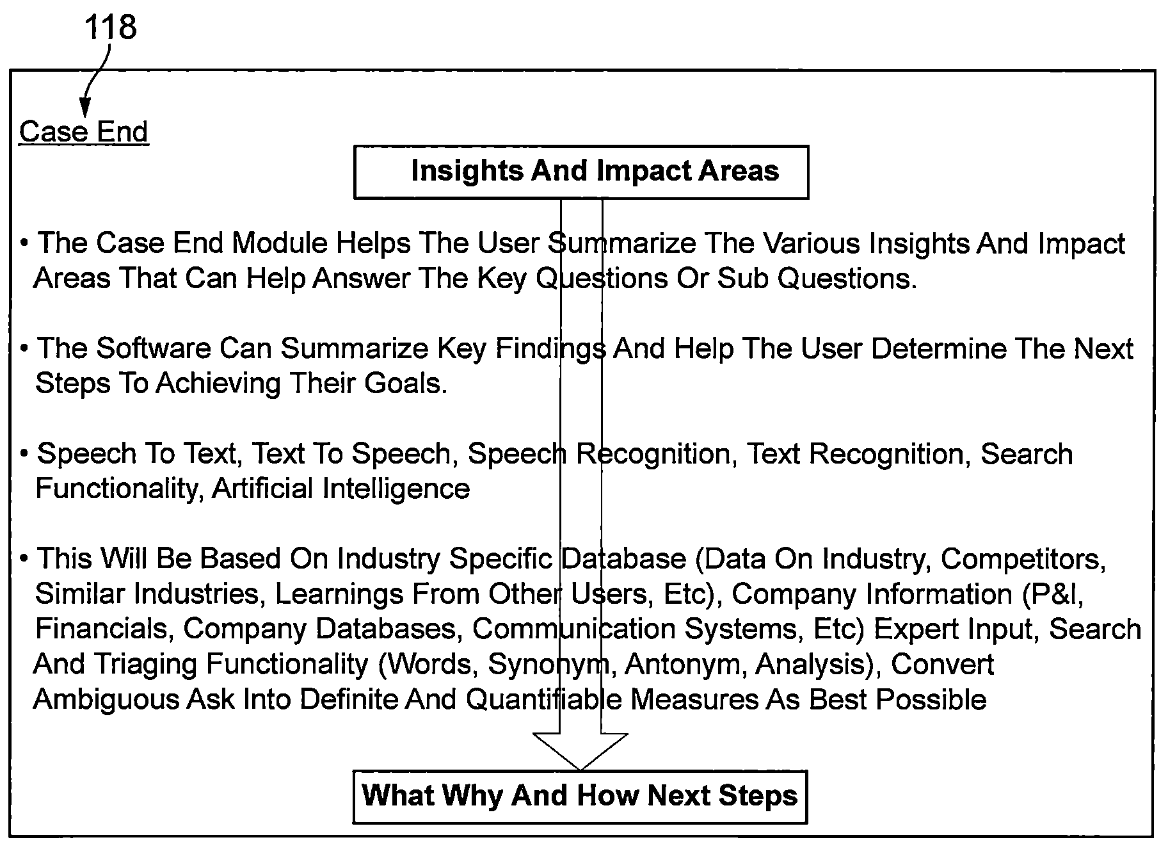
FIG. 23 (Cont. 85)

SYSTEM AND METHOD FOR ASSISTING ENTITIES IN MAKING DECISIONS

CROSS-REFERENCE TO RELATED APPLICATION

This application claims priority to U.S. Provisional Patent Application No. 63/108,297, titled "SYSTEM FOR ASSISTING INDIVIDUALS IN MAKING DECISIONS" filed on Oct. 31, 2020. The specification of the above referenced patent application is incorporated herein by reference in its entirety.

BACKGROUND OF THE INVENTION

A. Technical Field

The present invention generally relates to a computer-based platform which supports a decision-making process. More specifically, the present invention relates to a system and method for providing a collaborative decision platform adapted to run on a computing device, for example, a computer, and could be either fully computerized or human-powered, or a combination of both, wherein the system is configured to assist entities, persons, people, teams (organized or unorganized), computers, and organizations (like but not limited to companies, nonprofit entities, teams) in the making of decisions in different fields.

B. Description of Related Art

In all levels of society and across all age groups, people and entities such as organizations, teams, profit, non profit companies, government organizations need to take decisions (business and personal) but don't really know how to do that. They might do it based on sporadic thoughts in random directions, which leads to poor judgment in making decisions, thinking, and consequently exhibit poor character. There is no structured way to make decisions and hence they are inefficient. Most of their decisions are based either on a desire for instant gratification, convenience, peer approval, or avoidance of conflict.

Conventional methods of enhancing thinking, imagination, creativity, communication, decision-making, or planning can involve the use of motivational speakers, who provide positive and/or negative reinforcement of specified concepts in a generally passive setting. Occasionally, corporations have deemed it advisable to send their employees on retreats, where teamwork is fostered through physical activity and challenges, in the hopes that such teamwork will continue in the workplace, after the physical activities are completed. These activities are generally unrelated to specific company-related topics.

A prior art WO2001086611 assigned to Reynolds Thomas J, entitled "Interactive method and system for teaching decision making" discloses an interactive tool for teaching decision-making skills that includes a decision-making framework that will provide them with an understanding of the decision-making process that can be used in class when analyzing individual behavioral situations. The students write a personal situation that is based on the speaker's presentation and chart or graph the choices, distinctions, and consequences based on their situation. The tool further includes a choice context which can be a video presented on the display with audio output and assessing the ability of the student to identify these higher-order elements such as consequences to outcomes to goals to driving forces is the key element to scoring the depth of thinking.

Another prior art U.S. Pat. No. 8,290,888 assigned to Heidenreich, James Ralph, et. al., entitled "System and method for facilitating and evaluating user thinking about an arbitrary problem using archetype process", discloses a system that provides a software tool to evaluate, facilitate and convey user thinking that includes a base-line structure in which to address an arbitrary problem, wherein the tool includes tracking, evaluating, and inference modules which monitor and evaluate the user's actions against archetype or exemplary structure and process rules, and make suggestions to the user in response to decisions and choices made by the user. The thinking structures that may be used as a part of a thinking construct includes the topic set, which may be used to define the scope of the problem, question, issue, subject or topic or area of interest intended for pursuit by the user and the topic set may also include one or more subtopics to further elaborate the topic, subject, question, problem or issue of interest into smaller, more targeted or defined topics. The user is provided a portion of method and process in which the collection of the observations and meaning statements such as associated with analysis constructs.

Another prior art U.S. Pat. No. 6,632,174B1 assigned to Breznitz; Shlomo, entitled "Method and apparatus for testing and training cognitive ability" discloses a method for testing and/or training cognitive ability, including the steps of testing a preliminary cognitive level of a user and receiving results. The method includes the effective measurement and training of psychomotor and cognitive skills using a computer-based testing and training module using results from testing a preliminary cognitive level of a user that may then be broken up into separate discrete cognitive skills, and one or more tasks may be created, each task related to each of the separate discrete cognitive skills.

Another prior art AU2019100170A4 assigned to Blaik, Jason, et. al., entitled "A granular method for measurement and analysis of mental capabilities or conditions and a platform therefor" discloses a psychometric measurement and analysis platform that includes a plurality of databases configured to store a psychometric feature associated with a subject that is recorded in the database while the subject undergoes a psychometric test that includes facial expression image recognition. The platform includes challenge-based assessment that take into account more points including the correct answers to provide insight into a candidate's strengths and abilities. It further, provides the candidate with tasks that assess ability while not exposing the nature of the construct being measured and candidate engagement is increased by providing real time, in-challenge feedback that indicates to the candidate how they are performing as they move through the tasks.

Another prior art US20140272843A1 assigned to Foster; Eleanor Noelani, et. al., entitled "Cognitive evaluation and development system with content acquisition mechanism and method of operation thereof" discloses a system and method of operation of a cognitive evaluation and development system includes a cognitive puzzle having a video tile wherein, the user selecting a video tile of the cognitive puzzle, is presented with a media clip linked to the video tile that is linked with a cognitive task that is used for acquiring a user generated content in response to the cognitive task. The cognitive task includes making a video about a particular topic, entering text information in response to a question presented in the video that is further linked with other user information in the cognitive evaluation and development system. The media clip includes displays of scenes in nature or human interactions, which are intended to expand a user's thinking and induce a peaceful state of mind.

Though various systems and methods have been developed for facilitating user thinking to make decision, they fail to provide an integrated end-to-end system to test and train the entities to make decisions. In addition, there is no implementation or training that helps effective end-to-end decision making knowledge and skills. The existing prior arts lacks to provide a repeatable and reliable way that can be scaled across an organization in decision making. The existing interactive tools and systems often fail to link the choices with specific goals or values. Moreover, such approaches are difficult and often too complicated for many individuals in the making of decisions in different fields. Currently, there is no standardized process to make decision. The existing prior arts have small stand alone modules that work, but no one has even defined all the modules or connected them in a meaningful way. The prior art also fails to define how the invention interacts with the internal and external stakeholders to enable the decision making process and manage the execution. Further, people and entities find it difficult to make decisions, gain insights or to align in a timely and efficient manner. This wastes time and resources to make decision.

Therefore, there is a need for a system to provide a collaborative decision platform adapted to run on a computing device, for example, a computer, and could be either fully computerized or human-powered, or a combination of both. Further, there is also a need for a system configured to assist entities, people, computers, and companies in the making of decisions in different fields.

SUMMARY OF THE INVENTION

The present invention discloses a computer-based platform which supports a decision-making process. Further, the present invention discloses a system and method for providing a collaborative decision-making platform configured to assist entities, people, computers, and companies in the making of decisions in different fields.

In one embodiment, the system is a computer-implemented integrated system configured to assist the users or individuals for making decisions in different fields. In one embodiment, the system assists users to make decisions in business as well as personal. In one embodiment, the system is configured to assist entities, people, computers, and companies in making decisions in different fields. In one embodiment, the system is configured to enable the user, computer, and/or user and computer to make decisions. In one embodiment, the system is a fully computerized or human-powered, or combination of both. In one embodiment, the system auto-populates the required data to assist users in decision making.

In one embodiment, the system comprises a decision making engine or core thinking module or MG case composite for end-to-end decision making process accessed by the user. In one embodiment, the decision making engine comprises one or more cognitive modules integrated together configured to provide support to users in decision making, wherein each module process a certain part of a decision. In one embodiment, the decision making engine interacts internally with users of various facets of the organization including, but not limited to, users at various levels (Board, C suite, VPs, Directors, etc), ERP, Data bases (HR, Supply chain, etc), Communication systems (Email system, Chat systems, etc), RASCI charts, Org charts, and the like. In one embodiment, the decision-making engine interacts externally with contractors to answer questions, help shortlist vendors, request specific data sets, help direct vendors, cut contracts to vendors, and the like. In one embodiment, the decision-making engine works with existing or new facets of the organization to set agenda, set meetings, assign tasks, set schedules, drive schedules, modify schedules, track outcomes, and the like.

In one embodiment, the system further comprises a computing device having a processor and a memory or computer-readable medium. The computer-readable medium is in communication with the processor configured to store a set of instructions executed by the processor during each step of decision making. In one embodiment, the computing device is in communication with the decision making engine via a communication network. In one embodiment, the computing device may be physical/separate or cloud-based computing device.

In one embodiment, the system further comprises a database in communication with the decision making engine via the communication network configured to store data related to cognitive norms. In one embodiment, the system further comprises a user device in communication with the computing device via a network, having a user interface with a user profile associated with each user configured to establish interaction between the users during decision making by executing the one or more cognitive modules. The user profile is generated by registering one or more user credentials into the system via the user interface. In one embodiment, the user device is configured to communicate with the cloud-based computing device via the network using an application software or mobile application or, web-based application executed in a computer-implemented environment or network environment. In one embodiment, the application software operates by running the integrated system and interacting with users to provide end-to end decision making support to users.

In one embodiment, the one or more cognitive modules include, but not limited to, a case open module, a structure module, an MG case matrix module, a data analysis/graph analysis module, a brainstorming module, a problem solving module, a speed math/conversational module, and a case end module. In one embodiment, the modules are executed by the processor configured to make decision at various fields such as organization. In one embodiment, the MG case composite further comprises one or more sub-modules including, but not limited to, a drive and alignment module, an integration and transition module, an insight and impact module, and a commercial ecosystem. In one embodiment, each module in the system processes a certain part of a decision. Each module has steps to interface with other applicable modules, steps to start, sustain, and finish.

In one embodiment, the case opening module analyses an input user data provided by the user and assists the user to refine the input into a meaningful problem statement for the structure module. In one embodiment, the case open module is configured to allow the user to listen, reiterate, breakdown of information, and verify the key objectives and constraints, and then build a specific and measurable problem statement. In one embodiment, the structure module is configured to interact with the user to take input; apply MG case matrix for selecting an appropriate template; apply industry specific and/or user specific information to populate the template, and build a usable frame structure. In one embodiment, the MG case matrix module selects an appropriate template to understand the case situation in more detail, find one or more root causes, and fix the root causes for the case.

In one embodiment, the data analysis module allows the user to transition from a hypothesis, understand the data needs, gather data through the systems functions and eventually gain insights and impact. In one embodiment the data analysis module is configured to interact with the user to take input; assist the user to identify the data needs to solve one or more sub-issues or key issues; assist the user to procure the data through internal or external sources; utilize the algorithm to analyse the data to gain observations and deeper insights, and assist the user to move further in a direction to set solution.

In one embodiment, the brainstorm module interacts with the user to take input and assisting them to select an appropriate template to apply specific information to populate the template and build a mutually exclusive collectively exhaustive (MECE) set of solutions. In one embodiment, the brainstorming module is configured to interact with the user to take input; help the user to select the template; apply industry specific and user specific information to populate the template, and build an MECE set of solutions to prioritize the issue for the user to act on.

In one embodiment, the problem solving module allows the user to calculate the data that helps them in decision making. In one embodiment, the problem solving module is configured to interact with the user to take input; help the user to frame the problem similar to case opening module; work with the user to identify the key variables; break down the information and equation into multiple parts; help user to apply assumptions at each step of the equation to start calculating sub-results, and solve the equation to give the user an answer or a range of answers. In one embodiment, the speed math/conversational math module assists the user to calculate quantitative data required to move forward in decision making. In one embodiment, the case end module assists the user to summarize the various insights and impact areas, thereby assisting the user to determine the next steps to achieve their goals. In one embodiment, the modules are used for further processing the case process, thereby assessing co-scholastic skills include, critical-thinking, reasoning, problem-solving, decision-making, self-improvement, communication skills, mental processes, presentation and information processing, issue-solving, verbal communications of the individual.

In one embodiment, the driving and alignment module of the system allows for driving the decision making process by developing viewpoints for industry specific or entity specific situation by drawing on its own database and user information. The system utilizes the driving and alignment module configured to focus on strategic areas by making reasonable viewpoints and prioritizes key areas for users to focus on. In one embodiment, the integration and transition module of the system helps align the stakeholders by building a collaborative environment at multiple levels and recording its decision making trail. In one embodiment, the integration and transition module further integrates all of the modules and calls upon modules as needed. The system can call upon modules multiple times or repeatedly using the integration and transition module. The system can also transition from one module to the other and run multiple modules at the same time with various or same teams to support decision making via integration and transition module. In one embodiment, the insights and impacts module of the system gains and or develops key qualitative and quantitative insights throughout the process in every module and delivers impact to the stakeholders through analysis and acumen. The system can develop lower and higher level insights. Higher level insights are developed through combination of multiple insights of information points.

In one embodiment, the system standardizes question types and offers an integrated, end to end process that helps people/computers to make decisions in different fields. In one embodiment, the system is further configured to provide training/coaching from person-person (P-P) and computer to person (C-P) and implementation between P-P and C-P (computer guides). In one embodiment, the system could be a fully autonomous decision-making system using artificial intelligence (AI). In some embodiments, the system could be either fully computerized or human-powered, or a combination of both.

In one embodiment, the person or computer could follow the MG case composite. In one embodiment, the system provides training/coaching from person-person (P-P) and computer to person (C-P) for improving the decision-making ability, wherein the training/coaching includes problem start and formulate problem statement, show structure, fill structure, show how to retrieve data, interpret it, tie it to main question, brainstorm ideas, build sub structures, speed math and then close the problem with recommendations.

In one embodiment, the decision-making process could be implemented by the person or software. In one embodiment, the person could be chief executive officer (CEO) and send inputs strategic question program that imitates the MG case/problem composite. It initiates a problem/case opening step and helps the user to formulate a problem statement. Further, the computing device, for example, a computer moves to next step and recommends a template with some pre-populated areas or recommendations for questions/direction to respond and fill. Executives/people could complete this and the system (software) locks it. Then the system aids the people/executives to build a high-level plan and assigns tasks to appropriate individuals. It could also set baseline times that the CEO gets.

At another step, all users or participants could access the system through login and enable to get a plan to execute. At another step, the system could inform the user or participants about what type of questions to answer and what data to get and how to retrieve the data based on pre-inputs or general recommendations. At another step, the users could follow that path and advice on timelines and cost. In one embodiment, the system could keep everyone informed and, in the project, up to date. At another step, the users get data and then system aids the users to interpret it. If the report includes recommendation, then the user inputs and the system aid to drive this forward.

At another step, the system could provide brainstorming templates for the users to provide input data. Brainstorming is a group creativity technique by which efforts are made to find a conclusion for a specific problem by gathering a list of ideas spontaneously contributed by its members. In one embodiment, the system could perform speed math with voice recognition. In one embodiment, the system could aid the user to build sub structures and/or guide with some templates. In one embodiment, the system could aid break down problems or even solve them completely. In one embodiment, the system could receive instruction via voice and/or typing etc. In one embodiment, the system could keep everyone up to date and books group meetings at key points to ensure communication. It also shares data through common databases and points different stakeholder to look at certain data they might find useful in other part of the analysis (cross pollination). Eventually the system will guide in an efficient way to cut the noise and make everyone productive. In one embodiment, the system could be, but not limited to, a software as a service (SAAS) based system or installed at the site. In one embodiment, the system could be, but not limited to, a fully autonomous artificial intelligence (AI) system.

In one embodiment, the system eventually should be able to solve problems itself and set business plan targets, ask questions to solve them by going through MG case/problem composite, and inform stakeholders and optimize company performance by itself.

In one embodiment, a method for assisting users to make decisions using an integrated system executed in a computer-implemented environment is disclosed. The method comprises the following steps. At one step, the decision making engine allows the user to enter into the system by creating a user profile using one or more user credentials. At another step, the engine collects user data as input from the user. At another step, a case opening module is applied to analyze the user data and assists the user to refine the input into a meaningful problem statement for a structure module. In one embodiment, the case open module is configured to allow the user to listen, reiterate, breakdown of information, and verify the key objectives and constraints, and then build a specific and measurable problem statement. At another step, an appropriate template is selected from the MG case matrix module to understand the case situation in more detail, find one or more root causes, and fix the root causes for the case. In one embodiment, the structure module is configured to perform the steps of: interacting with the user to take input; applying MG case matrix for selecting an appropriate template; applying industry specific and/or user specific information to populate the template, and building a usable frame structure.

At another step, a data analysis module is applied for allowing the user to transition from a hypothesis, understand the data needs, gather data through the systems functions and eventually gain insights and impact. In one embodiment, the data analysis module is configured to perform the steps of: interacting with the user to take input; assisting the user to identify the data needs to solve one or more sub-issues or key issues; assisting the user to procure the data through internal or external sources; utilizing the algorithm to analyse the data to gain observations and deeper insights, and assisting the user to move further in a direction to set solution.

At another step, a brainstorming module is applied for interacting with the user to take input and assisting them to select an appropriate template to apply specific information to populate the template and build a mutually exclusive collectively exhaustive (MECE) set of solutions. In one embodiment, the brainstorming module is configured to perform the steps of: interacting with the user to take input; helping the user to select the template; applying one or more industry specific and user specific information to populate the template, and building an MECE set of solutions to prioritize the issue for the user to act on.

At another step, a problem solving module is applied for allowing the user to calculate the data that helps them in decision making. In one embodiment, the problem solving module is configured to perform the steps of: interacting with the user to take input; helping the user to frame the problem similar to case opening module; working with the user to identify the key variables; breaking down the information and equation into multiple parts; helping user to apply assumptions at each step of the equation to start calculating sub-results, and solving the equation to give the user an answer or a range of answers.

At another step, a speed math/conversational math module is applied for allowing the user to calculate quantitative data required for decision making. At another step, a case end module is applied to help the user to summarize the various insights and impact areas, thereby assisting the user to determine the next steps to achieve their goals. Once there is sufficient analysis and alignment then move to the case end module to end the case. In one embodiment, the system develops standardized question types and offers an integrated, end-to-end process configured to assist the user to solve the issue and make a decision or closing the case by assessing co-scholastic skills including critical-thinking, reasoning, problem-solving, decision-making, self-improvement, communication skills, mental processes, presentation and information processing, issue-solving, verbal communications of the individual indecision making at various fields.

In one embodiment, the one or more sub-modules such as drive and alignment module, integration and transition module, insight and impact module, and commercial ecosystem are also at play but are more pronounced and obvious. They are also applied simultaneously throughout the case and transition as required. Processing is to ensure a certain pace while not sacrificing rigor. In one embodiment, the relationship management/relationship building module is to build a rapport throughout the case process. In one embodiment, insights are generated from the start to the finish and it is critical to ensure that the end goal impact is being delivered or thought of being delivered.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIG. 16 shows a table of a structuring template containing structure details of, for example, an industry and company context in one embodiment of the present invention.

FIG. 18 shows a table of an MG brainstorm template in one embodiment of the present invention.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
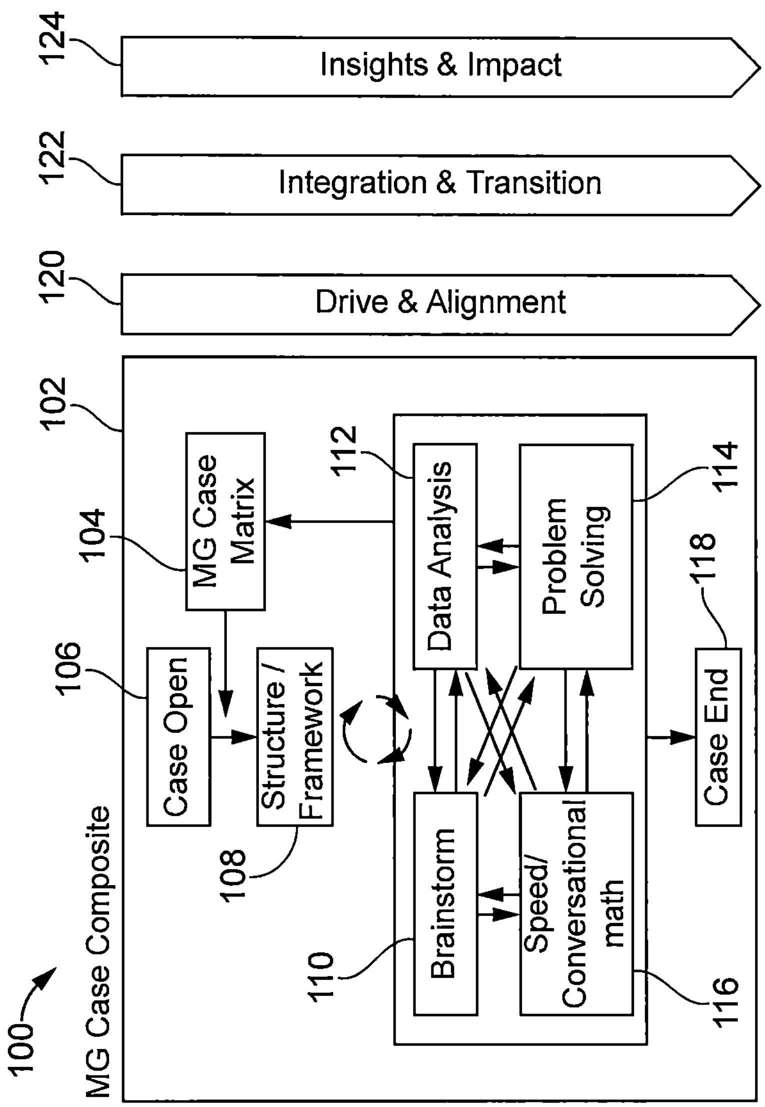
FIG. 1 shows a block diagram of a computer-implemented system having an integrated end-to-end decision making system or MG case composite for assisting users to make decision in an embodiment of the present invention.

Referring to FIG. 1, a block diagram of a computer-implemented integrated system (hereinafter referred as system) 100 executed in a computer-implemented environment for assisting users or entities to make decision in one embodiment is disclosed. In one embodiment, the system 100 is a collaborative decision platform or software adapted to run on a computing device, for example, a computer, and could be either fully computerized or human-powered, or a combination of both. In one embodiment, the computing device may be physical/separate or cloud-based computing device. In one embodiment, the system 100 is configured to assist and train users such as entities, people, computers, and companies in the making of decisions in different fields. In one embodiment, the system 100 assists users to make decisions in business as well as personal. In some embodiments, the user may be, but not limited to, individuals, adults, kids, business or non-business organizations, team/group of members (families, communities, etc), profit and non-profit companies, government organizations, public, private, or any other entities. In one embodiment, the system 100 could be a computer-based platform which supports a decision-making process. In one embodiment, the system 100 is a cloud-based computer platform to support decision making process.

In one embodiment, the system 100 is configured to implement the decision making by a user, a computer, and/or user and computer. In one embodiment, the system 100 is configured to enable the user, computer, and/or user and computer to learn decision making skills. In one embodiment, the system (software) 100 could enable the people or users for assessing co-scholastic skills and strengths such as, but not limited to, attitude towards life, thinking, reasoning, decision-making, self-improvement, communication skills, mental processes, presentation and information processing, notes, logic formation, verbal communication, etc. and related method of use using artificial intelligence (AI), games, mental processes, education, and related method of use.

In one embodiment, the system 100 is an end to end integrated system to take decisions, solve problems, solve issues, solve cases, etc. It is known by different names as noted in this document. In one embodiment, the system 100 is configured to enable the user or individual for assessing co-scholastic skills. In one embodiment, the system comprises a computing device having a memory and a processor, wherein the computing device is in communication with a server via a network. In one embodiment, the system comprises a database in communication with the server configured to store data related to cognitive norms.

In one embodiment, the system 100 includes an integrated end-to-end decision making system (software) or decision making engine or core thinking module or MG case composite 102. The MG case composite 102 is configured for end to end decision making process accessed by a user. In one embodiment, the MG case composite 102 is an integrated module. In an exemplary embodiment, the MG case composite 102 is designed for business. In one embodiment, the MG case composite 102 is designed for personal use. The MG case composite 102 is integrated with multiple modules configured to integrate the functioning and interaction of all the modules to provide support to make decisions for users. In one embodiment, the system 100 could be a computer software that operates by running the integrated system and interacting with users to provide end-to-end decision making support to users.

In one embodiment, the system 100 further comprises a cloud-based computing device having a processor and a computer-readable medium in communication with the processor configured to store a set of instructions executed by the processor during each step of decision making. In one embodiment, the computing device is in communication with the decision making engine via a communication network. In one embodiment, the system 100 further comprises a database in communication with the decision making engine via the communication network configured to store data related to cognitive norms. In one embodiment, the system 100 further comprises a user device in communication with the computing device via a network, having a user interface with a user profile associated with each user configured to establish interaction between the users during decision making by executing the modules. The user device may be any one of a mobile phone, smart phone, tablet, laptop, computer, desktop, a personal digital assistant (PDA or other suitable electronic communication device. In an embodiment, the network may be a Bluetooth®, Wi-Fi network, a WiMAX network, a local area network (LAN), a wide area network (WAN), and a wireless local area network (WLAN).

In one embodiment, the decision making engine interacts with internal and external facets (existing or new) of an organization to execute various tasks related to decision making such as gathering data and driving the decision making process through the organization. In one embodiment, the engine internally interacts with facets of the organization including, but not limited to, users at various levels (Example: Board, C suite, VPs, Directors), ERP, databases (Example: HR, supply chain), communication systems (email system and chat systems), RASCI charts, and organization charts. In one embodiment, the decision making engine externally interacts with facets includes contractors to answer questions, help shortlist vendors, request specific data sets, help direct vendors, and cut contracts to vendors. The facets of the organization works with the computing device to set agenda, set meetings, assign tasks, set schedules, drive schedules, modify schedules, and to track outcomes. In one embodiment, the system (software) 100 auto populates data to help decision making.

Figure 5:
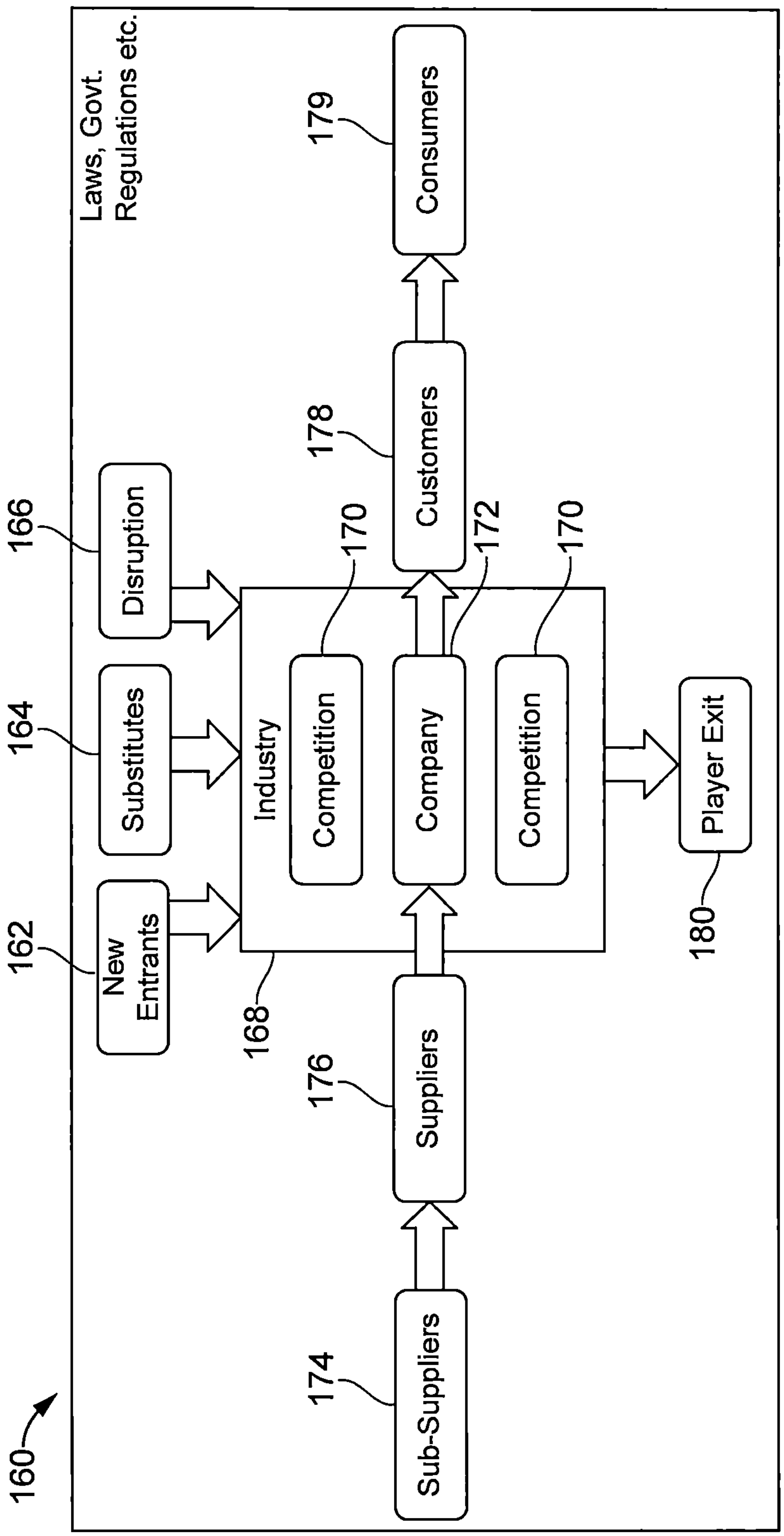
FIG. 5 shows a block diagram of an ecosystem of the system in one embodiment of the present invention.

In one embodiment, the MG case composite 102 is an end to end integrated system to take decisions, solve problems, solve issues, solve cases, etc. The MG case composite has multiple modules within it. In one embodiment, the MG case composite 102 comprises multiple cognitive modules include, but not limited to, an MG case matrix 104, a case open module 106, a structure/framework module 108, a brainstorm module 110, a data analysis/graph analysis module 112, a problem-solving module 114, a speed math/conversational math module 116, and a case end module 118. In one embodiment, the MG case composite 102 further comprises one or more sub-modules including, but not limited to, a drive and alignment module 120, an integration and transition module 122, an insight and impact module 124, and a commercial ecosystem 160 (as shown in FIG. 5). In one embodiment, each module has multiple names but for simplicity are listed as one name in this description. In one embodiment, each module in the system 100 processes a certain part of a decision. Each module has steps to interface with other applicable modules, steps to start, sustain, and finish. They generally interface as shown in the diagram.

In one embodiment, the cognitive modules are executed by the processor configured to make decision for a problem/issue/case, comprising opening the case open module 106, applying the MG case matrix 104 for picking at least one or more templates, and applying necessary information to build a structure using the structure/framework module 108. In one embodiment, the user could apply the other modules include the brainstorming module 110, problem-solving module 114, data analysis module 112, speed math/conversational math module 116 as needed for further processing the case process, thereby assessing co-scholastic skills include, but not limited to, critical-thinking, reasoning, problem-solving, decision-making, self-improvement, communication skills, mental processes, presentation and information processing, issue-solving, verbal communications of the individual.

In one embodiment, the case opening module 106 analyses an input user data provided by the user and assists the user to refine the input into a meaningful problem statement for the structure module. In one embodiment, the case open module 106 is configured to allow the user to listen, reiterate, breakdown of information, and verify the key objectives and constraints, and then build a specific and measurable problem statement. In one embodiment, the structure module 108 is configured to interact with the user to take input; apply MG case matrix 104 for selecting an appropriate template; apply industry specific and/or user specific information to populate the template, and build a usable frame structure. In one embodiment, the MG case matrix 104 selects an appropriate template to understand the case situation in more detail, find one or more root causes, and fix the root causes for the case.

In one embodiment, the data analysis module 112 allows the user to transition from a hypothesis, understand the data needs, gather data through the systems functions and eventually gain insights and impact. In one embodiment the data analysis module 112 is configured to interact with the user to take input; assist the user to identify the data needs to solve one or more sub-issues or key issues; assist the user to procure the data through internal or external sources; utilize the algorithm to analyse the data to gain observations and deeper insights, and assist the user to move further in a direction to set solution.

In one embodiment, the brainstorm module 110 interacts with the user to take input and assisting them to select an appropriate template to apply specific information to populate the template and build a mutually exclusive collectively exhaustive (MECE) set of solutions. In one embodiment, the brainstorming module 110 is configured to interact with the user to take input; help the user to select the template; apply industry specific and user specific information to populate the template, and build an MECE set of solutions to prioritize the issue for the user to act on.

In one embodiment, the problem solving module 114 allows the user to calculate the data that helps them in decision making. In one embodiment, the problem solving module 114 is configured to interact with the user to take input; help the user to frame the problem similar to case opening module 106; work with the user to identify the key variables; break down the information and equation into multiple parts; help user to apply assumptions at each step of the equation to start calculating sub-results, and solve the equation to give the user an answer or a range of answers. In one embodiment, the speed math/conversational math module 116 assists the user to calculate quantitative data required to move forward in decision making. In one embodiment, the case end module 118 assists the user to summarize the various insights and impact areas, thereby assisting the user to determine the next steps to achieve their goals. In one embodiment, the modules are used for further processing the case process, thereby assessing co-scholastic skills include, critical-thinking, reasoning, problem-solving, decision-making, self-improvement, communication skills, mental processes, presentation and information processing, issue-solving, verbal communications of the individual.

In one embodiment, the driving and alignment module 120 of the system allows for driving the decision making process by developing viewpoints for industry specific or entity specific situation by drawing on its own database and user information. The system utilizes the driving and alignment module 120 configured to focus on strategic areas by making reasonable viewpoints and prioritizes key areas for users to focus on. In one embodiment, the integration and transition module 122 of the system helps align the stakeholders by building a collaborative environment at multiple levels and recording its decision making trail. In one embodiment, the integration and transition module 122 further integrates all of the modules and calls upon modules as needed. The system can call upon modules multiple times or repeatedly using the integration and transition module 122. The system can also transition from one module to the other and run multiple modules at the same time with various or same teams to support decision making via integration and transition module 122. In one embodiment, the insights and impacts module 124 of the system gains and or develops key qualitative and quantitative insights throughout the process in every module and delivers impact to the stakeholders through analysis and acumen. The system can develop lower and higher level insights. Higher level insights are developed through combination of multiple insights of information points.

In one embodiment, the system 100 develops a course that standardizes question types and offers an integrated, end to end process that helps people/computers take decisions. In one embodiment, the system 100 is further configured to provide training/coaching from person-person (P-P) and computer to person (C-P) and implementation between P-P and C-P (computer guides). In one embodiment, the system 100 could be a fully autonomous decision-making system using artificial intelligence (AI). In some embodiments, the system 100 could be either fully computerized or human-powered, or a combination of both.

In one embodiment, the person or computer could follow the system or MG case composite 100. In one embodiment, the system 100 provides training/coaching from person-person (P-P) and computer to person (C-P) for improving the decision-making ability, wherein the training/coaching includes problem start and formulate problem statement, show structure, fill structure, show how to retrieve data, interpret it, tie it to main question, brainstorm ideas, build sub structures, speed math and then close the problem with recommendations.

In one embodiment, the decision-making process could be implemented by the person or software. In one embodiment, the person could be chief executive officer (CEO) and send inputs strategic question program that imitates the MG case/problem composite. It initiates a problem/case opening step and helps the user to formulate a problem statement. Further, the computing device, for example, a computer moves to next step and recommends a template with some pre-populated areas or recommendations for questions/direction to respond and fill. Executives/people could complete this and the system (software) 100 locks it. Then the system 100 aids the people/executives to build a high-level plan and assigns tasks to appropriate individuals. It could also set baseline times that the CEO gets.

In one embodiment, the system 100 could be accessed by all the users or participants through login and enable to get a plan to execute. In one embodiment, the system 100 could inform the user or participants about what type of questions to answer and what data to get and how to retrieve the data based on pre-inputs or general recommendations. The users could follow that path or process and advice on timelines and cost. In one embodiment, the system 100 could keep everyone informed and, in the project, up to date. The users get data and then system 100 aids the users to interpret the received data. If the report includes recommendation then the user inputs and the system 100 aid to drive this forward. In one embodiment, the system 100 could provide brainstorming templates for the users to provide input data. Brainstorming is a group creativity technique by which efforts are made to find a conclusion for a specific problem by gathering a list of ideas spontaneously contributed by its members.

In one embodiment, the system 100 could perform speed math with voice recognition (like Alexa, Ski). In one embodiment, the system could aid the user to build sub structures and/or guide with some templates. In one embodiment, the system 100 could aid break down problems or even solve them completely. In one embodiment, the system 100 could receive instruction via voice and/or typing etc. In one embodiment, the system 100 could keep everyone up to date and books group meetings at key points to ensure communication. It also shares data through common databases and points different stakeholder to look at certain data they might find useful in other part of the analysis (cross pollination). Eventually the system 100 will guide in an efficient way to cut the noise and make everyone productive. In one embodiment, the system 100 could be, but not limited to, a software as a service (SAAS) based system or installed at the site. In one embodiment, the system 100 could be, but not limited to, a fully autonomous artificial intelligence (AI) system.

In one embodiment, the system 100 eventually should be able to solve problems itself and set business plan targets, ask questions to solve them by going through MG case/problem composite matrix 104, and inform stakeholders and optimize company performance by itself.

At one step, the user could open the case open module 106 and then apply MG case matrix 104 to pick a template. In one embodiment, the case open module 106 is configured to allow the individual to listen, reiterate, breakdown of information, and then to confirm objectives and constraints and then build a specific and measurable question. The user could apply the necessary information to build a structure and then apply modules as needed while having touch-points as required with the structure/framework module 108. If needed call other structures indirectly through the initial structure or directly through MG case matrix 104. At another step, the user could also apply other modules such as brainstorming module 110, problem-solving module 114, data analysis module 112, and speed math/conversational math module 116 as needed to further proceed the decision-making process or case process. Once there is sufficient analysis and alignment is done, then the case is moved to the case end module 126 to close/end the case.

In one embodiment, the sub-modules such as the drive and alignment module 120, integration and transition module 122, insight and impact module 124, and commercial ecosystem 160 are also at play. They are also applied simultaneously throughout the case and transition as required. In one embodiment, the insights are generated from the start to the finish and it is critical to ensure that the end goal impact is being delivered or thought of being delivered.

Figure 2:
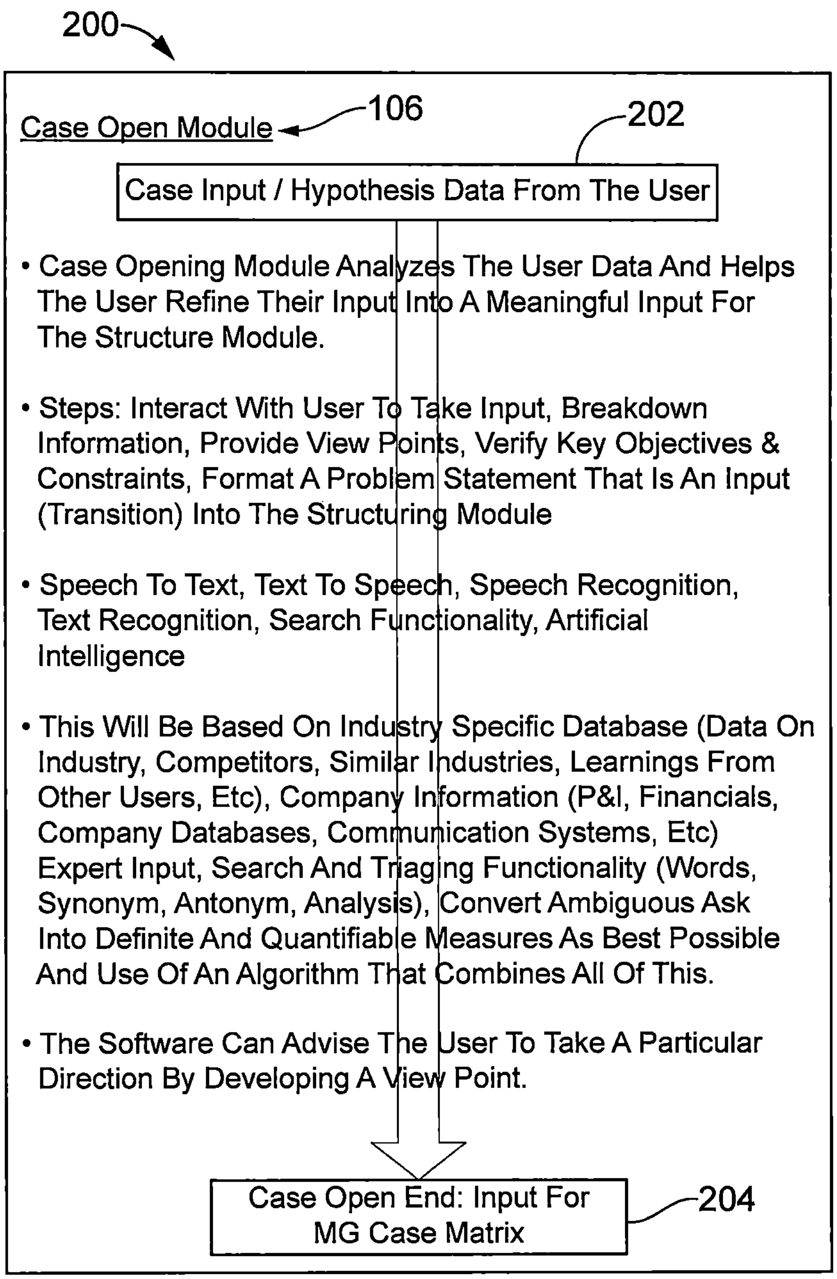
FIG. 2 shows a flowchart of a method of a case open module in one embodiment of the present invention.

Referring to FIG. 2, a flowchart 200 of a method of a case open module 106 in one embodiment is disclosed. At step 202, the case open module 106 receives inputs from the user. In one embodiment, case opening module 106 analyzes the user data and helps the user refine their input into a meaningful input for the structure module 108. In one embodiment, the case open module 106 is configured to allow the user to listen, reiterate, breakdown of information, and verify the key objectives and constraints, and then build a specific and measurable problem statement.

In one embodiment, the case open module 106 comprises the following steps. At one step, the case open module 106 interacts with user to take input. At another step, the case open module 106 breaks down the information. At another step, the case open module 106 provides view points. At another step, the case open module 106 verifies the key objectives and constraints. At another step, the case open module 106 formats a problem statement that is an input (transition) into the structuring module.

In one embodiment, the case open module 106 further comprises speech to text, text to speech, speech recognition, text recognition, search functionality, and artificial intelligence. This will be based on industry specific database (data on industry, competitors, similar industries, learning from other users, etc), company information (p&l, financial, company databases, communication systems, etc) expert input, search and triaging functionality (words, synonym, antonym, analysis), convert ambiguous ask into definite and quantifiable measures as best possible and use of an algorithm that combines all of this. In one embodiment, the MG case composite 102 can advise the user to take a particular direction by developing a view point. At step 204, the case open module 106 closes the case and presents input for MG case matrix 104.

Example

The case opening is the starting process of teaching/training the user to make decisions, solve problems, solve issues, solve cases, etc. The case opening occurs right at the start of the case. For example, the case opening starts when the interviewer reads the question and ends when the candidate/student is ready to build their structure. The interviewer delivers the information only once, so the candidate/user only has one shot at taking in the content. The case opening plays an important role, which sets the context and direction for the rest of the case. The case opening is used to transfer information to the candidate, which is mainly a verbal process. The case opening is also used to check if the candidate could absorb the data in a short time span.

The case opening process involves case open, issue open, problem open, case initiation, problem initiation, issue initiation, and decision open. In one embodiment, the process comprises the following steps. At one step, one or more case factors such as the main issue, prompt, case, etc. that need to be solved are listed. The issue could be wordy, abstract, ambiguous, disesteemed, etc. In one embodiment, the issue, prompt, taking notes, and actively marking areas are listened and processed. The issue, prompt, taking notes, and actively marking areas could be undefined or not specific information, known, unknown, clear, unclear, important, superfluous, quantitative, qualitative data or information etc. Also, it could include verbal or non-verbal communication. The process allows the candidate to listen to the information either by marking, writing, or taking pen notes to process, wherein the listening includes, but not limited to, circles, underlining, boxes, etc. or a combination. The process also allows the candidate to add context and knowledge to that issue at the right times and right amount, which clarifies the objectives, constraints, and KPIs (key performance indicators). The process allows the candidate to share their notes and demonstrate the quality and quantity of the notes. The process allows the candidate to engage verbally and non-verbally with one or more other candidates/players if applicable. Then, the MG case matrix 102 (shown in FIG. 1) is applied to determine problem/issue type and pick a template and/or narrow down the options, and drive the conversation accordingly. A process of forming a hypothesis about the problem has started to pick a direction and test the problem.

Figure 3:
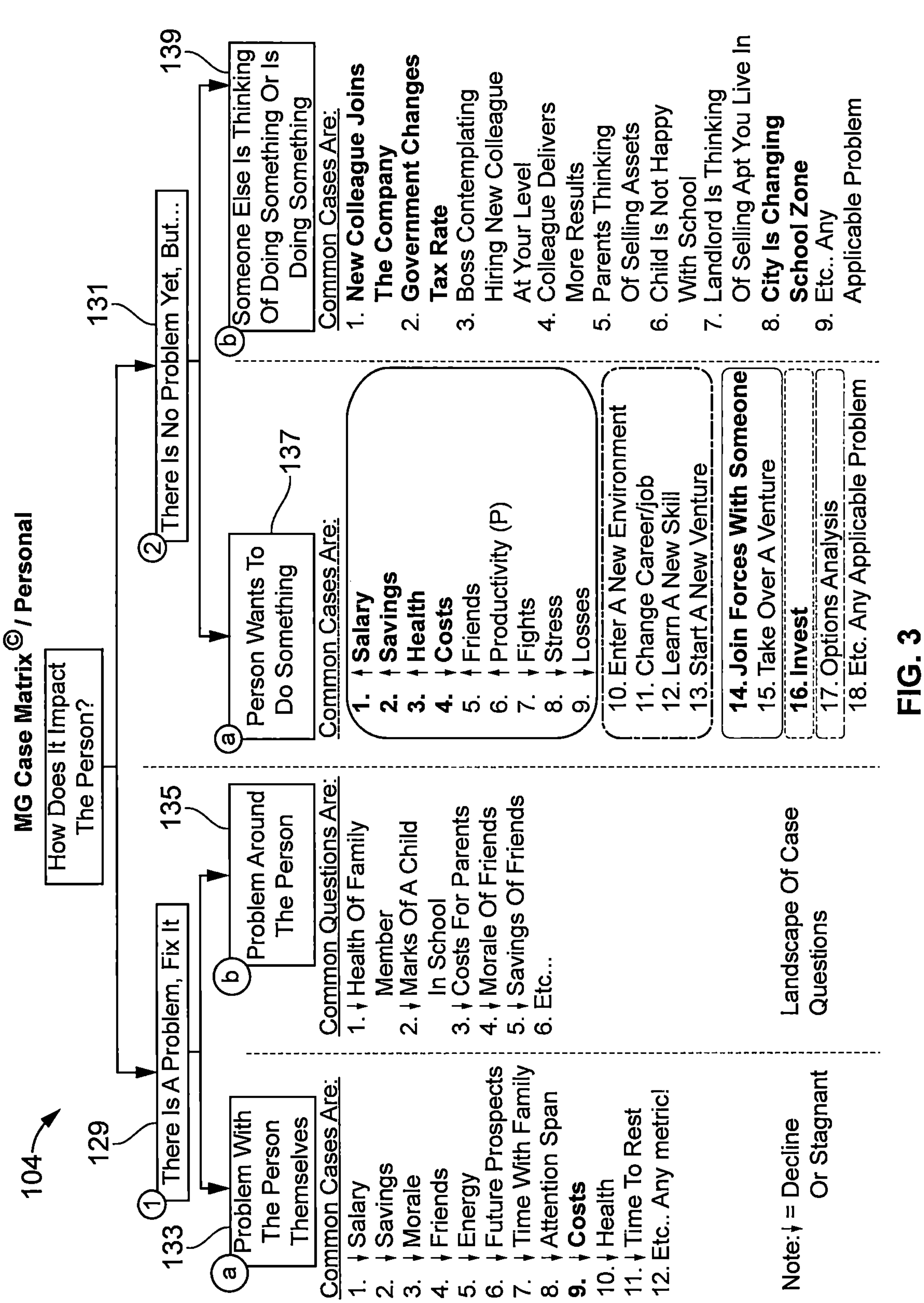
FIG. 3 shows a block diagram of an MG case matrix/MG question matrix/MG problem matrix of the system in one embodiment of the present invention.

Referring to FIG. 3, a block diagram of an MG case matrix/MG question matrix/MG problem matrix 104, according to one embodiment of the present invention. In one embodiment, the MG case matrix 104 is developed for personal use. In one embodiment, the MG case matrix 104 includes different templates for categorizing questions, thereby enabling the customers/clients/user to pick a template and further breakdown the key question (output of case open module). In one embodiment, the MG case matrix 104 includes (1) a problem find and fix category 129 and (2) a problem preventing category 131. The problem find and fix category 129 includes (a) a first sub-category or problem with the person themself 133 and (b) a second sub-category or problem around the person 135. The problem with the person themself 133 includes different cases such as, but not limited to, salary, savings, morale, friends, energy, future prospects, time with family, attention span, costs, health, time to rest, etc., any metric. The problem around the person 135 may include one or more common questions including, but are not limited to, health of family members, marks of a child in school, costs for parents, morale of friends, savings of friends, etc.

In one embodiment, the problem preventing category 131 includes (a) a first sub-category or person wants to do something 137 and (b) a second sub-category or someone else is thinking of doing something or is doing something 139. In one embodiment, the first sub-category 137 of problem preventing category 131 may utilizes different templates. In one embodiment, the first sub-category 137 may utilizes a template for different cases including, but not are limited to, salary, savings, health, costs, friends, productivity (P), fights, stress, and losses. In one embodiment, the first sub-category 137 may utilizes another template for different cases including, but not are limited to, enter a new environment, change career/job, learn a new skill, start a new venture, etc. In one embodiment, the first sub-category 137 may utilizes another template for different cases including, but not are limited to, join forces with someone, take over a venture, etc. In one embodiment, the first subcategory 137 may utilizes another template for invest. In one embodiment, the first subcategory 137 may utilizes another template for options analysis, etc. any applicable problem. In one embodiment, the second sub-category 139 includes different cases including, but not are limited to, the new colleague joins the company, government changes tax rate, boss contemplating hiring new colleague at your level, colleague delivers more results, parents thinking of selling assets, child is not happy with school, landlord is thinking of selling apt you live in, city is changing school zone, etc. and any applicable problem.

Figure 4:
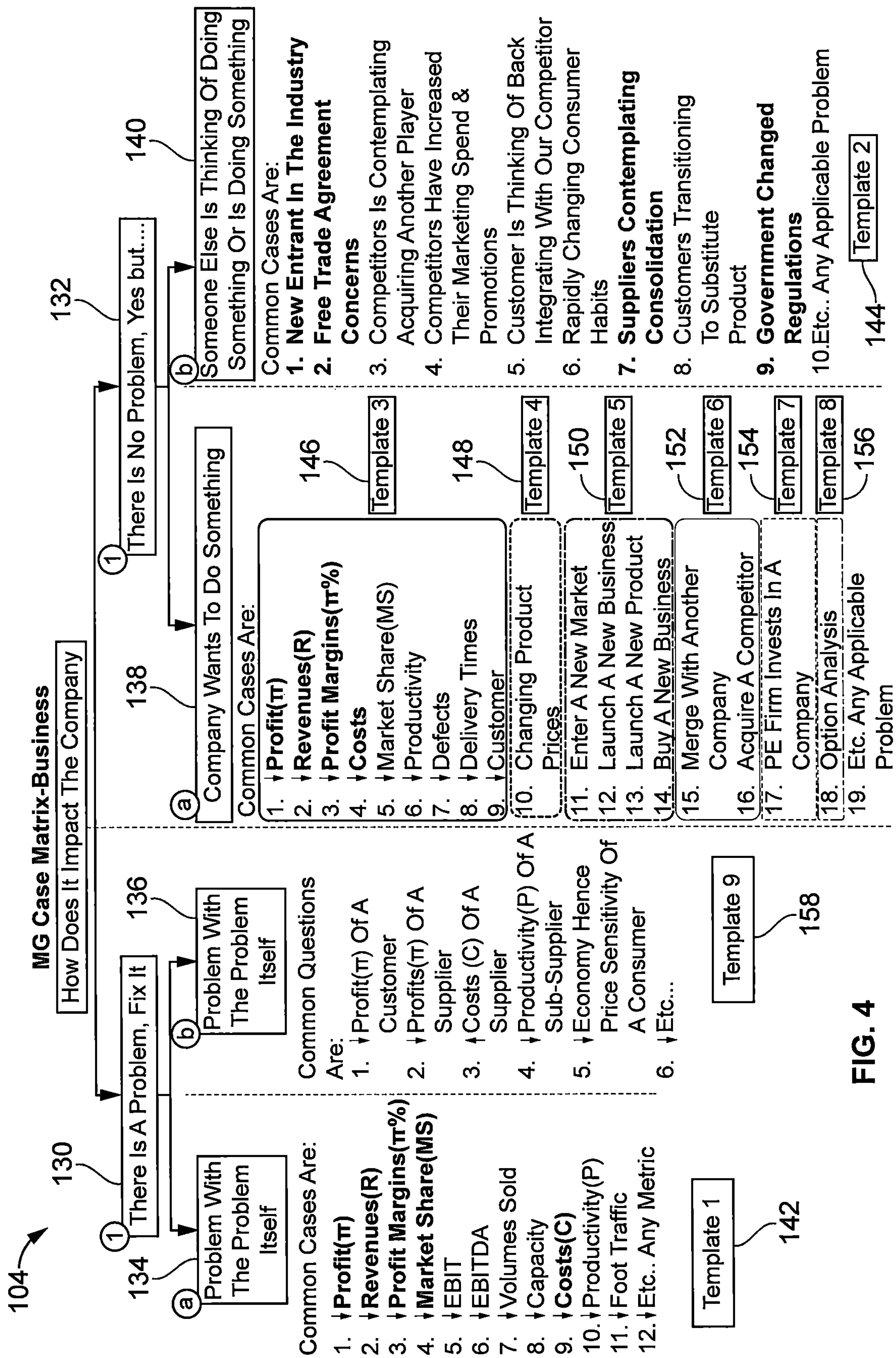
FIG. 4 shows a block diagram of an MG case matrix/MG question matrix/MG problem matrix of the system in another embodiment of the present invention.

Referring to FIG. 4, a block diagram of an MG case matrix/MG question matrix/MG problem matrix 104, according to another embodiment of the present invention. In one embodiment, the MG case matrix 104 is developed for business use. In one embodiment, the MG case matrix 104 includes different templates for categorizing questions, thereby enabling the customers/clients/user to pick a template and further breakdown the key question (output of case open module). In one embodiment, the template 1 142 in the MG case matrix 104 includes a problem find and fix category 130 and a problem preventing category 132. The problem find and fix category 130 includes a first sub-category or problem with the company itself 134 and a second sub-category or problem around the company 136. The problem with the company itself 134 includes different cases such as profits ($\pi$), revenues (R), profit margins ($\pi$ %), market share (MS), EBIT, EBITDA, volumes sold, capacity, costs (C), productivity (P), foot traffic, etc., any metric.

In one embodiment, the problem preventing category 132 includes a third sub-category or company wants to do something 138 and a fourth sub-category or someone else is thinking of doing something or is doing something 140. In one embodiment, the template 2 144 in the second sub-category includes different cases such as, but not limited to, the new entrant in the industry, free trade agreement concerns, competitor is contemplating acquiring another player, competitors have increased their marketing spend & promotions, customer is thinking of back integrating with our competitor, rapidly changing consumer habits, suppliers contemplating consolidation, customers transitioning to substitute product, the government changed regulations, etc., any applicable problem. In one embodiment, the third subcategory 138 includes different templates. In one embodiment, the template 3 146 includes different cases such as, but not limited to, profits (π), revenues (R), profit margins (π %), costs, market share (MS), productivity (P), defects, delivery times, and customer churn. In one embodiment, the template 4 148 includes changing product prices. In one embodiment, the template 5 150 includes, but not limited to, enter a new market, launch a new business, launch a new product, and buy a new business. In one embodiment, the template 6 152 includes, but not limited to, merge with another company and acquire a competitor. I none embodiment, the template 7 154 includes PE firm invests in a company and the template 8 156 includes options analysis, etc., any applicable problem. The template 9 158 in the second subcategory 136 includes, but not limited to, ↓ profits (π) of a customer, ↓ profits (π) of a supplier, ↑ costs (c) of a supplier, ↓ productivity (p) of a sub-supplier, ↓ economy hence ↑ price sensitivity of consumer, etc.

Referring to FIG. 5, the block diagram of the ecosystem 160 of the system 100 in one embodiment is disclosed. In one embodiment, the ecosystem 160 is critical to understand the various stakeholders and their interactions and their inter-dependencies. A company 172 exists within an industry 168 and is surrounded by competitors. In one embodiment, new entrants 162, substitute products 164, and disruption 166 are always interacting with the industry 168. The new entrants 162 and substitutes 164 come into industry 168 on a permanent or temporary basis. The disruption 166 is always happening at large or small scale due to multiple drivers. Players exit the industry 168 on a permanent or temporary basis depending upon the situations.

In one embodiment, the company 172 is linked to sub-suppliers 174, suppliers 176, customers 178, and consumers 179 through a complex value chain that is unique to their industry 168. The company 172 is linked to the competition 170 through industry bodies. They sell products and/or services to customers and buy products and/or services from the suppliers. The players could exit via the player exit 180.

In one embodiment, the customers 178 and consumers 179 could buy products or services from the company 172 and might be the end consumers and/or pass it on to the consumers 179 who actually consume the products and/or services. The customers 178 and consumers 179 themselves could be part of an industry. In one embodiment, sub-suppliers/suppliers (174 and 176) could sell products or services to the company 170 and/or the industry 168. In one embodiment, the ecosystem 160 exists in the government regulations, laws, ethics, culture, etc. and that context is crucial to operations, strategy, and decision making.

Figure 6:
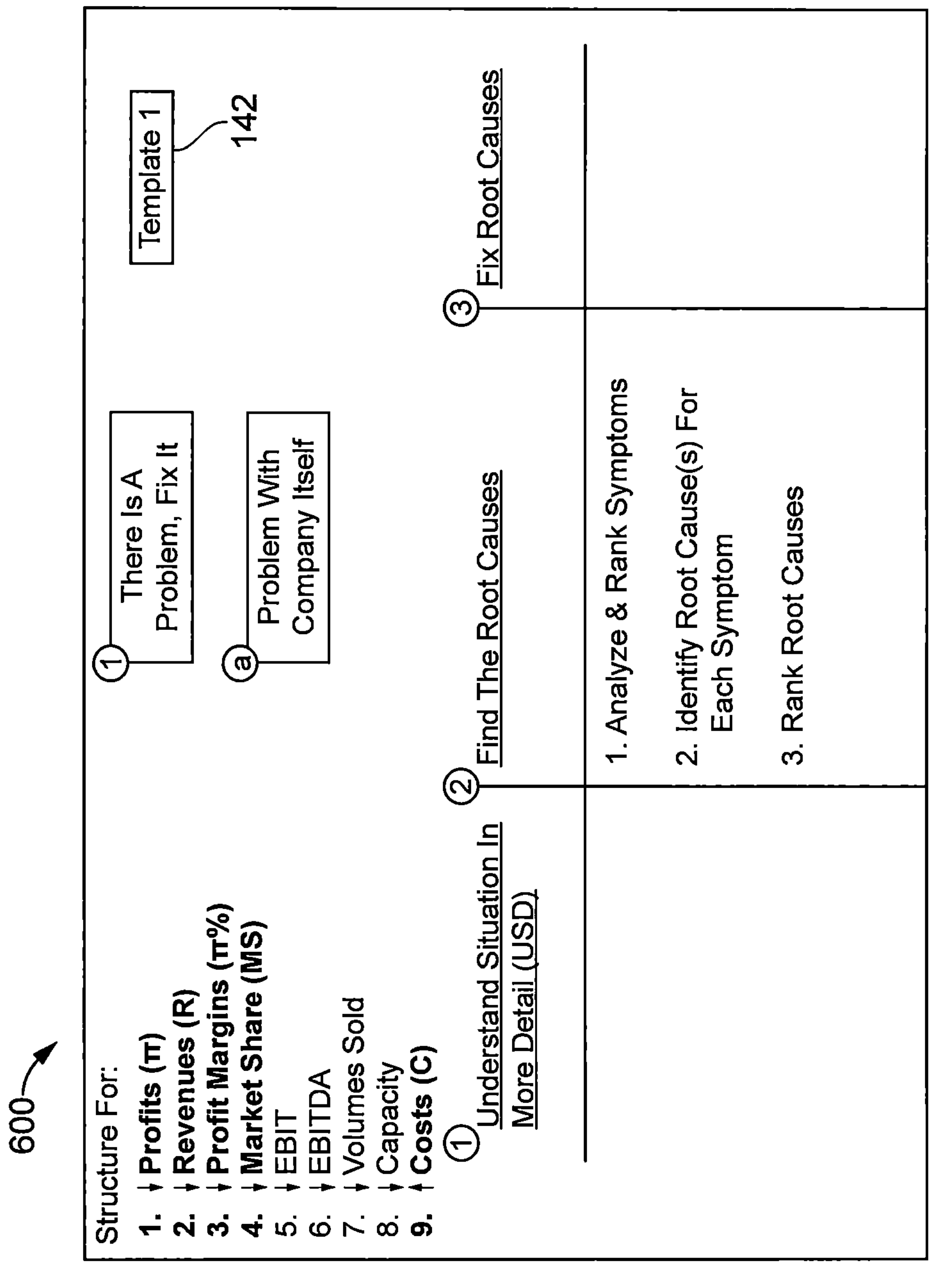
FIG. 6 shows a screenshot of a template 1 in one embodiment of the present invention.

Referring to FIG. 6, a screenshot 600 of the template 1 142 of the present invention is disclosed. In an exemplary embodiment, the template 1 142 is categorized and includes understand the situation in more detail (USD), find the root causes, and fix root causes for enabling the user/customer/client to further breakdown the key question (output of case open module). The find root causes category comprises, but not limited to, analyze and rank symptoms, identify root causes for each symptom, and rank root causes. In one embodiment, the template 1 142 could provide work space for the user/customer/client to breakdown the key question (output of case open module). In one embodiment, the template 1 142 could provide structure for profits (π), revenues (R), profit margins (π %), market share (MS), EBIT, EBITDA, volumes sold, capacity, costs (C), etc.

Figure 7:
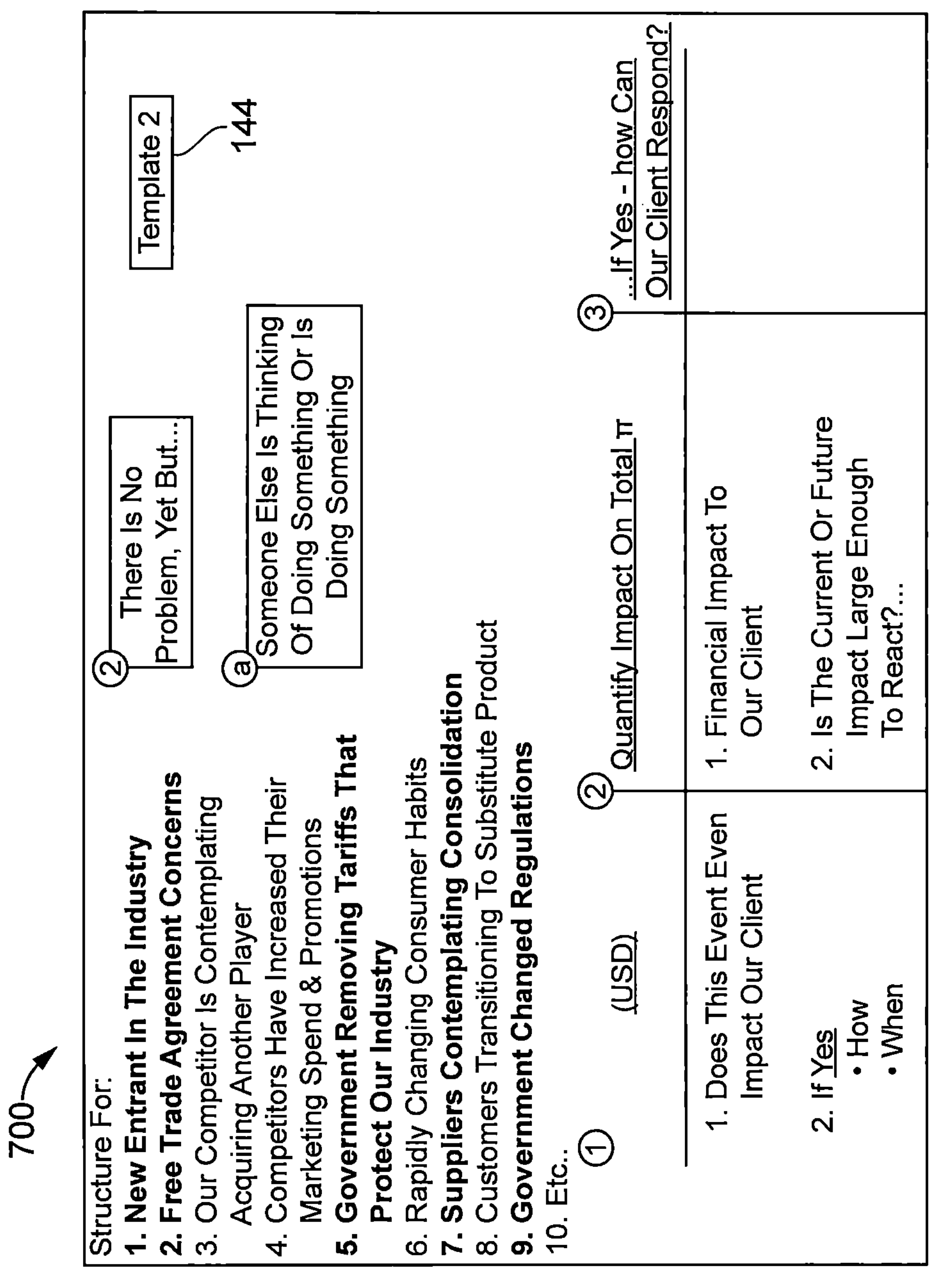
FIG. 7 shows a screenshot of a template 2 in one embodiment of the present invention.

Referring to FIG. 7, a screenshot 700 of the template 2 144 of the present invention is disclosed. In an exemplary embodiment, the template 2 144 is categorized and includes, but not limited to, understand the situation in more details (USD), quantify the impact on total n, and response for enabling the user/customer/client to further breakdown the key question. In one embodiment, the template 2 144 includes different cases such as, but not limited to, the new entrant in the industry, free trade agreement concerns, competitor is contemplating acquiring another player, competitors have increased their marketing spend & promotions, customer is thinking of back integrating with our competitor, rapidly changing consumer habits, suppliers contemplating consolidation, customers transitioning to substitute product, government changed regulations, etc., any applicable problem. Understanding the situation in more details (USD) comprises questions for the user to respond accordingly with respect to above different cases. In one embodiment, the user could respond to the questions in the quantify impact on total π and response categories.

Figure 8:
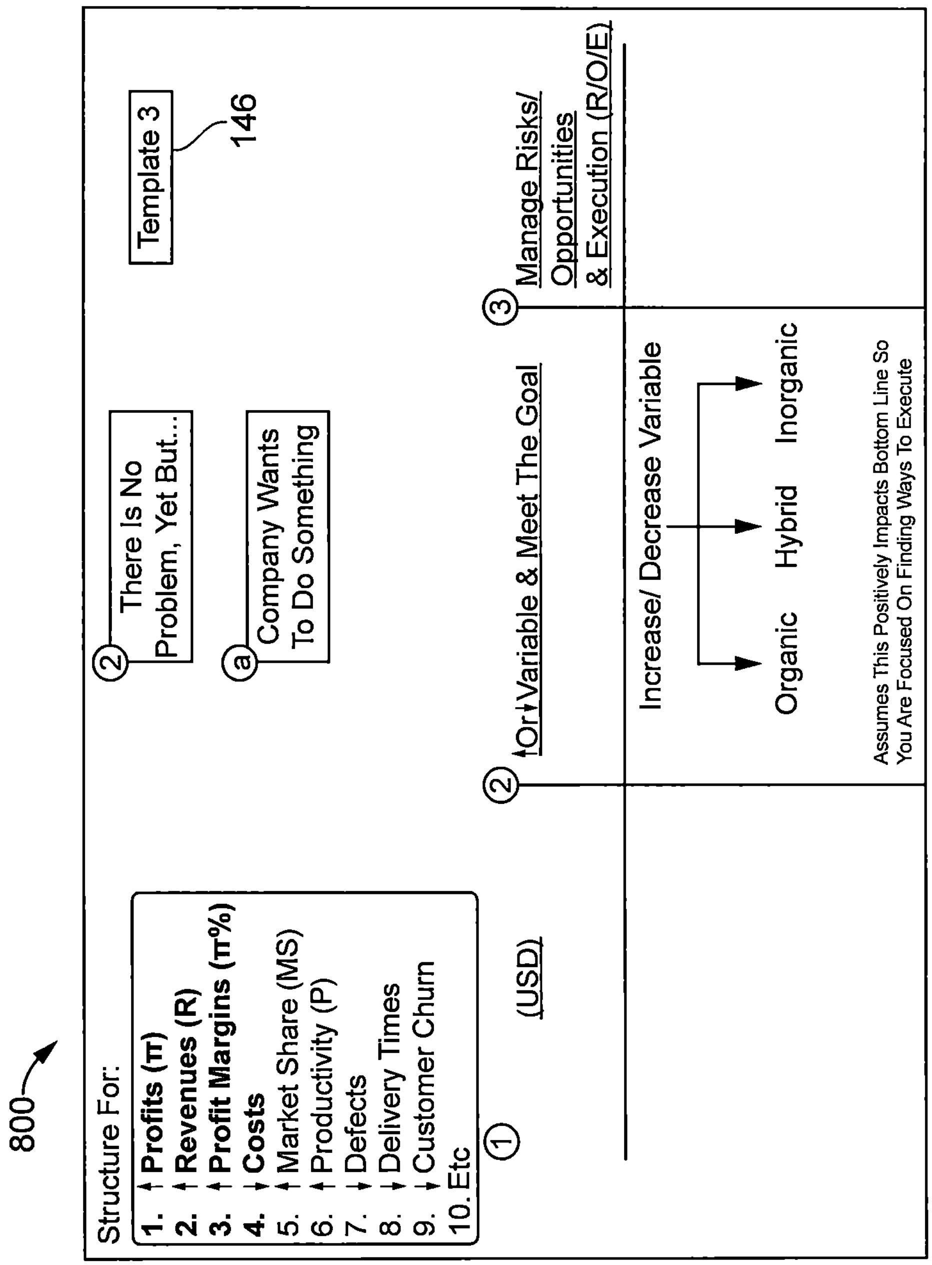
FIG. 8 shows a screenshot of a template 3 in one embodiment of the present invention.

Referring to FIG. 8, a screenshot 800 of the template 3 146 of the present invention is disclosed. In an exemplary embodiment, the template 3 146 is categorized and includes, but not limited to, understand the situation in more details (USD), increase or decrease variable and meet the goal, and manage risks/opportunities and execution (R/O/E) for enabling the user/customer/client to further breakdown the key question. In one embodiment, the template 3 146 could provide work space for the user/customer/client to breakdown the key question. In one embodiment, the template 3 170 could provide structure for profits (π), revenues (R), profit margins (π %), market share (MS), productivity, defects, delivery items, customer churn, etc.

Figure 9:
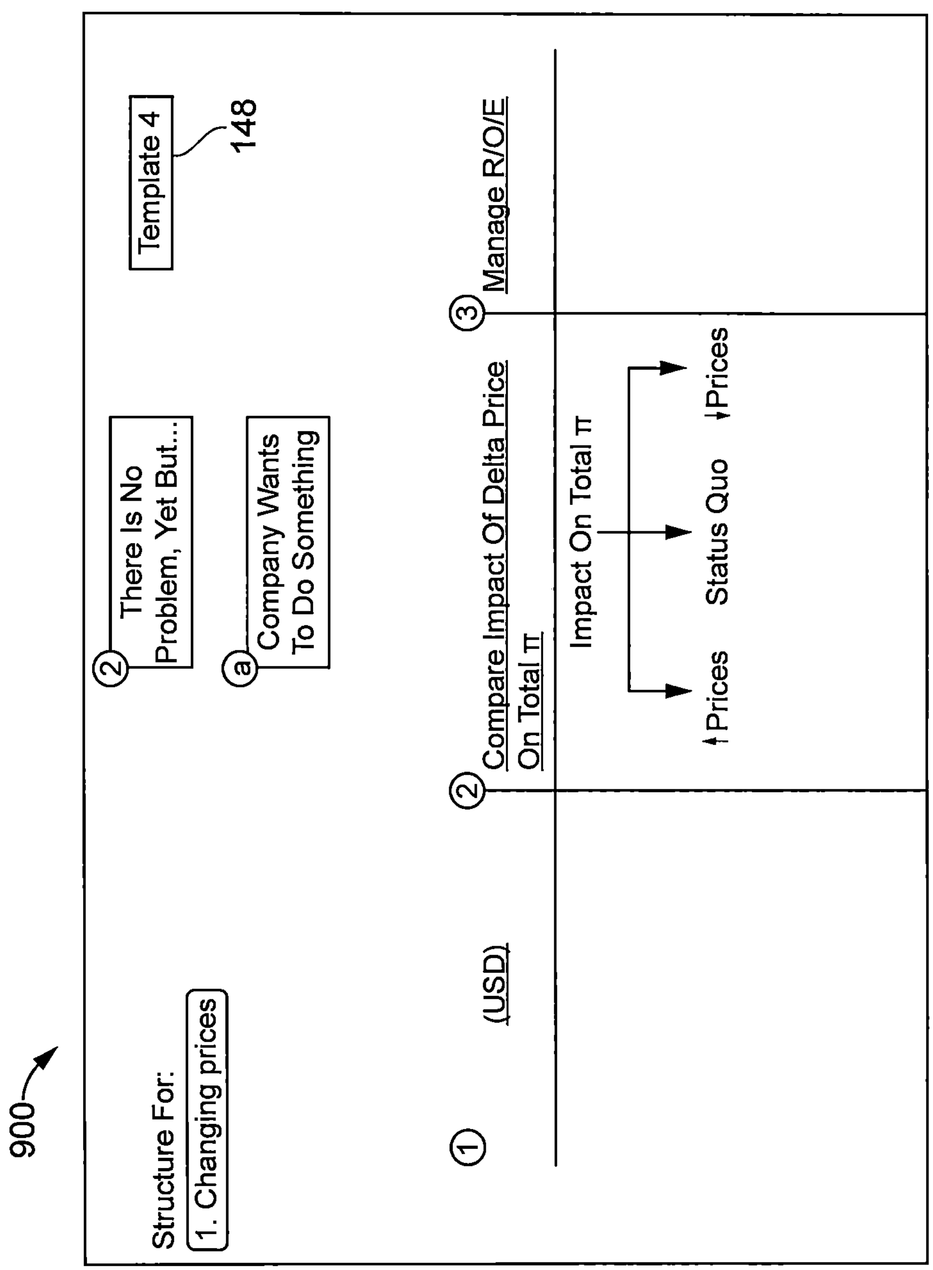
FIG. 9 shows a screenshot of a template 4 in one embodiment of the present invention.

Referring to FIG. 9, a screenshot 900 of the template 4 148 of the present invention is disclosed. In an exemplary embodiment, the template 4 148 is categorized and includes, but not limited to, understand the situation in more details (USD), compare the impact of delta price on total π, for example, impact on total π including ↑ prices, Status Quo and ↓ Prices, and manage risks/opportunities and execution (R/O/E) for enabling the user/customer/client to further breakdown the key question. In one embodiment, the template 4 148 could provide work space for the user/customer/client to breakdown the key question.

Figure 10:
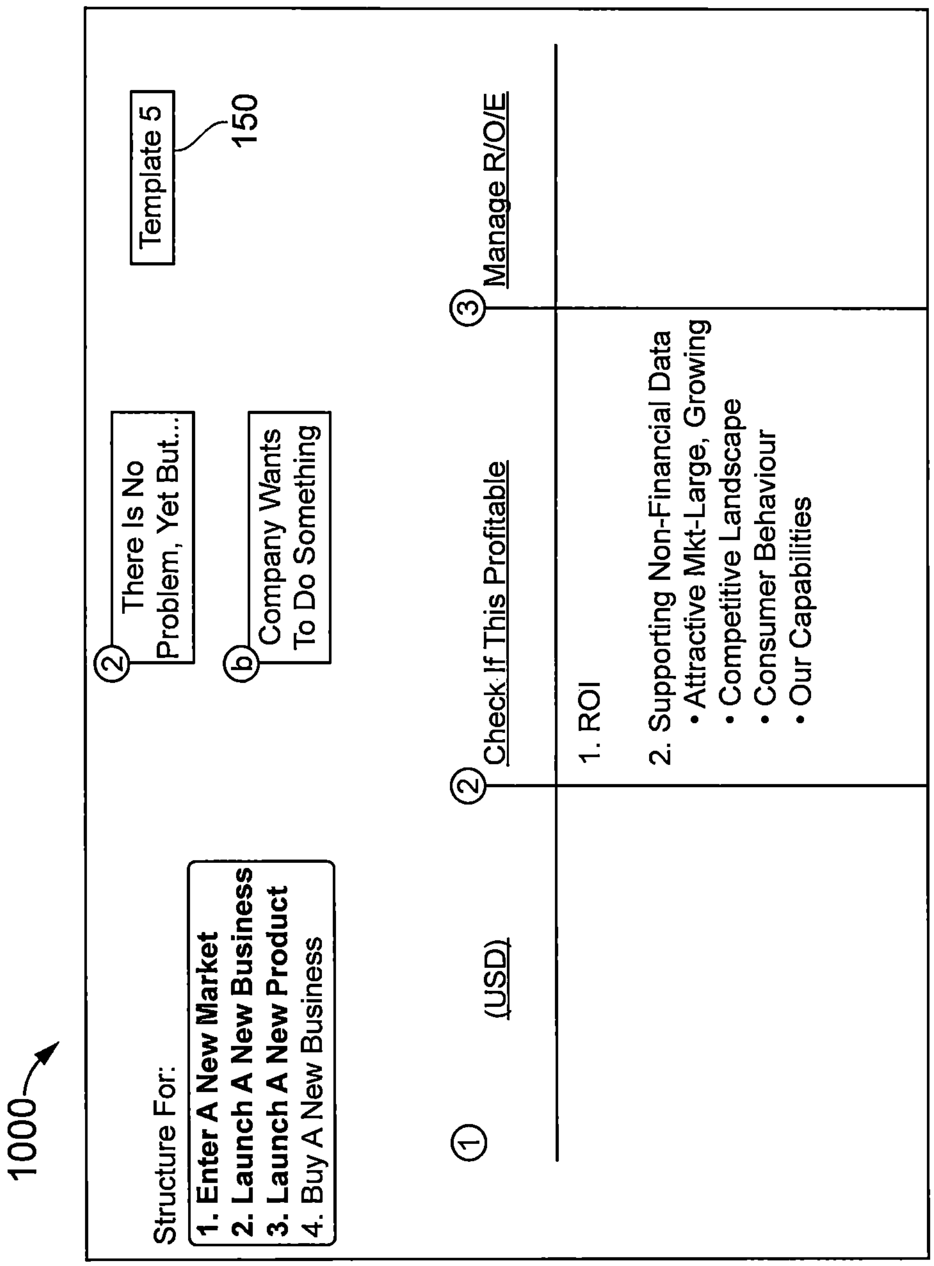
FIG. 10 shows a screenshot of a template 5 in one embodiment of the present invention.

Referring to FIG. 10, a screenshot 1000 of the template 5 150 of the present invention is disclosed. In one embodiment, the template 5 150 is structured for enter a new market, launch a new business, launch a new product, and buy a new business. In one embodiment, the template 5 150 is categorized and includes, but not limited to, understand the situation in more details (USD), check profits, for example, risks/opportunities and execution (R/O/E), and supporting non-financial data, for example, attractive market—large, growing, competitive landscape, consumer behaviour, and our capabilities and manage risks/opportunities and execution (R/O/E) for enabling the user/customer/client to further breakdown the key question.

Figure 11:
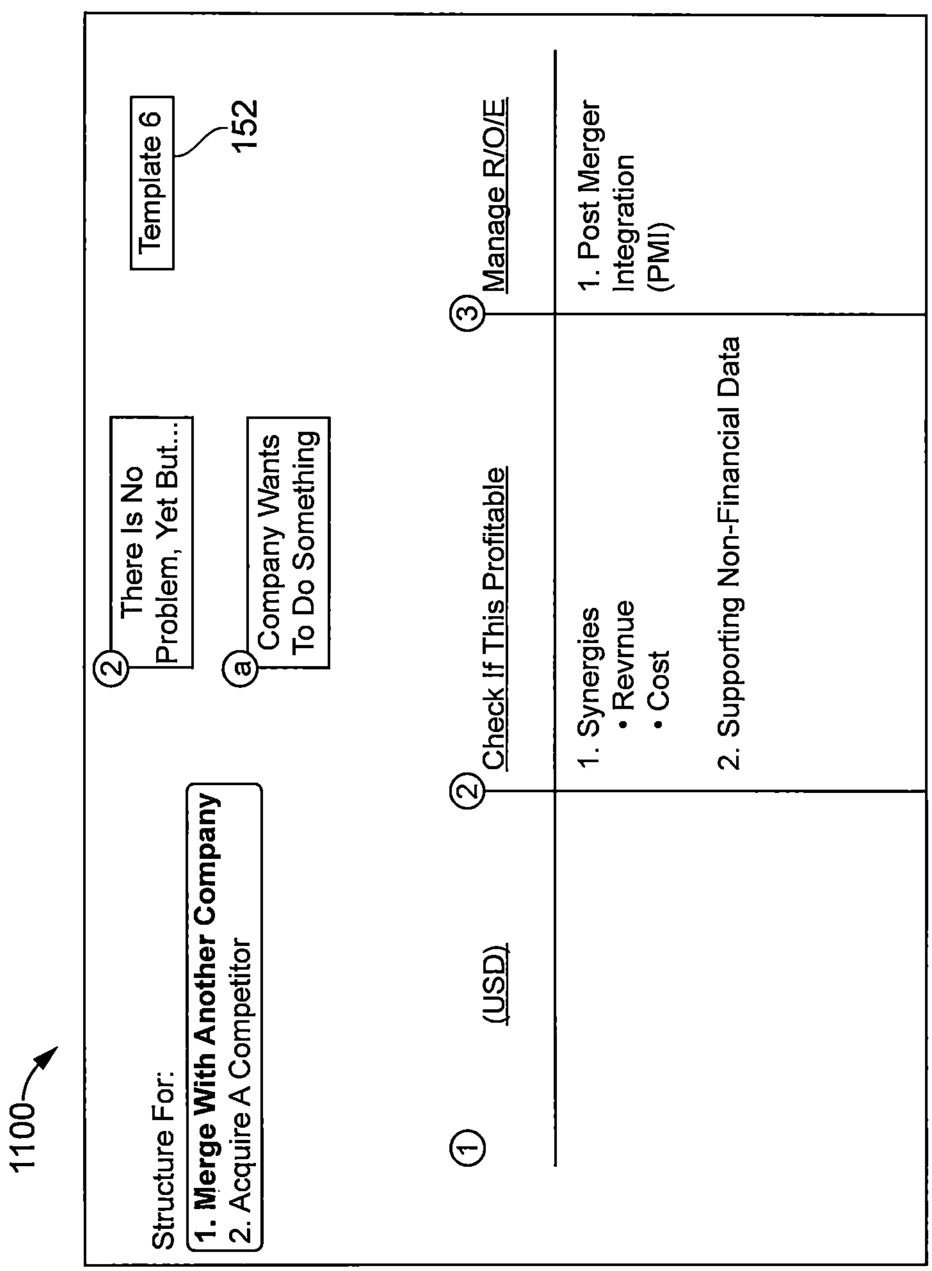
FIG. 11 shows a screenshot of a template 6 in one embodiment of the present invention.

Referring to FIG. 11, a screenshot 1100 of the template 6 152 of the present invention is disclosed. In one embodiment, the template 6 152 is categorized and includes, but not limited to, understand the situation in more details (USD), check profits, for example, synergies revenue and cost, and supporting non-financial data, and also manage risks/opportunities and execution (R/O/E) for example, post-merger integration (PMI), for enabling the user/customer/client to further breakdown the key question.

Figure 12:
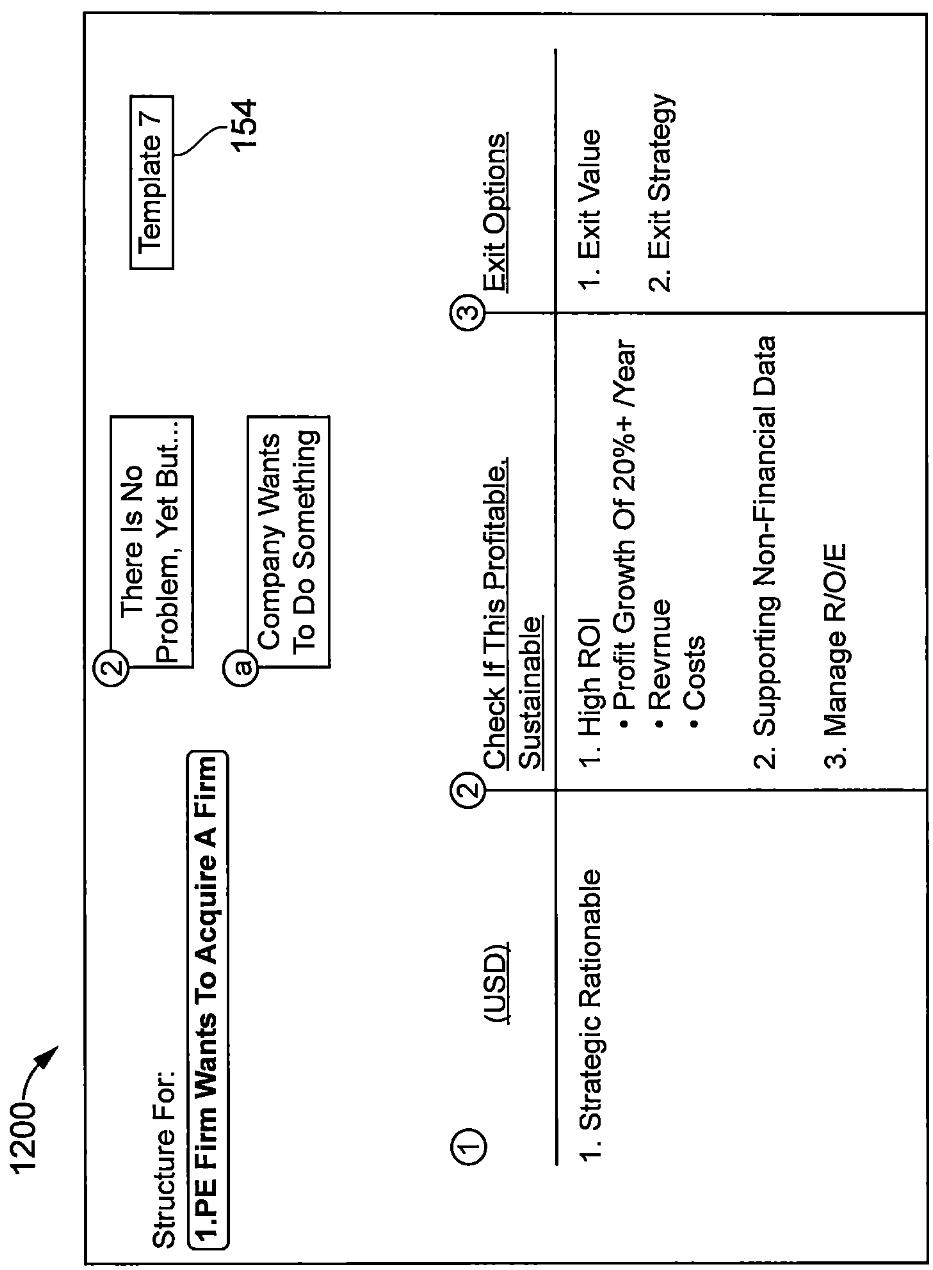
FIG. 12 shows a screenshot of a template 7 in one embodiment of the present invention.

Referring to FIG. 12, a screenshot 1200 of the template 7 154 of the present invention is disclosed. In one embodiment, the template 8 156 is categorized and includes, but not limited to, understand the situation in more details (USD), check profits and sustainability, and exit options. The profit and sustainability is checked for high ROI, for example, profit growth of 20%+/year, revenue and cost, and supporting non-financial data, and also manage risks/opportunities and execution (R/O/E). The exit options may be exit value and exit strategy.

Figure 13:
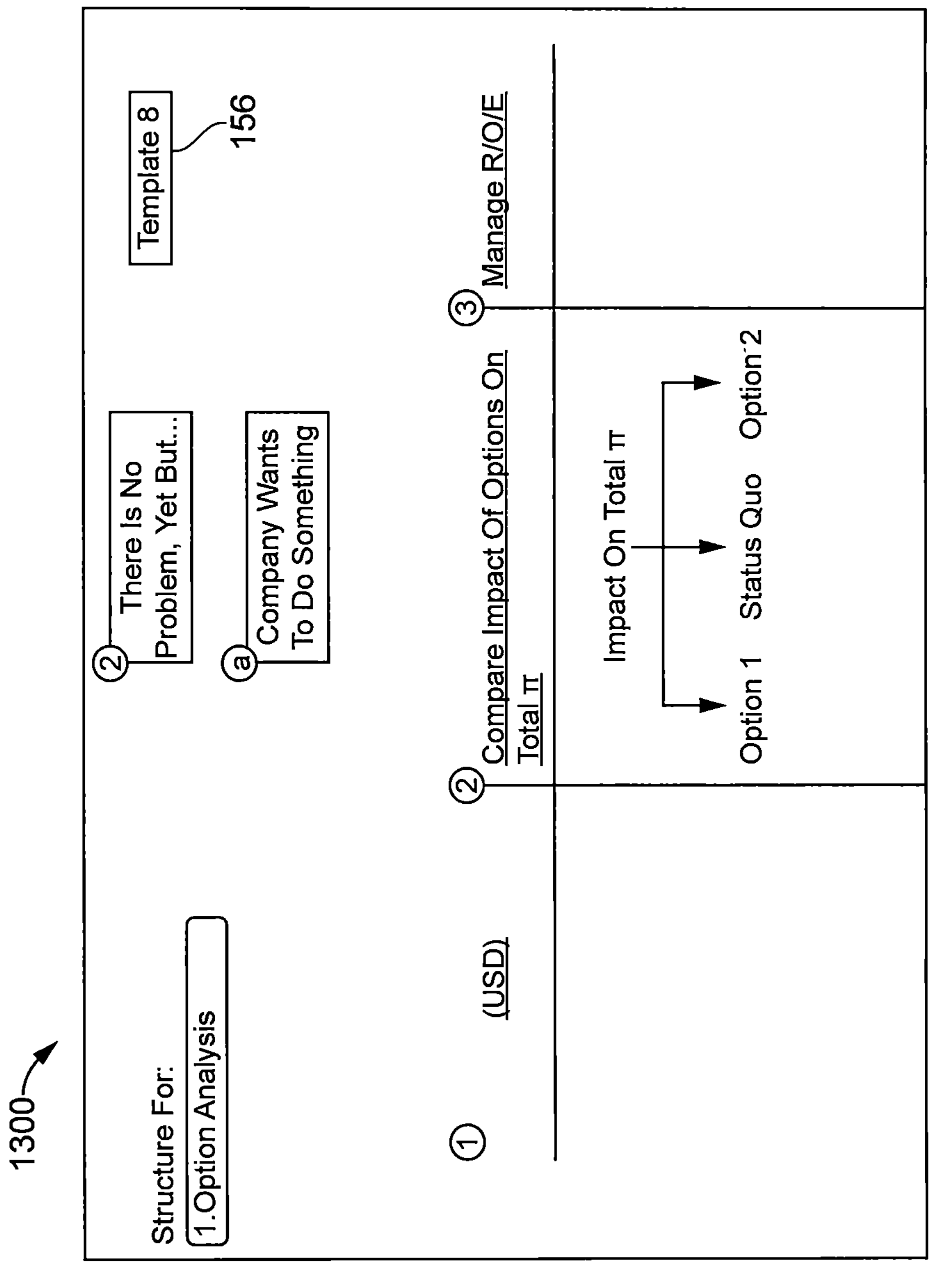
FIG. 13 shows a screenshot of a template 8 in one embodiment of the present invention.

Referring to FIG. 13, a screenshot 1300 of the template 8 156 of the present invention is disclosed. In one embodiment, the template 8 156 is structured for options analysis. In one embodiment, the template 8 156 is categorized and includes, but not limited to, understand the situation in more details (USD), compare impacts of options on total $\pi$, and manage risks/opportunities and execution (R/O/E) for enabling the user/customer/client to further breakdown the key question.

Figure 14:
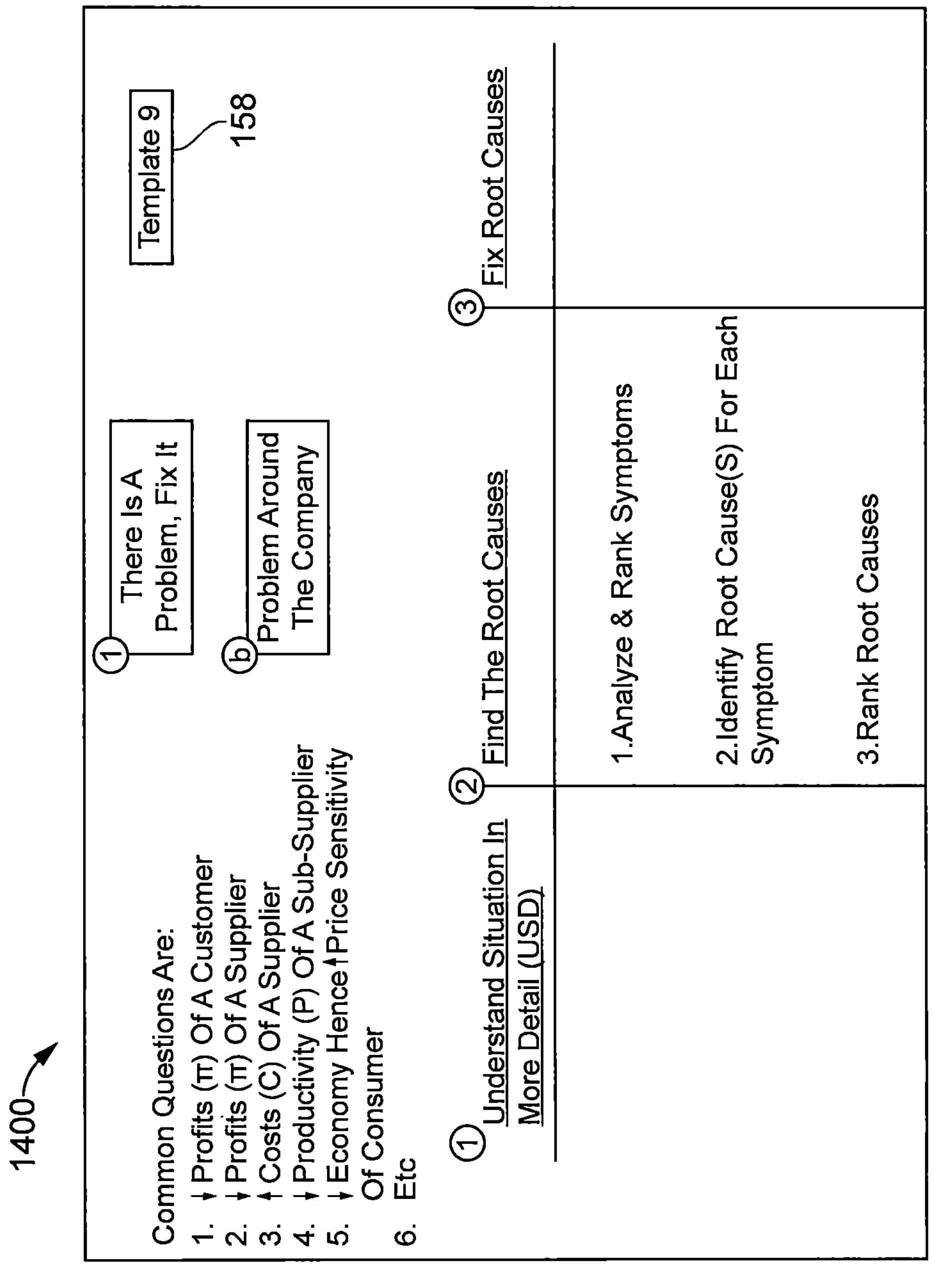
FIG. 14 shows a screenshot of a template 9 in one embodiment of the present invention.

Referring to FIG. 14, a screenshot 1400 of the template 9 158 of the present invention is disclosed. In one embodiment, the template 9 158 comprises one or more common queries such as ↓ profits ($\pi$) of a customer, ↓ profits ($\pi$) of a supplier, ↑ costs (C) of a supplier, ↓ productivity (P) of a sub-supplier, ↓ economy hence ↑ price sensitivity of consumer, etc. In one embodiment, the template 9 158 is categorized and includes, but not limited to, understand the situation in more details (USD), find the root causes, for example, analyze & rank symptoms, identify root causes for each symptom, and rank root causes, and fix the root causes.

Figure 15:
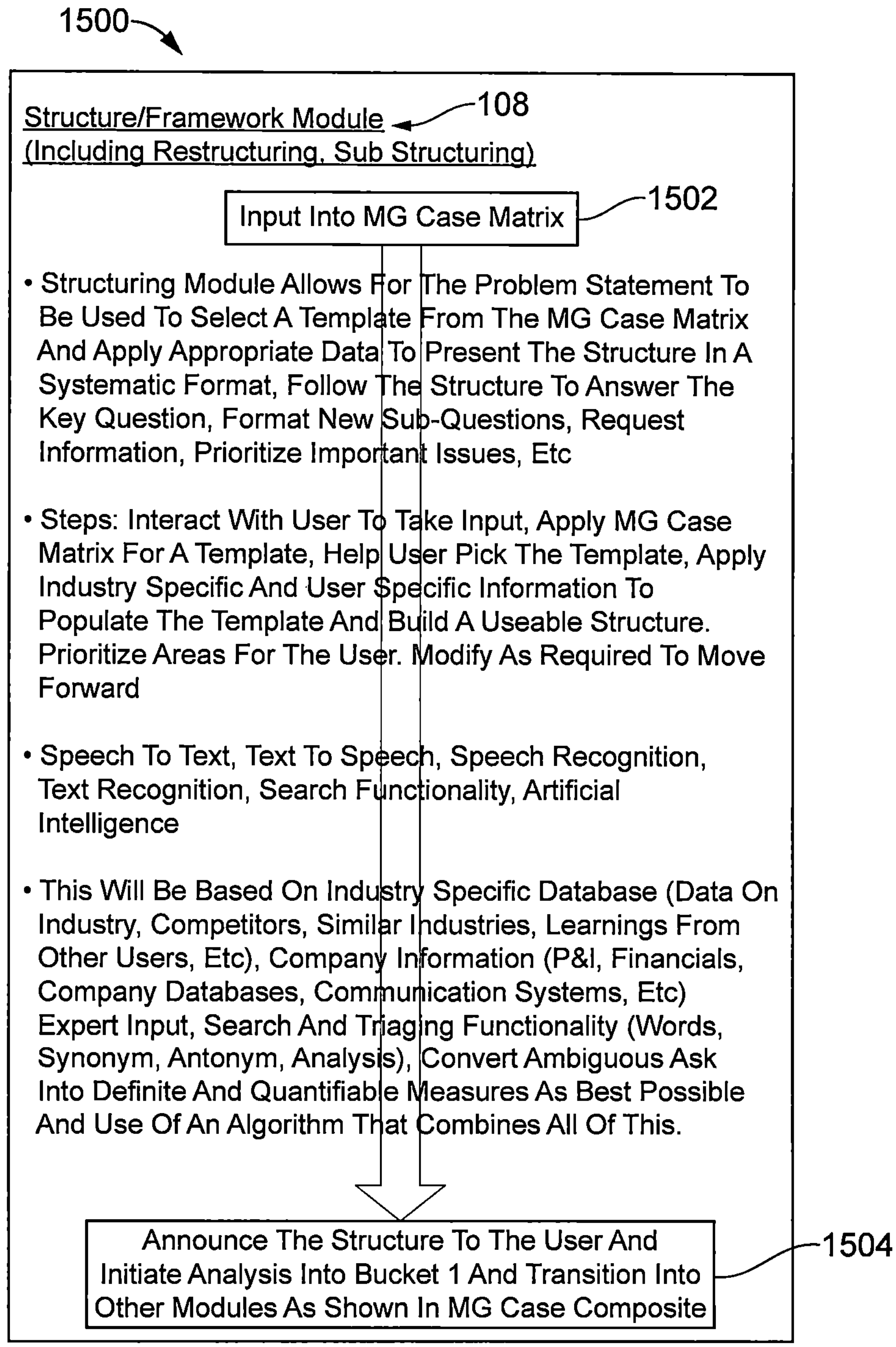
FIG. 15 shows a flowchart of a method of a structure/framework module in one embodiment of the present invention.

Referring to FIG. 15, a flowchart 1500 of a method of a structure/framework module 108 to solve a problem, according to one embodiment of the present invention. The structure module 108 includes restructuring and sub-structuring processes. At step 1502, key questions and problem statements are given as input to the MG case matrix 104, which is definitive and quantifiable. In one embodiment, the structure module 108 allows for the problem statement to be used to select a template from the MG Case Matrix 104 and apply appropriate data to present the structure in a systematic format, follow the structure to answer the key question, format new sub-questions, request information, prioritize important issues, etc.

In one embodiment, the structure module 108 further comprises the follows steps. At one step, the structure module 108 interacts with the user to take input. At another step, the structure module 108 applies MG Case matrix 104 for a template. At another step, the structure module 108 helps user pick the template. At another step, the structure module 108 applies industry specific and user specific information to populate the template and build a useable structure. At another step, the structure module 108 prioritizes areas for the user. At another step, the structure module 108 modifies as required to move forward.

In one embodiment, the structure module 108 further comprises speech to text, text to speech, speech recognition, text recognition, search functionality, and artificial intelligence. This will be based on industry specific database (data on industry, competitors, similar industries, learning from other users, etc), company information (P&L, financial, company databases, communication systems, etc) expert input, search and triaging functionality (words, synonym, antonym, analysis), convert ambiguous ask into definite and quantifiable measures as best possible and use of an algorithm that combines all of this. At step 1504, the structure module 108 announces the structure to the user and initiate analysis into bucket 1 and transition into other modules as shown in MG case composite 102.

Example

The key questions and problem statements comprise, but not limited to, process, apply context, knowledge, research to templates, discern between various view points, and develop viewpoints. The process develops one or more unique questions and populates templates (pen) after processing. Then the previous knowledge base, information from the interviewer, exhibits, etc., industry knowledge, and industry profiles are applied. In one embodiment, the process allows the candidate to provide their viewpoints that are relevant to the question, which may involve research, debates, etc. Also, the middle bucket in the structure must represent the problem statement and key question. Further, the structure details are utilized to explore various areas of the case and cover a comprehensive span.

At one step, the software could build reliable and repeatable structures and frameworks. In one embodiment, the structure is a systematic format. At another step, follow the structure to answer the key question, format new sub-questions, request information, drive the game forward, and prioritize important issues. At another step, the process of announcing the structure is finished and then a hypothesis is picked to start problem-solving.

In one embodiment, the main objective is to structuring, challenges students face, and overcome challenges. For example, management consulting firms solve ambiguous problems and need an organized approach to manage the abstract nature of the problems they face. A structure, in the context of management consulting, is an organized approach. It demonstrates to the clients that the firm is being efficient. Similarly, in a case, the structure addresses the problem in a systematic way and a good structure demonstrates organization at a strategic level. It also streamlines the case performance and helps in time management. Even though structuring is extremely important to success in case interviews, candidates struggle to master this skill.

Referring to FIG. 16, a table 1600 containing structure details of, for example, industry and company context, according to one embodiment of the present invention. These details are critical to use and casing because they could help the candidate or user build a comprehensive and detailed view of the problem landscape and solution landscape in the areas, for example, being structuring, brainstorming etc.

Figure 17:
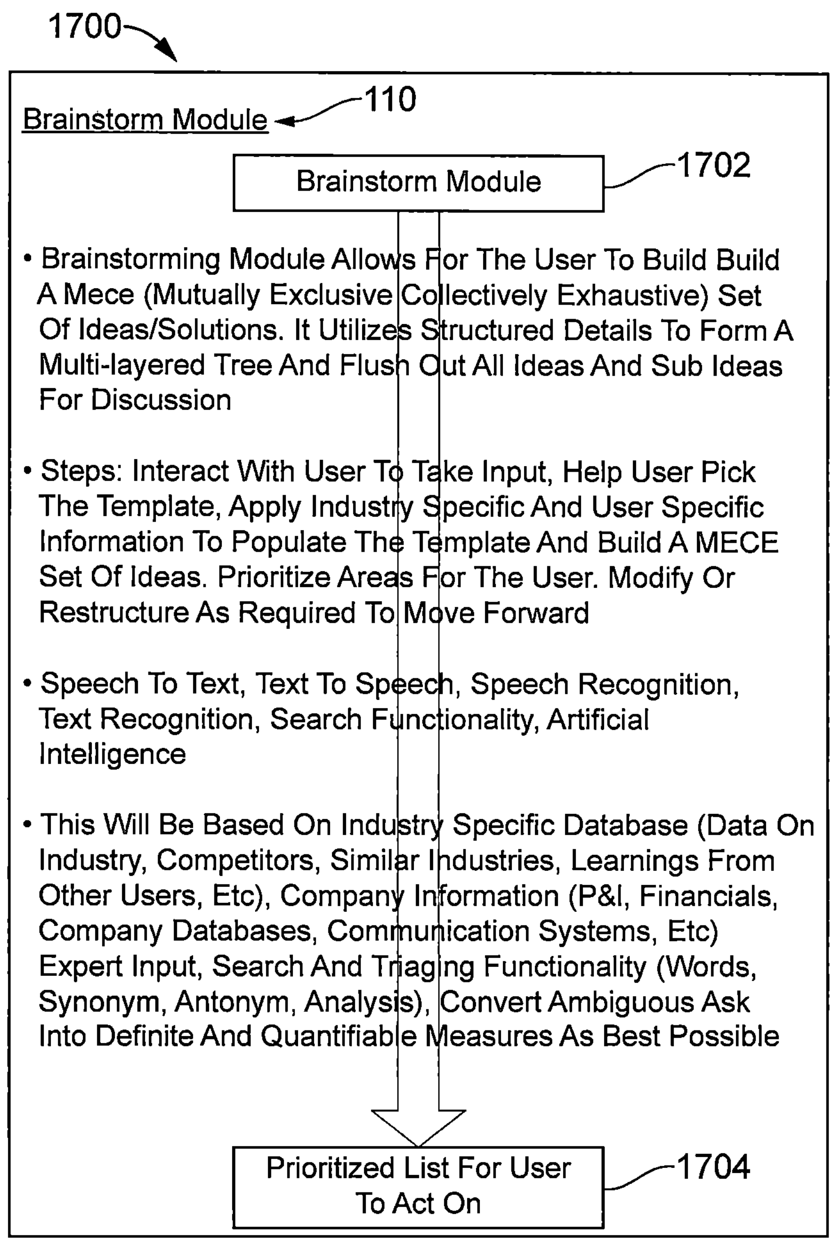
FIG. 17 shows a flowchart of a method of a brainstorming module in one embodiment of the present invention.

Referring to FIG. 17, a flowchart of a method 1700 for brainstorming, according to one embodiment of the present invention. At step 1702, the analyzed data is transferred to the brainstorming module 110. In one embodiment, the brainstorming module 110 is applied for interacting with the user to take input and assisting them to select an appropriate template to apply specific information to populate the template and build a mutually exclusive collectively exhaustive (MECE) set of solutions. In one embodiment, the brainstorming module is configured to perform the following steps. At one step, the brainstorming module 110 interacts with the user to take input. At another step, the brainstorming module 110 helps the user to select the template. At another step, the brainstorming module 110 assists one or more industry specific and user specific information to populate the template. At another step, the brainstorming module 110 the brainstorming module 110 builds an MECE set of solutions to prioritize the issue for the user to act on.

In one embodiment, the brainstorming module 110 further includes one or more components such as speech to text, text to speech, speech recognition, text recognition, search functionality, and artificial intelligence. This will be based on industry specific database (data on industry, competitors, similar industries, learning from other users, etc), company information (p&l, financial, company databases, communication systems, etc) expert input, search and triaging functionality (words, synonym, antonym, analysis), convert ambiguous ask into definite and quantifiable measures as best possible. At step 1704, the brainstorm module 110 prioritize the list for user to act on.

In one embodiment, the transition comprises the following steps. At one step, understand the context of the question. At another step, MG Brainstorm frameworks are utilized and provided to pick the best/closest fit for the situation. At another step, a mutually exclusive collectively exhaustive (MECE) set of ideas could be formed. Being mutually exclusive and collectively exhaustive will provide the complete spectrum. Top-tier management consulting firms are particular about the MECE approach. The templates could aid the users to be MECE at a high level. At lower levels once the users flush out ideas, they start over lapping so the user could weed out the common ones. At another step, the structure details could be used to form a multi-layered tree and flush out all ideas and sub-ideas for discussion. At another step, prioritize ideas based on processing of previous information. At another step, present the framework to the interviewer. This is critical because once the user have showed options, also need to show most probable ones. This step could only be done with context. In a case setting context exists then it is easy to prioritize results.

Example

Typically, brainstorming is thoughts of team's spit-balling ideas, in a room with a whiteboard crop up. In the interview, it is different, where a single candidate alone has to sit and solve the case, so the candidate is expected to brainstorm alone. Moreover, top-tier firms expect structured ideas rather than random thoughts. During brainstorming, when the client asks the question and a consultant does not know the exact answer, then there is a way for the consultant to manage the situation. For example, brainstorming is a way for the consultant to say that the consultant does not know but there is a spectrum where the answer could lie. In other words, the consultant could show the potential set and prioritize where to focus first, based on their context.

When the user does not know the answer, the user selects the brainstorm 110 to think of possible solutions. The BS techniques help someone get a MECE result (mutually exclusive and collectively exhaustive). The brainstorming approach helps the user to quickly develop MECE options. If the options are not MECE then potential solutions could be missed. In one embodiment, data analysis/graph analysis 112 is configured to find answers to the situation. In one embodiment, the data analysis module 112 could help the user to review and analyze the data and gather insights in the given timeframe.

Referring to FIG. 18, a table 1800 of MG brainstorm frameworks, according to one embodiment of the present invention. In one embodiment, the table 1800 comprises one or more types, example questions/templates for each type, and breakdown for each type. The one or more types include, but not limited to, stakeholders/elements, business, formula (2 parts), decision, ensure an outcome or avoid, commodity, solve the issue, growth, functions/tasks, and time dependent. Each type has separate templates or example questions and breakdown. The stakeholder may be various stakeholders or elements involved in the frame who brainstorms, for example, to determine a solution to increase the revenue and why did it go down. They breakdown the information into core and non-core functions required to proceed further. The business professional or executive management brainstorms, for example, to breakdown the analysis, which includes financial/non-financial breakdown and economic/qualitative breakdown. The formula comprises 2 parts, which includes breaking down the information and then repeat. The formula breaks down the information based on profit such as revenue and cost. The profit may be fixed/variable/investment. The decision comprises templates to solve an issue, for example, "why did someone do something", "why did a company not launch digital", and/or "why did it launch digital". It breaks down the information, for example, having choice/no choice, yes/no/maybe, and advantages/disadvantages. The ensure an outcome/avoid comprises templates, for example, "how to avoid or how to sustain", "how to avoid drop in revenue", and how to ensure stable growth" by breaking down the information, for example, preventive/corrective and short term/medium term/long term. The commodity may breakdown the supply demand, for example, supply rod demand and CC. Solve the issue involves solving the issue, not solving the issue, giving perception to solve the issue, solving by themselves, or solving the issue with the help of others. The growth may be organic/inorganic/hybrid. The functions/tasks breakdown into core/non core functions and important/not important functions. The time dependent breaks down into urgent/not urgent, critical/non critical, and short term/medium term/long term.

Figure 19:
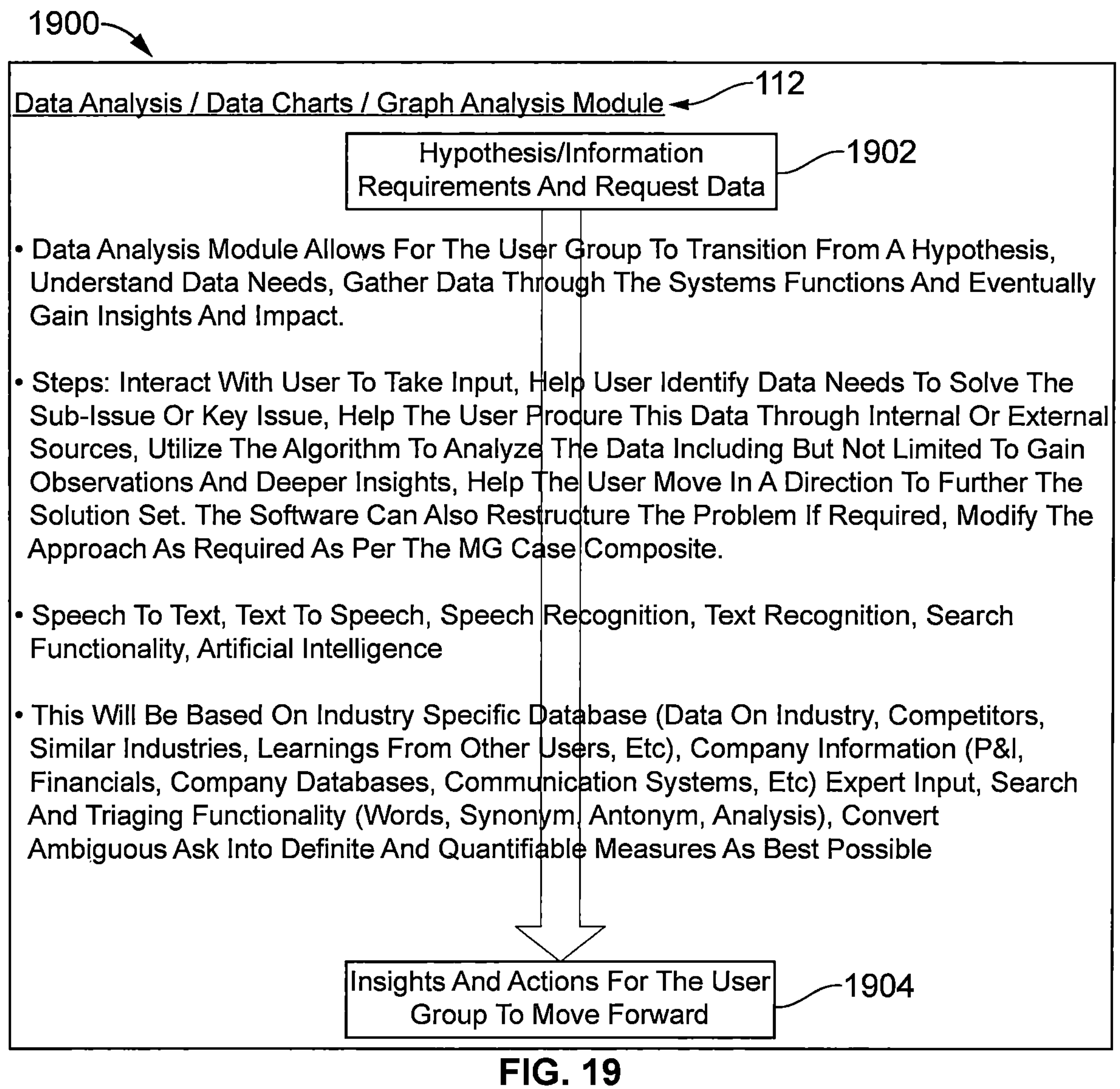
FIG. 19 shows a flowchart of a method of a data analysis/data charts/graph analysis module in one embodiment of the present invention.

Referring to FIG. 19, a flowchart of a method 1900 of the data analysis/data charts/graph analysis module 112, according to one embodiment of the present invention. At step 1902, hypothesize data/information/exhibits requirements and request data are collected. The data analysis module 112 allows the user group to transition from a hypothesis, understand data needs, gather data through the systems functions and eventually gain insights and impact.

In one embodiment, the data analysis module 112 comprises the following steps. At one step, the data analysis module 112 interacts with the user to take input. At another step, the data analysis module 112 assists the user to identify the data needs to solve one or more sub-issues or key issues. At another step, the data analysis module 112 assists the user to procure the data through internal or external sources. At another step, the data analysis module 112 utilizes the algorithm to analyse the data to gain observations and deeper insights. At another step, the data analysis module 112 assists the user to move further in a direction to set solution.

In one embodiment, the data analysis module 112 includes one or more components include, but not limited to, speech to text converter, text to speech converter, speech recognition, text recognition, search functionality, and artificial intelligence. This will be based on industry specific database (data on industry, competitors, similar industries, learning from other users, etc), company information (p&l, financials, company databases, communication systems, etc) expert input, search and triaging functionality (words, synonym, antonym, analysis), convert ambiguous ask into definite and quantifiable measures as best possible. At step 1904, the insights and actions for the user group are moved forward.

Example

Typically, the data analysis comprises the following steps. At one step, understands the information by taking a few seconds to review the data. In one embodiment, the data includes, but not limited to, title, x-axis, y-axis, notes, actual graph, type of graph, chart, peaks valleys. In one embodiment, the chart data (data chart) includes columns, rows, units, totals, etc. At another step, announce meaning of these data to the interviewer. At another step, announce key question that was built at case start phase, if not changed. If that changed, then the key question is updated by restructuring. At another step, re-align the data to match the key question if needed. In one embodiment, the ask, hence re-alignment is required when the data is not match. At another step, observations and explanation are made for example, but not limited to, differences, similarities, trends, benchmarks, qualitative information, segmentation, averages, and total units. At another step, move towards insights at level-1 (for example, UAT/TSBQ—units, averages, totals/trends, benchmarks, segments, qualitative information). At another step, move towards insights at level-2 (for example, cross reference within the chart/data itself across multiple charts/data sets/exhibits, cause/effect, co-relation).

In one embodiment, data analysis is the bridge between a hypothesis and a conclusion. The objective of data analysis is: understand data analysis in a case context, challenges students to face, and helps the candidates to overcome these hurdles. In one embodiment, the candidate analyzes data provided by the interviewer in the following manner. Data could be quantitative, qualitative, or a mixture of the two. Quantitative data is tables, charts, etc. Qualitative could be anything, for example, words, colors, flags, etc. The candidates are expected to request data based on the bespoke structure they have built, analyze the data against the context of the case, and draw actionable insights in a short amount of time.

Figure 20:
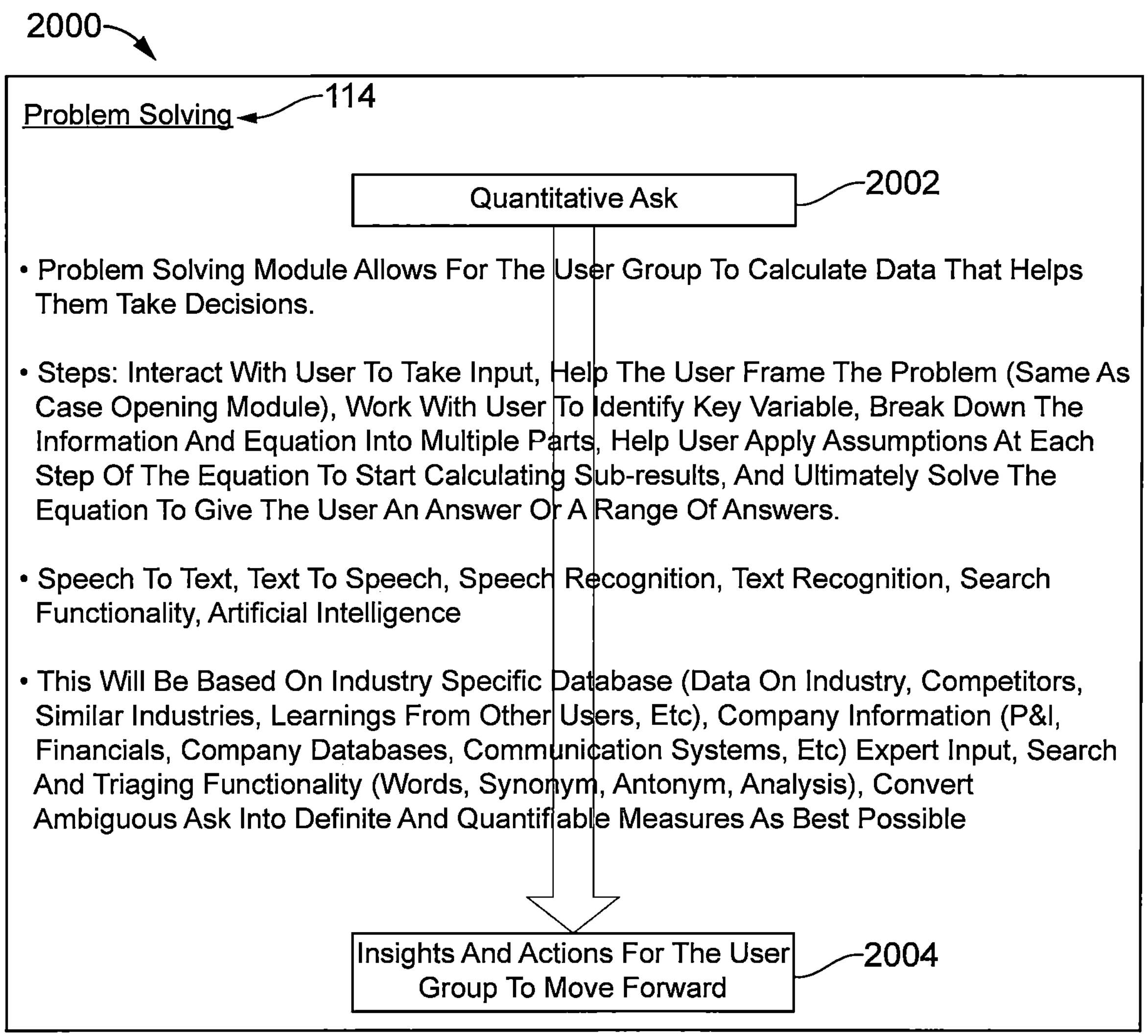
FIG. 20 shows a flowchart of a method of a problem solving module in one embodiment of the present invention.

Referring to FIG. 20, a flowchart 2000 of a method of the problem solving module 114 in one embodiment is disclosed. At step 2002, one or more quantitative data are collected. In one embodiment, the problem solving module 114 allows for the user group to calculate data that helps them to take decisions. In one embodiment, the problem solving module 114 is configured to perform the following steps. At one step, the problem solving module 114 interacts with the user to take input. At another step, the problem solving module 114 helps the user to frame the problem similar to case opening module. At another step; the problem solving module 114 works with the user to identify the key variables. At another step, the problem solving module 114 breaks down the information and equation into multiple parts. At another step, the problem solving module 114 helps the user to apply assumptions at each step of the equation to start calculating sub-results, and solving the equation to give the user an answer or a range of answers.

In one embodiment, the problem solving module 114 further includes one or more components such as speech to text, text to speech, speech recognition, text recognition, search functionality, and artificial intelligence. This will be based on industry specific database (data on industry, competitors, similar industries, learning from other users, etc), company information (P&L, financial, company databases, communication systems, etc) expert input, search and triaging functionality (words, synonym, antonym, analysis), convert ambiguous ask into definite and quantifiable measures as best possible. At step 2004, the problem solving module 114 presents insights and actions for the user group to move forward.

Figure 21:
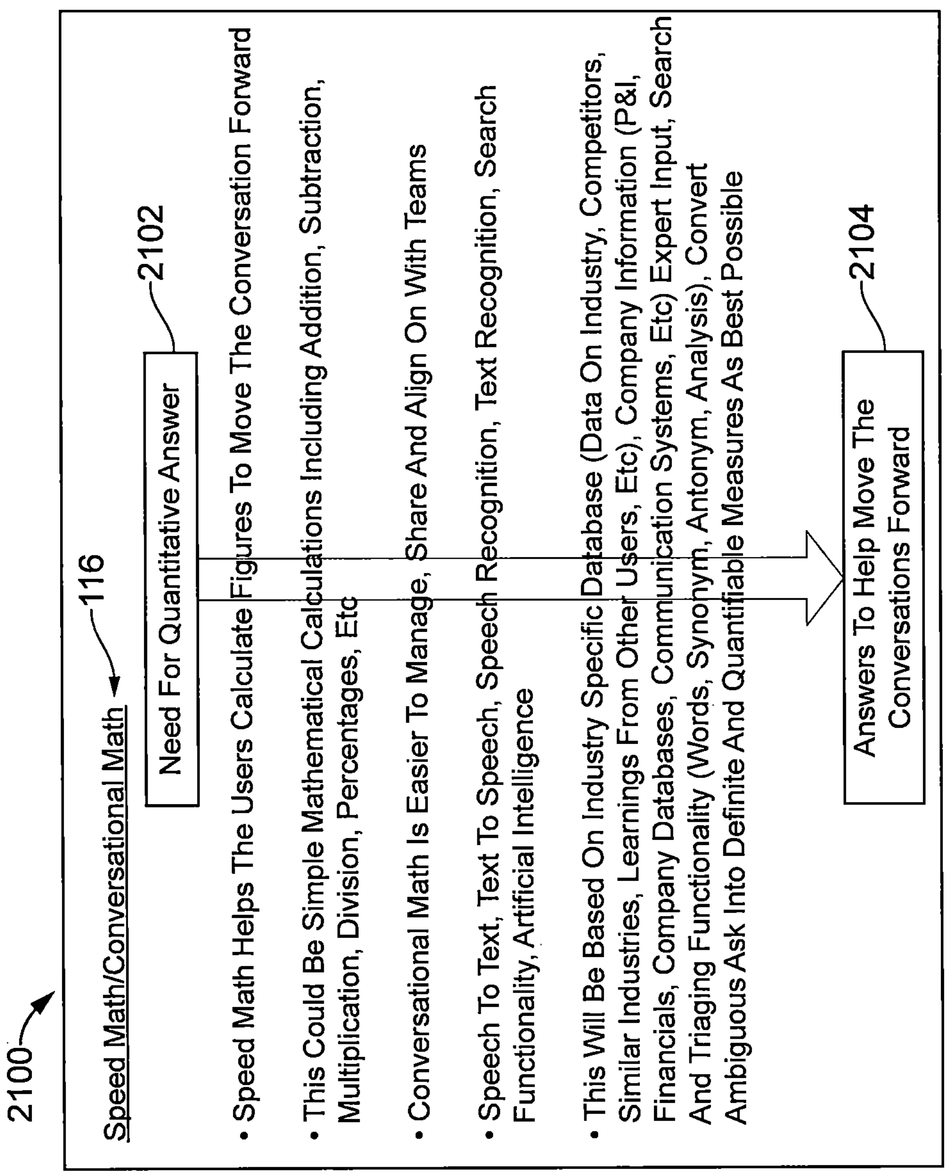
FIG. 21 shows flowchart of a method of a speed math/conversational math module in one embodiment of the present invention.

Referring to FIG. 21, a flowchart 2100 of a method of a speed math/conversational math module 116 in one embodiment is disclosed. At step 2102, the speed math/conversational math module 116 needs for quantitative answer. In one embodiment, the speed math/conversational math module 116 helps the users calculate figures to move the conversation forward. This could be simple mathematical calculations including addition, subtraction, multiplication, division, percentages, etc. The speed math/conversational math module 116 is easier to manage, share, and align on with teams speech to text, text to speech, speech recognition, text recognition, search functionality, and artificial intelligence. This will be based on industry specific database (data on industry, competitors, similar industries, learning from other users, etc), company information (p&l, financial, company databases, communication systems, etc) expert input, search and triaging functionality (words, synonym, antonym, analysis), convert ambiguous ask into definite and quantifiable measures as best possible. At step 2104, the speed math/conversational math module 116 provides answers to help the user to move the conversations forward.

Figure 22:
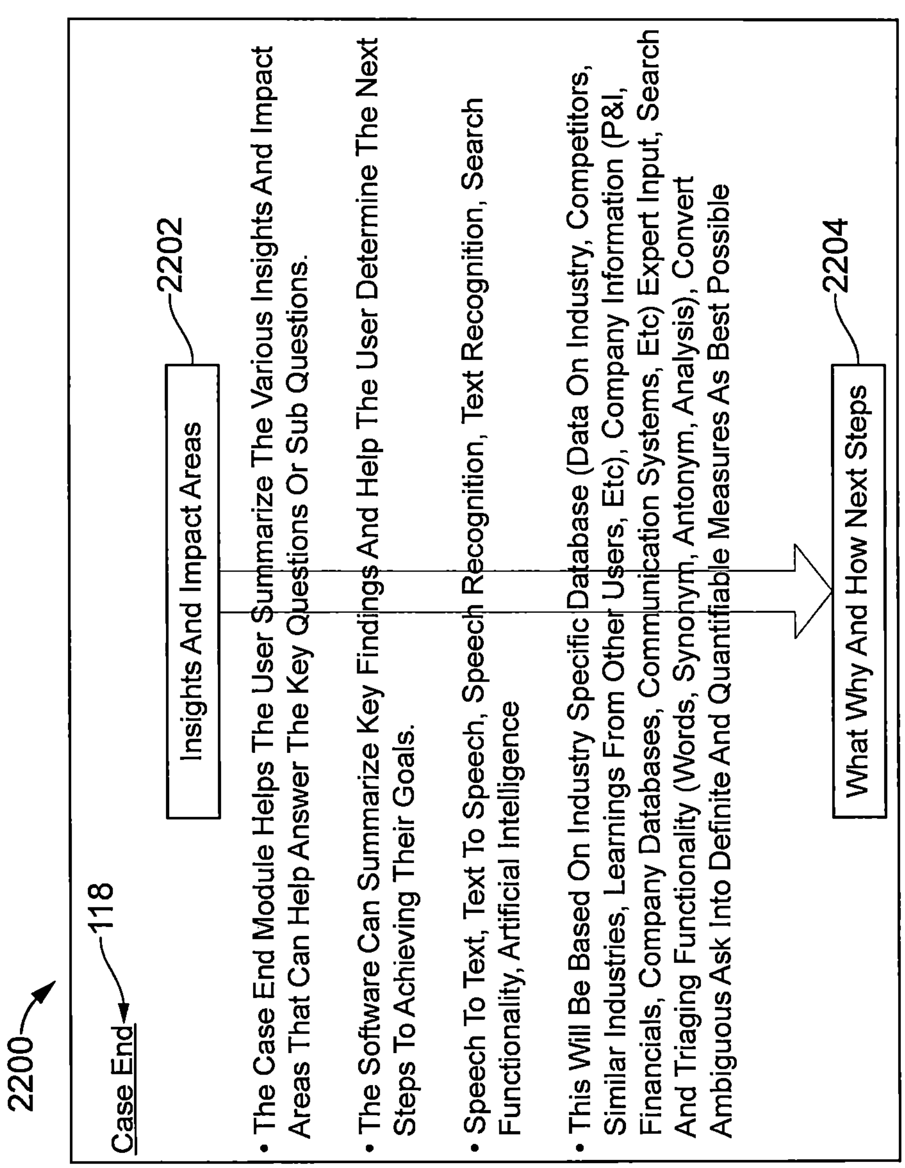
FIG. 22 shows a flowchart of a method of a case end module in one embodiment of the present invention.

Referring to FIG. 22, a flowchart 2200 of a method of a case end module 118, according to one embodiment of the present invention. At step 2202, the case end module 118 summarize the insights and impact areas. In one embodiment, the case end module 118 helps the user to summarize the various insights and impact areas that can help answer the key questions or sub questions. In one embodiment, the decision making engine 102 summarizes key findings and help the user determine the next steps to achieving their goals. In one embodiment, the case end module 118 further comprises one or more facilities such as speech to text, text to speech, speech recognition, text recognition, search functionality, and artificial intelligence. This will be based on industry specific database (data on industry, competitors, similar industries, learning from other users, etc), company information (p&l, financial, company databases, communication systems, etc) expert input, search and triaging functionality (words, synonym, antonym, analysis), convert ambiguous ask into definite and quantifiable measures as best possible. At step 2204, the case end module 118 presents a way to move forward, for example, "what, why, and how next steps".

In one embodiment, the system utilizes a method for assisting a user, a computer, and/or user and computer to make decisions in different fields. In some embodiments, the user may be, but not limited to, individuals, adults, kids, business or non-business organizations, team/group of members (families, communities, etc), profit and non-profit companies, government organizations, personal, public, private, or any other entities. The method performs the following steps to standardize decision making process to help entities such as people, computers and companies to make any type of decisions. At one step, the user enters into the system by creating a user profile using one or more user credentials. In one embodiment, the user creates the user profile using one or more credentials such as user name, email ID, and password. At another step, one or more user data or problem or issue is given as input to the system. At another step, a case open module 106 is applied to analyze the user data and assists the user to refine the input into a meaningful problem statement for a structure module 108. In one embodiment, the case open module 106 is configured to allow the user to listen, reiterate, breakdown of information, and verify the key objectives and constraints, and then build a specific and measurable problem statement. In one embodiment, the structure module 108 is configured to perform the steps of: interacting with the user to take input; applying MG case matrix 104 for selecting an appropriate template; applying industry specific and/or user specific information to populate the template, and building a usable frame structure.

At another step, an appropriate template is selected from an MG case matrix or MG case composite or decision making engine 102 to understand the case situation in more detail, find one or more root causes, and fix the root causes for the case. At another step, a data analysis module 112 is applied for allowing the user to transition from a hypothesis, understand the data needs, gather data through the systems functions and eventually gain insights and impact. In one embodiment, the analysis module 112 is configured to perform the following steps of: interacting with the user to take input; assisting the user to identify the data needs to solve one or more sub-issues or key issues; assisting the user to procure the data through internal or external sources; utilizing the algorithm to analyse the data to gain observations and deeper insights, and assisting the user to move further in a direction to set solution.

At another step, a brainstorming module 110 is applied for interacting with the user to take input and assisting them to select an appropriate template to apply specific information to populate the template and build a mutually exclusive collectively exhaustive (MECE) set of solutions. In one embodiment, the brainstorming module is configured to perform the following steps of: interacting with the user to take input; helping the user to select the template; applying one or more industry specific and user specific information to populate the template, and building an MECE set of solutions to prioritize the issue for the user to act on.

At another step, a problem solving module 114 is applied for allowing the user to calculate the data that helps them in decision making. In one embodiment, the problem solving module is configured to perform the following steps of: interacting with the user to take input; helping the user to frame the problem similar to case opening module; working with the user to identify the key variables; breaking down the information and equation into multiple parts; helping user to apply assumptions at each step of the equation to start calculating sub-results, and solving the equation to give the user an answer or a range of answers. At another step, a case end module 118 is applied to help the user to summarize the various insights and impact areas, thereby assisting the user to determine the next steps to achieve their goals. In one embodiment, the decision-making engine offers an integrated, end-to-end process configured to assist the user to solve the issue and make a decision or closing the case, thereby training the user or organization to improve critical thinking and decision making at various fields.

Example

Figure 23:
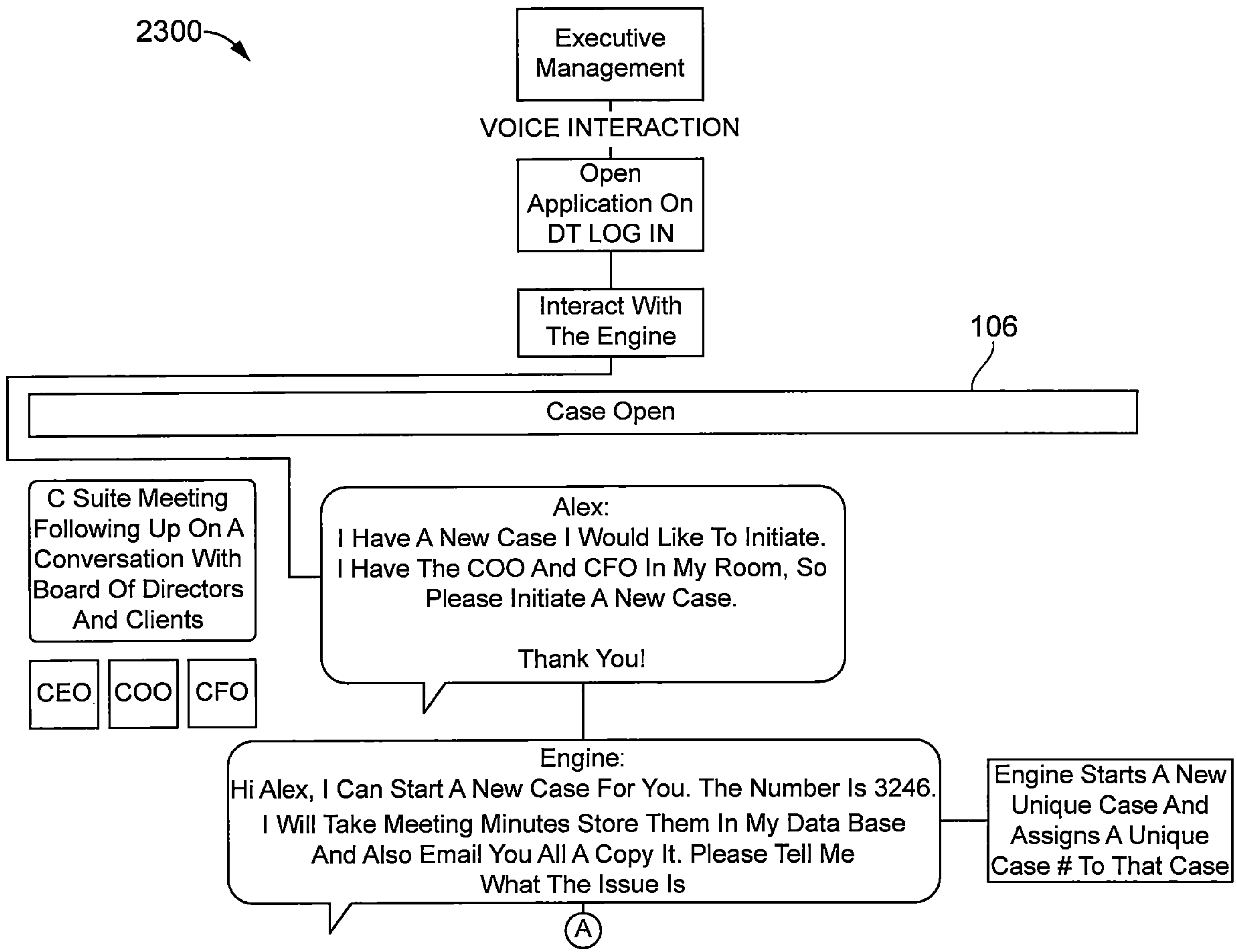
FIG. 23 shows an example flowchart illustrating decision making process in one embodiment of the present invention.

Referring to FIG. 23, an example flowchart 2300 of the system (for example, miro) illustrating a work flow for a business problem using MG case matrix 104 for business in a corporation, according to one embodiment of the present invention. In one embodiment, the system allows the user to initiate the engine work flow to solve the business problem. In one embodiment, the user may be any of the executive management officials/c-suite members/board of directors such as chief executive officer (CEO), chief operating officer (COO), and/or chief financial officer (CFO). In one embodiment, the system may be an application program, an application software, a mobile application, or a web-based application (hereinafter referred as application). In one embodiment, the application may run on a browser, an android, and an IOS. The system is opened on a user device or communication device. In one embodiment, the user device is a desktop (DT). In some embodiments, the user device may be any one of a mobile phone, a smartphone, a tablet, a laptop, a computer, or other suitable electronic communication device.

In one embodiment, the system allows the user to create a user profile by registering into the system using one or more user details such as email-ID, phone number, and password. Upon successful registration, the system allows the user to log-in into the system by entering user name and password. In one embodiment, the user may enter into the system using other networking platforms such as, but not limited to, slack, office 365, and Facebook®. In one embodiment, the system includes an engine or a decision making engine or core thinking module. In one embodiment, the user may communicate/interact with the decision making engine via voice interaction.

In one embodiment, the system further comprises a plurality of modules. The plurality of modules are case open module 106, structure module 108, brain storming module 110, data analysis module 112, problem solving module 114, speed math module 116, and case end module 118. In one embodiment, the system integrates the functions and interactions of all the modules to provide support to make decisions for users. Each module in the system processes a certain part of a decision.

In one embodiment, each module performs a certain part of a decision and interacts with various facets of the entity either internal or external to enable the decision making process. At one step, the system accesses ERP case open module 106 for forecast from finance and shares information with the user. At another step, the system transitions to structure module 108 from case open module 106. In one embodiment, the system builds schedules to make decision with multiple steps. At another step, the system interacts with HR systems and suggests names to the user for follow up. At another step, the system transitions from structure module to data analysis acquisition module 112, where the system interacts with the organization chart and suggests names to user. At another step, the system interacts with one or more communication systems and builds email for multiple users and sets a meeting using the schedule it built before. At another step, the system transitions from data analysis acquisition 112 module to data analysis solve module, where the system acquires the data and shares with multiple users and updates schedule accordingly and allows the users to aware of the updated schedule. At another step, the system interacts with users to set meetings to complete debottlenecking of other steps in the process and updates schedule accordingly.

At another step, the system transitions from data analysis solve module to brainstorming module 110, where the system interacts with the users and suggests who need to attend the meetings. At another step, the system transitions to restructuring module or structuring part-2 108, where the system interacts with the user and organization chart systems and suggests other users to complete acquisition of production workstream of problem. At another step, the system interacts with the external vendors via restructuring module to get information that is required to take decisions. At another step, the system interacts with the users and also with company and engine database to build a risk register. At another step, the system transitions from restructuring module to case end module 118, where the system interacts with the users and shows updated schedule and summarizes information or conclusions and next steps to proceed further in decision making.

In one embodiment, the system allows the user to initiate the engine work flow for making an appropriate decision to solve the business problem. In one embodiment, the decision-making engine interacts internally with users of various facets of the organization including, but not limited to, users at various levels (Board, C suite, VPs, Directors, etc), ERP, Data bases (HR, Supply chain, etc), Communication systems (Email system, Chat systems, etc), RASCI charts, Org charts, and the like. In one embodiment, the decision-making engine interacts externally with stakeholders, contractors and vendors to answer questions, help shortlist vendors, request specific data sets, help direct vendors, build contracts to vendors, and the like. In one embodiment, the decision-making engine works with existing or new facets of the organization to set agenda, set meetings, assign tasks, align teams, set schedules, drive schedules, modify schedules, track outcomes, and the like.

The process of each modules to make decision are described as follows: At first, the system allows the user to enter into the case open module 106 upon successful log-in into the system. Whenever a problem/issue arises in the business, the executive management conducts a meeting following up on a conversation with the board of directors such as CEO, COO and CFO, and clients and interacts with the decision making engine to make decision to solve the problem. At each step, the decision making engine confirms the issue with the user in a clear manner and prepares structures to solve the issue.

The example flowchart 2300 exemplarily illustrates the start, middle, and end steps of an example case which deals with the manufacturing demand of pillows of a company. The following steps describe the functionality and process of the case open module 106 as shown in FIG. 2. At one step, the user or executive management members such as CEO, COO, and CFO of the company communicates/interacts with the decision making engine to initiate a new case. In one embodiment, the executive management may interact with the decision making engine via voice interaction. The system allows the user, for example, CEO to give voice comment, for example, "I (CEO—Alex) have a new case I would like to initiate. I have the COO and CFO in my room, so please initiate a new case. Thank you!". The decision making engine analyses the case using case open module 106 and responds back to the CEO with the case number, for example, "Hi Alex, I can start a new case for you. The case number is 3246. I will take meeting minutes and store them in my database and also email you all a copy of it. Please tell me what the issue is".

At another step, the system allows the user to explain the issue to the case open module 106 in detail to make it clearly understand the issue to proceed further to solve the issue, for example, "As you know our company makes pillows in the US. We sell these pillows to a number of boutique stores. Consumers really like these pillows because they remain soft for a longer period of time due to a patented technology that is owned by our company. The pillows are very popular that our clients and we have been having trouble keeping up with the demand in the west coast. We would like to solve this issue, how can you help us by first starting to structure this?". The case open module 106 replies back with its understanding based on the user input, for example, "Thank you Alex fro the information. Let me make sure that I understand the issue. Our company, puffy pillows, makes pillows. We are interested in the operations on the west coast of the US. We sell to a number of boutique stores. These pillows remain soft and because the technology is patented. These are very popular and the demand is very high and the key question is how do we solve the issue and you wanted to understand how I can structure this problem for you. Is that correct?".

At another step, the user ensures the first-level understanding of the case open module 106, for example, "that's right". The case open module 106 then raise few verification queries to clearly understand the issue before initiating the case, for example, "I'd like to clarify few things and ask few verifying question before I begin. Is that alright?". At another step, the user allows the case open module 106 to raise verification queries by saying "Yes". The case open module 106 raise verification queries relating to company's operation in different locations, for example, "the company has operations in west and east USA. We are only concerned about the west in this case. Is that accurate?".

At another step, the user ensures the second-level understanding of the case open module, for example, "Yes only the west at this point". The case open module 106 then raise queries relating to business details and product demand by comparing the present data with the previously stored data in the database to determine the root cause of the problem/issue, for example, "thanks alex, I understand the business details from the company. We sell to boutiques and the boutiques sell to consumers. A am assuming that the bottleneck is not at the boutique level. From what I can tell by looking at the last months data, most boutiques are increasing their order size. This is most likely within our company. Does that sound accurate?".

At another step, the user ensures the third-level understanding of the case open module 106, for example, "yes, the boutiques have contacted me and COO and are looking for more product". The decision making engine analyses the case and provide response, for example, "Alex, you mentioned that we own this technology. Can I assume that this patent has some ways to go before it runs out". At another step, the user confirms the understanding of the case open module 106 by saying "Yes". The decision making engine checks the marketability of the product, for example, "Great! And I'll assume that this protects the current market that we are in". At another step, the user confirms the marketability of the product and allows the case open module 106 to proceed further, for example, "that's fair, lets proceed". The case open module 106 further analyze the data and accesses company's ERP (Enterprise resource planning) and financial information like forecast from the finance department. The case open module 106 raise few queries to the user regarding product demand, for example, "as far as demand projection goes, the finance department in projecting a 2% month over month increase from the data I have from the finance database. The current supply to all customers in west is 6000 pillows a month. At 5% the supply increase to 6,120 a month. I understand from this conversation, that will not be enough. What is the new demand? The other question is should we update the forecast to reflect this new demand?".

At another step, the user provides response and suggestions/comments to the case open module 106 to increase the productivity. The user provides response as "I talked to the COO and the sales department and they are projecting a sustained demand for 2000 pillows a day. For this analysis let assume that the demand will be 2000 pillows a day. Let the finance department know to update the projection as a sensitivity analysis. We don't need to change the base forecast just yet. Also, meeting this supply from east US is not an option". Now, the case open module 106 summarizes the input received from the user, for example, "Thank you Alex, to summarize, our current supply is 200 pillows per day, current demand is 2000 pillows per day and I am assuming that this will continue to remain stable at 2000 pillows per day?".

At another step, the user ensures the response received from the case open module 106, for example, "That's correct!". The case open module 106 then analyse the problem and raise a query for timeline to achieve the target. For example, "Okay. So, the problem is how do we get the supply up from 200 pillows per day to 2000 pillows per day. The difference is 10 times so that's pretty high. I am wondering what is the timeline to achieve this because the delta is very big. I'd imagine it will take some tome to get there". At another step, the user provides timeline to the case open module 106, for example, "Actually, because the demand is high, we'd like to capitalize on this demand and fulfill the customer's needs. Therefor, we're looking to achieve something in one year's time". The case open module 106 finally frame the exact problem, for example, "Thanks. So, ultimately we're trying to do is increase the supply from 200 pillows per day to 2000 pillows per day within one year". At another step, the user ensures the problem statement framed by the case open module 106, for example, "That is correct".

In one embodiment, upon receiving response from the user, the decision making engine frames a structure to the problem using the structure module 108. The following steps describe the functionality and process of the structure module 108 as shown in FIG. 15. At one step, the structure module 108 analysis the templates to pulls up a right template from the MG case matrix 104, for example, "Thank you Alex. Now, I'd like to answer your first question as to how I can build a structure to solve this problem. I can bring this up in a second. Thank you". At another step, the structure module 108 pulls up the right template to solve the problem, fro example, "Thank you Alex. I have picked a structure to solve this issue. I will announce it to you. We can solve the problem in three steps. The first is to understand the current situation. The second is to find the root cause of why the supply is 200 pillows per day. The third is to fix the root cause and increase the supply to 2000 pillows per day in one year".

At another step, the structure module 108 accesses the production layout from the database as shown in template-1 142. The structure module 108 analyses the current production and understand the process in west coast in detail. Further, the structure module 108 focuses on high level process in the system and analysis to understand if there are any bottlenecks, for example, "In the first bucket, there are three areas I'd like to look at. First the current production. I would like to understand the process in the west coast in detail. I can see that the high level process in the system is raw material procurement, operations and delivery to our customers. The second is I'd like to understand if there are any bottlenecks. Currently the hypothesis is, yes there are bottlenecks".

At another step, the structure module 108 suggests different ways to achieve the goal, for example, "we have to increase the production by 10 times. I don't think even id we de-bottleneck the plant, we can meet the gap. So we might have to check how much can we meet with de-bottlenecking. If we cannot achieve the goal of producing 2000 pillows a day, then I'd like to look at the other ways of increasing supply. It could be increasing capacity or outsourcing, so on, so forth". At another step, the structure module 108 rank the causes and find the bottlenecks and then find the root causes for those causes, for example, "in the second bucket, I'd like to rank the causes I find from those bottlenecks and then find the root causes for those causes". At another step, the structure module 108 fix all the root causes and check the targets, for example, "in the third bucket, I'd like to do two things. First, fix all root causes and check out target. If we don't meet our target of 2000 pillows per day, then I'll start looking at other ways. If that's okay, I'd like to begin". At another step, the user responds to the structure described by the structure module 108 for the problem statement, for example, "that's a very good structure. Lets start solving the first bucket". At another step, the structure module 108 then asks the user regarding time-frame to complete the analysis, for example, "I can also setup a rough schedule to match this structure and start gathering the right stakeholders. Do you have an end time-frame in mind to complete this analysis?". At another step, the user responds to the structure module 108 with the time-frame, for example, "I have a board meeting in 2 months. Maybe we can use that as the end date". The user then approves and proceed the structure framed by the structure module 108. At another step, the structure module 108 frames the rough schedule to start the case, for example, "oh here is the rough schedule and I can start the case now. Thanks".

In one embodiment, the system then directs to the data analysis module 112 (shown in FIG. 19) for data acquisition. The system utilizes the data analysis module 112 configured to perform the following steps to describe its functionality and process for data acquisition. At one step, the data analysis module 112 allows the user to understand the pillow manufacturing process at a high level, capacity, and actual production. These data helps to check the hypothesis that a bottleneck exists. At another step, the data analysis module 112 requests the data relating to pillow manufacturing from internal team members including a second user or production VP, a third user or director of production, and production staff, for example, "Alex, we can request this data from the internal teams, starting with the VP of production under the COO. I do not have access to that data set yet". The user then allows the team to verify the data to match this format, for example, "that sounds about right. Lets get the team to verify this and provide data to match this format". At another step, the data analysis module 112 shares a list of stakeholders that will receive this information to start work based on RASCI chart in HR record, such as direct reports, other groups, and indirect reports, and a backup folks (in case someone is on vacation). The data analysis module 112 sets timelines for follow up, shows sample email to user, and builds group structure. At another step, the user schedules a meeting to assign the structure to the team to get the data, for example, "Great! Lets schedule a meeting and assign them this structure to get the data". At another step, the data analysis module 112 sends meeting invitation to the second user or production VP, for example, "I have drafted the mails and scheduled the meetings. Should I send this to the VP". The user allows the data analysis module 112 to send the meeting schedule to the VP, for example, "Yes! Please proceed". The user approves and allows the data analysis module 112 to proceed further.

The second user or production VP receives the mail and meeting details to gather the current company's production profile. In one embodiment, the email defines the task as per the structure generated as shown in template-1 142. In one embodiment, the second user interacts with the decision making engine via voice interaction. At one step, the engine collects the details of the production process, latest data, and bottlenecks from the production VP as the production VP has the access to the production database, for example, "Hi Martin, based on the c suite discussions, the CEO and COO would like to know about the production process and bottlenecks. You are the VP of production so you might have access to the latest data to help us move forward. I could not access it from the database". The second user may provide the pillow manufacturing process and parameters after discussing with the team, for example, "I can provide the pillow manufacturing process and parameters after discussing with my team. Lets send them emails and tasks". At another step, the engine suggests a few names from the team to the second user to set a meeting to meet the overall schedule set by the c suite, for example, "Thank you. I can suggest a few names from your team and set a meeting to meet the overall schedule set by the c suite". The user may acknowledges the suggestion made by the engine, for example, "sounds great! thanks". Upon receiving acknowledgement from the second user, the engine drafts a list of stakeholders to receive the emails and tasks to start work, for example, "here are the list of stakeholders that will receive this to start work based on RASCI chart in HR records, which includes direct reports, other groups, and indirect reports, backup folks (in case someone is on vacation), timelines for follow up, shows sample email to user, and builds group structure". At another step, the engine gets permission from the second user to send the mails and scheduled meetings to the listed users, for example, "I have drafted the mails and scheduled the meetings. Should I send this to the middle management or third user". The second user approves and allows the engine to proceed further, for example, "sounds great! thanks".

In one embodiment, the middle management or director of production or third user and the staff members receive the mail and scheduled meeting by the engine. In one embodiment, the email defines the task as per the structure generated as shown in template-1 142. In one embodiment, the second user interacts with the decision making engine via voice interaction. At one step, the engine collects the production details such as current production stats and bottlenecks from the director of production or third user for third user or VP of production, for example, "Hi Andy (director of production), the VP of production wants to know more about the current production stats and bottlenecks". The third user informs the engine to format the email to the shop floor supervisors/managers to provide the latest information, for example, "I can check with my shop floor supervisors/managers to provide the latest information. Please format this email you send me for them". At another step, the engine acknowledges, for example, "for sure!", and drafts a list of stakeholders to receive the emails and tasks to start work, for example, "here are the list of stakeholders who will receive the mail to start work based on RASCI chart in HR records, which includes direct reports, other groups, and indirect reports, backup folks (in case someone is on vacation), timelines for follow up, shows sample email to user, and builds group structure". At another step, the engine gets permission from the third user to send the mails and scheduled meetings to the listed users or staff, for example, "I have drafted the mails and scheduled the meetings. Should I send this to the staff members or production staff". The third user approves and allows the engine to proceed further, for example, "sounds great! thanks".

In one embodiment, the production staff receives the mail and scheduled meeting set by the engine. In one embodiment, the email defines the task as per the structure generated as shown in template-1 142. In one embodiment, the production staff interacts with the decision making engine via voice interaction. At one step, the engine requests details such as production process and latest parameters like capacity and actual production per step to the production staff, for example, "the executive management and the director of production need the production process and latest parameters like capacity and actual production per step". The production staff request time to check the final figures before submitting them to the c suite, for example, "we can get this information in a day. We just need to check the final figures before submitting them to the c suite". The engine then send emails for updates to the stakeholders, for example, "Thanks! I will inform the stakeholders". The staff submits the latest data regarding production profile of the puffy pillows in the engine after one day, for example, "here is the latest data. We have checked it with our team". In one embodiment, the data includes capacity and throughput at different stages such as preparation (1), fill (2), puffing (3), packing (4), and storage and shipping (5). The engine confirms with the staff regarding the steady production rate for the recent past, for example, "thanks, just to confirm, this represents steady production rate for the recent past and should sustain for the foreseeable future or in other words should be fairly steady from a high level perspective". The user then acknowledges as "yes, you can use this as a steady state for the sake of calculation". The engine now send the data to the director and updates the task list, for example, "thanks! I will send this to the director and update the task list. Please also update the database with this information so I can retrieve it next time".

In one embodiment, the middle management or director of production or third user receives the mail for data analysis for production profile from the engine. In one embodiment, the email defines the task as per the structure generated as shown in template-1 142. In one embodiment, the third user interacts with the decision making engine via voice interaction. At one step, the engine describes the actual goal and the bottleneck in the current production process to the third user to fix the problem, for example, "our original hypothesis was that there are bottleneck in the current production process. From this data we see that the actual production is only 200 pillows per day but the capacity of the storage is 1000 pillows per day. That means there is a gap of 800 pillows per day. There is definitely a bottleneck at the puffing stage where the capacity and throughput are 200 only. Thinking about the key goal that we had to produce 2000 pillows per day. So what we should do is to figure our what the causes are, then find the root causes and then fix those and then I'll check id we are at 2000 and proceed from there". At another step, the engine requests the third user to share the above details with the production VP or second user, for example, "would you like to share this with the production VP?". The third user approves the request and informs the engine to arrange a meeting with the production VP and staff to go through the data, for example, "yes, lets book a meeting with the VP, me, and the staff to go through this data. We can then prep the VP also for the meeting with the c suite". At another step, the engine drafts a list of stakeholders to receive the emails and tasks to start work, for example, "here are the list of stakeholders who will receive the mail to start work based on RASCI chart in HR records, which includes direct reports, other groups, and indirect reports, backup folks (in case someone is on vacation), timelines for follow up, shows sample email to user, and builds group structure". At another step, the engine gets permission from the third user to send the mails and scheduled meetings to the listed users or staff, for example, "I have drafted the mails and scheduled the meetings. Should I send this to the staff". The third user approves and allows the engine to proceed further, for example, "yes! Please proceed".

In one embodiment, the production VP or second user receives the mail and scheduled meeting by the engine for data analysis of production profile. In one embodiment, the email defines the task as per the structure generated as shown in template-1 142. In one embodiment, the second user interacts with the decision making engine via voice interaction. At one step, the engine presents the data requested by the VP production and requests for approval to set a meeting, for example, "Hi VP production, the data you requested is available. The initial hypothesis is correct. The data shows there is a bottleneck at the puffing stage. The director of production or third user has requested a meeting to start solving this issue. I can set up a meeting with you and your direct reports who are part of this case. Do you approve?". The VP production approves the request, for example, "yes for sure, I am curious to see what the team and you come up with". At another step, the engine sets a meeting based on the availability of meeting members, for example, "meeting is set based on availability, please check your calenders". Upon receiving meeting date and time, the VP production approves the request and allows the engine to proceed further.

In one embodiment, the engine sets a meeting for production VP or second user, director of production or third user, and production staff to analyze the production data. At one step, the engine presents context and objective of the meeting to achieve the target, for example, "Thank you for attending the meeting. Context: The c suite is looking into an issue of how can we increase the production from 200 to 2000 pillows. You are part of a team that is tasked with checking bottlenecks in the current production system. Why this meeting: initial analysis by the software shows that current production system has bottlenecks. Objective: this specific task is to identify causes and root causes of bottlenecks. Your expertise will help this team and me to find out the facts and present those to the c suite. Ask: participate in the discussion, provide data, facts and view points. My (software) role: drive the conversation, ask questions, align team, find insights and ultimately record impact areas". The production VP or second user begins the data analysis as "thank you for the information. I think we are all aligned. We want the best for the team and the company. Lets begin the data analysis". The engine takes a moment to understand the situation in detail as "thank you. Let me take a moment to understand this and then wen can start discussing the insights". The engine then presents a graph of the current production profile having five steps such as prep, fill, puffing, packing, and storage and shipping. Further, the engine presents the capacity and throughput. For example, "This graph is the current production profile. It has five steps such as prep, fill, puffing, packing, and storage and shipping. And there are two variables that are being tracked i.e., capacity and throughput. Throughput is how may pillows we actually make per day. Capacity is the name plate capacity of the plant and is how much particular stage can produce at the maximum level, is that accurate?". The second user acknowledges the data presented by the engine as "that's true". At another step, the engine summarize the data from the graph as "from this we see that the actual production which is the throughput is only 200 pillows per day. There is definitely a bottleneck at the puffing stage. Thinking about the key goal that we had, i.e., we need to produce 2000 pillows per day, so we are definitely not there, so let me mark that. So, what I'd like to do is figure out where the causes are then find the root causes and then fix those and then I'll check if we are at 2000 and proceed from there". The second user then raise queries regarding insights, for example, "Ok. What are the three insights that the team need to focus on". At another step, the engine presents the three insights as "the first insight I can identify is that, we are at 200 pillows per day due to the puffing phase being at a maximum capacity of 200 pillows per day". "The second insight I can identify is, if we were to upgrade the plant, then we can get a maximum of 1000 pillows per day and so we are not going to get to 2000 pillows per day that we were originally hoping. So, I'd have to look at the other ways to doubling that capacity, or the throughout I should say". "The third insight I can identify is that, lets say we upgrade the puffing stage and we upgrade it back to lets say 1000, theoretically lets day we could actually make 1000 pillows in the puffing phases such as packing, prep, and filling, all in that order. So all the bottlenecks will need to be dealt with". The second user informs/request the engine and team to focus on puffing as "for now lets focus on puffing. Once we understand how to drill down and fix as a team, the same team then can finish the rest of the steps and report to me". The third user or director of production accepts the request as "that makes sense. We only need strategic direction on one of these areas".

At another step, the engine focuses on puffing stage as "ok I will focus on puffing stage only. If we need more help, I can be available. The steps are fairly similar". The engine then sets a follow up meetings for the engine and the other work streams for the third user as "I can set up follow up meetings for you for the other work streams". The third user responds to the engine and requests to suggest milestones as "sounds good. Please suggest milestones for me and my team, so that we can review those with the VP production". The second person requests to brainstorm the ways to take the production from 1000 to 2000 as "of course, then we need to brainstorm the ways of taking the production from 1000 to 2000 also". The engine now drill down on puffing stage and tries to figure out the root causes for bottleneck in order to bring the production up to about 1000 pillows per day, for example, "Thanks. Drilling down on puffing stage, lets try to figure out the root causes for bottleneck here so your teams can de-bottleneck this stage and bring it up to 1000 pillows per day at puffing".

In one embodiment, the engine continues the meeting with the production VP or second user for brainstorming using the brainstorming module 110 (shown in FIG. 17). In one embodiment, brainstorm 1 is conducted for puffing stage to identify the root causes of production bottlenecks. The engine also sets a meeting for director of production or third user and the production staff to brainstorm other areas of production such as prep, fill, packing, and storage and shipping. The team solves the other debottlenecking by themselves similar to the puffing phase.

In one embodiment, the meeting continues with the production VP or second user, director of production or third user, and production staff. The team discuss about all the root causes before starting the brainstorming session for puffing stage. At one step, the engine initiates brainstorming session, for example, "the key question we would lie to brainstorm for is why is puffing stage only at 200 pillows per day?". The engine picks a formula based on a template for this brainstorming session, as follows:

$$\frac{\#P}{d} = \frac{\#P}{h} \times \frac{\text{hours of operations}}{\text{day}}$$

The formula calculates the number of pillows per day is a function of number of pillows per hour into number of hours of operation per day. The number of pillows per hour is a function of hardware, software, and manpower, since the team ultimately need machines and manpower to make these pillows, $$\text{i.e., } \frac{\#P}{\#Mc/h} \times \#Mc.$$

The engine builds a structure in the hardware part to analyse the production per day. The engine then explains the equation for number of pillows per hour, for example, "I would say it'll be number of pillows per machine per hour into number of machines. Number of pillows made by the machine per hour into number of machines, that'll give you number of pillows per hour". From the software perspective, the engine brainstorms a few reasons as "there is probably total lack of software implementation in this business or industry, maybe they are old school, there is partial software, so partial digitization or its inefficient due to various reasons". From manpower perspective, the engine brainstorms productivity and number of people working on the this as "I could say there's again two or three factors, one is the productivity and the other is the number of people working on this in this step".

In one embodiment, the engine then moves to the next step or problem solving module 114 (shown in FIG. 20) to solve the problem, where the meeting continues with production VP or second user, director of production or third user, and production staff. The second user accepts the explanation provided by the engine and collects additional information from other members such as third user and production staff. The director of production and the staff presents addition information, for example, "yeah, we have got machines. Lets look into this. There is no manpower. There is no software issue but I like your idea of digitizing processes. Probably we can do this at certain time later on. On the hardware side, currently, we have one machine that makes 200 pillows per day". Then the team with the directors and staff involves to find the similar solutions for rest of the steps in the production process. At another step, the engine provides options to increase the production with the current machine or with a new machine, for example, "Thanks, lets hypothesize we can triple the production in house. If we were to do that correctly. you get 1000 pillows per day. To achieve that goal, we can do that with current machine or with a new machine. With the current machine, we use the one we have—run it longer, run it more efficient (make modifications). With a new machine-install more of the same m/c (to get to 1000), we can get a much better machine (make 1000 pillows)". The staff analyses the details provided by the engine and takes time to work on the options provided by the engine to close the gap, for example, "lets look into this a bit more, both options. We are working to close the gap and we have similar options. We can provide figures and details. Please give us a day to get these". At another step, the engine applies another framework to process the goal.

In one embodiment, the engine restructures the frame work using MG case matrix 104 and structuring module 108. In one embodiment, the engine pulls up a right template or template 8 156 from the MG case matrix 104 and fills the discussed details and continue on this path for the next discussion, for example, "the best framework for our sub question is an optional framework as shown. I can pre-fill the details discussed till now and continue on this path for our next discussion". The team meets after a day with at least two options such as replacing the current machine with a brand new machine and adding another machine and discuss with the engine for the best solution, for example, "currently we've got two options. Option one is, get a new machine, brand new machine, new technology, and replace the current machine with this new machine. This new machine has a set up time of 120 minutes per day and makes 2 pillows per minute. Option two is the exact same technology, add another machine, and set-up time is 90 minutes per day but it makes 1 pillow for every 2 minutes. Which one should I get just based on the capacity alone?".

At one step, based on the received input, the engine updates the structure and starts to analyse the information and raise few queries to clearly understand the advantages and disadvantages of the options, for example "Thank you for this information. Let me make sure that I understood this problem. Option one is replace the current machine with something with new technology, the set up time is 120 minutes per day. Is this something that happens in the morning or what is this about?". The user responds that the time mentioned is a setup time required for the worker to setting up the machine, so that the machine can produce for the rest of the day, for example, "this is really workers setting up the machine, so machines can produce for the rest of the day". Also, the engine confirms with the user that the setup time is a part of the 8 hours of a day. At another step, the engine analysis the second option, for example, "Option two is, get another machine with the same technology and that machine has 90 minute per day set up time, so that's less than machine 1 but it makes 1 pillow per every 2 minutes rather than 2 pillows per minute. Okay, so, the way I would like to approach this is first calculate how many pillows does machine 1 make and then how many pillows does machine 2 make and compare those two and then we can proceed from there". The user acknowledges the engine's suggestion.

At another step, the engine processes the option one using the formula as follows:

$$\frac{\#P}{d} = \frac{\#2P}{\text{minute}} \times \frac{6 \times 60m}{h} = \frac{720P}{\text{day}}$$

wherein, the set up time is 120 minutes that's equal to 2 hours, where the machine is not operational. Total time is 8 hours, so operational time is 6 hours. In 6 hours, the machine can make 2 pillows per minute, then 120 pillows per hour for 60 minutes. So this gives the value of how many number of pillows per day. Therefore, the machine can produce 720 pillows per day from option one.

At another step, the engine processes the option two, where a new machine with the same technology used in the current machine is installed. The current machine makes 200 pillows per day and the new machine will make 200 pillows. Lets add the capacity of 200 pillows per day. Therefore, the older and new machines can produce 400 pillows per day.

At another step, the engine compares the results of the two options, for example, "Looking at this, with option one, we won't be at 1000 pillows per day, but we would be at 720 pillows per day. Other ways we can increase production is like I mentioned in my structure, increase the time of operation per machine or the productivity of the machine. So, we could probably get at 1000 pillows per day". The production VP and the director of production acknowledges with the engine's comparison result. The team further discusses and brainstorm to ramp up the production beyond 1000 pillows/day.

In one embodiment, the engine works on the third bucket to achieve the goal as "Of course. The third bucket is about how to manage the transition to a new machine and also change the operating times to allow us to make 1000 pillows per day. At a high level we need to procure the machine, prep the space for installation without loosing volumes, and transition to 1000 pillows per day". The user accepts the structure and allows the team to work on the structure as "This is a good structure, we can work with this. Procurement our teams have identified 3 vendors and we can get competitive quotes. Key areas are price and timeline. Timeline needs to be within 1 year so say 8-10 months. We have worked with all three vendors so this is low risk operation". The team further discuss about the installation and request the engine to build risk and opportunities register as "We have procedures for installation of machines at this facility so that is low risk operation too. We can involve our project management and operations teams to start looking into the installation and change management process and de risk this. They probably have opportunities to upgrade the facility and processes around this project also. Can you please build a risk and opportunities register for us to start this project?". At another step, the engine creates a risk and opportunity register for the operations and project management teams. At another step, the user takes the risk and opportunity register for the execution. Also, staff work on the de-bottlenecking of other stages by login into the system. The engine then allocates two weeks of time.

In one embodiment, the engine also sets a meeting for corporate M&A VP to join as they oversee the external expansion/acquisitions, etc. The engine then finishes the structure. In one embodiment, the corporate M&A VP receives email and meetings scheduled by the engine to increase the production supply. In one embodiment, the email defines the task as per the structure generated as shown in template-1 142. In one embodiment, the corporate M&A VP interacts with the decision making engine via voice interaction. At one step, the engine request the corporate M&A VP to have a brainstorm to the additional production to increase the supply production, for example, "Hi Roger (corporate M&A VP), based on the c suite discussions, the CEO and COO would like to know if we can gain access to additional production to increase our supply production from 1000 pillows per day to 2000 p/d. VP Production and his team have already worked on ramping up internal production to 1000 p/d. Production VP would like to brainstorm with you and co present solutions to C suite". The corporate M&A VP accepts the request for the meeting as "sure that makes sense. I can be available for a meeting. You can set a meeting based on my availability. I'll also chat with him. thanks". The engine send mail to check their availability and sets a meeting. The corporate M&A VP accepts the email and proceeds to the next step. In one embodiment, the engine could perform speed math with voice recognition using speed math module 116.

In one embodiment, the engine further arranges a meeting for brainstorming using brainstorming module 110 (shown in FIG. 17) with corporate M&A VP (VP of corporate development & Expansion) and Production VP to increase the productivity from 1000 to 2000 pillows per day. In one embodiment, the corporate M&A VP and production VP receive emails and meetings scheduled by the engine to increase the production supply. In one embodiment, the email defines the task as per the structure generated as shown in template-1 142. In one embodiment, the corporate M&A VP and production VP interacts with the decision making engine via voice interaction. At one step, the engine interacts with the M&A VP and production VP to discuss the brainstorming ideas to increase the production from 1000-2000 per day. The M&A VP and production VP presents the solutions. At another step, the engine discuss the two options as "sure! To enhance the production of pillows form current inhouse capacity of 1000-2000 in 1 year. We can think of 2 options: option one is we do ourselves, and option two is we get from someone else".

At another step, the engine provides different insights by analyzing the option one, for example, "with respect to option 1, we can modify/expand the current facility. Here we can buy a new number of machines or improve the existing machines. Also, we can build another facility". At another step, the engine provides different insights by analyzing the option two in detail as "with respect to option 2, we get We get from someone else. Here we can buy production, rent product and Outsourced or whitelabled. Buy Production: We can either acquire facility or merge with another facility. Rent Production: We can rent full facility or partial rent. Outsourced or whitelabled: Full Outsourced or partial". The M&A VP accepts the insights given by the engine as "thanks for coming up with this insight. If we talk about option 1: We can buy new machines. Improving existing machine would not be ideal, also building another facility in less than a year would not be feasible". At another step, the engine makes decision for option 1 based on the knowledge acquired during the brainstorming session, for example, "thanks for making this clear, so in option 1, we can only think to buy more new machines". At another step, the engine analyzes the option 2, for example, "Yeah! Option 2: Buying or acquiring the facility would be expensive. But definitely we can think about the rent production. I think outsourcing could decrease the quality standards but it could be a long term option. Not a small term option". At another step, the engine brainstorms further to understand the execution, risk, and opportunities, for example, "thanks, we need to now understand the execution, risk, and opportunities. I can also transition to a structure so that we can record this in the right format".

In one embodiment, the engine then restructures the frame using MG case matrix 104 and structuring module 108. The engine request the corporate M&A VP and production VP to have a brainstorming session using a brainstorming module 110 for restructuring the frame to rent the production. At one step, the engine pulls up a right template from the MG case matrix 104 to rend the production, for example, "for the question of how can we rent production, I have pulled up a structure from the MG case matrix". At another step, the engine brainstorms about execution risks and opportunities and request permission to add those to the risk register, for example, "We need to now think about Execution Risks and opportunities. Execution wise—how to find a reliable factory that meets our needs, upgrade it if required and start production and meet 1000 pillows per day within one year. I can see a few risks, please confirm if you would like to add these to the risk register—they are listed on the screen". The user allows the engine to add the risks to the risk register and lets involve the M&A team to scan the market to find the right targets for a rental space. At another step, the engine creates a rink and opportunity register for the operations and project management teams. At another step, the engine summarizes the meeting minutes and get this ready for the c suite presentation, for example, "In summary, the M&A team has action items and the production team is already working on other items. I can summarize our findings and get this ready for the c suite presentation". At another step, the engine send email and scheduled meeting to the c-suite. The c suite approves and allows the engine to proceed further.

In one embodiment, the engine directs to case end module 118 (shown in FIG. 22). The engine tie back to c suite in the case end module 118. The engine closes the case meeting with executive management or first user, production VP or second user, and director of production or third user. At one step, the engine request the executive management to approve the summary of the findings for the case, for example, "Hello thank you for attending this meeting. We are meeting regarding case 3246. We set out to understand if we could meet our client needs of delivering 2000 pillows per day from a current 200 pillows per day in the west coast within one year. The production and MBA teams met over the past few weeks and I have a summary of the findings. The ask is if you could please approve this direction so the teams can get budget approvals and proceed". The executive management approves the request to proceed further.

At another step, the engine explains the current status of the case as "Our production team found multiple bottlenecks in the current production process and are in the process of debottlenecking to get the production ramped up internally from 200 to 1000 pillows per day. They also identified a few risks and opportunities and should have progress meetings with the COO next week. Our M&A teams are working on renting additional space to get additional 1000 pillows per day production by the end of the year. They are also working on executing this and should have report for the COO next week. Due to the delays in data collection, we had to update the schedule but the teams are working hard to achieve the target set by the C suite. I have attached the updated schedule also for your review".

At another step, the engine recommends progress monitoring, funding for additional CAPEX needs, and regular meetings with the clients to help them to understand the progress, for example, "monitoring progress and support the teams to achieve their goals, approving funding for additional CAPEX needs, and having regular meetings with our clients to help them understand our progress and also get sales involved to draw up mid-long term contracts to we can secure this demand." The executive management agree the recommendation. Also, it allows the COO and CFO to execute the next steps and take needed actions. At another step, the executive management request the engine to briefly update them every week. At another step, the engine closes the case by accepting the request and circle back with all the stakeholder to keep the executive management updated.

Advantageously, the system of the present invention is used to standardize decision making process for implementation and training in turn provide higher quality and faster decisions. The system helps entities (for example: corporations, government, etc) and people make better decisions. The system manage the decision to gain alignment, (without alignment it is difficult to make decision for teams). The system is configured to train individuals or teams to make better decisions. Also, the system provides end-to-end integrated decision making process from strategic to tactical level, including transitioning between modules. It drive the decision making process (project manage). In addition, it gains alignment with team members, organization. Further, it gains insights and impact.

According to the present invention, the applications of the present invention including, but are not limited to the following: The decision-making engine or integrated end-end decision making (MG Case composite) includes a plurality of modules that work on a specific part of a decision. The MG case composite is taught in a way that is meaningful and could be applied in real life. The engine has various modules that considerably standardize the part of the decision making process and each module can transition to another module. This can be taught to person, teams, computer or network of computers or corporations. One can transition seamlessly from one module to another and practice standard decision making. The engine also connects with other facets of an entity or person (ERP, communication systems, etc). The engine also manages the execution of the decision to a certain extent by assigning tasks, modifying tasks, assessing risks etc. The engine helps people to take decisions in a repeatable and reliable way. It makes them efficient and cuts down non-value added steps/work. Ultimately is makes the ecosystem (people, families, corporations etc) efficient and better.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An integrated system is an autonomous decision-making system using artificial intelligence (AI), executed in a computer-implemented environment to assist users or entities to make decisions, comprising:

a decision making engine interacts with the users to execute various tasks related to decision making, wherein the decision making engine comprises one or more cognitive modules integrated together configured to provide support to users in decision making, wherein each module processes a part of a decision;

a cloud or non-cloud based computing device having a processor and a computer-readable medium in communication with the processor configured to store a set of instructions executed by the processor during each step of decision making, wherein the computing device is in communication with the decision making engine via a communication network;

a database in communication with the decision making engine via the communication network configured to store data related to cognitive norms, and a user device in communication with the computing device via a network, having a user interface with a user profile associated with each user configured to establish interaction between the users during decision making by executing the modules, wherein the one or more cognitive modules are executed by the processor configured to make decision, comprising:

analyzing, via a case open module equipped with speech to text, text to speech, speech recognition, text recognition, search functionality, and artificial intelligence, an input user data provided by the user, in form of a hypothesis or a prompt, and assists the user to refine the input into a problem statement via a structure module equipped with speech to text, text to speech, speech recognition, text recognition, search functionality, and artificial intelligence;

selecting, via a case matrix module, an appropriate template to understand the case situation in more detail;

allowing, via a data analysis module equipped with speech to text, text to speech, speech recognition, text recognition, search functionality, and artificial intelligence, the user to transition from a hypothesis, understand the data needs, gather data through the systems functions, analyze and eventually gain insights and impact;

interacting, via a brainstorm module equipped with speech to text, text to speech, speech recognition, text recognition, search functionality, and artificial intelligence, with the user to take input and assisting them to select an appropriate template to apply specific information to populate the template and build a mutually exclusive collectively exhaustive (MECE) set of solutions and prioritize accordingly;

allowing, via a problem solving module equipped with speech to text, text to speech, speech recognition, text recognition, search functionality, and artificial intelligence, the user to calculate the data that helps them in decision making;

allowing, via a speed math/conversational math module equipped with speech to text, text to speech, speech recognition, text recognition, search functionality, and artificial intelligence, the user to calculate quantitative data required to make decisions, and allowing, via a case end module equipped with speech to text, text to speech, speech recognition, text recognition, search functionality, and artificial intelligence, the user to summarize insights and impact areas, thereby assisting the user to determine the next steps to achieve user's goals, wherein the system calls and recalls one or more internal or external modules repeatedly and operates multiple modules at the same time if required, wherein the system develops standardized question types and offers an integrated, end-to-end process configured to assist the user to solve the issue and make a decision or closing the case, thereby training the users to improve and assess co-scholastic skills including critical-thinking, reasoning, problem-solving, decision-making, self-improvement, communication skills, mental processes, presentation and information processing, issue-solving, verbal communications of the individual in decision making.

2. The system of claim 1, is configured to auto-populate the required data to assist users in decision making.

3. The system of claim 1, wherein the user device is configured to communicate with the cloud-based computing device via the network using an application software or mobile application or, web-based application executed in a computer-implemented environment or network environment.

4. The system of claim 3, wherein the application software operates by running the integrated system and interacting with users to provide end-to end decision making support to users.

5. The system of claim 1, wherein the decision-making engine interacts internally by calling upon internal modules, with users of various facets of the organization.

6. The system of claim 1, wherein the decision-making engine interacts externally by calling upon external modules, with stakeholders, contractors, programs and vendors to answer questions, help shortlist vendors, request specific data sets, help direct vendors, and build contracts.

7. The system of claim 1, wherein the decision-making engine works with existing or new facets of the organization to set agenda, set meetings, assign tasks, align teams, set schedules, drive schedules, modify schedules, initiate and manage risks, opportunities, issues and risk, opportunities and issues registers and track outcomes.

8. The system of claim 1, wherein the case open module is configured to allow the user to listen, reiterate, breakdown of information, and verify the key objectives and constraints, and then build a specific and measurable problem statement.

9. The system of claim 1, wherein the structure module is configured to:

interact with the user to take input;

apply case matrix for selecting an appropriate template;

apply industry specific and/or user specific information to populate the template, and build a usable frame structure.

10. The system of claim 1, wherein the data analysis module is configured to:

interact with the user to take input;

assist the user to identify the data needs to solve one or more sub-issues or key issues;

assist the user to procure the data through internal or external sources;

utilize the algorithm to analyse the data to gain observations and deeper insights, and assist the user to move further in a direction to set solution.

11. The system of claim 1, wherein the brainstorming module is configured to:

interact with the user to take input;

help the user to select the template;

apply industry specific and user specific information to populate the template, and build an MECE set of solutions to prioritize the issue for the user to act on.

12. The system of claim 1, wherein the problem solving module is configured to:

interact with the user to take input;

help the user to frame the problem similar to case open module;

work with the user to identify the key variables;

break down the information and equation into multiple parts;

help user to apply assumptions at each step of the equation to start calculating sub-results, and solve the equation to give the user an answer or a range of answers.

13. The system of claim 1, wherein the one or more internal or external modules are repeated or called back again for decision making.

14. The system of claim 1, further comprises one or more sub-modules include:

a driving and alignment module configured to drive the decision making process by developing viewpoints for entity specific situation by drawing on its own database and user information, wherein the driving and alignment module focuses on strategic areas by making reasonable viewpoints and prioritizes key areas for users to focus on;

an integration and transition module configured to align the stakeholders by building a collaborative environment at multiple levels and recording its decision making trail, wherein the integration and transition module integrates all of the modules for transition from one module to the other module and calls upon modules at the same for multiple times or repeatedly as needed with various or same teams to support decision making, and an insights and impacts module configured to gain and/or develop key qualitative and quantitative insights throughout the process in every module and delivers impact to the stakeholders through analysis and acumen, wherein the system develops lower and higher level insights.

15. A method for assisting users to make decisions using artificial intelligence (AI), executed in a computer-implemented environment having a decision making engine configured to interact with the users to execute various tasks related to decision making, wherein the decision making engine comprises one or more cognitive modules integrated together configured to provide support to make decisions for users, wherein each module processes a part of a decision; a cloud-based computing device having a processor and a computer-readable medium in communication with the processor configured to store a set of instructions executed by the processor during each step of decision making, wherein the computing device is in communication with the decision making engine via a communication network; a database in communication with the decision making engine via the communication network configured to store data related to cognitive norms, and a user device in communication with the computing device via a network configured to establish interaction between the users during decision making by executing the modules, wherein the cognitive modules are executed by the processor configured to make decision at organization, comprising the steps of:

allowing the user to enter into the system by creating a user profile using one or more user credentials;

providing user data as input into the system; applying a case open module equipped with speech to text, text to speech, speech recognition, text recognition, search functionality, and artificial intelligence, configured to analyze the user data and assists the user to refine the input into a problem statement via a structure module equipped with speech to text, text to speech, speech recognition, text recognition, search functionality, and artificial intelligence;

selecting an appropriate template from a case matrix module to understand the case situation in more detail, applying a data analysis module equipped with speech to text, text to speech, speech recognition, text recognition, search functionality, and artificial intelligence, to allow the user to transition from a hypothesis, understand the data needs, gather data through the systems functions and eventually gain insights and impact;

applying a brainstorming module equipped with speech to text, text to speech, speech recognition, text recognition, search functionality, and artificial intelligence, to interact with the user to take input and assisting them to select an appropriate template to apply specific information to populate the template and build a mutually exclusive collectively exhaustive (MECE) set of solutions;

applying a problem solving module equipped with speech to text, text to speech, speech recognition, text recognition, search functionality, and artificial intelligence, to allow the user to calculate the data that helps them in decision making;

applying a speed math/conversational math module equipped with speech to text, text to speech, speech recognition, text recognition, search functionality, and artificial intelligence, to allow the user to calculate quantitative data required to make decisions, and applying a case end module equipped with speech to text, text to speech, speech recognition, text recognition, search functionality, and artificial intelligence, configured to help the user to summarize insights and impact areas, thereby assisting the user to determine the next steps to achieve user's goals, wherein one or more internal or external modules are called and recalled repeatedly and multiple modules are operated at the same time if required, wherein the system develops standardized question types and offers an integrated, end-to-end process configured to assist the user to solve the issue and make a decision or closing the case by assessing co-scholastic skills including critical-thinking, reasoning, problem-solving, decision-making, self-improvement, communication skills, mental processes, presentation and information processing, issue-solving, verbal communications of the individual in decision making.

16. The method of claim 15, wherein the case open module is configured to allow the user to listen, reiterate, breakdown of information, and verify the key objectives and constraints, and then build a specific and measurable problem statement.

17. The method of claim 15, wherein the structure module is configured to perform the following steps of:

interacting with the user to take input;

applying case matrix module for selecting an appropriate template;

applying industry specific and/or user specific information to populate the template, and building a usable framework or structure.

18. The method of claim 15, wherein the data analysis module is configured to perform the following steps of:

interacting with the user to take input;

assisting the user to identify the data needs to solve one or more sub-issues or key issues;

assisting the user to procure the data through internal or external sources;

utilizing the algorithm to analyse the data to gain observations and deeper insights, and assisting the user to move further in a direction to set solution.

19. The method of claim 15, wherein the brainstorming module is configured to perform the following steps of:

interacting with the user to take input;

helping the user to select the template;

applying one or more industry specific and user specific information to populate the template, and building an MECE set of solutions to prioritize the issue for the user to act on.

20. The method of claim 15, wherein the problem-solving module is configured to perform the following steps of:

interacting with the user to take input;

helping the user to frame the problem similar to case open module;

working with the user to identify the key variables;

breaking down the information and equation into multiple parts;

helping user to apply assumptions at each step of the equation to start calculating sub-results, and solving the equation to give the user an answer or a range of answers.

* * * * *